United States Patent
Lee et al.

(10) Patent No.: US 9,621,311 B2
(45) Date of Patent: Apr. 11, 2017

(54) PILOT TRANSMISSION AND RECEPTION FOR ORTHOGONAL FREQUENCY DIVISION MULTIPLE ACCESS

(71) Applicant: NEWRACOM, INC., Irvine, CA (US)

(72) Inventors: Dae Won Lee, Irvine, CA (US); Young Hoon Kwon, Irvine, CA (US); Sungho Moon, Irvine, CA (US); Yujin Noh, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/150,127

(22) Filed: May 9, 2016

(65) Prior Publication Data
US 2016/0330000 A1 Nov. 10, 2016

Related U.S. Application Data

(60) Provisional application No. 62/159,187, filed on May 8, 2015.

(51) Int. Cl.
*H04B 7/02* (2006.01)
*H04L 1/02* (2006.01)
*H04L 5/00* (2006.01)
*H04W 72/12* (2009.01)

(52) U.S. Cl.
CPC .......... *H04L 5/0007* (2013.01); *H04L 5/0048* (2013.01); *H04W 72/1263* (2013.01)

(58) Field of Classification Search
CPC  H04L 5/0048; H04L 27/2613; H04L 27/2675
See application file for complete search history.

(56) References Cited

U.S. PATENT DOCUMENTS

| 2004/0131011 | A1 | 7/2004 | Sandell et al. | |
|---|---|---|---|---|
| 2005/0117670 | A1* | 6/2005 | Webster | H04L 27/2602 375/330 |
| 2007/0195899 | A1* | 8/2007 | Bhushan | H04B 7/0452 375/260 |
| 2008/0043860 | A1 | 2/2008 | Moffatt | |
| 2008/0232239 | A1* | 9/2008 | Mujtaba | H04B 7/0669 370/209 |

(Continued)

OTHER PUBLICATIONS

Zhang, H., "HE-LTF Proposal", Mar. 2015, IEEE, IEEE 802.11-15/0349, p. 1-43.*

(Continued)

*Primary Examiner* — Shuwang Liu
*Assistant Examiner* — Sung Ahn

(57) ABSTRACT

A wireless device transmits a frame by determining a plurality of Resource Units (RUs) of the frame, providing pilots in a first RU of the frame at a first set of positions, providing pilots in a second RU of the frame at a second set of positions, and transmitting the frame. The first set of positions is different from the second set of positions. A wireless device receives a frame including an RU including pilots and processes the pilots. When an RU for the data symbol includes an odd-numbered lowest subcarrier, the pilots are included at a first set of positions in the resource unit. When the RU includes an even-numbered lowest subcarrier, the pilots are included at a second set of positions in the resource unit. The second set of positions is different from the first set of positions.

20 Claims, 54 Drawing Sheets

(56) References Cited

U.S. PATENT DOCUMENTS

| | | |
|---|---|---|
| 2010/0002787 A1 | 1/2010 | Choi et al. |
| 2010/0080265 A1 | 4/2010 | Moffatt et al. |
| 2010/0080309 A1* | 4/2010 | Moffatt ................. H04L 27/262 375/260 |
| 2010/0272033 A1 | 10/2010 | Fwu et al. |
| 2011/0150115 A1 | 6/2011 | Schmidl et al. |
| 2011/0216677 A1 | 9/2011 | Ahmadi et al. |
| 2011/0305296 A1* | 12/2011 | Van Nee ............... H04L 5/0048 375/295 |
| 2012/0121040 A1 | 5/2012 | Yu et al. |
| 2012/0218983 A1* | 8/2012 | Noh ..................... H04B 7/0452 370/338 |
| 2012/0320836 A1* | 12/2012 | Lomnitz ............... H04W 16/00 370/329 |
| 2013/0107893 A1* | 5/2013 | Zhang ...................... H04L 1/00 370/474 |
| 2013/0215868 A1 | 8/2013 | Chun et al. |
| 2013/0230120 A1* | 9/2013 | Yang ................... H04L 27/2613 375/295 |
| 2013/0315342 A1* | 11/2013 | Um ..................... H04L 27/2613 375/295 |
| 2014/0307650 A1 | 10/2014 | Vermani et al. |

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

International Search Report and Written Opinion for PCT/US2016/031501, filed May 9, 2016.

* cited by examiner

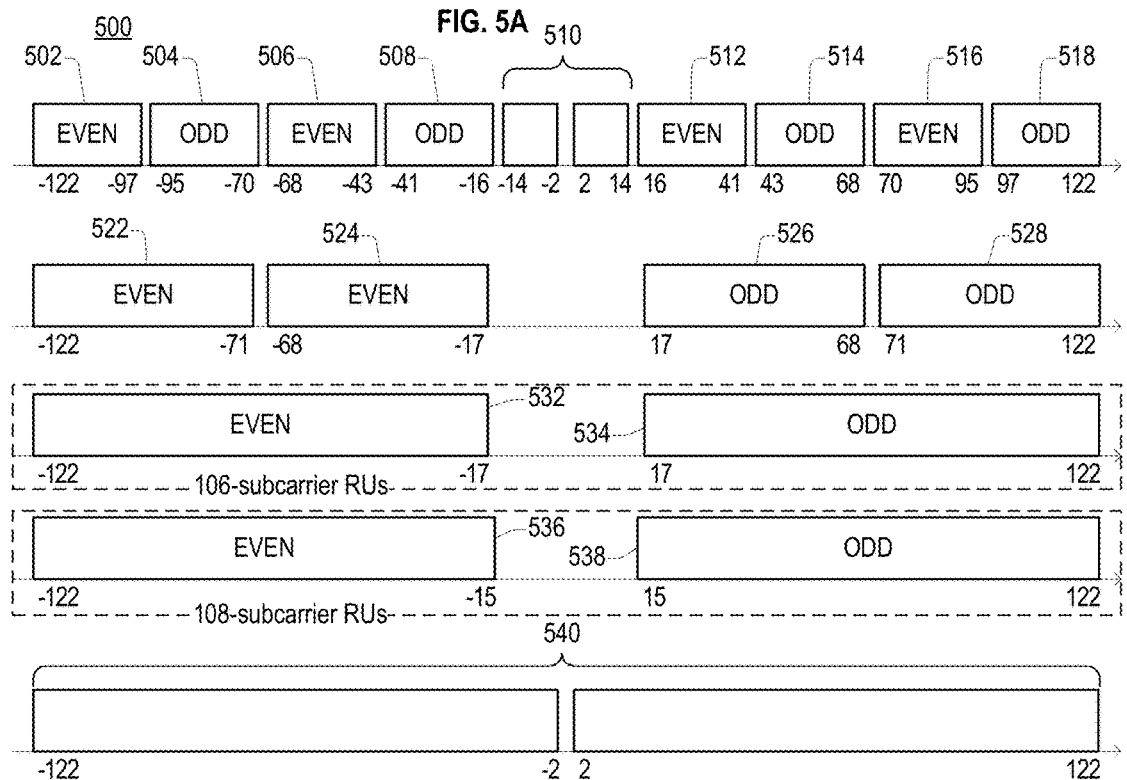

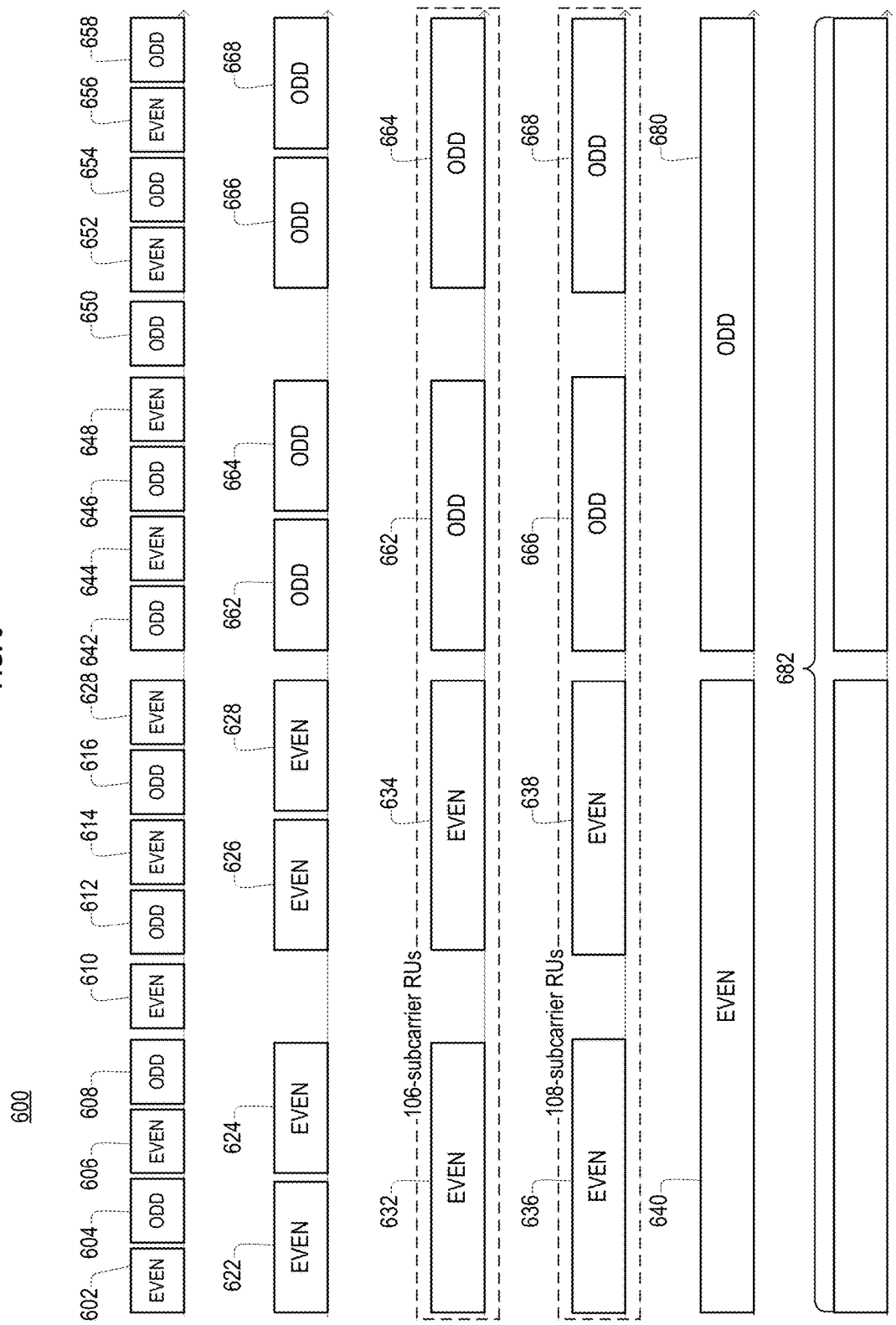

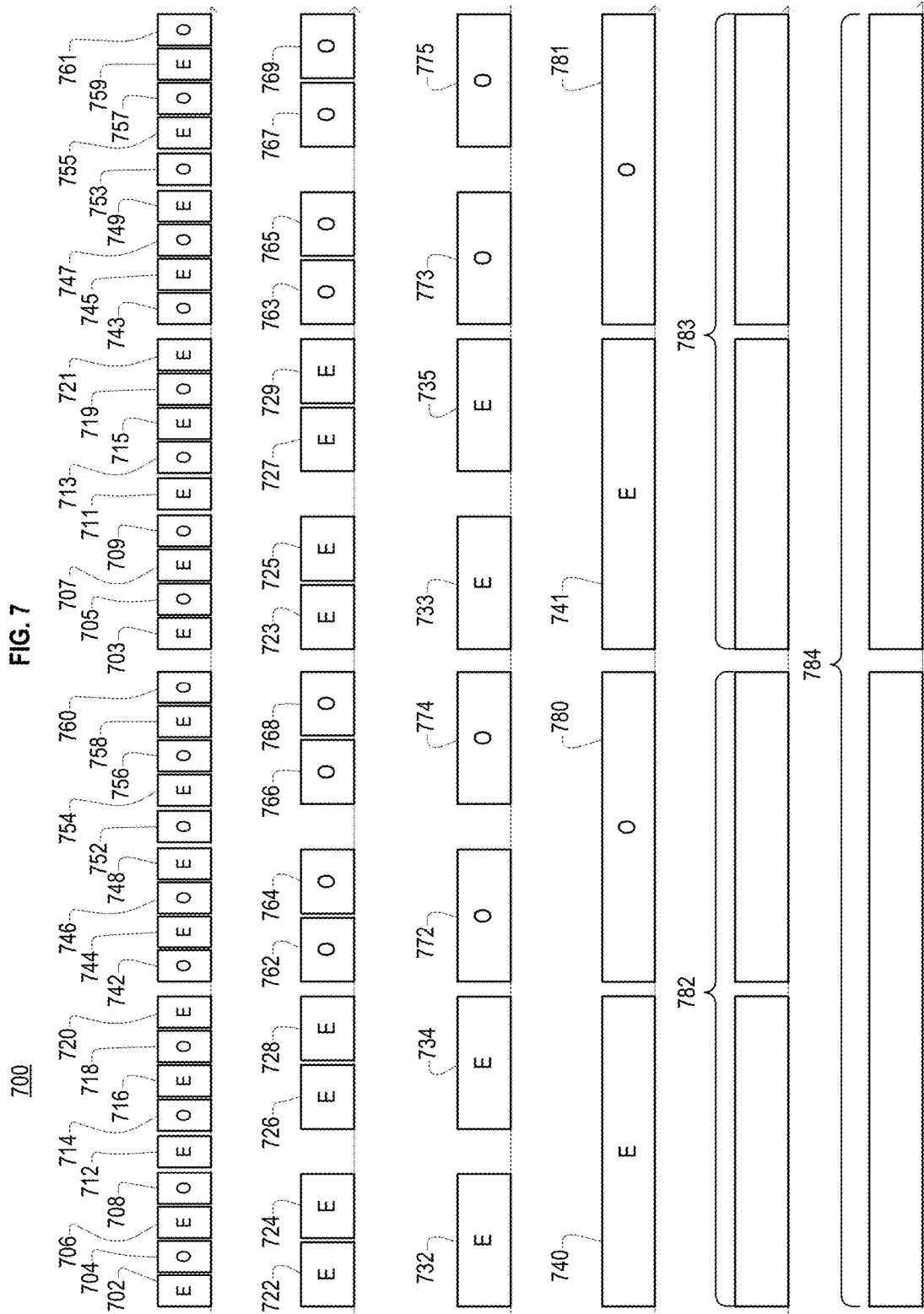

FIG. 8B Table 2

| Ref. | No. of SCs | First SC Index | Last SC Index | Type |
|---|---|---|---|---|
| 802 | 26 | -122 | -97 | EVEN |
| 804 | 26 | -96 | -71 | EVEN |
| 806 | 26 | -68 | -43 | EVEN |
| 808 | 26 | -42 | -17 | EVEN |
| 810 | 26 | -14 | -2 | CENTER |
|  |  | 2 | 14 |  |
| 812 | 26 | 17 | 42 | ODD |
| 814 | 26 | 43 | 68 | ODD |
| 816 | 26 | 71 | 96 | ODD |
| 818 | 26 | 97 | 122 | ODD |
| 822 | 52 | -122 | -71 | EVEN |
| 824 | 52 | -68 | -17 | EVEN |
| 826 | 52 | 17 | 69 | ODD |
| 828 | 52 | 71 | 122 | ODD |
| 832 | 106 | -122 | -17 | EVEN |
| 834 | 106 | 17 | 122 | ODD |
| 836 | 108 | -122 | -15 | EVEN |
| 838 | 108 | 15 | 122 | ODD |
| 840 | 242 | -122 | -2 | EVEN |
|  |  | 2 | 122 |  |

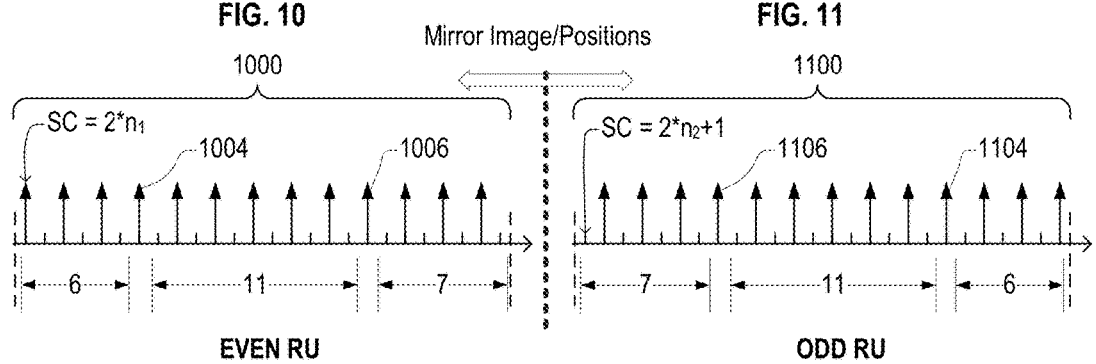
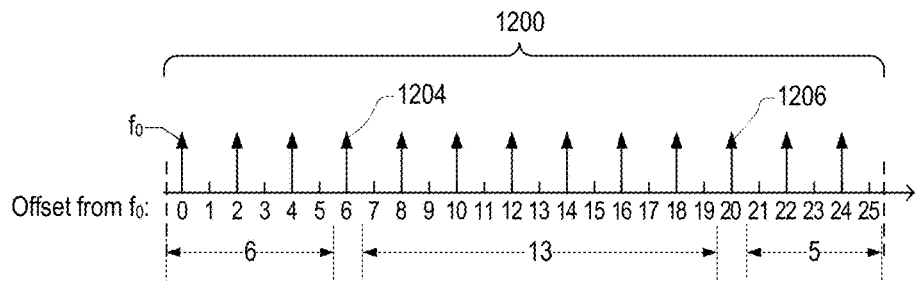
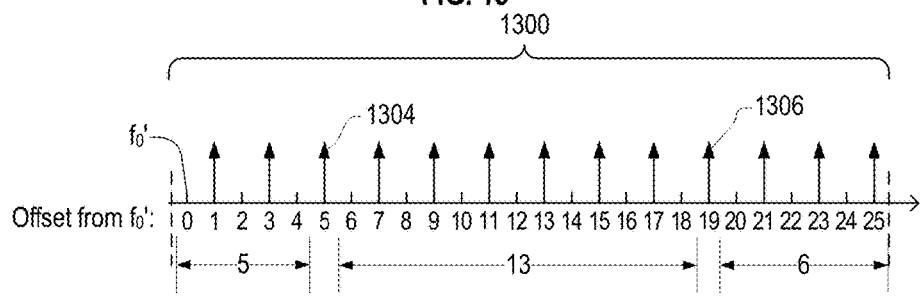
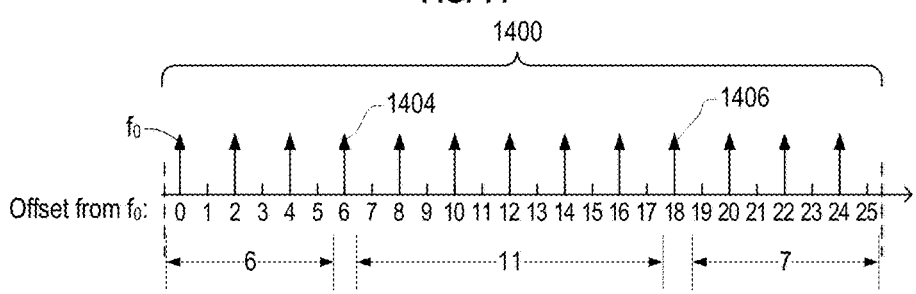

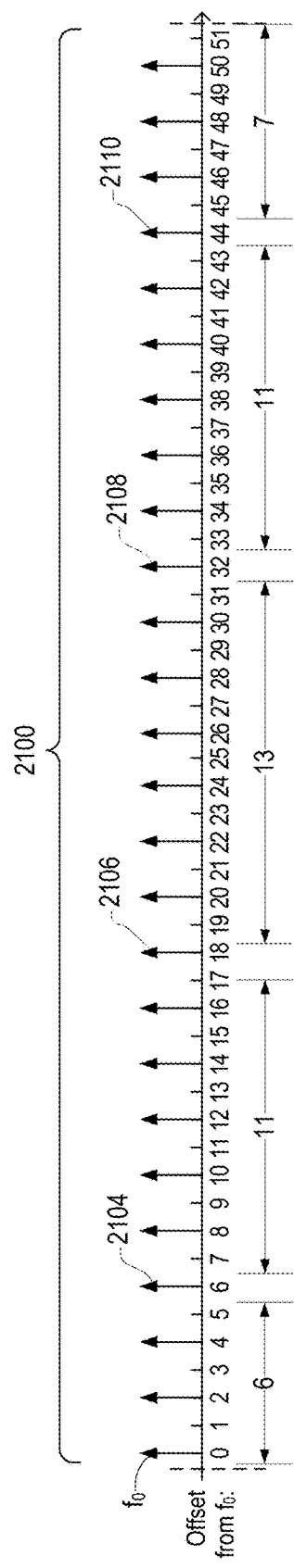
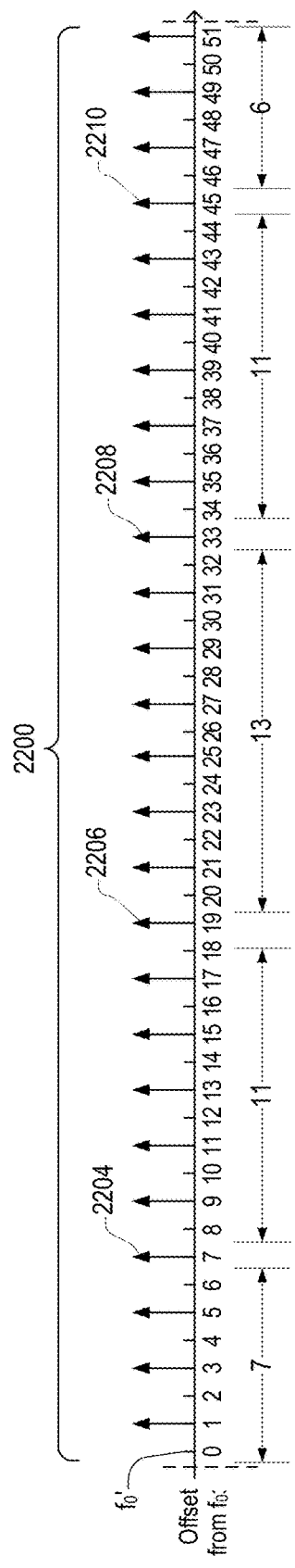

FIG. 23
Table 3. Pilot Tone Relative Positions in 106 Subcarrier RUs

| RU Type/ LTF Tone Mapping | Option a | | | | Option b | | | | Option c | | | |
|---|---|---|---|---|---|---|---|---|---|---|---|---|
| | EVEN/EVEN or ODD/ODD | | ODD/EVEN or EVEN/ODD | | EVEN/EVEN or ODD/ODD | | ODD/EVEN or EVEN/ODD | | EVEN/EVEN or ODD/ODD | | ODD/EVEN or EVEN/ODD | |
| | SC | Gap | SC | Gap | SC | Gap | SC | Gap | SC | Gap | SC | Gap |
| Low SC | 0 | 14 | 0 | 13 | 0 | 12 | 0 | 15 | 0 | 16 | 0 | 11 |
| 1st Pilot | +14 | 25 | +13 | 25 | +12 | 25 | +15 | 25 | +16 | 25 | +11 | 25 |
| 2nd Pilot | +40 | 25 | +39 | 25 | +38 | 25 | +41 | 25 | +42 | 25 | +37 | 25 |
| 3rd Pilot | +66 | 25 | +65 | 25 | +64 | 25 | +67 | 25 | +68 | 25 | +63 | 25 |
| 4th Pilot | +92 | 13 | +91 | 14 | +90 | 15 | +93 | 12 | +94 | 11 | +89 | 16 |
| High SC | +105 | - | 105 | - | 105 | - | 105 | - | 105 | - | 105 | - |

FIG. 24
Table 4. Pilot Tone Relative Positions in 108 Subcarrier RUs

| RU Type/ LTF Tone Mapping | Option a | | | | Option b | | | | Option c | | | |
|---|---|---|---|---|---|---|---|---|---|---|---|---|
| | EVEN/EVEN or ODD/ODD | | ODD/EVEN or EVEN/ODD | | EVEN/EVEN or ODD/ODD | | ODD/EVEN or EVEN/ODD | | EVEN/EVEN or ODD/ODD | | ODD/EVEN or EVEN/ODD | |
| | SC | Gap | SC | Gap | SC | Gap | SC | Gap | SC | Gap | SC | Gap |
| Low SC | 0 | 8 | 0 | 9 | 0 | 10 | 0 | 7 | 0 | 6 | 0 | 11 |
| 1st Pilot | +8 | 17 | +9 | 17 | +10 | 17 | +7 | 17 | +6 | 17 | +11 | 17 |
| 2nd Pilot | +26 | 17 | +27 | 17 | +28 | 17 | +25 | 17 | +24 | 17 | +29 | 17 |
| 3rd Pilot | +44 | 17 | +45 | 17 | +46 | 17 | +43 | 17 | +42 | 17 | +47 | 17 |
| 4th Pilot | +62 | 17 | +63 | 17 | +64 | 17 | +61 | 17 | +60 | 17 | +65 | 17 |
| 5th Pilot | +80 | 17 | +81 | 17 | +82 | 17 | +79 | 17 | +78 | 17 | +83 | 17 |
| 6th Pilot | +98 | 9 | +99 | 8 | +100 | 7 | +97 | 10 | +96 | 11 | +101 | 6 |
| High SC | +107 | - | +107 | - | +107 | - | +107 | - | +107 | - | +107 | - |

FIG. 25
Table 5. Pilot Tone Relative Positions in 242 Subcarrier RUs

| RU Type/ LTF Tone Mapping | 20MHz Bandwidth | | | | 40, 80, or 160MHz Bandwidth | | | | | | |
|---|---|---|---|---|---|---|---|---|---|---|---|
| | Opt. a | Opt. b | a or b | | Option a | | | | Option b | | |
| | LTF EVEN | LTF EVEN | LTF ODD | | EVEN/EVEN or ODD/ODD | | ODD/EVEN or EVEN/ODD | | EVEN/EVEN or ODD/ODD | | ODD/EVEN or EVEN/ODD | |
| | SC | SC | SC | Gap | SC | Gap | SC | Gap | SC | Gap | SC | Gap |
| Low SC | -122 | | | 18/20/19 | 0 | 18 | 0 | 19 | 0 | 20 | 0 | 19 |
| 1st Pilot | -104 | -102 | -103 | 27 | 18 | 27 | 19 | 27 | 20 | 27 | 19 | 27 |
| 2nd Pilot | -76 | -74 | -75 | 35 | 46 | 35 | 47 | 35 | 48 | 35 | 47 | 35 |
| 3rd Pilot | -40 | -38 | -39 | 37 | 82 | 27 | 83 | 27 | 84 | 27 | 83 | 27 |
| 4th Pilot | -12 | -10 | -11 | 23/19/21 | 110 | 19 | 111 | 19 | 112 | 17 | 111 | 17 |
| 5th Pilot | +12 | +10 | +11 | 27 | 130 | 27 | 131 | 27 | 130 | 27 | 119 | 27 |
| 6th Pilot | +40 | +38 | +39 | 35 | 158 | 35 | 159 | 35 | 158 | 35 | 157 | 35 |
| 7th Pilot | +76 | +74 | +75 | 37 | 194 | 27 | 195 | 27 | 194 | 27 | 193 | 27 |
| 8th Pilot | +104 | +102 | +103 | 18/20/19 | 222 | 19 | 223 | 18 | 222 | 19 | 221 | 20 |
| High SC | +122 | | | - | +241 | - | +241 | - | +241 | - | +241 | - |

FIG. 26

Table 6. Pilot Tone Relative Positions in 242 Subcarrier Resource Blocks

| Block Type/<br>LTF Tone Mapping | Option A | | Option B | | Option C | |
|---|---|---|---|---|---|---|
| | EVEN/EVEN<br>or ODD/ODD | ODD/EVEN or<br>EVEN/ODD | EVEN/EVEN<br>or ODD/ODD | ODD/EVEN or<br>EVEN/ODD | EVEN/EVEN<br>or ODD/ODD | ODD/EVEN or<br>EVEN/ODD |
| First Pilot | +16 | +15 | +18 | +17 | +14 | +13 |
| Second Pilot | +46 | +45 | +48 | +47 | +44 | +43 |
| Third Pilot | +76 | +75 | +78 | +77 | +74 | +73 |
| Fourth Pilot | +106 | +105 | +108 | +107 | +104 | +103 |
| Fifth Pilot | +136 | +135 | +138 | +137 | +134 | +133 |
| Sixth Pilot | +166 | +165 | +168 | +167 | +164 | +163 |
| Seventh Pilot | +192 | +195 | +198 | +197 | +194 | +193 |
| Eighth Pilot | +226 | +225 | +228 | +227 | +224 | +223 |

FIG. 27

Table 7. Pilot Tone Relative Positions in Center 242 Subcarrier Resource Blocks

| LTF Tone<br>Mapping | Option A | | Option B | | Option C | |
|---|---|---|---|---|---|---|
| | EVEN | ODD | EVEN | ODD | EVEN | ODD |
| First Pilot | $-f_0-104$ | $-f_0-105$ | $-f_0-102$ | $-f_0-103$ | $-f_0-106$ | $-f_0-107$ |
| Second Pilot | $-f_0-74$ | $-f_0-75$ | $-f_0-72$ | $-f_0-73$ | $-f_0-76$ | $-f_0-77$ |
| Third Pilot | $-f_0-44$ | $-f_0-45$ | $-f_0-42$ | $-f_0-43$ | $-f_0-46$ | $-f_0-47$ |
| Fourth Pilot | $-f_0-14$ | $-f_0-15$ | $-f_0-12$ | $-f_0-13$ | $-f_0-16$ | $-f_0-17$ |
| Fifth Pilot | $+f_0+14$ | $+f_0+15$ | $+f_0+12$ | $+f_0+13$ | $+f_0+16$ | $+f_0+17$ |
| Sixth Pilot | $+f_0+44$ | $+f_0+45$ | $+f_0+42$ | $+f_0+43$ | $+f_0+46$ | $+f_0+47$ |
| Seventh Pilot | $+f_0+74$ | $+f_0+75$ | $+f_0+73$ | $+f_0+73$ | $+f_0+76$ | $+f_0+77$ |
| Eighth Pilot | $+f_0+104$ | $+f_0+105$ | $+f_0+102$ | $+f_0+103$ | $+f_0+106$ | $+f_0+107$ |

Table 9. Pilot Tone Relative Positions

| Tone | Position | Tone | Position |
|---|---|---|---|
| c1 | -116 | c18 | +116 |
| c2 | -102 or -104 | c17 | +102 or +104 |
| c3 | -90 or -88 | c16 | +90 or +88 |
| c4 | -76 | c15 | +76 |
| c5 | -62 | c14 | +62 |
| c6 | -48 or -50 | c13 | +48 or +50 |
| c7 | -36 or -34 | c12 | +36 or +34 |
| c8 | -22 | c11 | +22 |
| c9 | -8 | c10 | +8 |

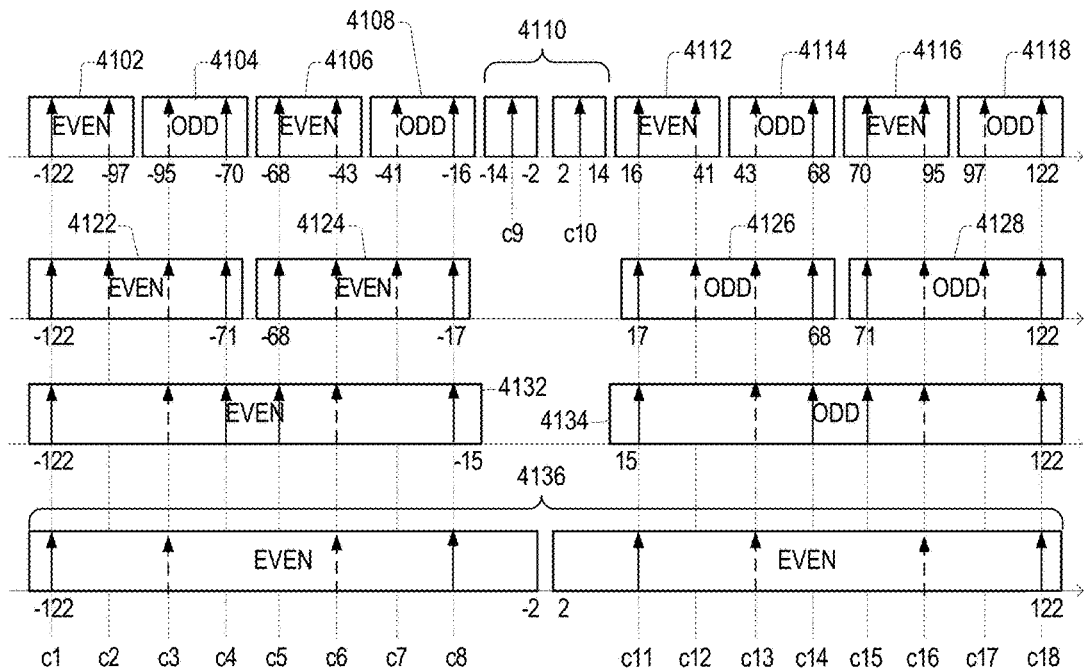
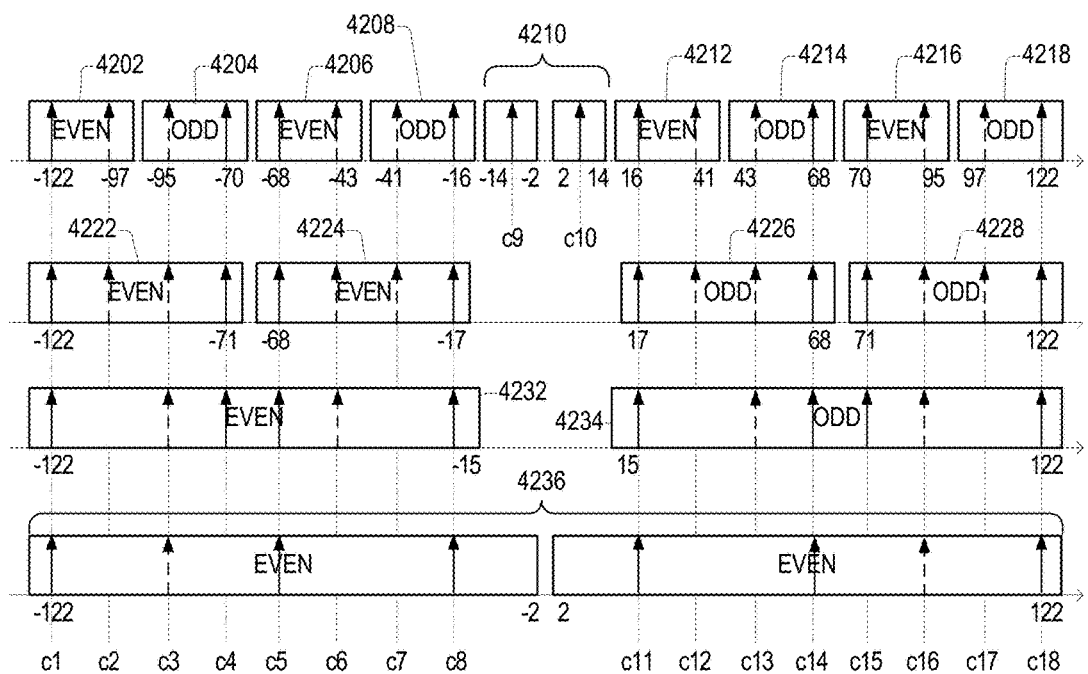

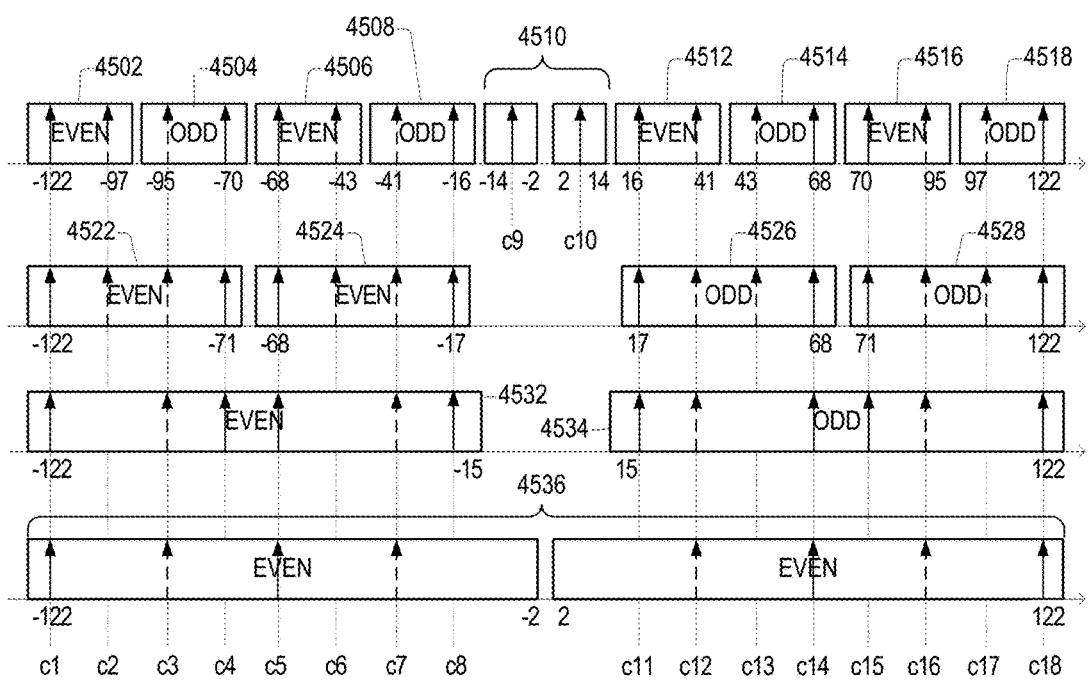

FIG. 46B

Table 10. Pilot Tone Relative Positions

| Pilot | Position | Pilot | Position |
|---|---|---|---|
| d1 | -238 | d36 | +238 |
| d2 | -224 or -226 | d35 | +224 or +226 |
| d3 | -212 or -210 | d34 | +212 or +210 |
| d4 | -198 | d33 | +198 |
| d5 | -184 | d32 | +184 |
| d6 | -170 or -172 | d31 | +170 or +172 |
| d7 | -158 or -156 | d30 | +158 or +156 |
| d8 | -144 | d29 | +144 |
| d9 | -130 | d28 | +130 |
| d10 | -116 or -118 | d27 | +116 or +118 |
| d11 | -104 or -102 | d26 | +104 or +102 |
| d12 | -90 | d25 | +90 |
| d13 | -78 | d24 | +78 |
| d14 | -64 or -62 | d23 | +64 or +62 |
| d15 | -50 or -48 | d22 | +50 or +48 |
| d16 | -36 | d21 | +36 |
| d17 | -24 | d20 | +24 |
| d18 | -10 or -8 | d19 | +10 or +8 |

Table 11. Pilot Tone Relative Positions

| Pilot | Position | Pilot | Position |
|---|---|---|---|
| e1 | -116 | e18 | +116 |
| e2 | -102 or -104 | e17 | +102 or +104 |
| e3 | -90 | e16 | +90 |
| e4 | -76 or -78 | e15 | +76 or +78 |
| e5 | -62 | e14 | +62 |
| e6 | -48 or -50 | e13 | +48 or +50 |
| e7 | -36 | e12 | +36 |
| e8 | -22 or -24 | e11 | +22 or +24 |
| e9 | -8 | e10 | +8 |

FIG. 59B

Table 12. Pilot Tone Relative Positions

| Pilot | Position | Pilot | Position |
|---|---|---|---|
| f1 | -238 | f36 | 238 |
| f2 | -224 or -226 | f35 | 224 or 226 |
| f3 | -212 | f34 | 212 |
| f4 | -198 or -200 | f33 | 198 or 200 |
| f5 | -184 | f32 | 184 |
| f6 | -170 or -172 | f31 | 170 or 172 |
| f7 | -158 | f30 | 158 |
| f8 | -144 or -146 | f29 | 144 or 146 |
| f9 | -130 | f28 | 130 |
| f10 | -116 or -118 | f27 | 116 or 118 |
| f11 | -104 | f26 | 104 |
| f12 | -90 or -92 | f25 | 90 or 92 |
| f13 | -78 | f24 | 78 |
| f14 | -64 or -66 | f23 | 64 or 66 |
| f15 | -50 | f22 | 50 |
| f16 | -36 or -38 | f23 | 36 or 38 |
| f17 | -24 | f20 | 24 |
| f18 | -10 or -12 | f19 | 10 or 12 |

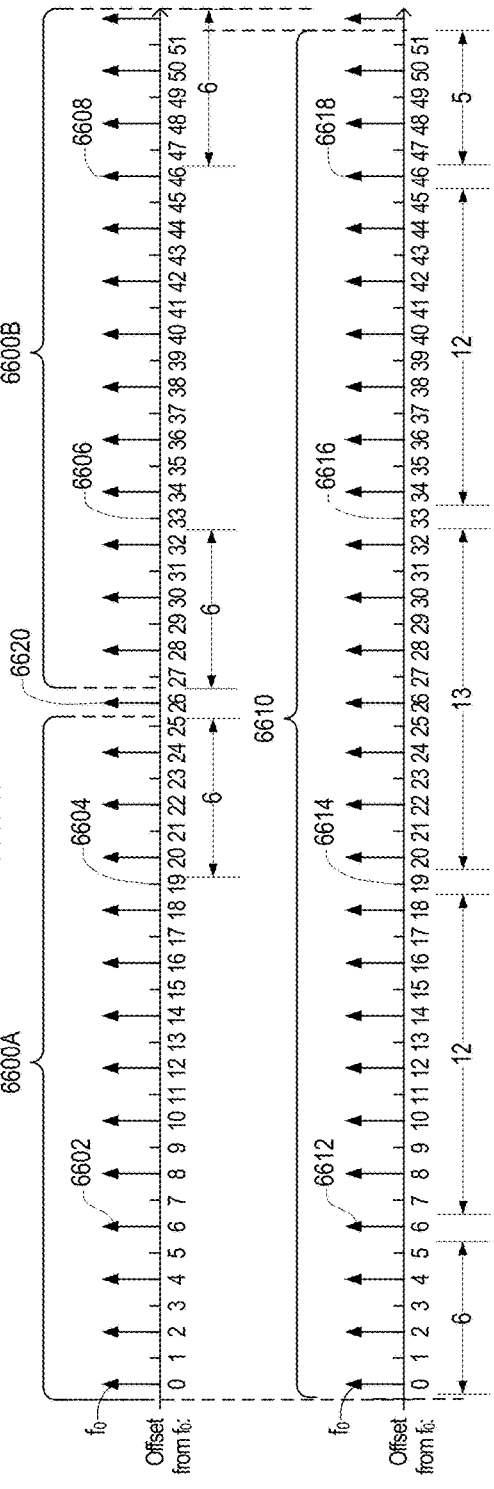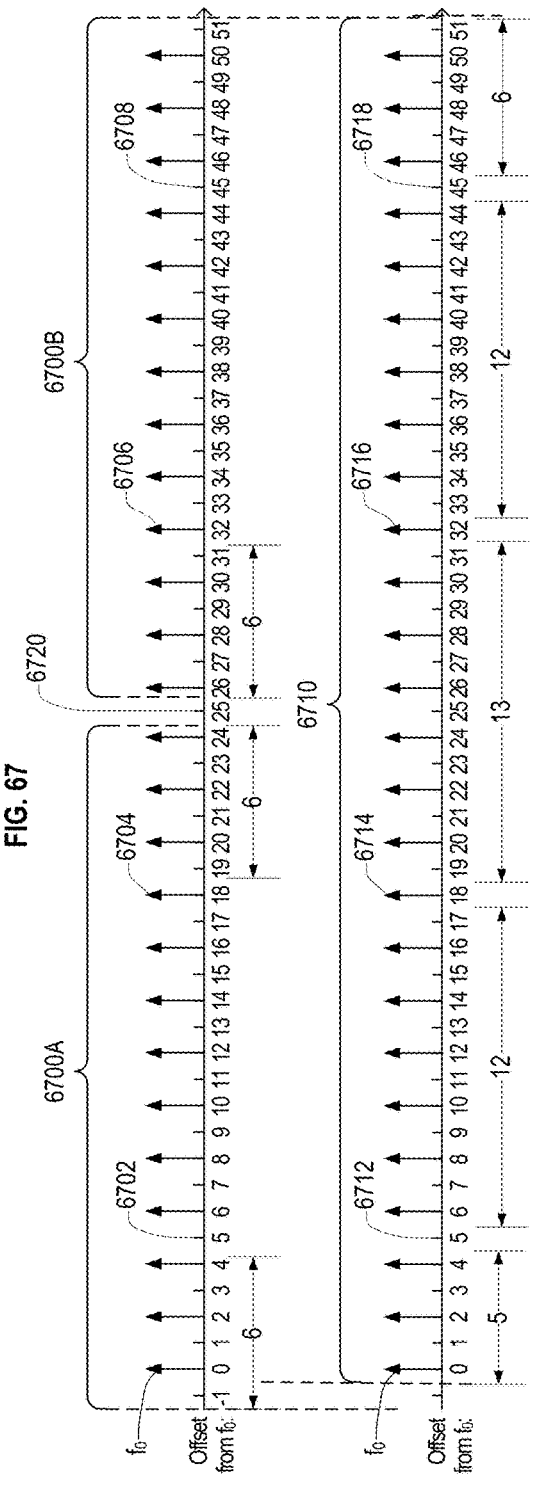

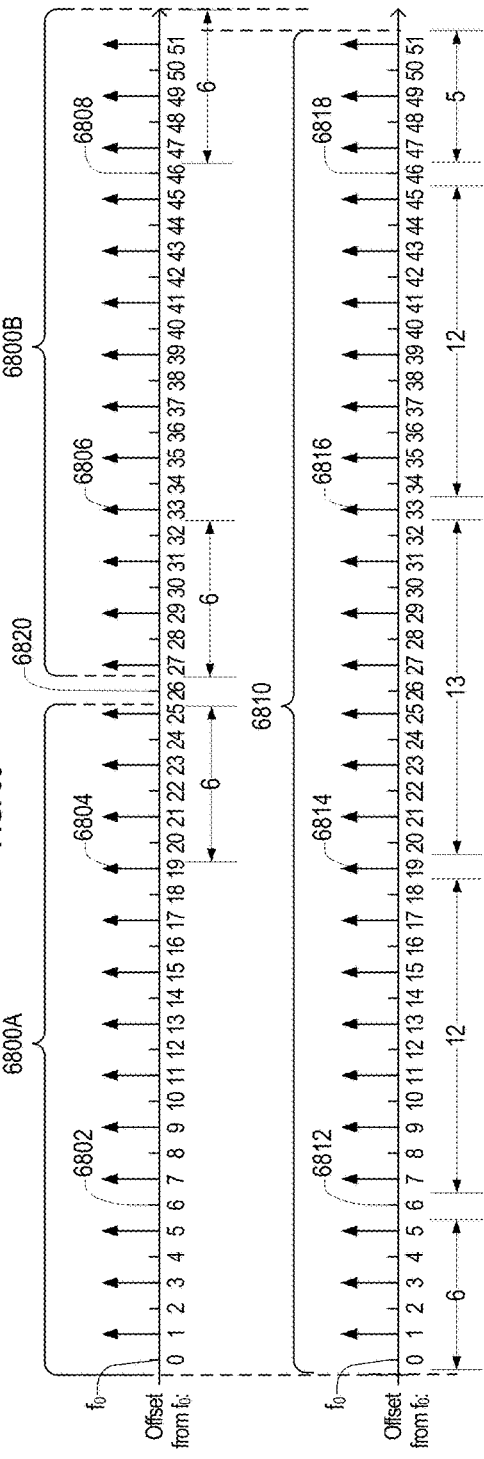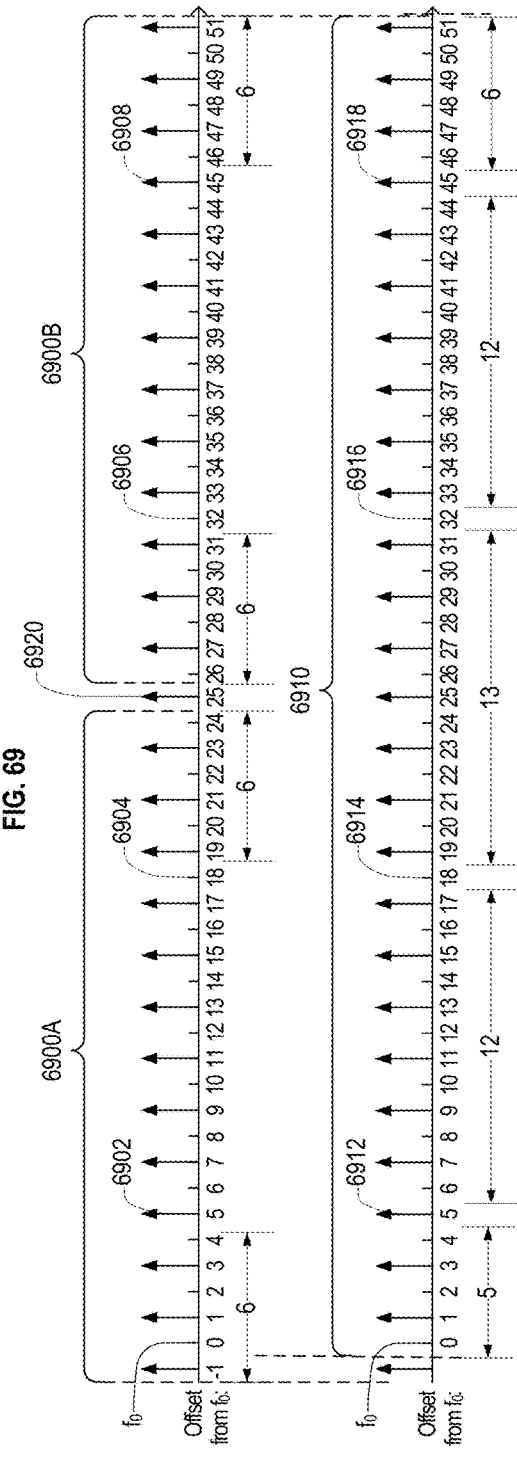

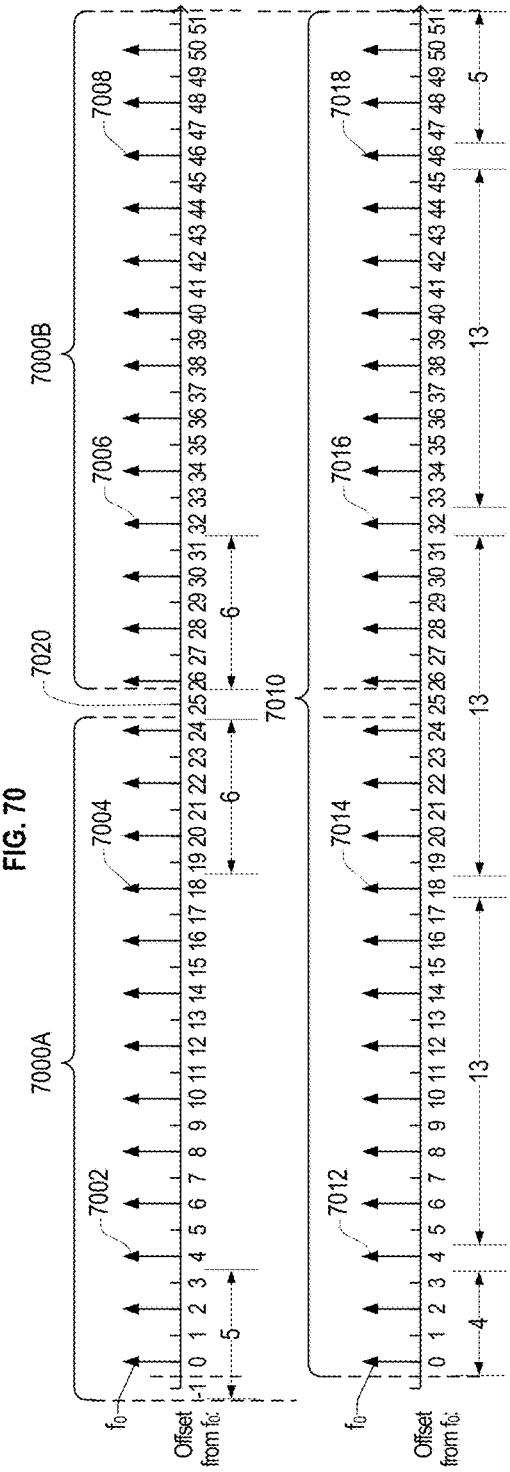
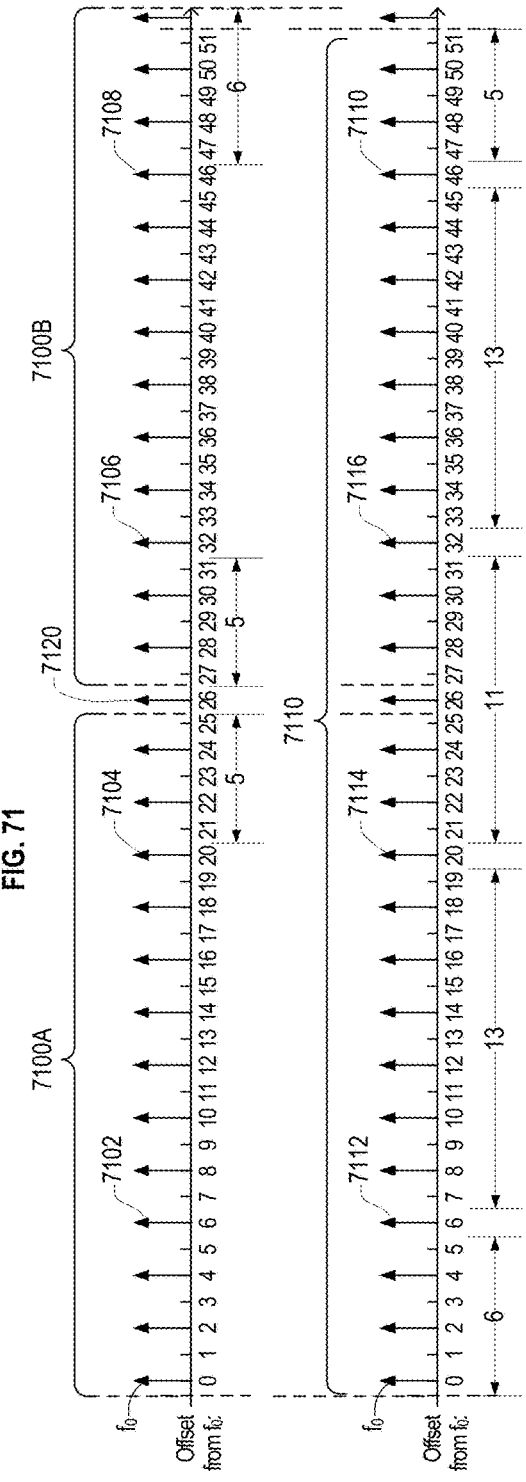

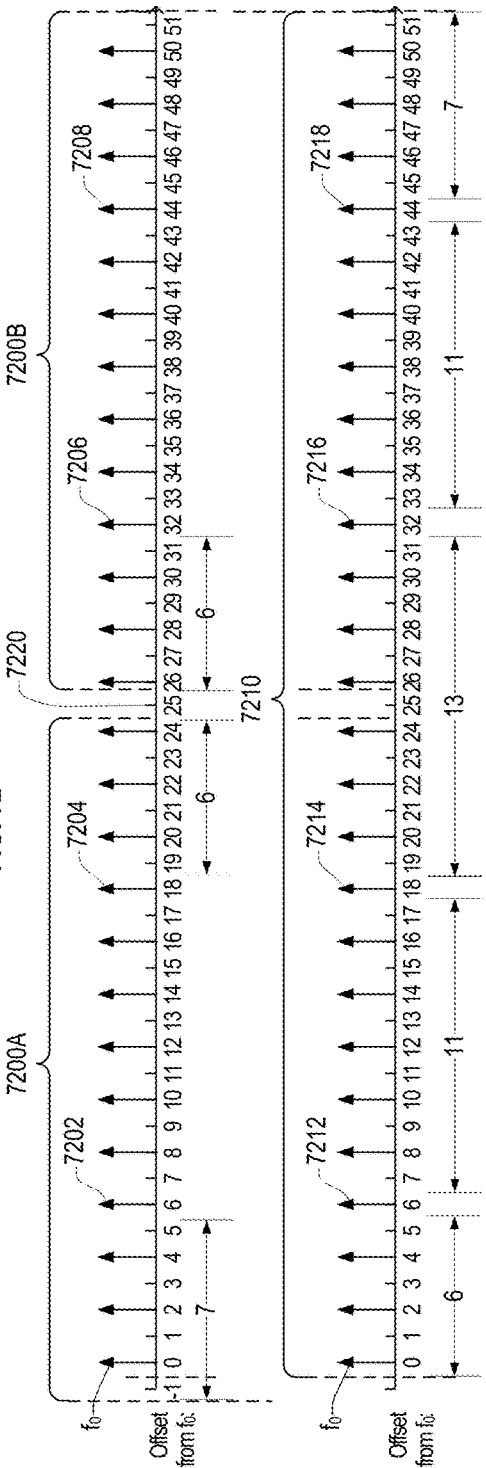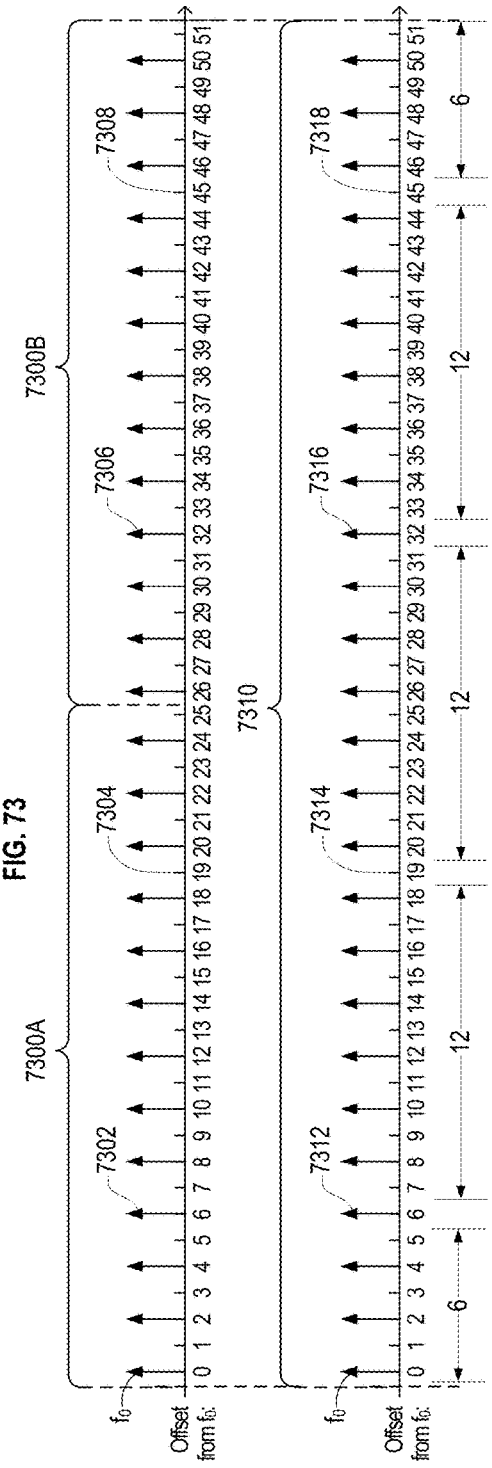

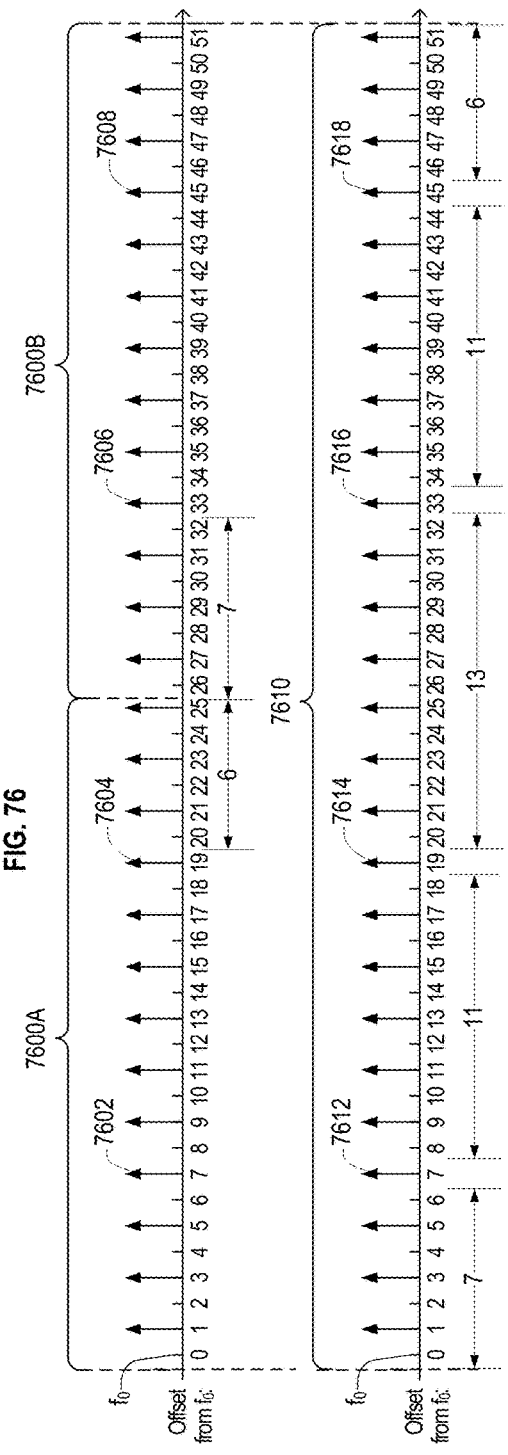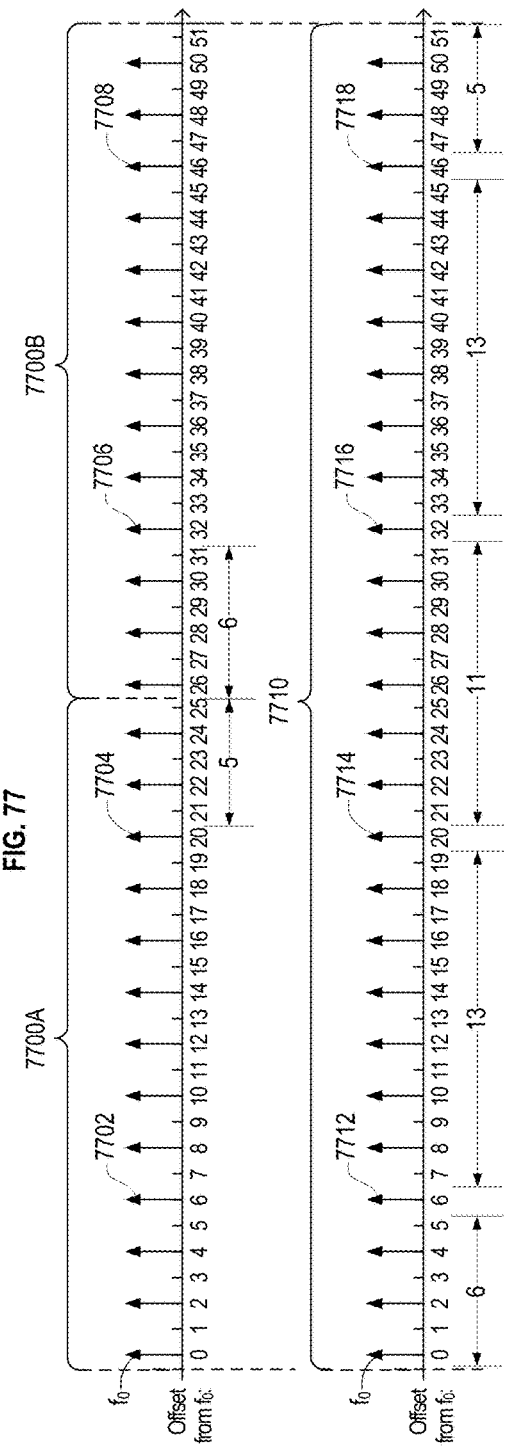

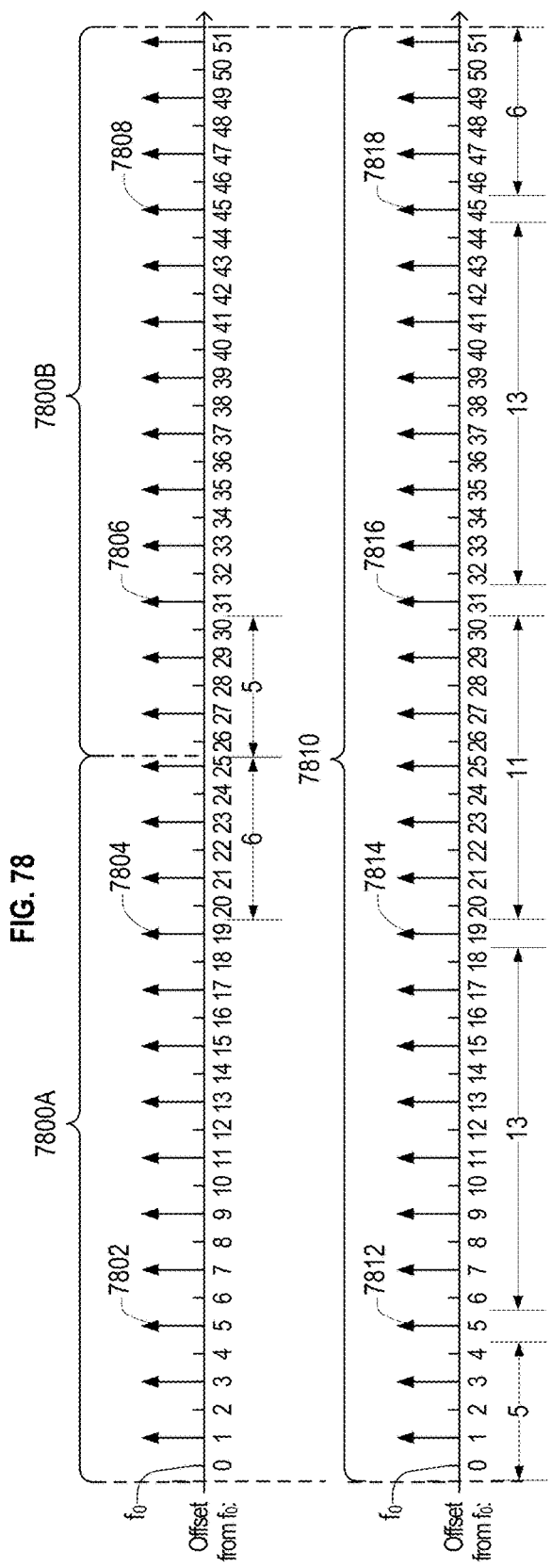

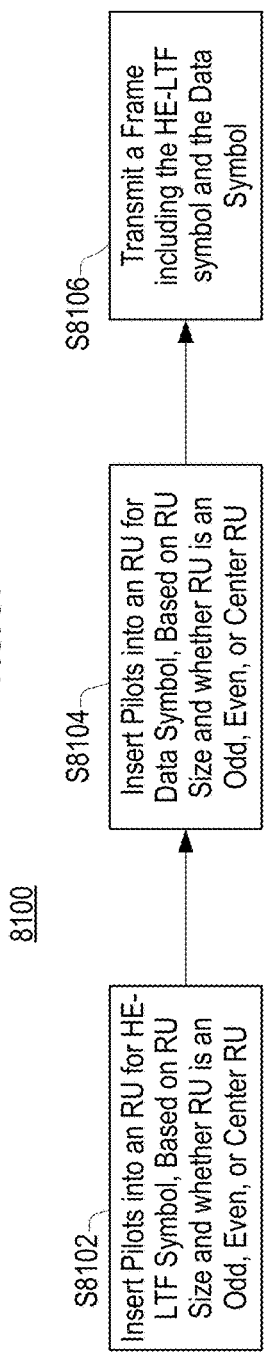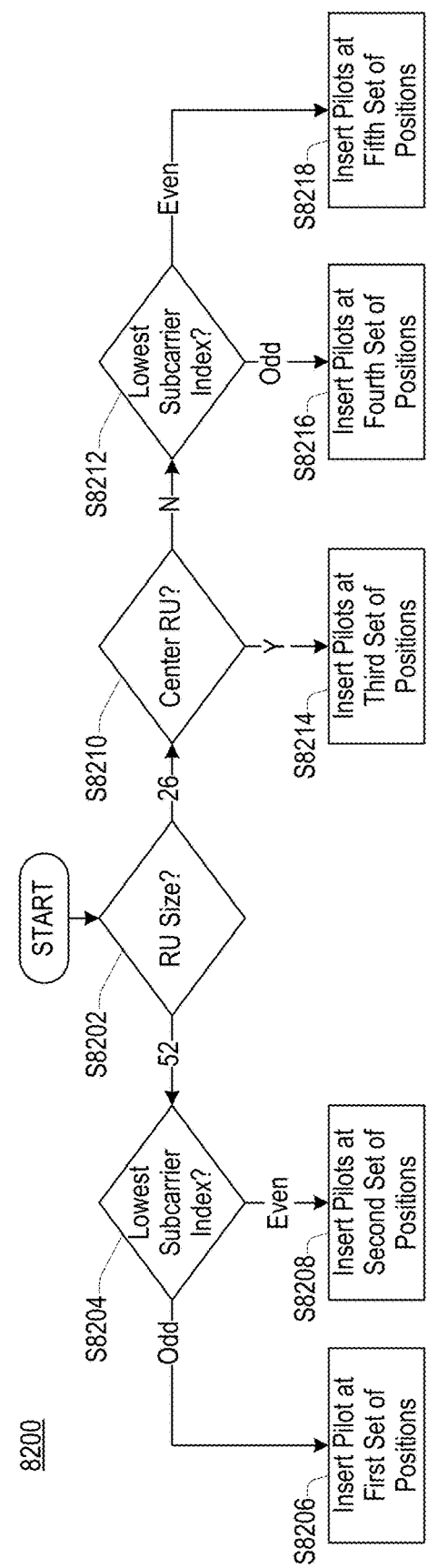

PILOT TRANSMISSION AND RECEPTION FOR ORTHOGONAL FREQUENCY DIVISION MULTIPLE ACCESS

CROSS-REFERENCE TO RELATED APPLICATION

This application claims the benefit of U.S. Provisional Application No. 62/159,187 filed May 8, 2015, the contents of which are incorporated herein by reference.

BACKGROUND

1. Technical Field

The technology described herein relates generally to wireless networking. More particularly, the technology relates to the transmission and reception of symbols (such as symbols in Orthogonal Frequency Division Multiple Access (OFDMA) frames) that include pilots transmitted using pilot tones.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a high efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements will be made to support environments such as wireless corporate offices, outdoor hotspots, dense residential apartments, and stadiums.

An HE WLAN supports Orthogonal Frequency Division Multiple Access (OFDMA) communications. In the OFDMA communications, an Access Point (AP) may communicate simultaneously with a plurality of stations by allocating respective Resource Units (RUs) (that is, groups of subchannels) within the stations.

An HE WLAN also supports the use of longer symbols in data fields of an HE frame. For example, while a preamble of the HE frame may include Orthogonal Frequency Division Multiplexing (OFDM) symbols have respective durations, exclusive of Cyclic Prefixes (CPs), of 3.2 microseconds, a data field of the HE frame may include OFDM symbols have respective durations, exclusive of CPs, of 12.8 microseconds.

A duration of an OFDM symbol may be determined according to a number of input elements of a Fourier Transform (FT) or Inverse Fourier Transform (iFT) respectively used to decode or generate the OFDM symbol. An OFDM symbol having a duration, exclusive of CP, of 3.2 microseconds in a 20 MHz bandwidth may be generated using an iFT having 64 input elements (i.e. a 64-element iFT) and decoded using a FT having 64 input elements (i.e. a 64-element FT). An OFDM symbol having a duration, exclusive of CP, of 12.8 microseconds in a 20 MHz bandwidth may be generated using an iFT having 256 input elements (i.e. a 256-element iFT) and decoded using a FT having 256 input elements (i.e. a 256-element FT). A number of input elements of an FT or iFT may be referred to as a size of the FT or iFT.

Pilots are used in 802.11 systems for performing channel estimation and for performing carrier frequency offset (CFO) tracking. Pilots used for channel estimation may be included in a training field, such as a Long Training Field (LTF).

CFO may occur, for example, because of a frequency mismatch between oscillators of a transmitter and a receiver or because of the Doppler Effect due to relative motions of the transmitter and receiver. Even if the channel state does not change over a duration of a received frame, a residual CFO may changeover the duration. Because the CFO may change during the duration, pilots for CFO tracking may be included in symbols of data fields. Such pilots may be carried by pilot tones located at pilot tone positions of the symbols.

Ideally, pilots are included in all OFDM symbols, and span the entire frequency bandwidth of the transmitted signal so that CFO tracking performance may be improved by the inclusion of frequency diversity. The positioning of pilots tones carrying the pilots may vary between symbols in training fields and symbols in data fields, and between symbols generated using different Fourier Transform (FT) sizes.

SUMMARY

In an embodiment, a method of a wireless device for transmitting a frame comprises determining, by the wireless device, a plurality of Resource Units (RUs) of the frame, providing a first plurality of pilots into a first RU of the frame at a first set of positions, respectively, providing a second plurality of pilots into a second RU of the frame at a second set of positions, respectively, and transmitting the frame. The first set of positions is different from the second set of positions.

In an embodiment, the frame is an Orthogonal Frequency Division Multiple Access (OFDMA) frame and the plurality of RUs include respective pluralities of subcarriers.

In an embodiment, the first RU includes a lowest subcarrier having an odd-numbered index, and the second RU includes a lowest subcarrier having an even-numbered index.

In an embodiment, the first RU is a 52-subcarrier RU and the second RUs is a 52-subcarrier RU.

In an embodiment, the first set of positions include a first pilot tone position spaced five subcarriers away from a lowest-indexed subcarrier of the first RU, a second pilot tone position separated by thirteen subcarriers from the first pilot tone position, a third pilot tone position separated by eleven subcarriers from the second pilot tone position, and a fourth pilot tone position separated by thirteen subcarriers from the third pilot tone position and six subcarriers away from a highest-indexed subcarrier of the first RU. The pilot tones of the second RU include a fifth pilot tone position spaced six subcarriers away from a lowest-indexed subcarrier of the first RU, a sixth pilot tone position separated by thirteen subcarriers from the fifth pilot tone position, a seventh pilot tone position separated by eleven subcarriers from the sixth pilot tone position, and an eighth pilot tone position separated by thirteen subcarriers from the seventh pilot tone position and five subcarriers away from a highest-indexed subcarrier of the second RU.

In an embodiment, the first RU is a 26-subcarrier RU, and the second RU is a 26-subcarrier RU.

In an embodiment, the first set of positions include a first pilot tone position spaced five subcarriers away from a lowest-indexed subcarrier of the first RU and a second pilot tone position separated by thirteen subcarriers from the first pilot tone position and spaced six subcarriers away from a highest-indexed subcarrier of the first RU. The the second set of positions includes a third pilot tone position spaced six subcarriers away from a lowest-indexed subcarrier of the second RU and a fourth pilot tone position separated by thirteen subcarriers from the third pilot tone position and five subcarriers away from a highest-indexed subcarrier of the second RU.

In an embodiment, the method further comprises providing a third plurality of pilots in a third RU of the frame at a third set of positions, respectively. The second set of positions is different from the third set of positions, the third RU is a 26-subcarrier RU, and the third RU is a center RU that is split into 13 positive-indexed subcarriers and 13 negative-indexed subcarriers by DC tones.

In an embodiment, the third set of positions includes a fifth pilot tone position spaced six subcarriers away from a lowest-indexed subcarrier of the third RU and a sixth pilot tone position spaced six subcarriers away from a highest-indexed subcarrier of the third RU In an embodiment, the first set of positions is a mirror image of the second set of positions.

In an embodiment, the frame includes a 2X High Efficiency (HE) Long Training Field (HE-LTF). The first set of positions respectively correspond to locations of non-null subcarriers of symbols of the 2X HE-LTF. The second set of positions espectively correspond to the locations of the non-null subcarriers of the symbols of the 2X HE-LTF.

In an embodiment, pilot tone positions for all RUs in a lower half of a 20 MHz channel are mirror symmetric to pilot tone positions for corresponding mirrored RUs in an upper half of the 20 MHz channel.

In an embodiment, pilot tone positions for all RUs in a lower half of a 40 MHz channel are mirror symmetric to pilot tone positions for corresponding mirrored RUs in an upper half of the 40 MHz channel.

In an embodiment, a method of a wireless device for transmitting a frame comprises providing pilots in a resource unit, and transmitting the frame including the resource unit. When a lowest subcarrier of the resource unit has an odd-numbered index, a plurality of pilots are included at a first set of positions in the resource unit, respectively. When the a lowest subcarrier of the resource unit has an even-numbered index, a plurality of pilots are included at a second set of positions in the resource unit, respectively. The second set of positions is different from the first set of positions.

In an embodiment, the resource unit is a 52-subcarrier resource unit.

In an embodiment, the first set of positions include a first pilot tone position spaced five subcarriers away from a lowest-indexed subcarrier of the resource unit, a second pilot tone position separated by thirteen subcarriers from the first pilot tone position, a third pilot tone position separated by eleven subcarriers from the second pilot tone position, and a fourth pilot tone position separated by thirteen subcarriers from the third pilot tone position and six subcarriers away from a highest-indexed subcarrier of the resource unit. The second set of positions include a fifth pilot tone position spaced six subcarriers away from a lowest-indexed subcarrier of the resource unit, a sixth pilot tone position separated by thirteen subcarriers from the fifth pilot tone position, a seventh pilot tone position separated by eleven subcarriers from the sixth pilot tone position, and an eighth pilot tone position separated by thirteen subcarriers from the seventh pilot tone position and five subcarriers away from a highest-indexed subcarrier of the resource unit.

In an embodiment, the resource unit is a 26-subcarrier resource unit.

In an embodiment, the first set of positions include a first pilot tone position spaced five subcarriers away from a lowest-indexed subcarrier of the resource unit and a second pilot tone position separated by thirteen subcarriers from the first pilot tone position and six subcarriers away from a highest-indexed subcarrier of the resource unit. The second set of positions inlude includes a third pilot tone position spaced six subcarriers away from a lowest-indexed subcarrier of the resource unit and a fourth pilot tone position separated by thirteen subcarriers from the third pilot tone position and five subcarriers away from a highest-indexed subcarrier of the resource unit.

In an embodiment, when the resource unit is a center resource unit that is split into 13 negative-indexed subcarriers and 13 positive-indexed subcarriers by DC tones, a plurality of pilots are included at a third set of positions in the resource unit, respectively. The third set of positions is different from the second set of positions.

In an embodiment, the first set of positions include a first pilot tone position spaced five subcarriers away from a lowest-indexed subcarrier of the resource unit and a second pilot tone position separated by thirteen subcarriers from the first pilot tone position and six subcarriers away from a highest-indexed subcarrier of the resource unit. The second set of positions includes a third pilot tone position spaced six subcarriers away from a lowest-indexed subcarrier of the resource unit and a fourth pilot tone position separated by thirteen subcarriers from the third pilot tone position and five subcarriers away from a highest-indexed subcarrier of the resource unit. The third set of positions includes a fifth pilot tone position spaced six subcarriers away from a lowest-indexed subcarrier of the resource unit and a sixth pilot tone position spaced six subcarriers away from a highest-indexed subcarrier of the resource unit.

In an embodiment, a method of a wireless device for receiving a frame comprises receiving the frame. The frame includes a resource unit. The resource unit includes pilots. The method further comprises processing the pilots. When a lowest subcarrier of the resource unit has an odd-numbered index, a plurality of pilots are included at a first set of positions in the resource unit, respectively. When the lowest subcarrier of the resource unit has an even-numbered index, a plurality of pilots are included at a second set of positions in the resource unit, respectively. The second set of positions is different from the first set of positions.

In an embodiment, the resource unit is a 52-subcarrier resource unit.

In an embodiment, the first set of positions include a first pilot tone position spaced five subcarriers away from a lowest-indexed subcarrier of the resource unit, a second pilot tone position separated by thirteen subcarriers from the first pilot tone position, a third pilot tone position separated by eleven subcarriers from the second pilot tone position, and a fourth pilot tone position separated by thirteen subcarriers from the third pilot tone position and six subcarriers away from a highest-indexed subcarrier of the resource unit. The second set of positions include a fifth pilot tone position spaced six subcarriers away from a lowest-indexed subcarrier of the resource unit, a sixth pilot tone position separated by thirteen subcarriers from the fifth pilot tone position, a seventh pilot tone position separated by eleven subcarriers from the sixth pilot tone position, and an eighth pilot tone position separated by thirteen subcarriers from the seventh pilot tone position and spaced five subcarriers away from a highest-indexed subcarrier of the resource unit.

In an embodiment, the resource unit is a 26-subcarrier resource unit.

In an embodiment, the first set of positions include a first pilot tone position spaced five subcarriers away from a lowest-indexed subcarrier of the resource unit and a second pilot tone position separated by thirteen subcarriers from the first pilot tone position and spaced six subcarriers away from a highest-indexed subcarrier of the resource unit. The second set of positions includes a third pilot tone position spaced six subcarriers away from a lowest-indexed subcarrier of the resource unit and a fourth pilot tone position separated by thirteen subcarriers from the third pilot tone position and spaced five subcarriers away from a highest-indexed subcarrier of the resource unit.

In an embodiment, when the resource unit is a center resource unit that is split into 13 negative-indexed subcarriers and 13 positive-indexed subcarriers by DC tones, a plurality of pilots are included at a third set of positions in the resource unit, respectively. The third set of positions is different from the second set of positions.

In an embodiment, the first set of positions include a first pilot tone position spaced five subcarriers away from a lowest-indexed subcarrier of the resource unit and a second pilot tone position separated by thirteen subcarriers from the first pilot tone position and spaced six subcarriers away from a highest-indexed subcarrier of the resource unit, The second set of positions includes a third pilot tone position spaced six subcarriers away from a lowest-indexed subcarrier of the resource unit and a fourth pilot tone position separated by thirteen subcarriers from the third pilot tone position and spaced five subcarriers away from a highest-indexed subcarrier of the resource unit. The third set of positions includes a fifth pilot tone position spaced six subcarriers away from a lowest-indexed subcarrier of the resource unit and a sixth pilot tone position spaced six subcarriers away from a highest-indexed subcarrier of the resource unit.

BRIEF DESCRIPTION OF THE DRAWINGS

FIG. 5A illustrates even and odd RUs in a 20 MHz bandwidth according to an embodiment.

FIG. 5B is a table listing subcarrier indexes of the RUs of FIG. 5.

FIG. 6 illustrates even and odd RUs in a 40 MHz bandwidth according to an embodiment.

FIG. 7 illustrates even and odd RUs in an 80 MHz bandwidth according to an embodiment.

FIG. 8B is a table listing subcarrier indexes of the RUs of FIG. 8.

FIG. 10 illustrates an RU according to an embodiment.

FIG. 11 illustrates an RU having mirror symmetry to the RU of FIG. 10, according to an embodiment.

FIG. 12 illustrates a 26-subcarrier RU of alternative 1 of design A, according to an embodiment.

FIG. 13 illustrates a 26-subcarrier RU of alternative 1 of design A, according to an embodiment.

FIG. 14 illustrates a 26-subcarrier RU of alternative 1 of design A, according to an embodiment.

FIG. 21 illustrates a 52-subcarrier RU of alternative 1 of design A, according to an embodiment.

FIG. 22 illustrates a 52-subcarrier RU of alternative 1 of design A, according to an embodiment.

FIG. 23 includes a Table 3 that indicates pilot tone positions for embodiments of 106-subcarrier RUs of alternative 1 of design A.

FIG. 24 includes a Table 4 that indicates pilot tone positions for embodiments of 108-subcarrier RUs of alternative 1 of design A.

FIG. 25 includes a Table 5 that indicates pilot tone positions for embodiments of 242-subcarrier RUs of alternative 1 of design A.

FIG. 26 includes a Table 6 that indicates pilot tone positions for embodiments of 242-subcarrier RUs of alternative 1 of design A.

FIG. 27 includes a Table 7 that indicates pilot tone positions for embodiments of center 242-subcarrier RUs of alternative 1 of design A.

FIG. 41 illustrates pilot tone positions for RUs of the 20 MHz BW in of Case 1, according to an embodiment.

FIG. 42 illustrates pilot tone positions for RUs of the 20 MHz BW in of Case 1, according to an embodiment.

FIG. 45 illustrates pilot tone positions for RUs of the 20 MHz BW in of Case 1, according to an embodiment.

FIG. 46B includes a Table 10 showing pilot tone relative positions in the 40 MHz BW according to an embodiment.

FIG. 59B includes a Table 12 showing pilot tone relative positions in the 40 MHz BW according to an embodiment.

FIG. 66 illustrates an option for pilot tone positions in Case 1, according to embodiments.

FIG. 67 illustrates another option for pilot tone positions in Case 1, according to embodiments.

FIG. 68 illustrates another option for pilot tone positions in Case 1, according to embodiments.

FIG. 69 illustrates another option for pilot tone positions in Case 1, according to embodiments.

FIG. 70 illustrates another option for pilot tone positions in Case 1, according to embodiments.

FIG. 71 illustrates another option for pilot tone positions in Case 1, according to embodiments.

FIG. 72 illustrates another option for pilot tone positions in Case 1, according to embodiments.

FIG. 73 illustrates an option for pilot tone positions in Case 2, according to embodiments.

FIG. 76 illustrates another option for pilot tone positions in Case 2, according to embodiments.

FIG. 77 illustrates another option for pilot tone positions in Case 2, according to embodiments.

FIG. 78 illustrates another option for pilot tone positions in Case 2, according to embodiments.

FIG. 81 illustrates a process for transmitting a frame, according to an embodiment.

FIG. 82 illustrates a sub-process for providing pilots, according to an embodiment.

DETAILED DESCRIPTION

Figure 1:
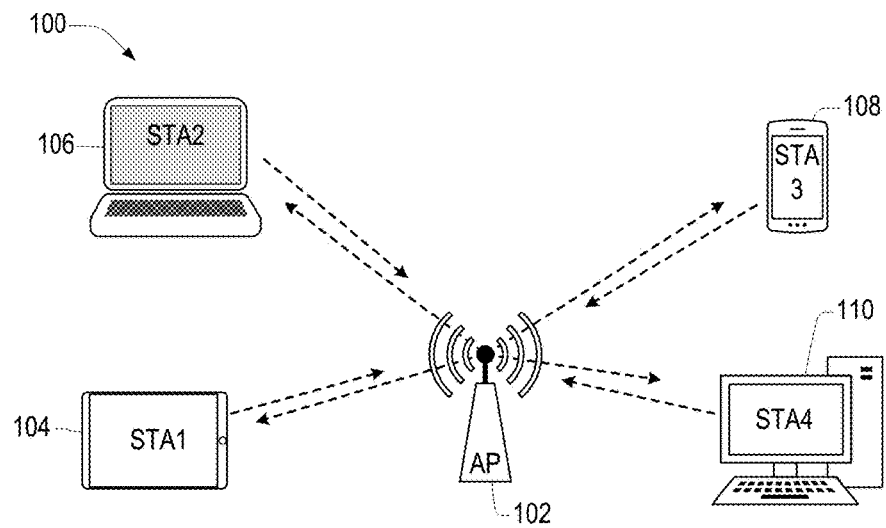
FIG. 1 illustrates a wireless network according to an embodiment.

Embodiments of the present disclosure relate generally to wireless networking, and more particularly, to providing and processing pilots in Orthogonal Frequency Division Multiplexing (OFDM) symbols to support same and different FFT size for symbols in a Long Training Field (LTF) and OFDM symbols in a data field of a frame, the frame being a frame transmitted in a wireless network.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN, the BSS provides the basic building-block and typically includes an access point (AP) and one or more associated stations (STAs). In FIG. 1, the BSS 100 includes an Access Point 102 (also referred to as AP) wirelessly communicating with first, second, third, and fourth wireless devices (or stations) 104, 106, 108, and 110 (also referred to as STA1, STA2, STA3, and STA4, respectively). The wireless devices may each include a medium access control layer (MAC) and a physical layer (PHY) according to an IEEE 802.11 standard.

Although the example of FIG. 1 shows only the BSS 100 including only the first to fourth stations STA1 to STA4, embodiments are not limited thereto and may comprise BSSs including any number of STAs.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports Spatial Division Multiple Access (SDMA), two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and the transceiver may be implemented in each of the stations STA1 to STA4 and the AP 102 using respective hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the frame, as prescribed in the applicable standard.

Figure 2:
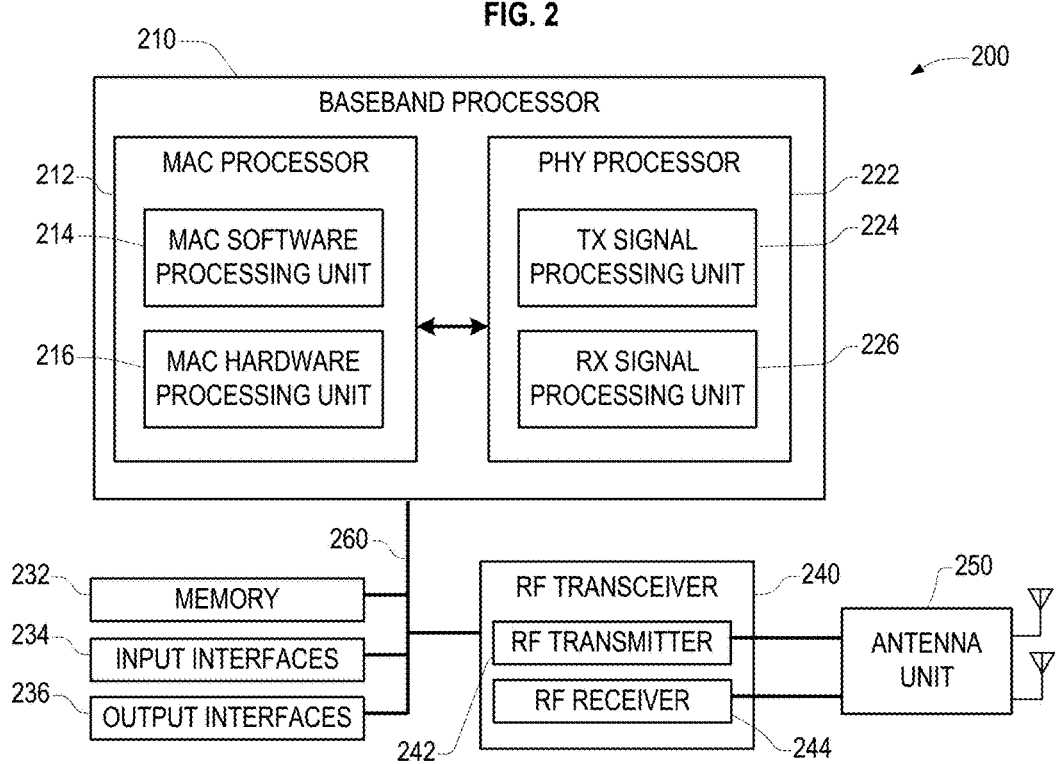
FIG. 2 is a schematic diagram of a wireless device according to an embodiment.

FIG. 2 illustrates a schematic block diagram of a wireless device 200 according to an embodiment. The wireless or WLAN device 200 can represent any device in a BSS, e.g., the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation.

Functions performed by the transmitting signal processing unit 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
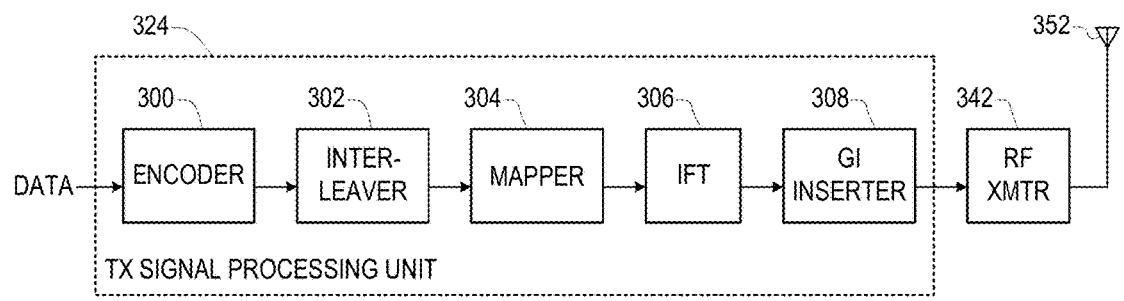
FIG. 3A illustrates components of a wireless device configured to transmit data according to an embodiment.

FIG. 3A illustrates components of a wireless device configured to transmit data according to an embodiment, including a Transmitting (Tx) Signal Processing Unit (TxSP) 324, an RF transmitter 342, and an antenna 352. In an embodiment, the TxSP 324, the RF transmitter 342, and the antenna 352 correspond to the transmitting signal processing unit 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
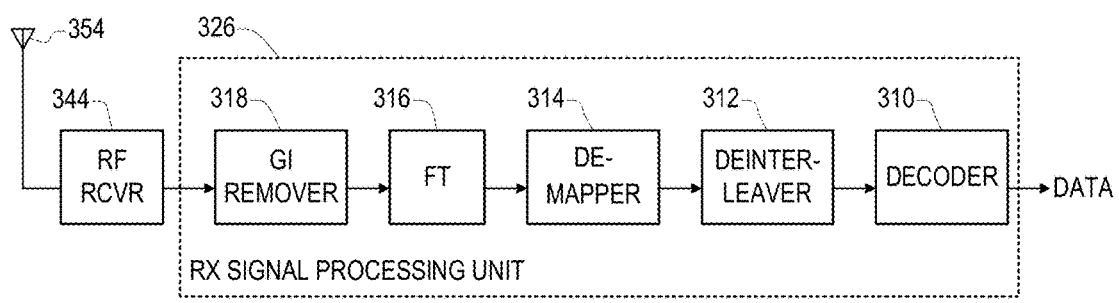
FIG. 3B illustrates components of a wireless device configured to receive data according to an embodiment.

FIG. 3B illustrates components of a wireless device configured to receive data according to an embodiment, including a Receiver (Rx) Signal Processing Unit (RxSP) 326, an RF receiver 344, and an antenna 354. In an embodiment, the RxSP 326, RF receiver 344, and antenna 354 may correspond to the receiving signal processing unit 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Figure 4A:
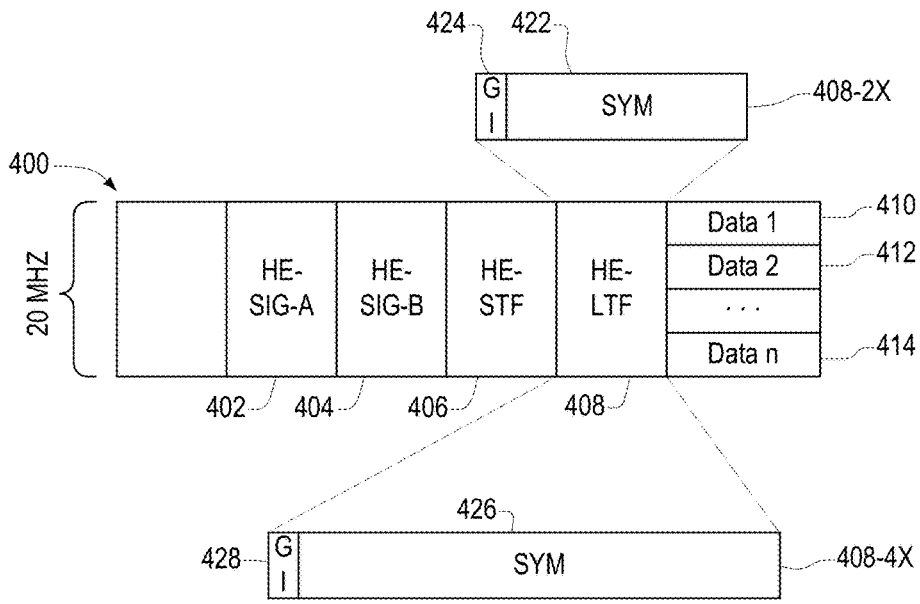
FIG. 4A illustrates an Orthogonal Frequency Division Multiple Access (OFDMA) frame including a High Efficiency (HE) Long Training Field (LTF) according to an embodiment.

FIG. 4A illustrates an Orthogonal Frequency Division Multiple Access (OFDMA) frame 400 according to an embodiment. The OFDMA frame 400 may be a Down-Link (DL) Multi-User (MU) OFDMA frame transmitted by the AP 102 or an Up-Link (UL) MU OFDMA frame transmitted by a one or more of the stations STA1 to STA4 of the WLAN BSS 100 of FIG. 1. In the embodiment shown in FIG. 4, the OFDMA frame 400 is transmitted used a 20 MHZ bandwidth, but embodiments are not limited thereto. Embodiments of the OFDMA frame 400 may be transmitted using any of a 40 MHz bandwidth, an 80 MHz bandwidth, an 80+80 MHz bandwidth, and a 160 MHz bandwidth.

The OFDMA frame 400 includes one or more data payloads, represented by first, second, and third data payloads 410, 412, and 414 respectively. The data payloads 410, 412, and 414 may be intended for respective first, second, and third stations.

A bandwidth of the OFDMA frame 400 is divided into one or more Resource Units (RUs), and each of the data payloads 410, 412, and 414 is allocated one or more of the RUs. In an embodiment, an RU is allocated to no more than one data payload.

The OFDMA frame 400 may further include a High Efficient (HE) Signal A (HE-SIG-A) field 402, an HE Signal B (HE-SIG-B) field 404, an HE Short Training Field (HE-STF) 406, and an HE Long Training Field (HE-LTF) 408.

The HE-SIG-A field 402 may include information for interpreting the OFDMA frame 400. The HE-SIG-B field 404, when present, may include information concerning the allocation of Resource Units (RUs) within the OFDMA frame 400 and may include information used by specific stations (STAs) to decode respective payloads intended for them. The HE-STF 406 may include information for use in automatic gain control in a device receiving the OFDMA frame 400.

The HE-LTF 408 includes information for estimating a channel between a WLAN device transmitting the OFDMA frame 400 and a WLAN device receiving the OFDMA frame 400. The information in the HE-LTF 408 may also be used by the receiving WLAN device to track phase and frequency offsets. In an embodiment, the OFDMA frame 400 includes a plurality of HE-LTFs 408.

Pilots exist in OFDM symbols of the data payloads 410, 412, and 414 and the symbols of the HE-LTF 408. The pilots in the HE-LTF 408 may be used to compensate for CFO drift and to reduce channel estimation error for transmissions having a high number of spatial streams.

802.11ax systems may support a first type and a second type of HE-LTF OFDM symbols. The first type may have a same number of subcarriers (i.e. tones) as data/pilot subcarriers. The second type may have approximately half of the number of information-carrying subcarriers (that is, carriers with energy) as data/pilot subcarriers. The first type of HE-LTF may be denoted as a 4×HE-LTF design and the second type of HE-LTF (with approximately half of the number of information-carrying subcarriers) may be denoted as a 2×HE-LTF design.

In an embodiment of the second type of HE-LTF, information is carried in every even tone, except for the DC tones. In another embodiment of the second type of HE-LTF, information is carried in every odd tone, except for the DC tones.

Accordingly, in an embodiment, the HE-LTF 408 includes a 2X HE-LTF 408-2X according to the 2×LTF design. The 2X HE-LTF 408-2X includes an OFDM symbol 422 and a Guard Interval (GI) 424. The OFDM symbol 422 may have a duration of 6.4 microseconds.

Figure 4B:
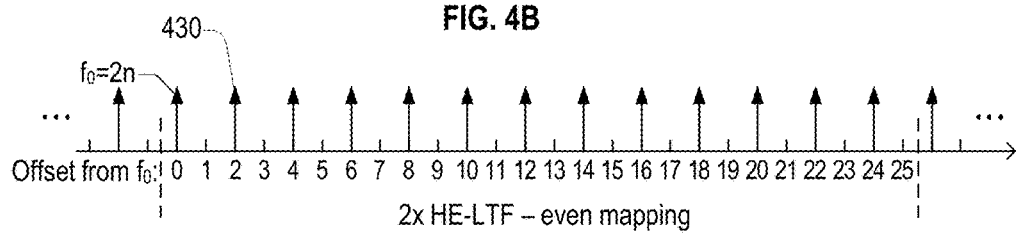
FIG. 4B illustrates positions in an even-aligned Resource Unit (RU) of tones corresponding to tones of a 2X LTF having an even mapping, according to an embodiment.

As shown in FIG. 4B, the OFDM symbol 422 of the 2X HE-LTF 408-2X may have an even mapping, that is, the OFDM symbol 422 only carry information in even-numbered tones (other than DC tones) within a bandwidth of the OFDM symbol 422, that is, tones having an index equal to 2+n, where n is an integer. Arrows such as an arrow 430 indicate tones of the OFDM symbol 422 that may carry information. Tones without an arrow do not carry information.

Figure 4C:
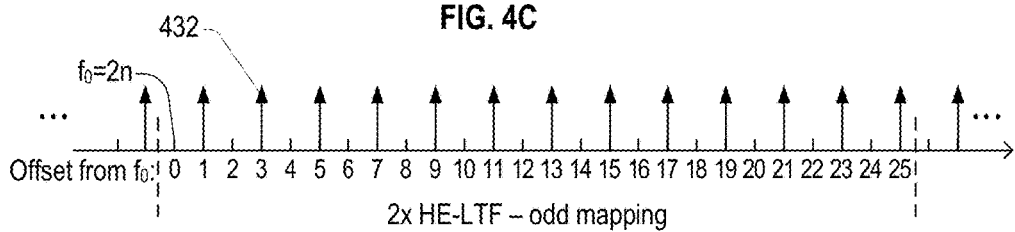
FIG. 4C illustrates positions in an even-aligned RU of tones corresponding to tones of the 2X LTF having an odd mapping, according to an embodiment.

As shown in FIG. 4C, the OFDM symbol 422 of the 2X HE-LTF 408-2X may have an odd mapping, that is, the OFDM symbol 422 may only carry information in odd-numbered tones (other than DC tones) within a bandwidth of the OFDM symbol 422, that is, tones having an index equal to 2n+1, where n is an integer. Arrows such as an arrow 432 indicate tones of the OFDM symbol 422 that may carry information. Tones without an arrow do not carry information.

In another embodiment, the HE-LTF 408 includes a 4X HE-LTF 408-4X according to the 4×LTF design. The 4X HE-LTF 408-4X includes an OFDM symbol 426 and a Guard Interval (GI) 428. The OFDM symbol 426 may have a duration of 12.8 microseconds.

Figure 4D:
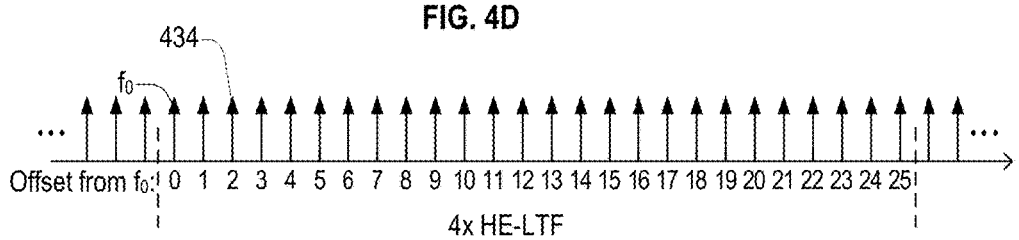
FIG. 4D illustrates positions in an RU of tones corresponding to tones of the 4X LTF according to an embodiment.

As shown in FIG. 4D, the OFDM symbol 426 of the 2X HE-LTF 408-4X may carry information in all tones (other than DC tones) within a bandwidth of the OFDM symbol 426. Arrows such as an arrow 434 indicate tones of the OFDM symbol 426 that may carry information.

Embodiments of the present disclosure include methods of providing pilots that support same and different FFT sizes for HE-LTF and data payload OFDM symbols.

In OFDMA operations, the operational bandwidth is divided up into resource units (RUs). There may be different RU sizes within the operational bandwidth, each RU size including a different number of subcarriers (i.e. tones). Examples of possible RUs for various bandwidths are shown in FIGS. 5A, 6, 7, 8A, and 9, described below. Depending on how the RUs are defined, RUs may start with an even numbered subcarrier (that is, RUs may be even RUs) or an odd numbered subcarrier (that is, RUs may be odd RUs).

FIG. 5A illustrates RUs definitions in a 20 MHz bandwidth 500 according to an embodiment. Within the 20 MHz bandwidth 500 may be defined first to ninth 26-subcarrier RUs 502, 504, 506, 508, 510, 512, 514, 516, and 518. Within the 20 MHz bandwidth 500 may be also defined first to fourth 52-subcarrier RUs 522, 524, 526 and 528. A 242-subcarrier RU 540 may also be defined within the 20 MHz bandwidth 500.

In an embodiment, first and second 106-subcarrier RUs 532 and 534 may be defined in the 20 MHz bandwidth 500. In another embodiment, first and second 108-subcarrier RUs 536 and 538 may be defined in the 20 MHz bandwidth 500.

FIG. 5B includes a Table 1 indicating the size and lowest and highest subcarrier (SC) indexes of the RUs that may be defined in the 20 MHz bandwidth 500. Table 1 also indicates whether an RU is considered an odd RU (that is, one that has a lowest SC index that is an odd integer) or an even RU (that is, one that has a lowest SC index that is an even integer.) Odd and even RUs are also indicated in FIG. 5A.

The fifth 26-subcarrier RU 510, at the center of the 20 MHz bandwidth 500, is not to be considered an odd RU or an even RU.

FIG. 6 illustrates RUs definitions in a 40 MHz bandwidth 600 according to an embodiment. Within the 40 MHz bandwidth 600 may be defined first to eighteenth 26-subcarrier RUs 602, 604, 606, 608, 610, 612, 614, 616, 618, 642, 644, 646, 648, 650, 652, 654, 656, and 658. Also defined may be first to eighth 62-subcarrier RUs 622, 624, 626, 628, 662, 664, 666 and 668. First and second 242-subcarrier RUs 640 and 680 and a 484-subcarrier RU 682 may also be defined within the 40 MHz bandwidth 600.

In an embodiment, first to fourth second 106-subcarrier RUs 632, 634, 662 and 664 may be defined in the 40 MHz bandwidth 600. In another embodiment, first to fourth 108-subcarrier RUs 636, 638, 666, and 668 may be defined in the 40 MHz bandwidth 600.

In an embodiment, lowest and highest SC indexes of the RUs 602 to 638 of FIG. 6 are the same, within a first 20 MHz subchannel of the 40 MHz bandwidth 600, as the lowest and highest SC indexes of the similarly numbered RUs 502 to 538 of FIGS. 5A and 5B, respectively. Lowest and highest SC indexes of the RUs 642 to 668 of FIG. 6 are the same, within a second 20 MHz subchannel of the 40 MHz bandwidth 600, as the lowest and highest SC indexes of the corresponding RUs 502 to 538 of FIGS. 5A and 5B, respectively.

The odd and even RUs of the 40 MHz bandwidth 600 are indicated by labels of the RUs.

Within this disclosure, the definitions of the RUs illustrated in FIGS. 5A and 6 are denoted as case 1.

FIG. 7 illustrates RUs defined within an 80 MHZ bandwidth 700. The defined RUs include thirty-six 26-subcarrier RUs 702 to 721 and 742 to 761, sixteen 52-subcarrier RUs 722 to 729 and 762 to 769, four 242-subcarrier RUs 740, 741, 780, and 781, two 484-subcarrier RUs 782 and 783, and a 996-subcarrier RU 784.

The defined RUs in the 80 MHZ bandwidth 700 also include eight RUs that may be 106-subcarrier RUs in an embodiment or 108-subcarrier RUs in another embodiment. The eight 106- or -108-subcarrier RUs are designated by reference characters 732 to 735 and 772 to 775.

Figure 8A:
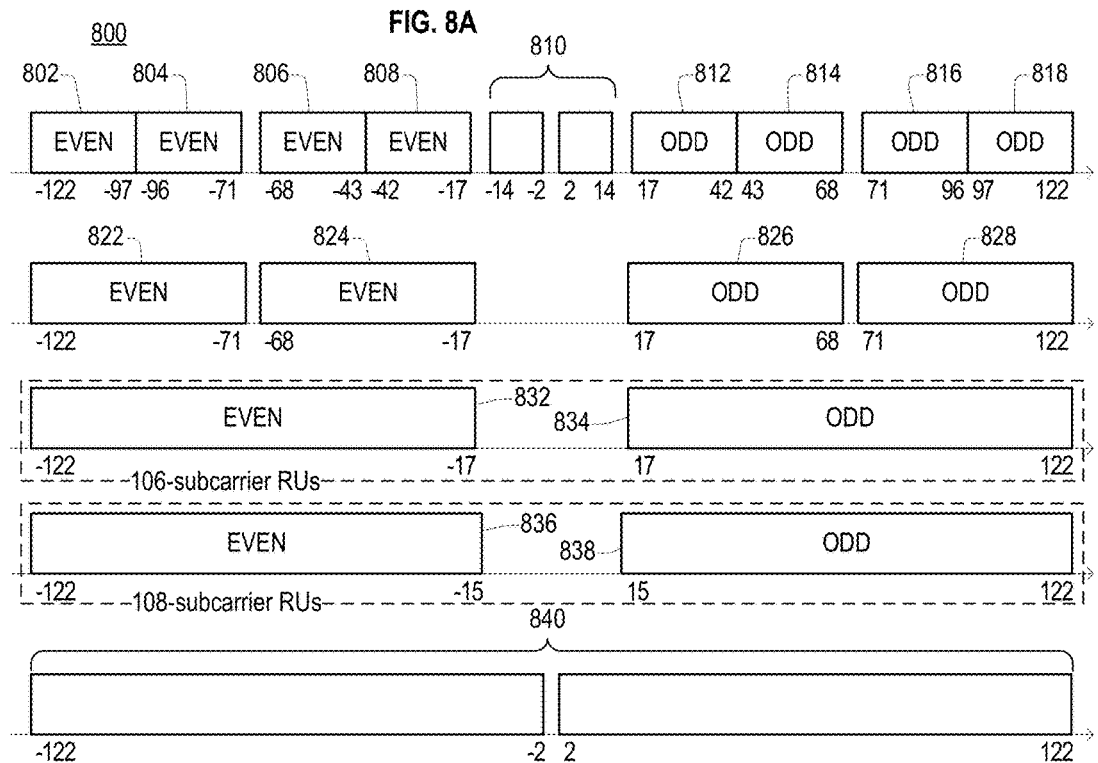
FIG. 8A illustrates even and odd RUs in a 20 MHz bandwidth according to another embodiment.
Figure 9:
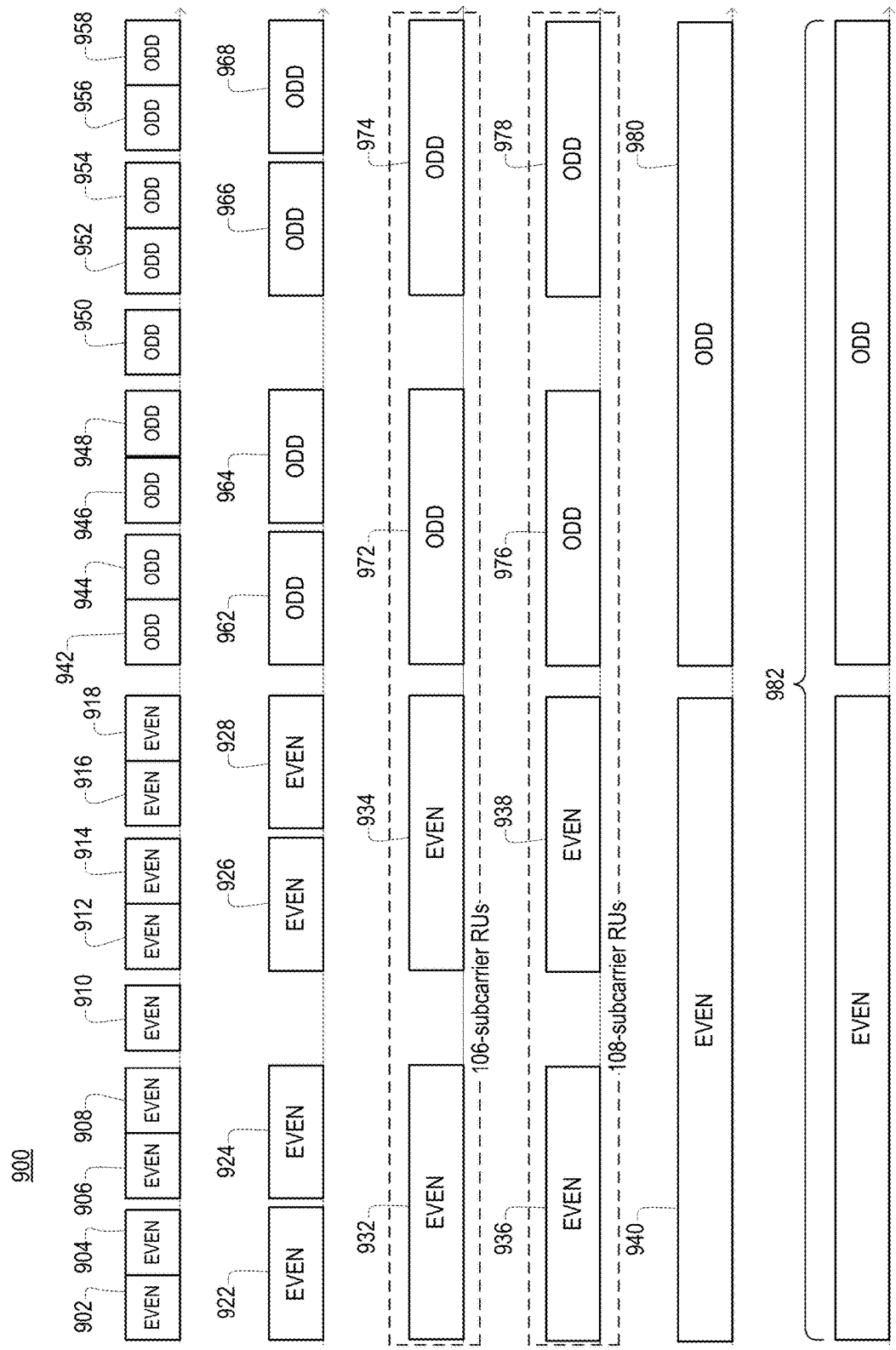
FIG. 9 illustrates even and odd RUs in a 40 MHz bandwidth according to another embodiment.

FIGS. 8A and 9 illustrate alternative RU definitions for 20 and 40 MHz bandwidths, respectively. Within this disclosure, the definitions of the RUs illustrated in FIGS. 8A and 9 are denoted as case 2.

FIG. 8A illustrates RUs definitions in a 20 MHz bandwidth 800 according to another embodiment. Within the 20 MHz bandwidth 800 are defined first to ninth 26-subcarrier RUs 802, 804, 806, 808, 810, 812, 814, 816, and 818. Also defined are first to fourth 52-subcarrier RUs 822, 824, 826 and 828. A 242-subcarrier RU 840 may also be defined within the 20 MHz bandwidth 800.

In an embodiment, first and second 106-subcarrier RUs 832 and 834 may be defined in the 20 MHz bandwidth 800. In another embodiment, first and second 108-subcarrier RUs 836 and 838 may be defined in the 20 MHz bandwidth 800.

FIG. 8B includes a Table 2 indicating the size and lowest and highest subcarrier (SC) indexes of the RUs that may be defined in the 20 MHz bandwidth 800. Table 1 also indicates whether an RU is considered an odd RU (that is, one that has a lowest SC index that is an odd integer) or an even RU (that is, one that has a lowest SC index that is an even integer.) Odd and even RUs are also indicated in FIG. 8A.

The fifth 26-subcarrier RU 810, at the center of the 20 MHz bandwidth 800, is not to be considered an odd RU or an even RU.

FIG. 9 illustrates RUs definitions in a 40 MHz bandwidth 900 according to another embodiment. Within the 40 MHz bandwidth 900 are defined first to eighteenth 26-subcarrier RUs 902, 904, 906, 908, 910, 912, 914, 916, 918, 942, 944, 946, 948, 950, 952, 954, 956, and 958. Also defined are first to eighth 52-subcarrier RUs 922, 924, 926, 928, 962, 964, 966 and 968. First and second 242-subcarrier RUs 940 and 980 and a 484-subcarrier RU 982 may also be defined within the 40 MHz bandwidth 900.

In an embodiment, first to fourth second 106-subcarrier RUs 932, 934, 962 and 964 may be defined in the 40 MHz bandwidth 900. In another embodiment, first to fourth 108-subcarrier RUs 936, 938, 966, and 968 may be defined in the 40 MHz bandwidth 900.

In an embodiment, lowest and highest SC indexes of the RUs 902 to 938 of FIG. 9 are the same, within a first 20 MHz subchannel of the 40 MHz bandwidth 900, as the lowest and highest SC indexes of the similarly numbered RUs 802 to 838 of FIGS. 8A and 8B, respectively. Lowest and highest SC indexes of the RUs 942 to 968 of FIG. 9 are the same, within a second 20 MHz subchannel of the 40 MHz bandwidth 900, as the lowest and highest SC indexes of the corresponding RUs 802 to 838 of FIGS. 8A and 8B, respectively.

The odd and even RUs of the 40 MHz bandwidth 900 are indicated by labels of the RUs.

1. Pilot Tone Mapping Symmetry between Even and Odd Resource Units

In an embodiment, even and odd RUs may have pilot tone positions that exhibit mirror symmetry. FIG. 10 illustrates positions of pilot tone positions in an even RU 1000 according to an embodiment. FIG. 11 illustrates positions of pilot tone positions in an odd RU 1100 according to an embodiment, the positions of the pilot tone positions in the odd RU 1100 having mirror symmetry relative to the positions of the pilot tone positions of the even RU 1000. The even RU 1000 and the odd RU 1100 have a same size, that is, a same number (26) of subcarriers.

In FIGS. 10 and 11, hash marks along the horizontal access correspond to odd subcarriers that respectively do not correspond to subcarriers having energy of a 2X HE-LTF. Upward pointing arrows along the horizontal access respectively correspond to even subcarriers that correspond to the subcarriers having energy of the 2X HE-LTF.

The even RU 1000 includes first and second pilot tone positions 1004 and 1006. The first pilot tone position 1004 corresponds to a subcarrier spaced 6 subcarriers away from a lowest-indexed subcarrier of the even RU 1000. The second pilot tone position 1006 corresponds to a subcarrier separated by 11 subcarriers from the first pilot tone position 1004 and spaced 7 subcarriers away from a highest-indexed subcarrier of the even RU 1000.

The odd RU 1100 includes third and fourth pilot tone positions 1104 and 1106 which are mirror-symmetric to the first and second pilot tone positions 1004 and 1006, respectively. Accordingly, the third pilot tone position 1104 corresponds to a subcarrier spaced 6 subcarriers away from a highest-indexed subcarrier of the odd RU 1100. The fourth pilot tone position 1106 corresponds to a subcarrier separated by 11 subcarriers from the third pilot tone position 1104 and spaced 7 subcarriers away from a lowest-indexed subcarrier of the odd RU 1100.

This produces mirror symmetric pilot tone positions between an even RU and an odd RU of the same size, when the even RU and the odd RU are adjacent to each other.

2. Nested and Non-nested Pilot Structure

In an embodiment, pilot tone positions may have a nested pilot structure. In another embodiment, pilot tone positions may have a non-nested pilot structure.

In the nested pilot structure, for a given operation bandwidth (such as 40 MHz or 80 MHz) the pilot tone positions for RUs having larger number of subcarriers are physically aligned (in frequency domain) with pilot tone positions for RUs having smaller numbers of subcarriers. The nested pilot structure may simplify a Carrier Frequency Offset (CFO) tracking algorithm of a receiver configured to receive frames including RU allocations having varied sizes and varied positions.

In the non-nested pilot structure, pilot tone positions are defined for each RU size in such a manner as to maximize CFO tracking performance. The non-nested pilot structure may have a uniform spacing of pilots within an RU.

3. Design A: Non-nested Pilot Structure

In embodiment according to a design-A principle having a non-nested pilot structure, cases may occur in which pilots are mapped to locations that correspond to null tones (that is, tones not carrying information) of a 2X HE-LTF, since information in the 2X HE-LTF sequence is only mapped to either even or odd tones in a given OFDM symbol.

Embodiments of the design-A principle include alternative 1 and alternative 2. Alternative 1 defines the pilot tone positions such that the pilot tone positions never correspond to locations of null tones of an HE-LTF OFDM symbol.

Alternative 2 defines the pilot tone positions such that pilot spacing is uniform, without regards to whether the pilot tone positions correspond to locations of null tones of the HE-LTF OFDM symbol. As a result, an HE-LTF OFDM symbol according to Alternative 2 of Design A may lack one or more pilots present in the data payload OFDM symbols.

4. Design a, Alternative 1: Pilots are not Mapped to Null LTF Tones

FIGS. 10 and 11 both illustrates a general concept for embodiments of alternative 1 of Design-A. In order to ensure that pilots are always mapped to non-null tones of an HE-LTF of the 2×LTF design, the tone spacing between two consecutive pilot tone positions (that is, the number of tones/subcarriers between two consecutive pilot tone positions) should be an odd number.

Accordingly in FIG. 10 the second pilot tone position 1006 corresponds to a subcarrier separated by 11 subcarriers from the first pilot tone position 1004, and in FIG. 11 the third pilot tone position 1104 corresponds to a subcarrier separated by 11 subcarriers from the fourth pilot tone position 1106. That is, the tone spacing between the pilot tone positions in each of FIGS. 10 and 11 is 11 subcarriers.

This ensures that pilot tone positions are mapped to 2X HE-LTF sequence mapping positions (i.e. subcarriers that carry information in a 2×LTF design).

In all of FIGS. 12-22, the upward arrows extending from the horizontal axis represents subcarriers corresponding to potential 2X HE-LTF sequence mapping positions from the 2×LTF design, and the hash marks on the axis represent subcarriers that do not corresponding to potential 2X HE-LTF sequence mapping positions from the 2×LTF design. The dash-dotted lines on the most left and right part of the figure represent the boundaries of the RU.

FIGS. 12 and 13 illustrate RUs having a spacing between pilot subcarrier positions of 13 subcarriers according to an embodiment of alternative 1 of Design A.

In an embodiment of alternative 1 of design A that includes an even tone mapping of an HE-LTF sequence in a 2×LTF design, FIG. 12 illustrates pilot tone positions for an even 26-subcarrier RU 1200, and FIG. 13 illustrates pilot tone positions for an odd 26-subcarrier RU 1300.

In the embodiment including the even tone mapping of the HE-LTF sequence, a lowest subcarrier index $f_0$ of the even RU 1200 is equal to 2n, and a lowest subcarrier index $f_0'$ of the odd RU 1300 is equal to 2n+1, where n is an integer. In an embodiment, the lowest subcarrier index $f_0$ of either of RU 1200 and 1300 may be one of −122, −68, +16, and +70 when even and one of −95, −41, +43, and +97 when odd. In an embodiment for 20 MHz bandwidth, the lowest subcarrier index $f_0$ of either of RU 1200 and 1300 may be one of −68, −42, +70, and +96 when even and one of −121, −95, +17, and +43 when odd. In an embodiment for 40 MHz bandwidth, the lowest subcarrier index $f_0$ of either of RU 1200 and 1300 may be one of −136, 4, 30, 58, 84, 138, 164, 192, and 218 when even and one of −243, −217, −189, −163, −109, −83, −55, −29, and 111 when odd. In an embodiment for 80 MHz bandwidth, the lowest subcarrier index $f_0$ of either of RU 1200 and 1300 may be one of −392, −150, +18, +44, +72, +98, +152, +178, +206, +232, +260, +286, +314, +340, +394, +420, +448, and +474 when even and one of −499, −473, −445, −419, −365, −339, −311, −285, −257, −231, −203, −177, −123, −97, −69, −43, +125, and +367 when odd. In an embodiment for 160 MHz bandwidth, the lowest subcarrier index $f_0$ of either of RU 1200 and 1300 may be one of −1011, −985, −957, −931, −877, −851, −823, −797, −769, −743, −715, −689, −635, −609, −581, −555, −387, −145, +13, +39, +67, +93, +147, +173, +201, +227, +255, +281, +309, +335, +389, +415, +443, +469, +637, and +879 when even and one of −904, −662, −494, −468, −440, −414, −360, −334, −306, −280, −252, −226, −198, −172, −118, −92, −64, −38, +120, +362, +530, +556, +584, +610, +664, +690, +718, +744, +772, +798, +826, +852, +906, +932, +960, +986 when odd.

A first pilot tone position 1204 of the even RU 1200 is spaced 6 subcarriers away from a lowest subcarrier of the even RU 1200. A second pilot tone position 1206 of the even RU 1200 is separated by 13 subcarriers from the first pilot tone position 1204 and 5 subcarriers away from a highest subcarrier of the even RU 1200. If the lowest subcarrier of the even RU 1200 is equal to f0, two pilots are located at the (f0+6)-th subcarrier and the (f0+20)-th subcarrier.

A first pilot tone position 1304 of the odd RU 1300 is spaced 5 subcarriers away from a lowest subcarrier of the odd RU 1300. A second pilot tone position 1306 of the odd RU 1300 is separated by 13 subcarriers from the first pilot tone position 1304 and 6 subcarriers away from a highest subcarrier of the odd RU 1300. If the lowest subcarrier of the even RU 1200 is equal to f0, two pilots are located at the (f0+5)-th subcarrier and the (f0+19)-th subcarrier.

In another embodiment of alternative 1 of design A that includes an odd tone mapping of an HE-LTF sequence in a 2×LTF design, FIG. 12 illustrates pilot tone positions for an odd 26-subcarrier RU, and FIG. 13 illustrates pilot tone positions for an even 26-subcarrier RUs.

In the embodiment including the odd tone mapping of the HE-LTF sequence, a lowest subcarrier index $f_0$ of the odd RU 1200 is equal to 2n+1, and a lowest subcarrier index $f_0'$ of the even RU 1300 is equal to 2n, where n is an integer. In an embodiment, the lowest subcarrier indexes $f_0$ and $f_0'$ of either of RU 1200 and 1300 is one of −122, −68, +16, and +70 when even and one of −95, −41, +43, and +97 when odd.

A first pilot tone position 1204 of the odd RU 1200 is spaced 6 subcarriers away from a lowest subcarrier of the odd RU 1200. A second pilot tone position 1206 of the odd RU 1200 is separated by 13 subcarriers from the first pilot tone position 1204 and spaced 5 subcarriers away from a highest subcarrier of the odd RU 1200.

A first pilot tone position 1304 of the even RU 1300 is spaced 5 subcarriers away from a lowest subcarrier of the even RU 1300. A second pilot tone position 1306 of the even RU 1300 is separated by 13 subcarriers from the first pilot tone position 1304 and 6 subcarriers away from a highest subcarrier of the even RU 1300.

Figure 15:
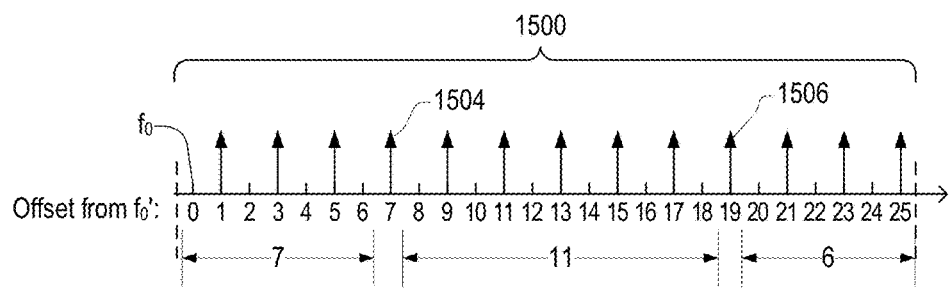
FIG. 15 illustrates a 26-subcarrier RU of alternative 1 of design A, according to an embodiment.

FIGS. 14 and 15 illustrate RUs having a spacing between pilot subcarrier positions of 11 subcarriers according to an embodiment of alternative 1 of Design A.

In an embodiment of alternative 1 of design A that includes an even tone mapping of an HE-LTF sequence in a 2×LTF design, FIG. 14 illustrates pilot tone positions for an even 26-subcarrier RU 1400, and FIG. 15 illustrates pilot tone positions for an odd 26-subcarrier RU 1500.

In the embodiment including the even tone mapping of the HE-LTF sequence, a lowest subcarrier index $f_0$ of the even RU 1400 is equal to 2n, and a lowest subcarrier index $f_0'$ of the odd RU 1500 is equal to 2n+1, where n is an integer. In an embodiment, the lowest subcarrier indexes $f_0$ and $f_0'$ of either of RU 1400 and 1500 is one of −122, −68, +16, and +70 when even and one of −95, −41, +43, and +97 when odd.

A first pilot tone position 1404 of the even RU 1400 is spaced 6 subcarriers away from a lowest subcarrier of the even RU 1400. A second pilot tone position 1406 of the even RU 1400 is separated by 11 subcarriers from the first pilot tone position 1404 and spaced 7 subcarriers away from a highest subcarrier of the even RU 1400.

A first pilot tone position 1504 of the odd RU 1500 is spaced 7 subcarriers away from a lowest subcarrier of the odd RU 1500. A second pilot tone position 1506 of the odd RU 1500 is separated by 11 subcarriers from the first pilot tone position 1504 and spaced 6 subcarriers away from a highest subcarrier of the odd RU 1500.

In another embodiment of alternative 1 of design A that includes an odd tone mapping of an HE-LTF sequence in a 2×LTF design, FIG. 14 illustrates pilot tone positions for an odd 26-subcarrier RU, and FIG. 15 illustrates pilot tone positions for an even 26-subcarrier RUs.

In the embodiment including the odd tone mapping of the HE-LTF sequence, a lowest subcarrier index $f_0$ of the odd RU 1400 is equal to 2n+1, and a lowest subcarrier index $f_0'$ of the even RU 1500 is equal to 2n, where n is an integer. In an embodiment, the lowest subcarrier indexes $f_0$ and $f_0'$ of either of RU 1400 and 1500 is one of −122, −68, +16, and +70 when even and one of −95, −41, +43, and +97 when odd.

A first pilot tone position 1404 of the odd RU 1400 is spaced 6 subcarriers away from a lowest subcarrier of the odd RU 1400. A second pilot tone position 1406 of the odd RU 1400 is separated by 11 subcarriers from the first pilot tone position 1404 and spaced 7 subcarriers away from a highest subcarrier of the odd RU 1400.

A first pilot tone position 1504 of the even RU 1500 is spaced 7 subcarriers away from a lowest subcarrier of the even RU 1500. A second pilot tone position 1506 of the even RU 1500 is separated by 11 subcarriers from the first pilot tone position 1504 and spaced 6 subcarriers away from a highest subcarrier of the even RU 1500.

Figure 16:
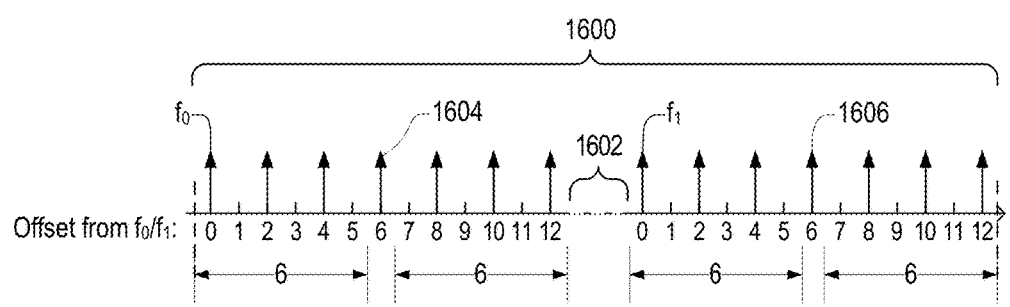
FIG. 16 illustrates a center 26-subcarrier RU of alternative 1 of design A, according to an embodiment.

FIG. 16 illustrates a center 26-subcarrier RU 1600 according to an embodiment of alternative 1 of design A that includes an even tone mapping of an HE-LTF sequence in a 2×LTF design. The center RU 1600 is split into a left 13-subcarrier unit and a right 13-subcarrier unit by one of 3, 5, and 7 Direct Current (DC) tones within a central portion 1602.

When the center RU 1600 includes 3 DC tones, a lowest subcarrier index $f_0$ of the left 13-subcarrier unit may be −14 and a lowest subcarrier index $f_1$ of the right 13-subcarrier unit may be +2. When the center RU 1600 includes 5 DC tones, the left lowest subcarrier index $f_0$ may be −15 and the right lowest subcarrier index $f_1$ of the center RU 1600 may be +3. When the center RU 1600 includes 7 DC tones, the left lowest subcarrier index $f_0$ may be −16 and the right lowest subcarrier index $f_1$ of the center RU 1600 may be +4.

A first pilot tone position 1604 of the center RU 1600 is spaced 6 subcarriers away from a lowest subcarrier of the center RU 1600 and 6 subcarriers away from the central portion 1602. A second pilot tone position 1606 of the center RU 1600 is spaced 6 subcarriers away from a highest subcarrier of the center RU 1600 and 6 subcarriers away from the central portion 1602. Two pilots are located at the (f0+6)-th subcarrier and the (f1+6)-th subcarrier.

The first pilot tone position 1604 is located at a center of 13 subcarriers of a left portion of the center RU 1600. The second pilot tone position 1606 is located at a center of 13 subcarriers of a right portion of the center RU 1600.

Figure 17:
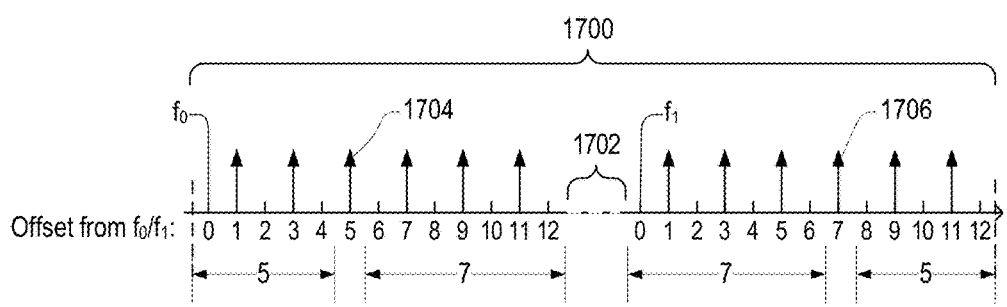
FIG. 17 illustrates a center 26-subcarrier RU of alternative 1 of design A, according to an embodiment.

FIG. 17 illustrates a center 26-subcarrier RU 1700 according to an embodiment of alternative 1 of design A that includes an odd tone mapping of an HE-LTF sequence in a 2×LTF design. The center RU 1700 may include one of 3, 5, and 7 Direct Current (DC) tones within a central portion 1702.

When the center RU 1700 includes 3 DC tones, a left lowest subcarrier index $f_0$ may be −14 and a right lowest subcarrier index $f_1$ of the center RU 1700 may be +2. When the center RU 1700 includes 5 DC tones, the left lowest subcarrier index $f_0$ may be −15 and the right lowest subcarrier index $f_1$ of the center RU 1700 may be +3. When the center RU 1700 includes 7 DC tones, the left lowest subcarrier index $f_0$ may be −16 and the right lowest subcarrier index $f_1$ of the center RU 1700 may be +4.

A first pilot tone position 1704 of the center RU 1700 is spaced 5 subcarriers away from a lowest subcarrier of the even RU 1700 and 7 subcarriers away from the central portion 1702. A second pilot tone position 1706 of the center RU 1700 is spaced 5 subcarriers away from a highest subcarrier of the center RU 1700 and 7 subcarriers away from the central portion 1702.

Figure 18:
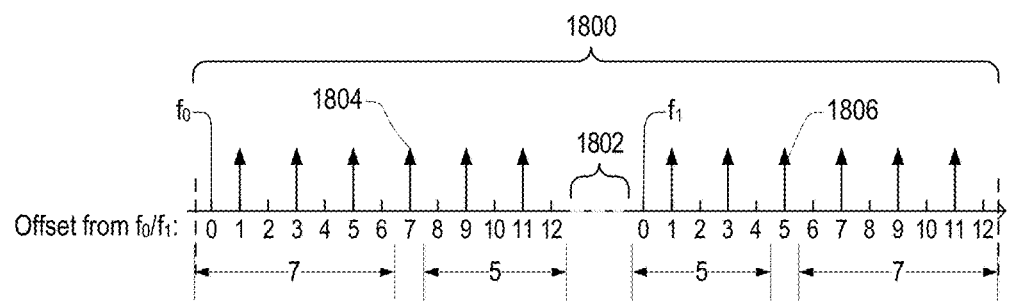
FIG. 18 illustrates a center 26-subcarrier RU of alternative 1 of design A, according to an embodiment.

FIG. 18 illustrates a center 26-subcarrier RU 1800 according to an embodiment of alternative 1 of design A that includes an odd tone mapping of an HE-LTF sequence in a 2×LTF design. The center RU 1800 may include one of 3, 5, and 7 Direct Current (DC) tones within a central portion 1802.

When the center RU 1800 includes 3 DC tones, a left lowest subcarrier index $f_0$ may be −14 and a right lowest subcarrier index $f_1$ of the center RU 1800 may be +2. When the center RU 1800 includes 5 DC tones, the left lowest subcarrier index $f_0$ may be −15 and the right lowest subcarrier index $f_1$ of the center RU 1800 may be +3. When the center RU 1800 includes 7 DC tones, the left lowest subcarrier index $f_0$ may be −16 and the right lowest subcarrier index $f_1$ of the center RU 1800 may be +4.

A first pilot tone position 1804 of the center RU 1800 is spaced 7 subcarriers away from a lowest subcarrier of the even RU 1800 and 5 subcarriers away from the central portion 1802. A second pilot tone position 1806 of the center RU 1800 is spaced 7 subcarriers away from a highest subcarrier of the center RU 1800 and 5 subcarriers away from the central portion 1802.

Figure 19:
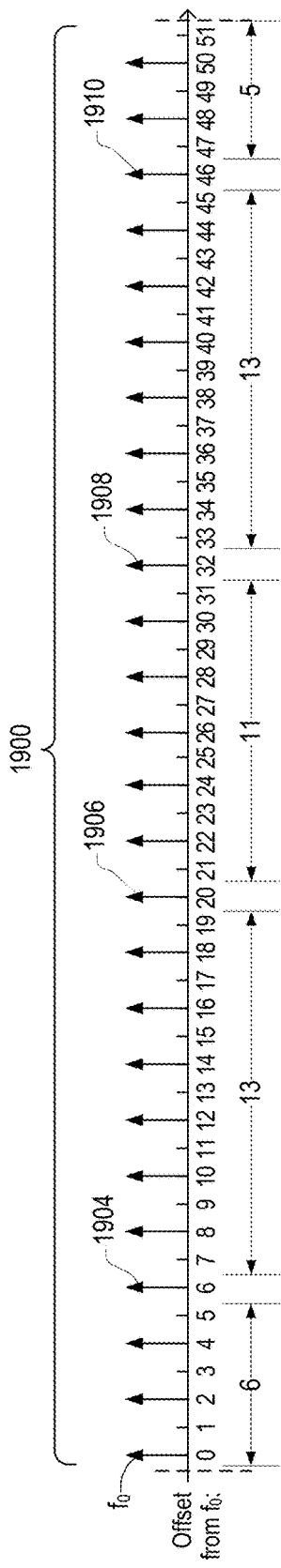
FIG. 19 illustrates a 52-subcarrier RU of alternative 1 of design A, according to an embodiment.
Figure 20:
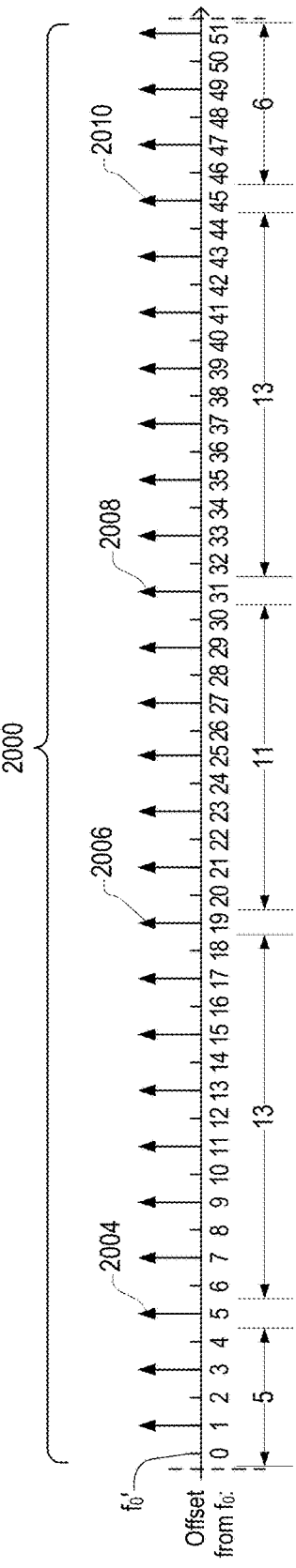
FIG. 20 illustrates a 52-subcarrier RU of alternative 1 of design A, according to an embodiment.

FIGS. 19 and 20 illustrate 52-subchannel RUs having a spacing between first, second, third, and fourth pilot subcarrier positions of 13, 11, and 13 subcarriers, respectively, according to an embodiment of alternative 1 of Design A.

In an embodiment of alternative 1 of design A that includes an even tone mapping of an HE-LTF sequence in a 2×LTF design, FIG. 19 illustrates pilot tone positions for an even 52-subcarrier RU 1900, and FIG. 20 illustrates pilot tone positions for an odd 52-subcarrier RU 2000.

In the embodiment including the even tone mapping of the HE-LTF sequence, a lowest subcarrier index $f_0$ of the even RU 1900 is equal to 2n, and a lowest subcarrier index $f_0'$ of the odd RU 2000 is equal to 2n+1, where n is an integer. In an embodiment, the lowest subcarrier indexes $f_0$ and $f_0'$ of either of RU 1900 and 2000 is one of −122, −68, +16, and +70 when even and one of −95, −41, +43, and +97 when odd. In an embodiment for 20 MHz bandwidth, the lowest subcarrier index $f_0$ of either of RU 1200 and 1300 may be one of −68 and +70 when even and one of −121 and +17 when odd. In an embodiment for 40 MHz bandwidth, the lowest subcarrier index $f_0$ of either of RU 1200 and 1300 may be one of 4, 58, 138, and 192 when even and one of −243, −189, −109, and −55 when odd. In an embodiment for 80 MHz bandwidth, the lowest subcarrier index $f_0$ of either of RU 1200 and 1300 may be one of +18, +72, +152, +206, +260, +314, +394 and +448 when even and one of −499, −445, −365, −311, −257, −203, −123 and −69 when odd. In an embodiment for the 160 MHz bandwidth, the lowest subcarrier index $f_0$ of either of RU 1200 and 1300 may be one of −494, −440, −360, −306, −252, −198, −118, −64, +530, +584, +664, +718, +772, +826, +906 and +960 when even and one of −1011, −957, −877, −823, −769, −715, −635, −581, +13, +67, +147, +201, +255, +309, +389 and +443 when odd.

A first pilot tone position 1904 of the even RU 1900 is spaced 6 subcarriers away from a lowest subcarrier of the even RU 1900. A second pilot tone position 1906 of the even RU 1900 is separated by 13 subcarriers from the first pilot tone position 1904. A third pilot tone position 1908 of the even RU 1900 is separated by 11 subcarriers from the second pilot tone position 1906. A fourth pilot tone position 1910 of the even RU 1900 is separated by 13 subcarriers from the third pilot tone position 1908 and spaced 5 subcarriers away from a highest subcarrier of the even RU 1900. If the lowest subcarrier of the even RU 1900 is equal to $f_0$, four pilots are located at the $(f_0+6)$-th subcarrier, the $(f_0+20)$-th subcarrier, the $(f_0+32)$-th subcarrier and the $(f_0+46)$-th subcarrier, respectively.

A first pilot tone position 2004 of the odd RU 2000 is spaced 5 subcarriers away from a lowest subcarrier of the odd RU 2000. A second pilot tone position 2006 of the odd RU 2000 is separated by 13 subcarriers from the first pilot tone position 2004. A third pilot tone position 2008 of the odd RU 2000 is separated by 11 subcarriers from the second pilot tone position 2006. A fourth pilot tone position 2010 of the odd RU 2000 is separated by 13 subcarriers from the third pilot tone position 2008 and spaced 6 subcarriers away from a highest subcarrier of the odd RU 2000. If the lowest subcarrier of the odd RU 1900 is equal to $f_0'$, four pilots are located at the $(f_0'+6)$-th subcarrier, the $(f_0'+20)$-th subcarrier, the $(f_0'+32)$-th subcarrier and the $(f_0'+46)$-th subcarrier, respectively.

In another embodiment of alternative 1 of design A that includes an odd tone mapping of an HE-LTF sequence in a 2×LTF design, FIG. 19 illustrates pilot tone positions for an odd 52-subcarrier RU 1900, and FIG. 20 illustrates pilot tone positions for an even 52-subcarrier RU 2000.

In the embodiment including the odd tone mapping of the HE-LTF sequence, a lowest subcarrier index $f_0$ of the odd RU 1900 is equal to 2n+1, and a lowest subcarrier index $f_0'$ of the even RU 2000 is equal to 2n, where n is an integer. In an embodiment, the lowest subcarrier indexes $f_0$ and $f_0'$ of either of RU 1900 and 2000 is one of −122, −68, +16, and +70 when even and one of −95, −41, +43, and +97 when odd.

A first pilot tone position 1904 of the odd RU 1900 is spaced 6 subcarriers away from a lowest subcarrier of the odd RU 1900. A second pilot tone position 1906 of the odd RU 1900 is separated by 13 subcarriers from the first pilot tone position 1904. A third pilot tone position 1908 of the odd RU 1900 is separated by 11 subcarriers from the second pilot tone position 1906. A fourth pilot tone position 1910 of the odd RU 1900 is separated by 13 subcarriers from the third pilot tone position 1908 and spaced 5 subcarriers away from a highest subcarrier of the odd RU 1900.

A first pilot tone position 2004 of the even RU 2000 is spaced 5 subcarriers away from a lowest subcarrier of the even RU 2000. A second pilot tone position 2006 of the even RU 2000 is separated by 13 subcarriers from the first pilot tone position 2004. A third pilot tone position 2008 of the even RU 2000 is separated by 11 subcarriers from the second pilot tone position 2006. A fourth pilot tone position 2010 of the even RU 2000 is separated by 13 subcarriers from the third pilot tone position 2008 and spaced 6 subcarriers away from a highest subcarrier of the even RU 2000.

FIGS. 21 and 22 illustrate 52-subchannel RUs having a spacing between first, second, third, and fourth pilot subcarrier positions of 11, 13, and 11 subcarriers, respectively, according to an embodiment of alternative 1 of Design A.

In an embodiment of alternative 1 of design A that includes an even tone mapping of an HE-LTF sequence in a 2×LTF design, FIG. 21 illustrates pilot tone positions for an even 52-subcarrier RU 2100, and FIG. 22 illustrates pilot tone positions for an odd 52-subcarrier RU 2200.

In the embodiment including the even tone mapping of the HE-LTF sequence, a lowest subcarrier index $f_0$ of the even RU 2100 is equal to 2n, and a lowest subcarrier index $f_0'$ of the odd RU 2200 is equal to 2n+1, where n is an integer. In an embodiment, the lowest subcarrier index $f_0$ of either of RU 2100 and 2200 is one of −122, −68, +16, and +70 when even and one of −95, −41, +43, and +97 when odd.

A first pilot tone position 2104 of the even RU 2100 is spaced 6 subcarriers away from a lowest subcarrier of the even RU 2100. A second pilot tone position 2106 of the even RU 2100 is separated by 11 subcarriers from the first pilot tone position 2104. A third pilot tone position 2108 of the even RU 2100 is separated by 13 subcarriers from the second pilot tone position 2106. A fourth pilot tone position 2110 of the even RU 2100 is separated by 11 subcarriers from the third pilot tone position 2108 and spaced 7 subcarriers away from a highest subcarrier of the even RU 2100.

A first pilot tone position 2204 of the odd RU 2200 is spaced 7 subcarriers away from a lowest subcarrier of the odd RU 2200. A second pilot tone position 2206 of the odd RU 2200 is separated by 11 subcarriers from the first pilot tone position 2204. A third pilot tone position 2208 of the odd RU 2200 is separated by 13 subcarriers from the second pilot tone position 2206. A fourth pilot tone position 2210 of the odd RU 2200 is separated by 11 subcarriers from the third pilot tone position 2208 and spaced 6 subcarriers away from a highest subcarrier of the odd RU 2200.

In another embodiment of alternative 1 of design A that includes an odd tone mapping of an HE-LTF sequence in a 2×LTF design, FIG. 21 illustrates pilot tone positions for an odd 52-subcarrier RU, and FIG. 22 illustrates pilot tone positions for an even 52-subcarrier RUs.

In the embodiment including the odd tone mapping of the HE-LTF sequence, a lowest subcarrier index $f_0$ of the odd RU 2100 is equal to 2n+1, and a lowest subcarrier index $f_0'$ of the even RU 2200 is equal to 2n, where n is an integer. In an embodiment, the lowest subcarrier indexes $f_0$ and $f_0'$ of either of RU 2100 and 2200 is one of −122, −68, +16, and +70 when even and one of −95, −41, +43, and +97 when odd.

A first pilot tone position 2104 of the odd RU 2100 is spaced 6 subcarriers away from a lowest subcarrier of the odd RU 2100. A second pilot tone position 2106 of the odd RU 2100 is separated by 11 subcarriers from the first pilot tone position 2104. A third pilot tone position 2108 of the odd RU 2100 is separated by 13 subcarriers from the second pilot tone position 2106. A fourth pilot tone position 2110 of the odd RU 2100 is separated by 11 subcarriers from the third pilot tone position 2108 and spaced 7 subcarriers away from a highest subcarrier of the odd RU 2100.

A first pilot tone position 2204 of the even RU 2200 is spaced 7 subcarriers away from a lowest subcarrier of the even RU 2200. A second pilot tone position 2206 of the even RU 2200 is separated by 11 subcarriers from the first pilot tone position 2204. A third pilot tone position 2208 of the even RU 2200 is separated by 13 subcarriers from the second pilot tone position 2206. A fourth pilot tone position 2210 of the even RU 2200 is separated by 11 subcarriers from the third pilot tone position 2208 and spaced 6 subcarriers away from a highest subcarrier of the even RU 2200.

FIG. 23 includes a Table 3 that indicates pilot tone positions for six embodiments of alternative 1 of design A for 106-subcarrier RUs. The embodiments include three spacing options a, b, and c for each of two mappings (even or odd) of an HE-LTF sequence in a 2×LTF design.

Table 3 includes three columns corresponding to the spacing options a, b, and c, respectively. Each column is composed of two subcolumns, i) an "EVEN/EVEN or ODD/ODD" subcolumn indicating positions in either even RUs when an even mapping of the HE-LTF is used or odd RUs when an odd mapping of the HE-LTF is used, and ii) an "ODD/EVEN or EVEN/ODD" subcolumn indicating positions in either the even RUs when the odd mapping of the HE-LTF is used or the odd RUs when the even mapping of the HE-LTF is used.

In each row, each column indicates a subcarrier position (SC) of an element (such as an edge carrier or a pilot tone) corresponding to the row and a spacing (or Gap) between the element corresponding to the row and the element corresponding to the next row.

In each case, the edge carriers of the RU includes a lowest subcarrier (low SC) having an index of 0, and a highest subcarrier (high SC) having an index of 105.

For a first example, in an embodiment of option a of alternative 1 of design A having an even tone mapping of an HE-LTF sequence in the 2×LTF design, first to fourth pilots of even RUs are respectively located at indexes of +14, +40, +66, and +92, respectively. First to fourth pilots of odd RUs are respectively located at indexes of +13, +39, +65, and +91, respectively.

In the first example, the positions of the pilot tone positions in the even and odd RUs are mirror symmetric. That is, the spacing between the pilot tone positions and edge subcarriers, starting from the lowest subcarrier, are 14, 25, 25, 25, and 13 in the even RUs and 13, 25, 25, 25, and 14 in the odd RUs.

For a second example, in an embodiment of option b of alternative 1 of design A having an odd tone mapping of an HE-LTF sequence in the 2×LTF design, first to fourth pilots of even RUs are respectively located at indexes of +15, +41, +67, and +93, respectively. First to fourth pilots of odd RUs are respectively located at indexes of +12, +38, +64, and +90, respectively.

As in the first example, in the second example, the positions of the pilot tone positions in the even and odd RUs are mirror symmetric. That is, the spacing between the pilot tone positions and edge subcarriers, starting from the lowest subcarrier, are 15, 25, 25, 25, and 12 in the even RUs and 12, 25, 25, 25, and 15 in the odd RUs.

Table 3 illustrates that in every combination of i) one of option a, b, and c, and ii) one of an even and odd tone mapping of an HE-LTF sequence in the 2×LTF design, the positions of the pilot tone positions in the even and odd RUs are mirror symmetric.

FIG. 24 includes a Table 4 that indicates pilot tone positions for six embodiments of alternative 1 of design A for 108-subcarrier RUs. The embodiments include three spacing options a, b, and c for each of two mappings (even or odd) of an HE-LTF sequence in a 2×LTF design.

Table 4 includes three columns corresponding to the spacing options a, b, and c, respectively. Each column is composed of two subcolumns, i) an "EVEN/EVEN or ODD/ODD" subcolumn indicating positions in either even RUs when an even mapping of the HE-LTF is used or odd RUs when an odd mapping of the HE-LTF is used, and ii) an "ODD/EVEN or EVEN/ODD" subcolumn indicating positions in either the even RUs when the odd mapping of the HE-LTF is used or the odd RUs when the even mapping of the HE-LTF is used.

In each row, each column indicates a subcarrier position (SC) of an element (such as an edge carrier or a pilot tone) corresponding to the row and a spacing (or Gap) between the element corresponding to the row and the element corresponding to the next row.

In each case, the edge carriers of the RU includes a lowest subcarrier (low SC) having an index of 0, and a highest subcarrier (high SC) having an index of 107.

For a first example, in an embodiment of option a of alternative 1 of design A having an even tone mapping of an HE-LTF sequence in the 2×LTF design, first to sixth pilots of even RUs are respectively located at indexes of +8, +26, +44, +62, +80, and +98, respectively. First to sixth pilots of odd RUs are respectively located at indexes of +9, +27, +45, +63, +81, and +99, respectively.

In the first example, the positions of the pilot tone positions in the even and odd RUs are mirror symmetric. That is, the spacing between the pilot tone positions and edge subcarriers, starting from the lowest subcarrier, are 8, 17, 17, 17, 17, 17, and 9 in the even RUs and 9, 17, 17, 17, 17, 17, and 8 in the odd RUs.

For a second example, in an embodiment of option b of alternative 1 of design A having an odd tone mapping of an HE-LTF sequence in the 2×LTF design, first to sixth pilots of even RUs are respectively located at indexes of +7, +25, +45, +61, +79, and +97, respectively. First to sixth pilots of odd RUs are respectively located at indexes of +10, +28, +46, +64, 82, and +100, respectively.

As in the first example, in the second example, the positions of the pilot tone positions in the even and odd RUs are mirror symmetric. That is, the spacing between the pilot tone positions and edge subcarriers, starting from the lowest subcarrier, are 7, 17, 17, 17, 17, 17, and 10 in the even RUs and 10, 17, 17, 17, 17, 17, and 7 in the odd RUs.

Table 4 illustrates that in every combination of i) one of option a, b, and c, and ii) one of an even and odd tone mapping of an HE-LTF sequence in the 2×LTF design, the positions of the pilot tone positions in the even and odd RUs are mirror symmetric.

FIG. 25 includes a Table 5 that indicates pilot tone positions for four embodiments of alternative 1 of design A for 242-subcarrier RUs. The embodiments include two spacing options a and b for each of two mappings (even or odd) of an HE-LTF sequence in a 2×LTF design.

Table 5 includes a left set of columns for a 242-subcarrier RUs in a 20 MHz bandwidth, wherein the RU is always an even RU. In the set of columns for the 20 MHz channel bandwidth, three sub-columns correspond to pilot tone positions for option a for an even mapping of the HE-LTF, pilot tone positions for option b for the even mapping of the HE-LTF, and pilot tone positions for an odd mapping of the HE-LTF for both options a and b, respectively.

In each row on the left side, three columns indicates respective subcarrier positions (SCs) of an element (such as an edge carrier or a pilot tone) corresponding to the row for the spacing option and LTF mapping, and a fourth columns indicates spacing (or Gap) between the element corresponding to the row and the element corresponding to the next row, which does not vary between the options a and b and the LTF mapping being even or odd.

Table 5 includes a right set of columns for 242-subcarrier RUs in any of a 40 MHz, an 80 MHz, or a 160 MHz channel bandwidth, wherein an RU can be an even or an odd RU. Within the right set, a column is provided for a spacing option a and a spacing option b.

In the right set of columns, Each column for spacing option a or b is composed of two subcolumns, i) an "EVEN/EVEN or ODD/ODD" subcolumn indicating positions in either even RUs when an even mapping of the HE-LTF is used or odd RUs when an odd mapping of the HE-LTF is used, and ii) an "ODD/EVEN or EVEN/ODD" subcolumn indicating positions in either the even RUs when the odd mapping of the HE-LTF is used or the odd RUs when the even mapping of the HE-LTF is used.

In each row on the right side, each column indicates a subcarrier position (SC) of an element (such as an edge carrier or a pilot tone) corresponding to the row and a spacing (or Gap) between the element corresponding to the row and the element corresponding to the next row.

In the embodiments within the 20 MHz channel bandwidth, the edge carriers of the RU includes a lowest subcarrier (low SC) having an index of −122, and a highest subcarrier (high SC) having an index of 122. In the embodiments within the 40, 80, or 160 MHz bandwidth, the edge carriers of the RUs includes a lowest subcarrier (low SC) having an index of 0, and a highest subcarrier (high SC) having an index of 241.

For a first example, in an embodiment of option a of alternative 1 of design A having an even tone mapping of an HE-LTF sequence in the 2×LTF design in a 20 MHz bandwidth, first to eighth pilots of the 242-subcarrier RU are respectively located at indexes of −104, −76, −40, −12, +12, +40, +76, +104, respectively.

For a second example, in an embodiment of option b of alternative 1 of design A having an odd tone mapping of an HE-LTF sequence in the 2×LTF design for a 40, 80, or 160 MHz channel bandwidth, first to eighth pilots of even RUs are respectively located at indexes of 19, 47, 83, 111, 131, 159, 195, and 223, respectively. First to eighth pilots of odd RUs are respectively located at indexes of 18, 46, 82, 110, 130, 158, 194, and 222, respectively.

In the second example, the positions of the pilot tone positions in the even and odd RUs are mirror symmetric. That is, the spacing between the pilot tone positions and edge subcarriers, starting from the lowest subcarrier, are 19, 27, 35, 27, 19, 27, 35, 27, and 18 in the even RUs and 18, 27, 35, 27, 19, 27, 35, 27, and 19 in the odd RUs.

Table 5 illustrates that, for channel bandwidths of 40, 80 and 160 MHz, in every combination of i) one of option a and b, and ii) one of an even and odd tone mapping of an HE-LTF sequence in the 2×LTF design, the positions of the pilot tone positions in the even and odd RUs are mirror symmetric. In a 20 MHz channel bandwidth, there is only one 242-subcarrier RU.

FIG. 26 includes a Table 6 that indicates pilot tone positions for six embodiments of alternative 1 of design A for 242-subcarrier RUs. The embodiments include three spacing options a, b, and c for each of two mappings (even or odd) of an HE-LTF sequence in a 2×LTF design.

Table 6 includes three columns corresponding to the spacing options a, b, and c, respectively. Each column is composed of two subcolumns, i) an "EVEN/EVEN or ODD/ODD" subcolumn indicating positions in either even RUs when an even mapping of the HE-LTF is used or odd RUs when an odd mapping of the HE-LTF is used, and ii) an "ODD/EVEN or EVEN/ODD" subcolumn indicating positions in either the even RUs when the odd mapping of the HE-LTF is used or the odd RUs when the even mapping of the HE-LTF is used.

In each row, each column indicates a subcarrier position (SC) of an element (such as an edge carrier or a pilot tone) corresponding to the row and a spacing (or Gap) between the element corresponding to the row and the element corresponding to the next row.

In each case, the edge carriers of the RU includes a lowest subcarrier (low SC) having an index of 0, and a highest subcarrier (high SC) having an index of 241.

For example, in an embodiment of option a of alternative 1 of design A having an even tone mapping of an HE-LTF sequence in the 2×LTF design, first to eighth pilots of even RUs are respectively located at indexes of +16, +46, +76, +106, +136, +166, +196, and +226, respectively. First to eighth pilots of odd RUs are respectively located at indexes of +15, +45, +75, +105, +135, +165, +195, and +225, respectively.

In the example, the positions of the pilot tone positions in the even and odd RUs are mirror symmetric. That is, the spacing between the pilot tone positions and edge subcarriers, starting from the lowest subcarrier, are 16, 29, 29, 29, 29, 29, 29, 29, and 15 in the even RUs and 15, 29, 29, 29, 29, 29, 29, 29, and 16 in the odd RUs.

Table 6 illustrates that in every combination of i) one of option a, b, and c, and ii) one of an even and odd tone mapping of an HE-LTF sequence in the 2×LTF design, the positions of the pilot tone positions in the even and odd RUs are mirror symmetric.

FIG. 27 includes a Table 7 that indicates pilot tone positions for six embodiments of alternative 1 of design A for center 242-subcarrier RUs. The embodiments include three spacing options a, b, and c for each of two mappings (even or odd) of an HE-LTF sequence in a 2×LTF design.

Table 6 includes three columns corresponding to the spacing options a, b, and c, respectively. Each column is composed of two subcolumns, i) an "EVEN" subcolumn indicating positions in the center RU when an even mapping of the HE-LTF is used, and ii) an "ODD" subcolumn indicating positions in the center RUs when the odd mapping of the HE-LTF is used.

In each row, each column indicates a subcarrier position of an element (such as a pilot tone) corresponding to the row. The subcarrier positions that are below the center of the RU are given relative to a negative offset $-f_0$. The subcarrier positions that are above the center of the RU are given relative to a positive offset $+f_0$. The negative and positive offsets $-f_0$ and $+f_0$ correspond to the first non-DC subcarriers below and above the center of the RU respectively, and the values of the negative and positive offsets $-f_0$ and $+f_0$ are determined by a number of DC subcarriers at the center of the RU.

In the embodiments shown in Table 7, pilot within each of an upper and lower half of the center RU are separated by 29 tones.

Table 7 illustrates that in every combination of i) one of option a, b, and c, and ii) one of an even and odd tone mapping of an HE-LTF sequence in the 2×LTF design, the positions of the pilot tone positions below and above the center of the center RU are mirror symmetric.

5. Design A, Alternative 2: Pilot can be Mapped to Null LTF Tones

Figure 28:
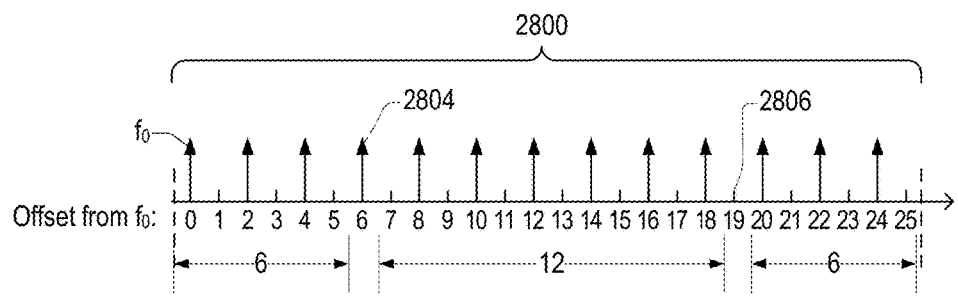
FIG. 28 illustrates a 26-subcarrier RU of alternative 2 of design A, according to an embodiment.
Figure 29:
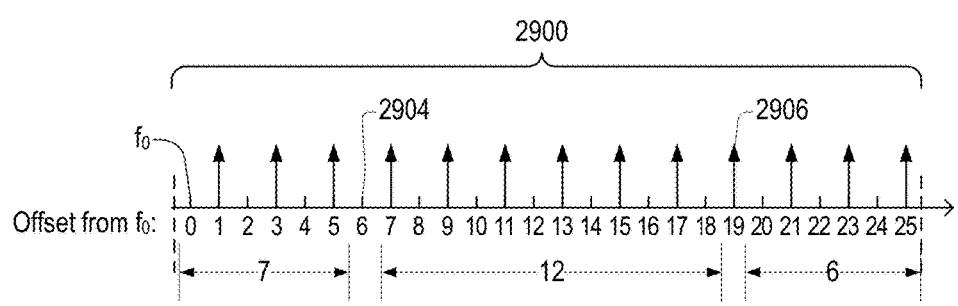
FIG. 29 illustrates a 26-subcarrier RU of alternative 2 of design A, according to an embodiment.

FIG. 28 illustrates pilot tone positions for an even RU block 2800 with 26 subcarriers when an even tone mapping of an LTF sequence in a 2×LTF design is used, or for an odd RU block 2800 with 26 subcarriers and when an odd tone mapping of the LTF sequence in the 2×LTF design is used, according to an embodiment of alternative 2 of design A. FIG. 29 illustrates pilot tone positions for an odd RU block 2900 with 26 subcarriers when an even tone mapping of the LTF sequence in the 2×LTF design is used, or for an even RU block 2900 with 26 subcarriers when an odd tone mapping of the LTF sequence in the 2×LTF design is used, according to an embodiment of alternative 2 of design A.

Locations of tones in the RU blocks 2800 and 2900 are given relative to an offset f0 within a 20 MHz channel. The offset f0 can be any of −122, −95, −68, −41, +16, +43, +70, and +97.

Alternative 2 defines the tone spacing between the pilots (that is, between first and second pilots 2804 and 2806 of the RU block 2800 and between first and second pilots 2904 and 2906 of the RU block 2900) to be 12 subcarriers and includes 6 subcarriers between outer edges of the RU and respective nearest pilot tone positions. In the 2×LTF design, the LTF OFDM symbol will only carry one pilot within the 26 subcarrier RU (because the LTF tones of the 2×LTF design, indicated by upward pointing arrows, only coincide with one pilot tone position in each of the RU blocks 2800 and 2900), however for the 4×LTF design, the LTF OFDM symbol will carry two pilots within the 26 subcarrier RU.

Figure 30:
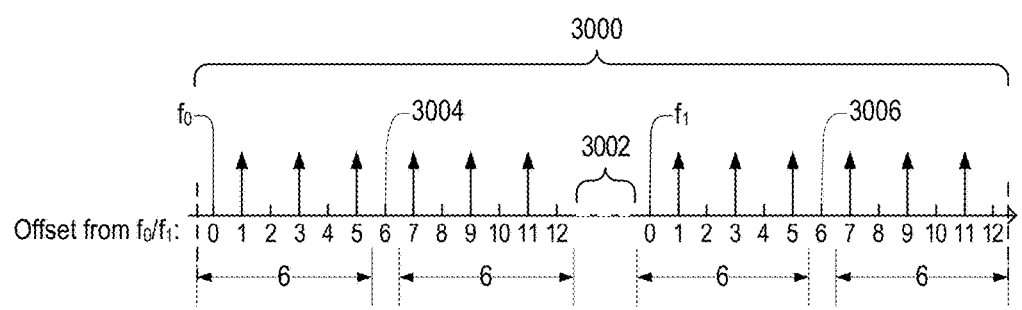
FIG. 30 illustrates a center 26-subcarrier RU of alternative 2 of design A, according to an embodiment.

FIG. 30 illustrates pilot tone positions for an center RU block 3000 with 26 subcarriers when odd tone mapping of an LTF sequence in a 2×LTF design are used. Locations of tones in the center RU block 3000 are given relative to a first offset f0 and a second offset $f_1$ relative to a center subcarrier of the center RU block 3000. The first, second, and third embodiment, the first offset $f_0$ can respectively be −14, −15, and −16 and the second offset $f_1$ can respectively be +2, +3, and +4. Tones that are lower than the center subcarrier of the center RU block 3000 have position indicated relative to the first offset $f_0$. Tones that are higher than the center subcarrier of the center RU block 3000 have position indicated relative to the second offset f1.

Alternative 2 defines the tone spacing between the first and second pilots 3004 and 3006 to be 12 subcarriers (not including any of the DC subcarriers 3002) and 6 subcarriers to the outer edge of the RU from pilot tone positions. This results in no pilots to be carried in the central 26 subcarrier RU of the LTF OFDM symbol in case of 2×LTF design because the LTF tones of the 2×LTF design, indicated by upward pointing arrows, do not correspond with either of the first pilot tone position 3004 and the second pilot tone position 3006.

Figure 31:
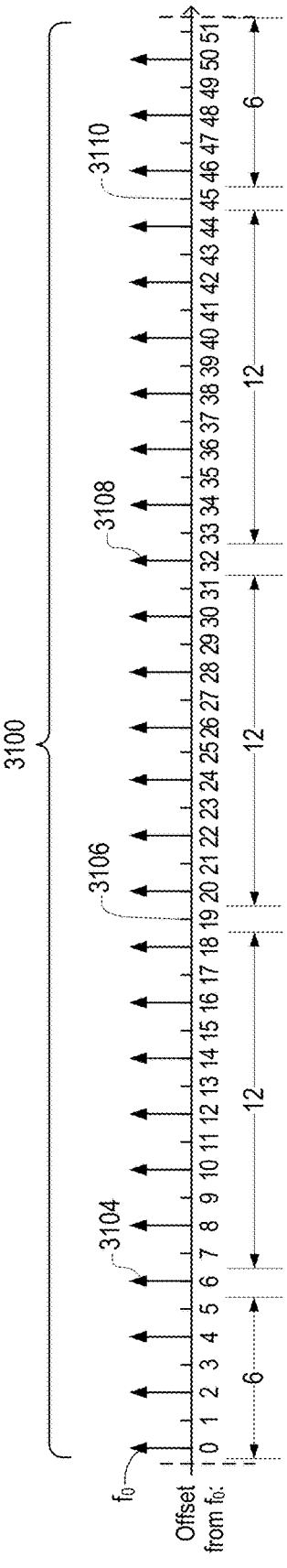
FIG. 31 illustrates a 52-subcarrier RU of alternative 2 of design A, according to an embodiment.
Figure 32:
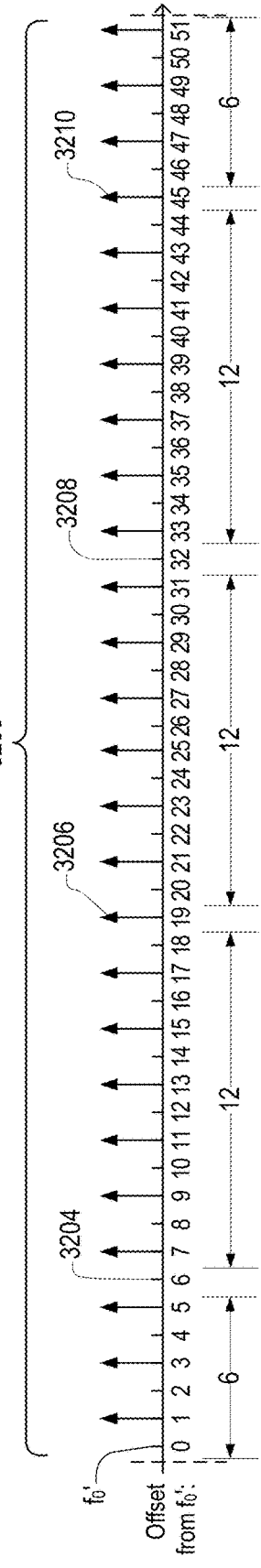
FIG. 32 illustrates a 52-subcarrier RU of alternative 2 of design A, according to an embodiment.

FIG. 31 illustrates pilot tone positions for an even RU block 3100 with 52 subcarriers when an even tone mapping of an LTF sequence in a 2×LTF design is used, or for an odd RU block 3100 with 52 subcarriers and when an odd tone mapping of the LTF sequence in the 2×LTF design is used, according to an embodiment of alternative 2 of design A. FIG. 32 illustrates pilot tone positions for an odd RU block 3200 with 56 subcarriers when the even tone mapping of the LTF sequence in the 2×LTF design is used, or for an even RU block 3100 with 26 subcarriers when the odd tone mapping of the LTF sequence in the 2×LTF design is used, according to an embodiment of alternative 2 of design A.

Alternative 2 defines the tone spacing between the any two pilots to be 12 subcarriers and 6 subcarriers to the outer edge of the RU from pilot tone positions. Accordingly, RU Block 3100 has first, second, third, and fourth pilots 3104, 3106, 3108, and 3110 at locations 6, 19, 32, and 45, respectively, and RU Block 3200 has first, second, third, and fourth pilots 3204, 3206, 3208, and 3210 at locations 6, 19, 32, and 45, respectively.

When the 2×LTF design is used, the LTF OFDM symbol will only carry two pilots within the 52 subcarrier RU, as shown in FIGS. 31 and 32 by only two of the pilot tone positions coinciding with the positions (indicated by upward pointing arrows) of tones in the 2×LTF design. For the 4×LTF design, the LTF OFDM symbol will carry four pilots within the 52 subcarrier RU.

6. Design B: Nested Pilot Structure

In a nested pilot structure, the pilot tone positions between different RUs having different number of subcarriers share the same physical frequency position. One or more pilot tone positions for a smallest resource size unit is determined, and pilot tone positions of a larger resource size unit are chosen from among the pilot tone positions of the smallest resource size unit. Embodiment of pilot tone position design are disclosed herein for two different cases.

Case 1 embodies RU definition design with 26 subcarrier RUs, 52 subcarriers RUs, 106 or 108 subcarrier RUs, 242 subcarrier RUs, 484 subcarrier RUs, and 994 or 996 subcarrier RUs, wherein there are one or more null or reserved tones between each 26 subcarrier RU and any adjacent 26 subcarrier RUs. Case 2 embodies RU definition design with 26 subcarrier RUs, 52 subcarriers RUs, 106 or 108 subcarrier RUs, 242 subcarrier RUs, 484 subcarrier RUs, and 994 or 996 subcarrier RUs, wherein pairs of consecutive 26 subcarrier RUs line up (frequency wise) with 52 subcarrier RUs, except for the central 26 subcarrier RU within each 20 MHz bandwidth.

In FIGS. 33 to 45, potential pilot tone positions in a 20 MHz bandwidth are indicated by dotted lines extending vertically through the figures. Actual pilot tone positions for each RU are indicated by upward pointing arrows. A solid upward pointing arrow indicates a pilot tone position with a fixed position. A dashed upward pointing arrow indicates a pilot tone position having one of two positions, includes a first position to the left of a reference subcarrier and a second position to the right of a reference subcarrier, according to a design choice. In an embodiment, the reference subcarriers are center subcarriers of 13-subcarrier halves of 26-subcarrier RUs.

In one embodiment, each potential pilot tone position aligns with a pilot tone position in an HE-LTF symbol of the frame. In some embodiments, two pilot tone positions are present in each 26 subcarrier RU for a given bandwidth. For example, as shown in FIGS. 12, 13, and 16, the pilot tone positions in each 26 subcarrier RU may be represented by the tones 1204 and 1206 (in relation to FIG. 12), tones 1304 and 1306 (in relation to FIG. 13), and tones 1604 and 1606 (in relation to FIG. 16). The pilot tone positions in 26 subcarrier RUs become the potential pilot tone positions for RUs with greater number of subcarriers (e.g., 52, 106, 242, 484, 996, and 2×996 subcarriers). In other word, the potential pilot tone positions are aggregation of pilot tone positions used for each 26 subcarrier RU for a given bandwidth.

Figures 33A, 33B:
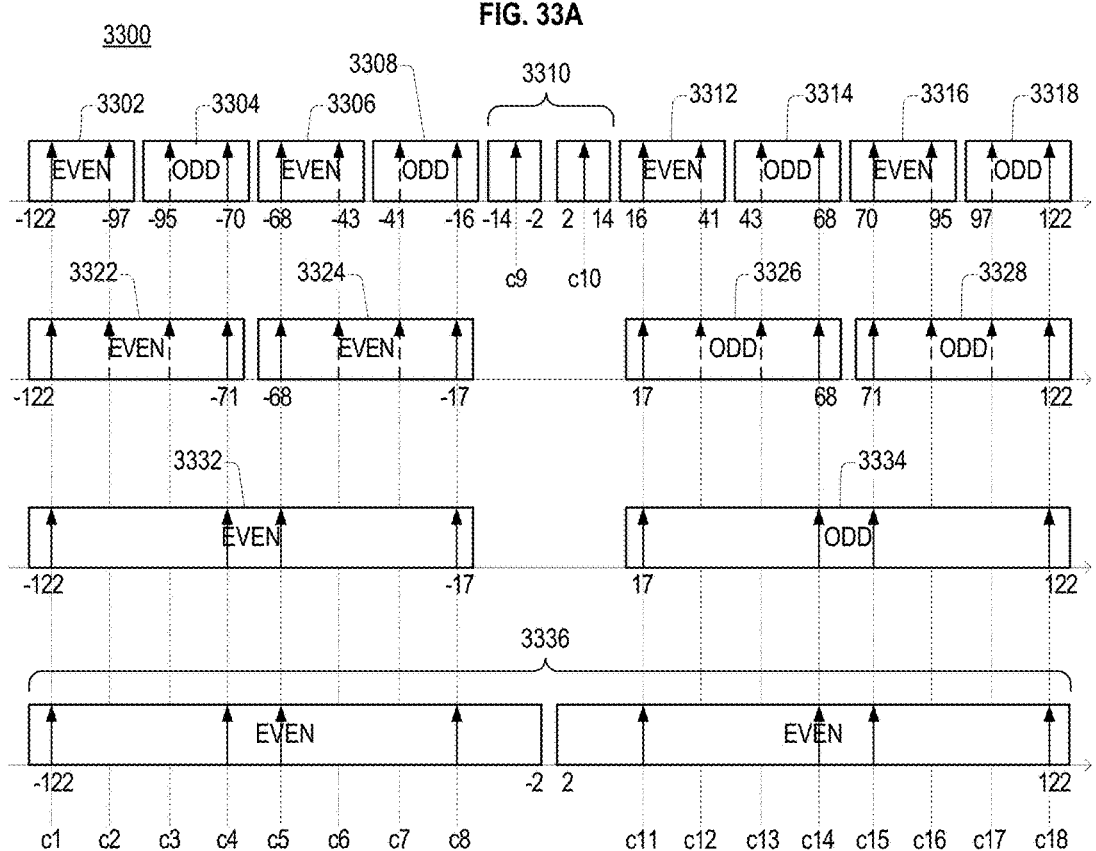
FIG. 33A illustrates pilot tone positions for RUs of a 20 MHz bandwidth (BW) of Case 1, according to an embodiment.
FIG. 33B includes a Table 9 showing pilot tone relative positions in the 20 MHz BW, according to an embodiment.

FIG. 33A illustrates a first option for pilot tone positions of a 20 MHz channel 3300 in Case 1. In Case 1, at least one null or reserved tone is present between each 26-subcarrier RU. Pilot tone positions for each RU are selected from first to eighteenth potential pilot tone positions $c1$ to $c18$. FIG. 33B shows Table 9, which lists the positions of each of the potential pilot tone positions $c1$ to $c18$ according to an embodiment, but embodiments are not limited thereto, and any of the pilot tone positions disclosed for 26-subchannel RUs in Design A, above, may be used for the potential pilot tone positions $c1$ to $c18$. FIGS. 33A and 33B show that the 20 MHz channel 3300 has a total number of potential pilot tone positions of 18.

In FIG. 33A and in FIGS. 34 to 25, numbers appearing immediately below each RU indicate indices of lowest and highest subcarriers of the RU. The indices are relative to a central ($0^{th}$) DC subcarrier of the 20 MHz channel 3300. For example, in FIG. 33A, the numbers appearing directly below a first 26-subcarrier RU 3302 indicates that the index of a lowest subcarrier of the first 26-subcarrier RU 3302 is −122 and that the index of a highest subcarrier of the first 26-subcarrier RU 3302 is −97. The positions shown in Table 33B are also relative to the central ($0^{th}$) DC subcarrier of the 20 MHz channel 3300.

FIG. 33A shows a first 26-subcarrier RU 3302 having pilot tone positions at potential pilot tone positions $c1$ and $c2$, a second 26-subcarrier RU 3304 having pilot tone positions at potential pilot tone positions $c3$ and $c4$, a third 26-subcarrier RU 3306 having pilot tone positions at potential pilot tone positions $c5$ and $c6$, a fourth 26-subcarrier RU 3308 having pilot tone positions at potential pilot tone positions $c7$ and $c8$, a fifth (center) 26-subcarrier RU 3310 having pilot tone positions at potential pilot tone positions $c9$ and $c10$, a sixth 26-subcarrier RU 3312 having pilot tone positions at potential pilot tone positions $c11$ and $c12$, a seventh 26-subcarrier RU 3314 having pilot tone positions at potential pilot tone positions $c13$ and $c14$, an eighth 26-subcarrier RU 3316 having pilot tone positions at potential pilot tone positions $c15$ and $c16$, and a ninth 26-subcarrier RU 3318 having pilot tone positions at potential pilot tone positions $c17$ and $c18$.

FIG. 33A further shows a first 52-subcarrier RU 3322 having pilot tone positions at potential pilot tone positions $c1$, $c2$, $c3$, and $c4$, a second 52-subcarrier RU 3324 having pilot tone positions at potential pilot tone positions $c5$, $c6$, $c7$, and $c8$, a third 52-subcarrier RU 3326 having pilot tone positions at potential pilot tone positions $c11$, $c12$, $c13$, and $c14$, and a fourth 52-subcarrier RU 3328 having pilot tone positions at potential pilot tone positions $c15$, $c16$, $c17$, and $c18$.

FIG. 33A further shows a first 106-subcarrier RU 3332 having pilot tone positions at potential pilot tone positions $c1$, $c4$, $c5$, and $c8$, a second 106-subcarrier RU 3334 having pilot tone positions at potential pilot tone positions $c11$, $c14$, $c15$, and $c18$, and a 242-subcarrier RU 3336 having pilot tone positions at potential pilot tone positions $c1$, $c4$, $c5$, $c8$, $c11$, $c14$, $c15$, and $c18$.

Each of the 52-, 106-, and 242-subcarrier RUs in FIG. 33A has pilot tone positions selected from among the pilot tone positions used by the RUs having fewer subcarriers that occupy the same bandwidth.

Furthermore, each RU in a lower 10 MHz of the 20 MHz channel 3300 has pilot tone positions that are mirror symmetric with a corresponding mirrored RU (that is, an RU with a same number of subcarriers and a same offset from the center of the 20 MHz channel 3300) of an upper 10 MHz of the 20 MHz channel 3300. For example, the pilot tone positions of the first 26-subcarrier RU 3302 are positioned to be mirror-symmetric to the pilot tone positions of the ninth 26-subcarrier RU 3318, the pilot tone positions of the second 52-subcarrier RU 3324 are positioned to be mirror-symmetric to the pilot tone positions of the third 52-subcarrier RU 3326, and so on.

Figure 34:
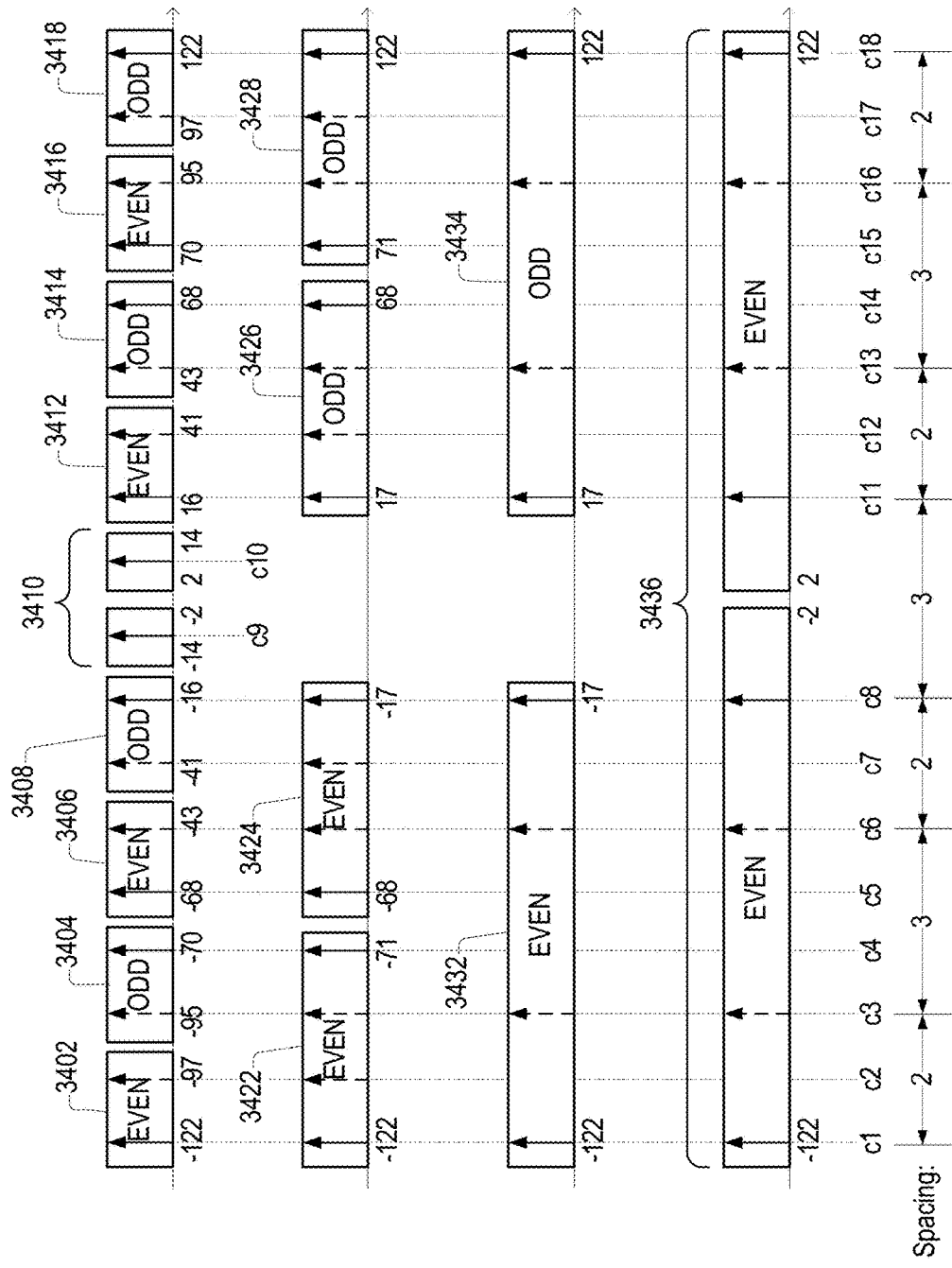
FIG. 34 illustrates pilot tone positions for RUs of the 20 MHz BW in of Case 1, according to an embodiment.

FIG. 34 illustrates a second option for pilot tone positions in Case 1. In an embodiment, the second option may use the first to eighteenth potential pilot tone positions $c1$ to $c18$ as shown in Table 9 of FIG. 33B, but embodiments are not limited thereto, and any of the pilot tone positions disclosed for 26-subchannel RUs in Design A, above, may be used for the potential pilot tone positions $c1$ to $c18$.

FIG. 34 shows a first, second, third, and fourth 26-subcarrier RUs 3402, 3404, 3406, and 3408 having pilot tone positions at potential pilot tone positions c1 and c2, c3 and c4, c5 and c6, and c7 and c8, respectively, a fifth (center) 26-subcarrier RUs 3410 having pilot tone positions at potential pilot tone positions c9 and c10, and sixth, seventh, eighth, and ninth 26-subcarrier RUs 3412, 3414, 3416, and 3418 having pilot tone positions at potential pilot tone positions c11 and c12, c13 and c14, c15 and c16, and c17 and c18, respectively. In each of the 26-subcarrier RUs 3402, 3404, 3406, 3408, 3410, 3412, 3414, 3416, and 3418, respective first and second pilot tone positions correspond to potential pilot tone positions covered by the respective 26 subcarriers.

FIG. 34 further shows a first, second, third, and fourth 52-subcarrier RUs 3422, 3424, 3426, and 3428 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively. In each of the 52-subcarrier RUs 3422, 3424, 3426, and 3428, respective first, second, third, and fourth pilot tone positions correspond to potential pilot tone positions covered by the respective 52 subcarriers.

FIG. 34 further shows a first 106-subcarrier RU 3432 having pilot tone positions at potential pilot tone positions c1, c3, c6, and c8, a second 106-subcarrier RU 3434 having pilot tone positions at potential pilot tone positions c11, c13, c16, and c18. In each of the 106-subcarrer RUs 3433 and 3434, a first pilot tone position has an index corresponding to a lowest index among potential pilot tone positions covered by the RU, a second pilot tone position is spaced two potential pilot tone positions away from the first pilot tone position, a third pilot tone position spaced three potential pilot tone positions away from the second pilot tone position, and a fourth pilot tone position spaced two potential pilot tone positions away from the third pilot tone position.

FIG. 34 further shows a 242-subcarrier RU 3436 having pilot tone positions at potential pilot tone positions c1, c3, c6, c8, c11, c13, c16, and c18. The 242-subcarrier RU 3436 has a first pilot tone position having a lowest index among potential pilot tone positions covered by the 242 subcarriers, a second pilot tone position spaced two potential pilot tone positions away from the first pilot tone position, a third pilot tone position spaced three potential pilot tone positions away from the second pilot tone position, a fourth pilot tone position spaced two potential pilot tone positions away from the third pilot tone position, a fifth pilot tone position spaced three potential pilot tone positions away from the fourth pilot tone position, a sixth pilot tone position spaced two potential pilot tone positions away from the fifth pilot tone position, a seventh pilot tone position spaced three potential pilot tone positions away from the sixth pilot tone position, and an eighth pilot tone position spaced two potential pilot tone positions away from the seventh pilot tone position.

Each of the 52-, 106-, and 242-subcarrier RUs in FIG. 34 has pilot tone positions selected from among the pilot tone positions used by the RUs having fewer subcarriers that occupy the same bandwidth. Further, the pilot tone positions shown in FIG. 34 illustrates the mirror symmetry described with respect to FIG. 33A. Therefore, pilot tone positions meet the following relationship: $c1=-c18$, $c2=-c17$, $c3=-c16$, $c4=-c15$, $c5=-c14$, $c6=-c13$, $c7=-c12$, $c8=-c11$, and $c9=-c10$
($c18>c17>c16>c15>c14>c13>c12>c11>c10>c9>c8>c7>c6>c5>c4>c3>c2>c1$).

Figure 35:
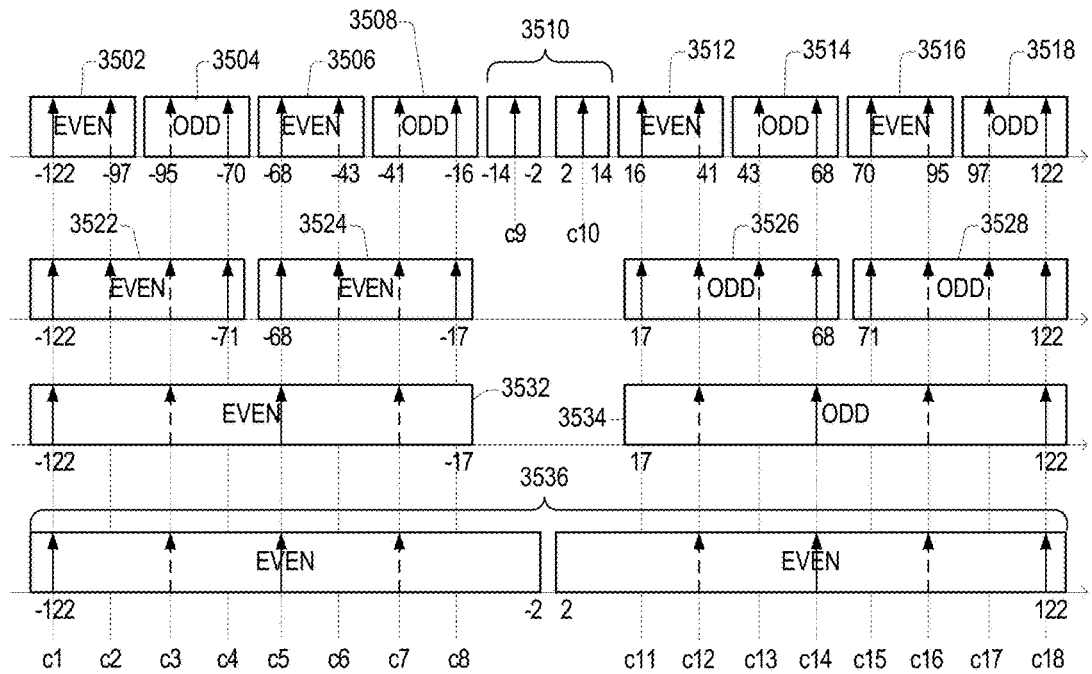
FIG. 35 illustrates pilot tone positions for RUs of the 20 MHz BW in of Case 1, according to an embodiment.

FIG. 35 illustrates a third option for pilot tone positions in Case 1. In an embodiment, the third option may use the first to eighteenth potential pilot tone positions c1 to c18 as shown in Table 9 of FIG. 33B, but embodiments are not limited thereto, and any of the pilot tone positions disclosed for 26-subchannel RUs in Design A, above, may be used for the potential pilot tone positions c1 to c18.

FIG. 35 shows a first, second, third, and fourth 26-subcarrier RU 3502, 3504, 3506, and 3508 having pilot tone positions at potential pilot tone positions c1 and c2, c3 and c4, c5 and c6, and c7 and c8, respectively, a fifth (center) 26-subcarrier RU 3510 having pilot tone positions at potential pilot tone positions c9 and c10, and sixth, seventh, eighth, and ninth 26-subcarrier RU 3512, 3514, 3516, and 3518 having pilot tone positions at potential pilot tone positions c11 and c12, c13 and c14, c15 and c16, and c17 and c18, respectively.

FIG. 35 further shows a first, second, third, and fourth 52-subcarrier RU 3522, 3524, 3526, and 3528 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 35 further shows a first 106-subcarrier RU 3532 having pilot tone positions at potential pilot tone positions c1, c3, c5, and c7, a second 106-subcarrier RU 3534 having pilot tone positions at potential pilot tone positions c12, c14, c16, and c18, and a 242-subcarrier RU 3536 having pilot tone positions at potential pilot tone positions c1, c3, c5, c7, c12, c14, c16, and c18.

Each of the 52-, 106-, and 242-subcarrier RUs in FIG. 35 has pilot tone positions selected from among the pilot tone positions used by the RUs having fewer subcarriers that occupy the same bandwidth. Further, the pilot tone positions shown in FIG. 35 illustrates the mirror symmetry described with respect to FIG. 33A.

Figure 36:
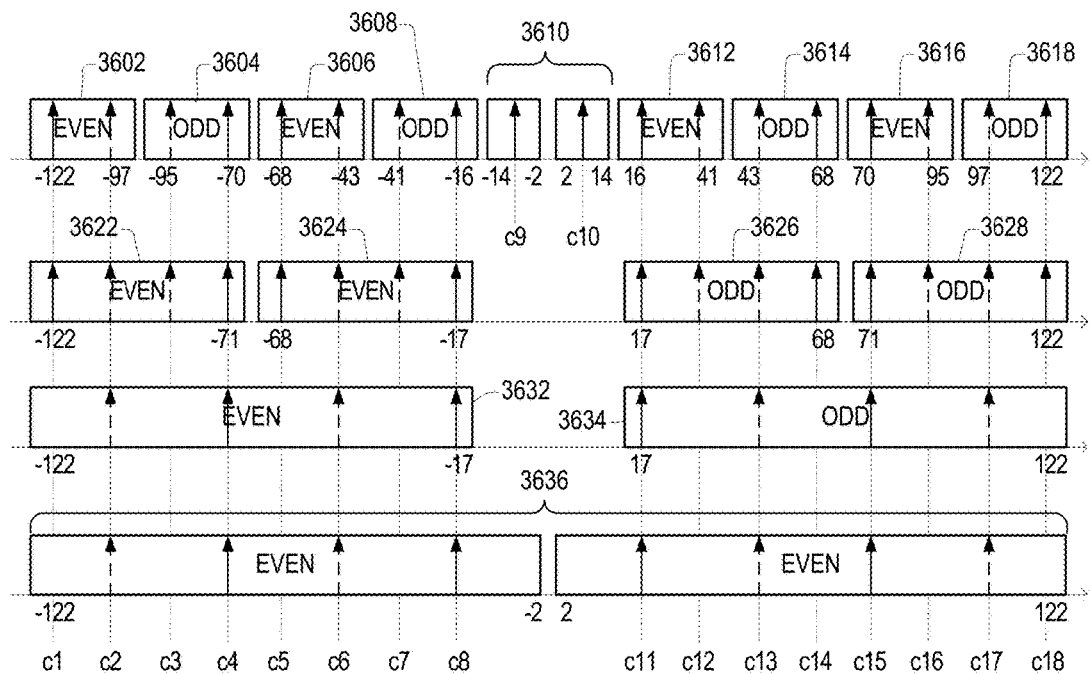
FIG. 36 illustrates pilot tone positions for RUs of the 20 MHz BW in of Case 1, according to an embodiment.

FIG. 36 illustrates a fourth option for pilot tone positions in Case 1. In an embodiment, the fourth option may use the first to eighteenth potential pilot tone positions c1 to c18 as shown in Table 9 of FIG. 33B, but embodiments are not limited thereto.

FIG. 36 shows a first, second, third, and fourth 26-subcarrier RU 3602, 3604, 3606, and 3608 having pilot tone positions at potential pilot tone positions c1 and c2, c3 and c4, c5 and c6, and c7 and c8, respectively, a fifth (center) 26-subcarrier RU 3610 having pilot tone positions at potential pilot tone positions c9 and c10, and sixth, seventh, eighth, and ninth 26-subcarrier RU 3612, 3614, 3616, and 3618 having pilot tone positions at potential pilot tone positions c11 and c12, c13 and c14, c15 and c16, and c17 and c18, respectively.

FIG. 36 further shows a first, second, third, and fourth 52-subcarrier RU 3622, 3624, 3626, and 3628 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 36 further shows a first 106-subcarrier RU 3632 having pilot tone positions at potential pilot tone positions c2, c4, c6, and c8, a second 106-subcarrier RU 3634 having pilot tone positions at potential pilot tone positions c11, c13, c15, and c17, and a 242-subcarrier RU 3636 having pilot tone positions at potential pilot tone positions c2, c4, c6, c8, c11, c13, c15, and c17.

Each of the 52-, 106-, and 242-subcarrier RUs in FIG. 36 has pilot tone positions selected from among the pilot tone positions used by the RUs having fewer subcarriers that occupy the same bandwidth. Further, the pilot tone positions shown in FIG. 36 illustrates the mirror symmetry described with respect to FIG. 33A.

The options 1, 2, 3, and 4 of Case 1 shown in FIGS. 33A, 34, 35, and 36, respectively illustrate pilot tone positions for a 20 MHz bandwidth and when 106 subcarrier RUs are used instead of 108 subcarrier RUs. The pilot tone positions within the 26 subcarrier RU can be the suggested pilot tone positions embodiments described in the Design A section.

Resource Units (RUs) with larger sizes will have pilot tone positions that are the same as or a subset of the pilot tone positions for aggregated 26-subcarrier RUs occupying the same frequencies. The 106-subcarrier RUs have 4 pilots within its RU allocation from among the eight potential pilot tone positions available for the 106-subcarrier RU. The options 1 to 4 are different alternatives for the four pilot tone positions of the 106-subcarrier RUs and corresponding eight pilot tone positions of a 242-subcarrier RU. The pilot tone positions for 106 subcarrier RU and 242 subcarrier RU are chosen from the set of potential positions stemming from the pilot tone positions of the 26 subcarrier RUs such that frequency diversity can be maximized (that is, so that the spacing between the pilots are large).

Figure 37:
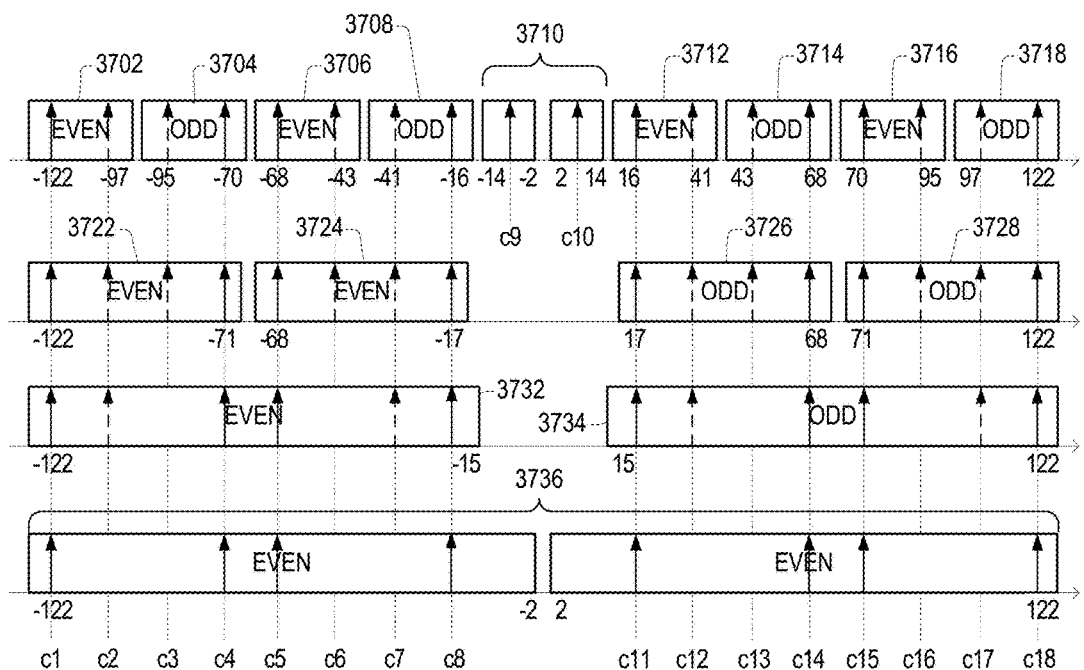
FIG. 37 illustrates pilot tone positions for RUs of the 20 MHz BW in of Case 1, according to an embodiment.

FIG. 37 illustrates a fifth option for pilot tone positions in Case 1. In an embodiment, the fifth option may use the first to eighteenth potential pilot tone positions $c_1$ to $c_{18}$ as shown in Table 9 of FIG. 33B, but embodiments are not limited thereto.

FIG. 37 shows a first, second, third, and fourth 26-subcarrier RU 3702, 3704, 3706, and 3708 having pilot tone positions at potential pilot tone positions $c_1$ and $c_2$, $c_3$ and $c_4$, $c_5$ and $c_6$, and $c_7$ and $c_8$, respectively, a fifth (center) 26-subcarrier RU 3710 having pilot tone positions at potential pilot tone positions $c_9$ and $c_{10}$, and sixth, seventh, eighth, and ninth 26-subcarrier RU 3712, 3714, 3716, and 3718 having pilot tone positions at potential pilot tone positions $c_{11}$ and $c_{12}$, $c_{13}$ and $c_{14}$, $c_{15}$ and $c_{16}$, and $c_{17}$ and $c_{18}$, respectively.

FIG. 37 further shows a first, second, third, and fourth 52-subcarrier RU 3722, 3724, 3726, and 3728 having pilot tone positions at potential pilot tone positions $c_1$, $c_2$, $c_3$, and $c_4$, potential pilot tone positions $c_5$, $c_6$, $c_7$, and $c_8$, potential pilot tone positions $c_{11}$, $c_{12}$, $c_{13}$, and $c_{14}$, and potential pilot tone positions $c_{15}$, $c_{16}$, $c_{17}$, and $c_{18}$, respectively.

FIG. 37 further shows a first 108-subcarrier RU 3732 having pilot tone positions at potential pilot tone positions $c_1$, $c_2$, $c_4$, $c_5$, $c_7$, and $c_8$, a second 108-subcarrier RU 3734 having pilot tone positions at potential pilot tone positions $c_{11}$, $c_{12}$, $c_{14}$, $c_{15}$, $c_{17}$, and $c_{18}$, and a 242-subcarrier RU 3736 having pilot tone positions at potential pilot tone positions $c_1$, $c_4$, $c_5$, $c_8$, $c_{11}$, $c_{14}$, $c_{15}$, and $c_{18}$.

Each of the 52-, 108-, and 242-subcarrier RUs in FIG. 37 has pilot tone positions selected from among the pilot tone positions used by the RUs having fewer subcarriers that occupy the same bandwidth. Further, the pilot tone positions shown in FIG. 37 illustrates the mirror symmetry described with respect to FIG. 33A.

Figure 38:
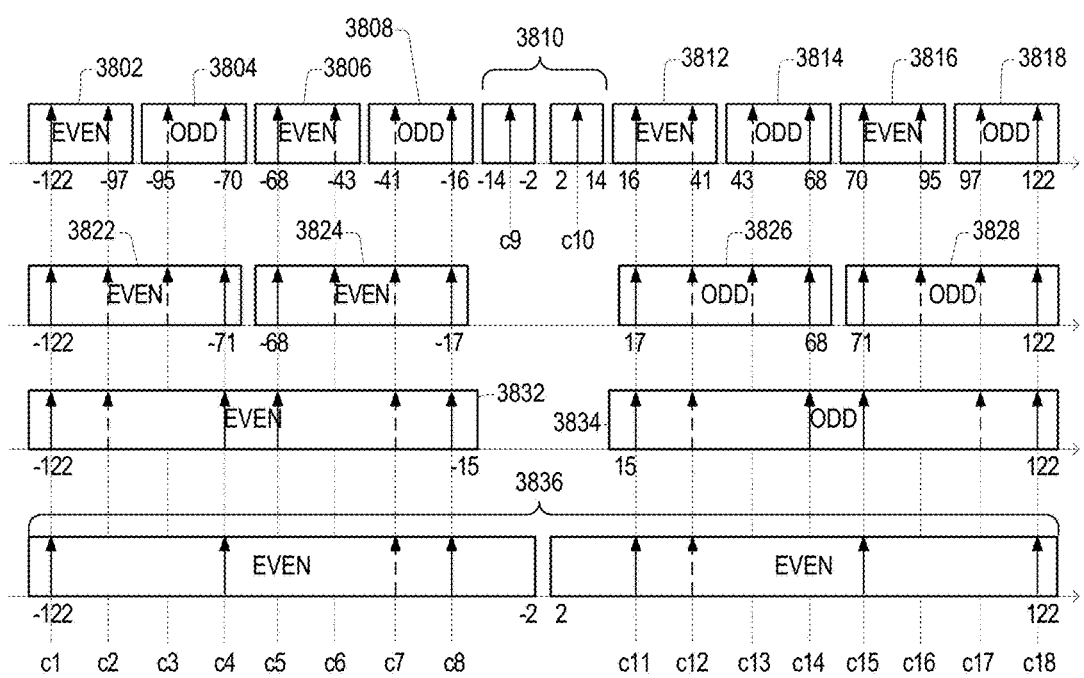
FIG. 38 illustrates pilot tone positions for RUs of the 20 MHz BW in of Case 1, according to an embodiment.

FIG. 38 illustrates a sixth option for pilot tone positions in Case 1. In an embodiment, the sixth option may use the first to eighteenth potential pilot tone positions $c_1$ to $c_{18}$ as shown in Table 9 of FIG. 33B, but embodiments are not limited thereto.

FIG. 38 shows a first, second, third, and fourth 26-subcarrier RU 3802, 3804, 3806, and 3808 having pilot tone positions at potential pilot tone positions $c_1$ and $c_2$, $c_3$ and $c_4$, $c_5$ and $c_6$, and $c_7$ and $c_8$, respectively, a fifth (center) 26-subcarrier RU 3810 having pilot tone positions at potential pilot tone positions $c_9$ and $c_{10}$, and sixth, seventh, eighth, and ninth 26-subcarrier RU 3812, 3814, 3816, and 3818 having pilot tone positions at potential pilot tone positions $c_{11}$ and $c_{12}$, $c_{13}$ and $c_{14}$, $c_{15}$ and $c_{16}$, and $c_{17}$ and $c_{18}$, respectively.

FIG. 38 further shows a first, second, third, and fourth 52-subcarrier RU 3822, 3824, 3826, and 3828 having pilot tone positions at potential pilot tone positions $c_1$, $c_2$, $c_3$, and $c_4$, potential pilot tone positions $c_5$, $c_6$, $c_7$, and $c_8$, potential pilot tone positions $c_{11}$, $c_{12}$, $c_{13}$, and $c_{14}$, and potential pilot tone positions $c_{15}$, $c_{16}$, $c_{17}$, and $c_{18}$, respectively.

FIG. 38 further shows a first 108-subcarrier RU 3832 having pilot tone positions at potential pilot tone positions $c_1$, $c_2$, $c_4$, $c_5$, $c_7$, and $c_8$, a second 108-subcarrier RU 3834 having pilot tone positions at potential pilot tone positions $c_{11}$, $c_{12}$, $c_{14}$, $c_{15}$, $c_{17}$, and $c_{18}$, and a 242-subcarrier RU 3836 having pilot tone positions at potential pilot tone positions $c_1$, $c_4$, $c_7$, $c_8$, $c_{11}$, $c_{12}$, $c_{15}$, and $c_{18}$.

Each of the 52-, 108-, and 242-subcarrier RUs in FIG. 38 has pilot tone positions selected from among the pilot tone positions used by the RUs having fewer subcarriers that occupy the same bandwidth. Further, the pilot tone positions shown in FIG. 38 illustrates the mirror symmetry described with respect to FIG. 33A.

Figure 39:
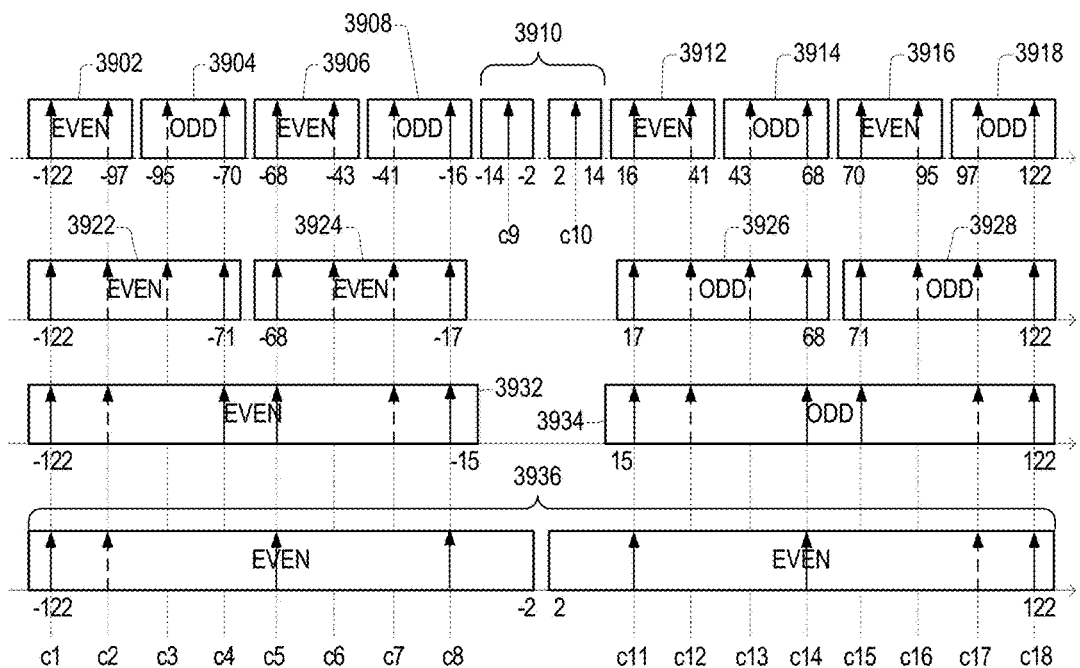
FIG. 39 illustrates pilot tone positions for RUs of the 20 MHz BW in of Case 1, according to an embodiment.

FIG. 39 illustrates a seventh option for pilot tone positions in Case 1. In an embodiment, the seventh option may use the first to eighteenth potential pilot tone positions $c_1$ to $c_{18}$ as shown in Table 9 of FIG. 33B, but embodiments are not limited thereto.

FIG. 39 shows a first, second, third, and fourth 26-subcarrier RU 3902, 3904, 3906, and 3908 having pilot tone positions at potential pilot tone positions $c_1$ and $c_2$, $c_3$ and $c_4$, $c_5$ and $c_6$, and $c_7$ and $c_8$, respectively, a fifth (center) 26-subcarrier RU 3910 having pilot tone positions at potential pilot tone positions $c_9$ and $c_{10}$, and sixth, seventh, eighth, and ninth 26-subcarrier RU 3912, 3914, 3916, and 3918 having pilot tone positions at potential pilot tone positions $c_{11}$ and $c_{12}$, $c_{13}$ and $c_{14}$, $c_{15}$ and $c_{16}$, and $c_{17}$ and $c_{18}$, respectively.

FIG. 39 further shows a first, second, third, and fourth 52-subcarrier RU 3922, 3924, 3926, and 3928 having pilot tone positions at potential pilot tone positions $c_1$, $c_2$, $c_3$, and $c_4$, potential pilot tone positions $c_5$, $c_6$, $c_7$, and $c_8$, potential pilot tone positions $c_{11}$, $c_{12}$, $c_{13}$, and $c_{14}$, and potential pilot tone positions $c_{15}$, $c_{16}$, $c_{17}$, and $c_{18}$, respectively.

FIG. 39 further shows a first 108-subcarrier RU 3932 having pilot tone positions at potential pilot tone positions $c_1$, $c_2$, $c_4$, $c_5$, $c_7$, and $c_8$, a second 108-subcarrier RU 3934 having pilot tone positions at potential pilot tone positions $c_{11}$, $c_{12}$, $c_{14}$, $c_{15}$, $c_{17}$, and $c_{18}$, and a 242-subcarrier RU 3936 having pilot tone positions at potential pilot tone positions $c_1$, $c_2$, $c_5$, $c_8$, $c_{11}$, $c_{14}$, $c_{17}$, and $c_{18}$.

Each of the 52-, 108-, and 242-subcarrier RUs in FIG. 39 has pilot tone positions selected from among the pilot tone positions used by the RUs having fewer subcarriers that occupy the same bandwidth. Further, the pilot tone positions shown in FIG. 39 illustrates the mirror symmetry described with respect to FIG. 33A.

Figure 40:
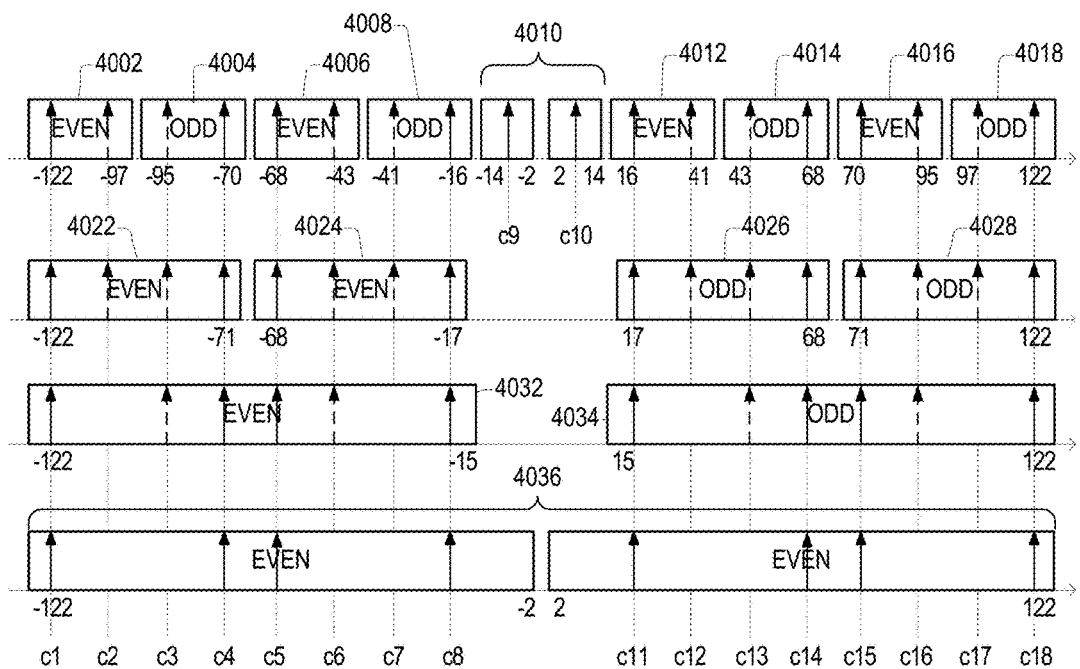
FIG. 40 illustrates pilot tone positions for RUs of the 20 MHz BW in of Case 1, according to an embodiment.

FIG. 40 illustrates an eighth option for pilot tone positions in Case 1. In an embodiment, the eighth option may use the first to eighteenth potential pilot tone positions $c_1$ to $c_{18}$ as shown in Table 9 of FIG. 33B, but embodiments are not limited thereto.

FIG. 40 shows a first, second, third, and fourth 26-subcarrier RU 4002, 4004, 4006, and 4008 having pilot tone positions at potential pilot tone positions $c_1$ and $c_2$, $c_3$ and $c_4$, $c_5$ and $c_6$, and $c_7$ and $c_8$, respectively, a fifth (center)

26-subcarrier RU 4010 having pilot tone positions at potential pilot tone positions c9 and c10, and sixth, seventh, eighth, and ninth 26-subcarrier RU 4012, 4014, 4016, and 4018 having pilot tone positions at potential pilot tone positions c11 and c12, c13 and c14, c15 and c16, and c17 and c18, respectively.

FIG. 40 further shows a first, second, third, and fourth 52-subcarrier RU 4022, 4024, 4026, and 4028 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 40 further shows a first 108-subcarrier RU 4032 having pilot tone positions at potential pilot tone positions c1, c3, c4, c5, c6, and c8, a second 108-subcarrier RU 4034 having pilot tone positions at potential pilot tone positions c11, c13, c14, c15, c16, and c18, and a 242-subcarrier RU 4036 having pilot tone positions at potential pilot tone positions c1, c4, c5, c8, c11, c14, c15, and c18.

Each of the 52-, 108-, and 242-subcarrier RUs in FIG. 40 has pilot tone positions selected from among the pilot tone positions used by the RUs having fewer subcarriers that occupy the same bandwidth. Further, the pilot tone positions shown in FIG. 40 illustrates the mirror symmetry described with respect to FIG. 33A.

FIG. 41 illustrates a ninth option for pilot tone positions in Case 1. In an embodiment, the ninth option may use the first to eighteenth potential pilot tone positions c1 to c18 as shown in Table 9 of FIG. 33B, but embodiments are not limited thereto.

FIG. 41 shows a first, second, third, and fourth 26-subcarrier RU 4102, 4104, 4106, and 4108 having pilot tone positions at potential pilot tone positions c1 and c2, c3 and c4, c5 and c6, and c7 and c8, respectively, a fifth (center) 26-subcarrier RU 4110 having pilot tone positions at potential pilot tone positions c9 and c10, and sixth, seventh, eighth, and ninth 26-subcarrier RU 4112, 4114, 4116, and 4118 having pilot tone positions at potential pilot tone positions c11 and c12, c13 and c14, c15 and c16, and c17 and c18, respectively.

FIG. 41 further shows a first, second, third, and fourth 52-subcarrier RU 4122, 4124, 4126, and 4128 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 41 further shows a first 108-subcarrier RU 4132 having pilot tone positions at potential pilot tone positions c1, c3, c4, c5, c6, and c8, a second 108-subcarrier RU 4134 having pilot tone positions at potential pilot tone positions c11, c13, c14, c15, c16, and c18, and a 242-subcarrier RU 4136 having pilot tone positions at potential pilot tone positions c1, c3, c6, c8, c11, c13, c16, and c18.

Each of the 52-, 108-, and 242-subcarrier RUs in FIG. 41 has pilot tone positions selected from among the pilot tone positions used by the RUs having fewer subcarriers that occupy the same bandwidth. Further, the pilot tone positions shown in FIG. 41 illustrates the mirror symmetry described with respect to FIG. 33A.

FIG. 42 illustrates a tenth option for pilot tone positions in Case 1. In an embodiment, the tenth option may use the first to eighteenth potential pilot tone positions c1 to c18 as shown in Table 9 of FIG. 33B, but embodiments are not limited thereto.

FIG. 42 shows a first, second, third, and fourth 26-subcarrier RU 4202, 4204, 4206, and 4208 having pilot tone positions at potential pilot tone positions c1 and c2, c3 and c4, c5 and c6, and c7 and c8, respectively, a fifth (center) 26-subcarrier RU 4210 having pilot tone positions at potential pilot tone positions c9 and c10, and sixth, seventh, eighth, and ninth 26-subcarrier RU 4212, 4214, 4216, and 4218 having pilot tone positions at potential pilot tone positions c11 and c12, c13 and c14, c15 and c16, and c17 and c18, respectively.

FIG. 42 further shows a first, second, third, and fourth 52-subcarrier RU 4222, 4224, 4226, and 4228 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 42 further shows a first 108-subcarrier RU 4232 having pilot tone positions at potential pilot tone positions c1, c3, c4, c5, c6, and c8, a second 108-subcarrier RU 4234 having pilot tone positions at potential pilot tone positions c11, c13, c14, c15, c16, and c18, and a 242-subcarrier RU 4236 having pilot tone positions at potential pilot tone positions c1, c3, c5, c8, c11, c14, c16, and c18.

Each of the 52-, 108-, and 242-subcarrier RUs in FIG. 42 has pilot tone positions selected from among the pilot tone positions used by the RUs having fewer subcarriers that occupy the same bandwidth. Further, the pilot tone positions shown in FIG. 42 illustrates the mirror symmetry described with respect to FIG. 33A.

Figure 43:
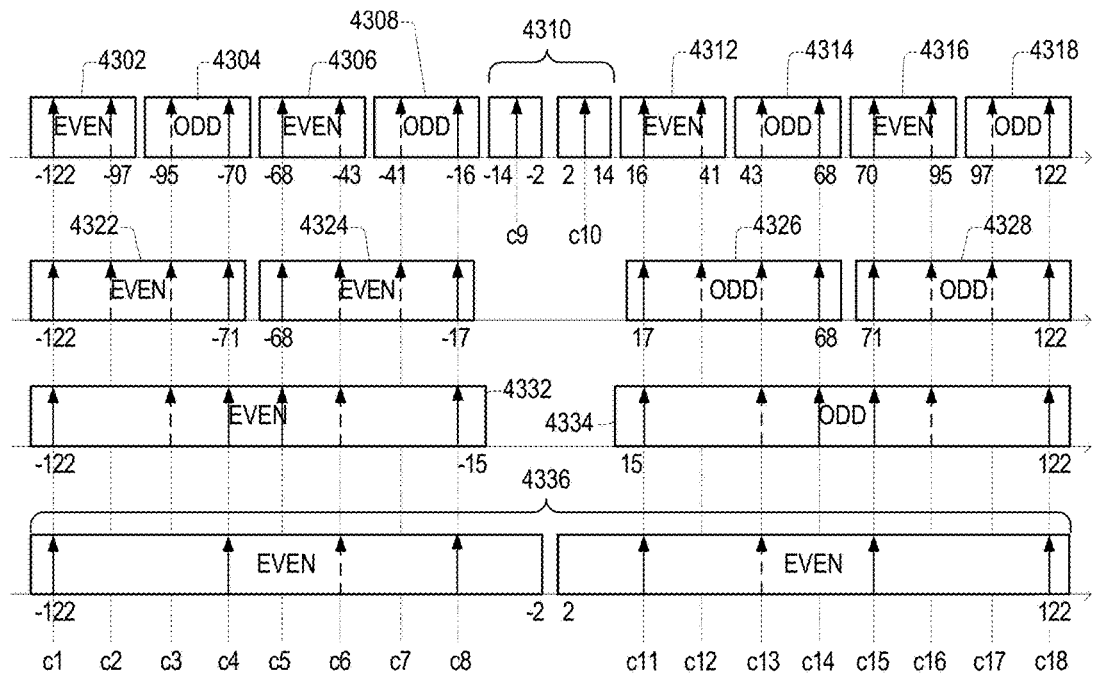
FIG. 43 illustrates pilot tone positions for RUs of the 20 MHz BW in of Case 1, according to an embodiment.

FIG. 43 illustrates an eleventh option for pilot tone positions in Case 1. In an embodiment, the eleventh option may use the first to eighteenth potential pilot tone positions c1 to c18 as shown in Table 9 of FIG. 33B, but embodiments are not limited thereto.

FIG. 43 shows a first, second, third, and fourth 26-subcarrier RU 4302, 4304, 4306, and 4308 having pilot tone positions at potential pilot tone positions c1 and c2, c3 and c4, c5 and c6, and c7 and c8, respectively, a fifth (center) 26-subcarrier RU 4310 having pilot tone positions at potential pilot tone positions c9 and c10, and sixth, seventh, eighth, and ninth 26-subcarrier RU 4312, 4314, 4316, and 4318 having pilot tone positions at potential pilot tone positions c11 and c12, c13 and c14, c15 and c16, and c17 and c18, respectively.

FIG. 43 further shows a first, second, third, and fourth 52-subcarrier RU 4322, 4324, 4326, and 4328 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 43 further shows a first 108-subcarrier RU 4332 having pilot tone positions at potential pilot tone positions c1, c3, c4, c5, c6, and c8, a second 108-subcarrier RU 4334 having pilot tone positions at potential pilot tone positions c11, c13, c14, c15, c16, and c18, and a 242-subcarrier RU 4336 having pilot tone positions at potential pilot tone positions c1, c4, c6, c8, c11, c13, c15, and c18.

Each of the 52-, 108-, and 242-subcarrier RUs in FIG. 43 has pilot tone positions selected from among the pilot tone positions used by the RUs having fewer subcarriers that occupy the same bandwidth. Further, the pilot tone positions shown in FIG. 43 illustrates the mirror symmetry described with respect to FIG. 33A.

Figure 44:
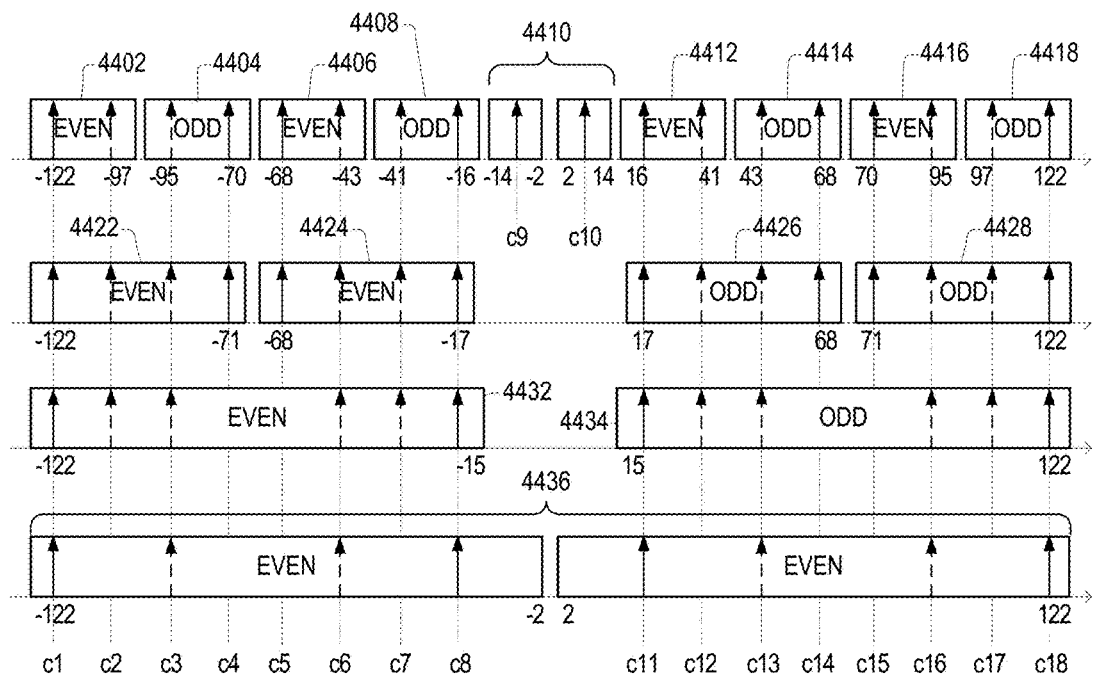
FIG. 44 illustrates pilot tone positions for RUs of the 20 MHz BW in of Case 1, according to an embodiment.

FIG. 44 illustrates a twelfth option for pilot tone positions in Case 1. In an embodiment, the twelfth option may use the first to eighteenth potential pilot tone positions c1 to c18 as shown in Table 9 of FIG. 33B, but embodiments are not limited thereto.

FIG. 44 shows a first, second, third, and fourth 26-subcarrier RU 4402, 4404, 4406, and 4408 having pilot tone positions at potential pilot tone positions c1 and c2, c3 and c4, c5 and c6, and c7 and c8, respectively, a fifth (center) 26-subcarrier RU 4410 having pilot tone positions at potential pilot tone positions c9 and c10, and sixth, seventh, eighth, and ninth 26-subcarrier RU 4412, 4414, 4416, and 4418 having pilot tone positions at potential pilot tone positions c11 and c12, c13 and c14, c15 and c16, and c17 and c18, respectively.

FIG. 44 further shows a first, second, third, and fourth 52-subcarrier RU 4422, 4424, 4426, and 4428 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 44 further shows a first 108-subcarrier RU 4432 having pilot tone positions at potential pilot tone positions c1, c2, c3, c6, c7, and c8, a second 108-subcarrier RU 4434 having pilot tone positions at potential pilot tone positions c11, c12, c13, c16, c17, and c18, and a 242-subcarrier RU 4436 having pilot tone positions at potential pilot tone positions c1, c3, c6, c8, c11, c13, c16, and c18.

Each of the 52-, 108-, and 242-subcarrier RUs in FIG. 44 has pilot tone positions selected from among the pilot tone positions used by the RUs having fewer subcarriers that occupy the same bandwidth. Further, the pilot tone positions shown in FIG. 44 illustrates the mirror symmetry described with respect to FIG. 33A.

FIG. 45 illustrates a thirteenth option for pilot tone positions in Case 1. In an embodiment, the thirteenth option may use the first to eighteenth potential pilot tone positions c1 to c18 as shown in Table 9 of FIG. 33B, but embodiments are not limited thereto.

FIG. 45 shows a first, second, third, and fourth 26-subcarrier RU 4502, 4504, 4506, and 4508 having pilot tone positions at potential pilot tone positions c1 and c2, c3 and c4, c5 and c6, and c7 and c8, respectively, a fifth (center) 26-subcarrier RU 4510 having pilot tone positions at potential pilot tone positions c9 and c10, and sixth, seventh, eighth, and ninth 26-subcarrier RU 4512, 4514, 4516, and 4518 having pilot tone positions at potential pilot tone positions c11 and c12, c13 and c14, c15 and c16, and c17 and c18, respectively.

FIG. 45 further shows a first, second, third, and fourth 52-subcarrier RU 4522, 4524, 4526, and 4528 having pilot tone positions at potential pilot tone positions c1, c2, c3, and c4, potential pilot tone positions c5, c6, c7, and c8, potential pilot tone positions c11, c12, c13, and c14, and potential pilot tone positions c15, c16, c17, and c18, respectively.

FIG. 45 further shows a first 108-subcarrier RU 4532 having pilot tone positions at potential pilot tone positions c1, c3, c4, c5, c7, and c8, a second 108-subcarrier RU 4534 having pilot tone positions at potential pilot tone positions c11, c12, c14, c15, c16, and c18, and a 242-subcarrier RU 4536 having pilot tone positions at potential pilot tone positions c1, c3, c5, c7, c12, c14, c16, and c18.

Each of the 52-, 108-, and 242-subcarrier RUs in FIG. 45 has pilot tone positions selected from among the pilot tone positions used by the RUs having fewer subcarriers that occupy the same bandwidth. Further, the pilot tone positions shown in FIG. 41 illustrates the mirror symmetry described with respect to FIG. 33A.

The options 5, 6, 7, 8, 9, 10, 11, 12, and 13 of Case 1 shown in FIGS. 37, 38, 39, 40, 41, 42, 43, 44, and 45, respectively, illustrate pilot tone positions for a 20 MHz bandwidth and when 108-subcarrier RUs are used instead of 106-subcarrier RUs. The pilot tone positions within the 26 subcarrier RU can be the suggested pilot tone positions embodiments described in the Design A section.

Resource Units (RUs) with larger sizes will have pilot frequency positions that are the same as or a subset of the pilot tone positions for aggregated 26-subcarrier RUs occupying the same frequencies. The 108-subcarrier RUs have 6 pilots within their respective RU allocation from among the eight potential pilot tone positions available for the 108-subcarrier RUs. The options 5 to 13 are different alternatives for the six pilot tone positions of the 108-subcarrier RUs and corresponding eight pilot tone positions of a 242-subcarrier RU. The pilot tone positions for 108 subcarrier RU and 242 subcarrier RU are chosen from the set of potential positions stemming from the pilot tone positions of the 26 subcarrier RUs such that frequency diversity can be maximized (that is, so that the spacing between the pilots are large).

7. Larger (Greater than 20 MHz) Bandwidth

In an embodiment, pilot tone positions defined for a 20 MHz bandwidth are reused in the 40, 80, and 160 MHz bandwidths.

The 40 MHz bandwidth RU definitions are defined using two logical aggregated 20 MHz RU definitions. Except for the central RUs, the left 20 MHz of the 40 MHz bandwidth will have the RU definitions and pilot tone positions corresponding to a 20 MHz embodiment described above and the right 20 MHz of the 40 MHz bandwidth will also have the RU definitions and pilot tone positions corresponding to a 20 MHz embodiment.

Because the DC tones in the middle of a 20 MHz bandwidth does not exist in the left 20 MHz or right 20 MHz of the 40 MHz bandwidth, a central 26-subcarrier RUs does not exist in the left 20 MHz or right 20 MHz of the 40 MHz bandwidth. Accordingly, an even 26 subcarrier RU or an odd 26 subcarrier RU occupies a central portion of the left 20 MHz portion and the right 20 MHz portion of the 40 MHz bandwidth, said central portion corresponding to the area occupied by the central 26-subcarrier RU of a 20 MHz bandwidth. Whether an even or odd 26-subcarrier RU is used in the central portion depends on the precise location of the RU.

Similarly, for the 80 MHz bandwidth RU definitions, two 40 MHz RU definitions and associated (relative) pilot tone positions are used. A center 26-subcarrier RU may be disposed between the two 40 MHz RU definitions.

For the 160 MHz bandwidth RU definitions, two 80 MHz RU definitions and associated (relative) pilot tone positions are used.

FIGS. 46A to 53 illustrate embodiments of pilot tone positions for a 40 MHz bandwidth for Case 1.

In FIGS. 46A to 54, potential pilot tone positions are indicated by dotted lines extending vertically through the figures. Actual pilot tone for each RU are indicated by upward pointing arrows. A solid upward pointing arrow indicates a pilot tone with a fixed position. A dashed upward pointing arrow indicates a pilot tone having one of two positions, includes a first position to the left of a reference subcarrier and a second position to the right of a reference subcarrier, according to a design choice. In an embodiment, the reference subcarriers are center subcarriers of 13-subcarrier halves of 26-subcarrier RUs.

Figure 46A:
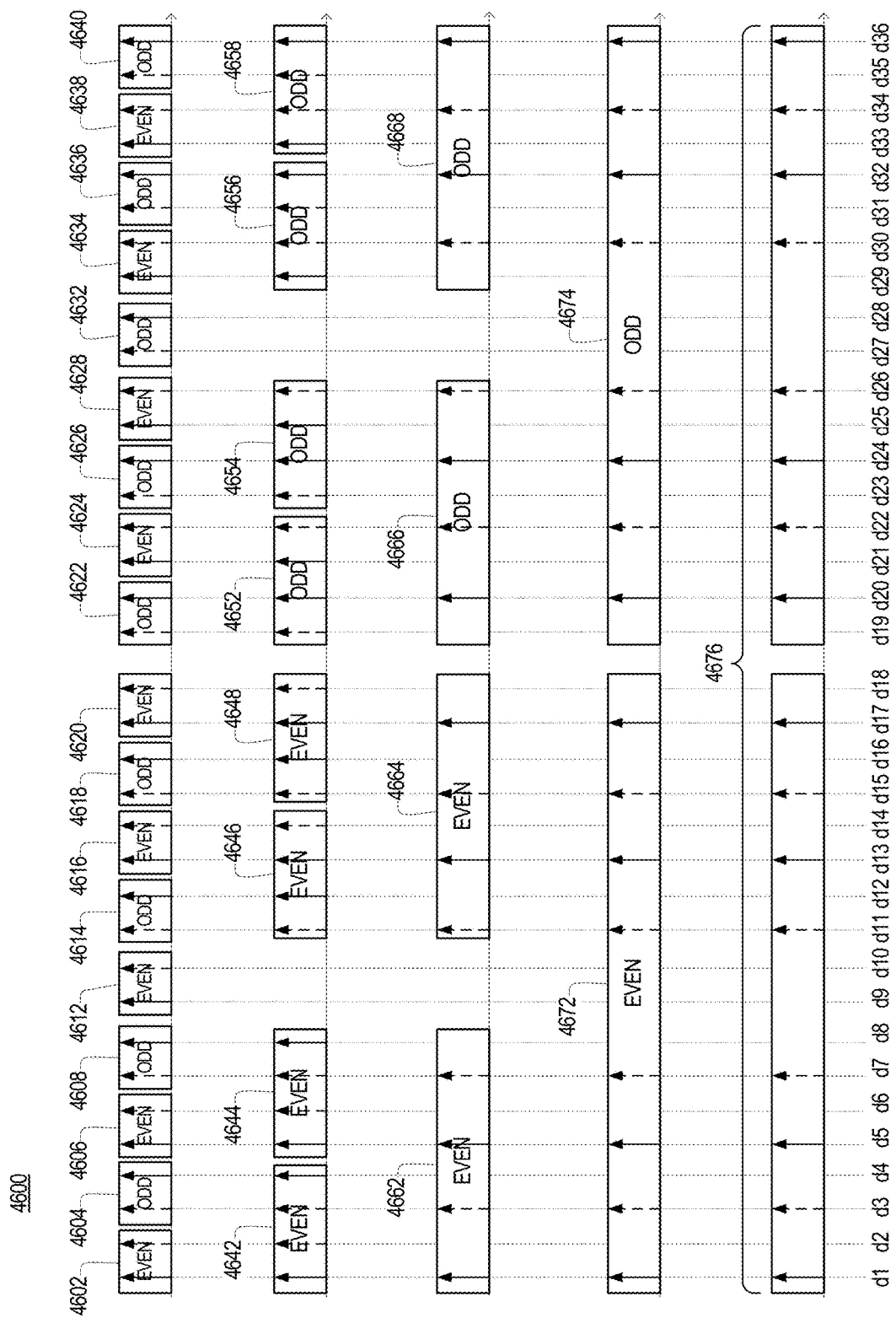
FIG. 46A illustrates pilot tone positions for RUs of a 40 MHz bandwidth (BW) of Case 1, according to an embodiment.

FIG. 46A illustrates a first option for pilot tone positions in Case 1 for a 40 MHz channel 4600, wherein at least one null or reserved tones is present between each 26-subcarrier RU. Pilot tone positions for each RU are selected from first to thirty-sixth potential pilot tone positions d1 to d36. FIG. 46B shows Table 10, which lists positions of each of the potential pilot tone positions d1 to d36 according to an embodiment, but embodiments are not limited thereto, and any of the pilot tone positions disclosed for 26-subchannel RUs in Design A, above, may be duplicated for use as the potential pilot tone positions d1 to d36. The order of the potential pilot tone positions d1 to d36 in Table 10 goes down the left sub-table and up the right sub-table to better illustrate the mirror symmetry of the potential pilot tone positions d1 to d36.

FIG. 46A shows, on the left side, a first 26-subcarrier RU 4602 having pilot tone positions at potential pilot tone positions d1 and d2, a second 26-subcarrier RU 4604 having pilot tone positions at potential pilot tone positions d3 and d4, a third 26-subcarrier RU 4606 having pilot tone positions at potential pilot tone positions d5 and d6, a fourth 26-subcarrier RU 4608 having pilot tone positions at potential pilot tone positions d7 and d8, a fifth 26-subcarrier RU 4612 having pilot tone positions at potential pilot tone positions d9 and d10, a sixth 26-subcarrier RU 4614 having pilot tone positions at potential pilot tone positions d11 and d12, a seventh 26-subcarrier RU 4616 having pilot tone positions at potential pilot tone positions d13 and d14, an eighth 26-subcarrier RU 4618 having pilot tone positions at potential pilot tone positions d15 and d16, and a ninth 26-subcarrier RU 4620 having pilot tone positions at potential pilot tone positions d17 and d18.

FIG. 46A shows, on the right side, a tenth 26-subcarrier RU 4622 having pilot tone positions at potential pilot tone positions d19 and d20, an eleventh 26-subcarrier RU 4624 having pilot tone positions at potential pilot tone positions d21 and d22, a twelfth 26-subcarrier RU 4626 having pilot tone positions at potential pilot tone positions d23 and d24, a thirteenth 26-subcarrier RU 4628 having pilot tone positions at potential pilot tone positions d25 and d26, a fourteenth 26-subcarrier RU 4632 having pilot tone positions at potential pilot tone positions d27 and d28, a fifteenth 26-subcarrier RU 4634 having pilot tone positions at potential pilot tone positions d29 and d30, a sixteenth 26-subcarrier RU 4636 having pilot tone positions at potential pilot tone positions d31 and d32, a seventeenth 26-subcarrier RU 4638 having pilot tone positions at potential pilot tone positions d33 and d34, and an eighteenth 26-subcarrier RU 4640 having pilot tone positions at potential pilot tone positions d35 and d36.

FIG. 46A further shows, on the left side, a first 52-subcarrier RU 4642 having pilot tone positions at potential pilot tone positions d1, d2, d3, and d4, a second 52-subcarrier RU 4644 having pilot tone positions at potential pilot tone positions d5, d6, d7, and d8, a third 52-subcarrier RU 4646 having pilot tone positions at potential pilot tone positions d11, d 12, d13, and d14, and a fourth 52-subcarrier RU 4648 having pilot tone positions at potential pilot tone positions d1 , d16, d17, and d18.

FIG. 46A further shows, on the right side, a fifth 52-subcarrier RU 4652 having pilot tone positions at potential pilot tone positions d19, d22, d21, and d22 a sixth 52-subcarrier RU 4654 having pilot tone positions at potential pilot tone positions d23, d24, d25, and d26, a seventh 52-subcarrier RU 4656 having pilot tone positions at potential pilot tone positions d29, d30, d31, and d32, and an eighth 52-subcarrier RU 4658 having pilot tone positions at potential pilot tone positions d33, d34, d35, and d36.

FIG. 46A further shows a first 106-subcarrier RU 4662 having pilot tone positions at potential pilot tone positions d1, d3, d5, and d7, a second 106-subcarrier RU 4664 having pilot tone positions at potential pilot tone positions d11, d13, d15, and d17, a third 106-subcarrier RU 4666 having pilot tone positions at potential pilot tone positions d20, d22, d24, and d26, and a fourth 106-subcarrier RU 4668 having pilot tone positions at potential pilot tone positions d30, d32, d34, and d36.

FIG. 46A further shows a first 242-subcarrier RU 4672 having pilot tone positions at potential pilot tone positions d1, d3, d5, d7, d11, d13, d15, and d17, a second 242-subcarrier RU 4674 having pilot tone positions at potential pilot tone positions d20, d22, d24, d26, d30, d32, d34, and d36, and a 484-subcarrier RU 4676 having pilot tone positions at potential pilot tone positions d1, d3, d5, d7, d11, d13, d15, d17, d20, d22, d24, d26, d30, d32, d34, and d36.

Each of the 52-, 106-, 242-, and 484-subcarrier RUs in FIG. 46A has pilot tone positions selected from among the pilot tone positions used by the RUs having fewer subcarriers that occupy the same bandwidth.

Furthermore, each RU in a lower 20 MHz of the 40 MHz channel 4600 has pilot tone positions that are mirror symmetric with a corresponding mirrored RU (that is, an RU with a same number of subcarriers and a same offset from the center of the 40 MHz channel 4600) of an upper 20 MHz of the 40 MHz channel 4600. For example, the pilot tone positions of the first 26-subcarrier RU 4602 are positioned to be mirror-symmetric to the pilot tone positions of the eighteenth 26-subcarrier RU 4640, the pilot tone positions of the second 52-subcarrier RU 4644 are positioned to be mirror-symmetric to the pilot tone positions of the seventh 52-subcarrier RU 4656, and so on.

Figure 47:
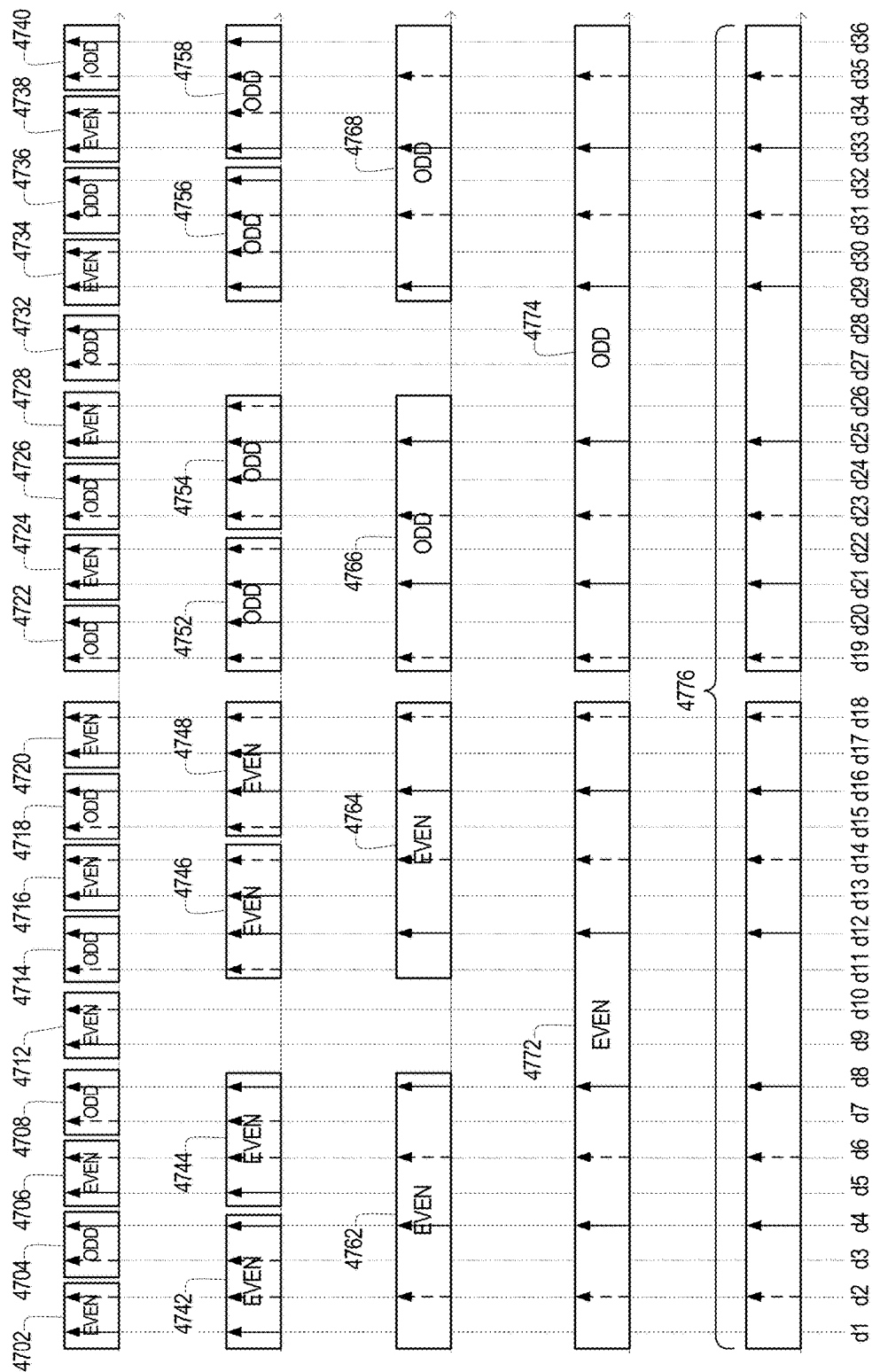
FIG. 47 illustrates pilot tone positions for RUs of the 40 MHz BW in of Case 1, according to an embodiment.

FIG. 47 illustrates a second option for pilot tone positions in Case 1 for a 40 MHz bandwidth. In an embodiment, the second option may use the first to thirty-sixth potential pilot tone positions d1 to d36 as shown in Table 9 of FIG. 33B, but embodiments are not limited thereto, and any of the pilot tone positions disclosed for 26-subchannel RUs in Design A, above, may be duplicated for use as the potential pilot tone positions d1 to d36.

FIG. 47 shows first to eighteenth 26-subcarrier RUs 4702 to 4740 having pilot tone positions at the same potential pilot tone positions as the first to eighteenth 26-subcarrier RU 4602 to 4640 of FIG. 46A, respectively.

FIG. 47 shows first to eighth 52-subcarrier RUs 4742 to 4758 having pilot tone positions at the same potential pilot tone positions as the first to eighth 52-subcarrier RUs 4642 to 4658 of FIG. 46A, respectively.

FIG. 47 further shows a first 106-subcarrier RU 4762 having pilot tone positions at potential pilot tone positions d2, d4, d6, and d8, a second 106-subcarrier RU 4764 having pilot tone positions at potential pilot tone positions d12, d14, d16, and d18, a third 106-subcarrier RU 4766 having pilot tone positions at potential pilot tone positions d19, d21, d23, and d25, and a fourth 106-subcarrier RU 4768 having pilot tone positions at potential pilot tone positions d29, d31, d33, and d35.

FIG. 47 further shows a first 242-subcarrier RU 4772 having pilot tone positions at potential pilot tone positions d2, d4, d6, d8, d12, d14, d16, and d18, a second 242-subcarrier RU 4774 having pilot tone positions at potential pilot tone positions d19, d21, d23, d25, d29, d31, d33, and d35, and a 484-subcarrier RU 4776 having pilot tone positions at potential pilot tone positions d2, d4, d6, d8, d12, d14, d16, d18, d19, d21, d23, d25, d29, d31, d33, and d35.

Each of the 52-, 106-, 242-, and 484-subcarrier RUs in FIG. 47 has pilot tone positions selected from among the pilot tone positions used by the RUs having fewer subcarriers that occupy the same bandwidth. Furthermore, the pilot tone positions of FIG. 47 exhibit the mirror symmetry described above for FIG. 46A.

Figure 48:
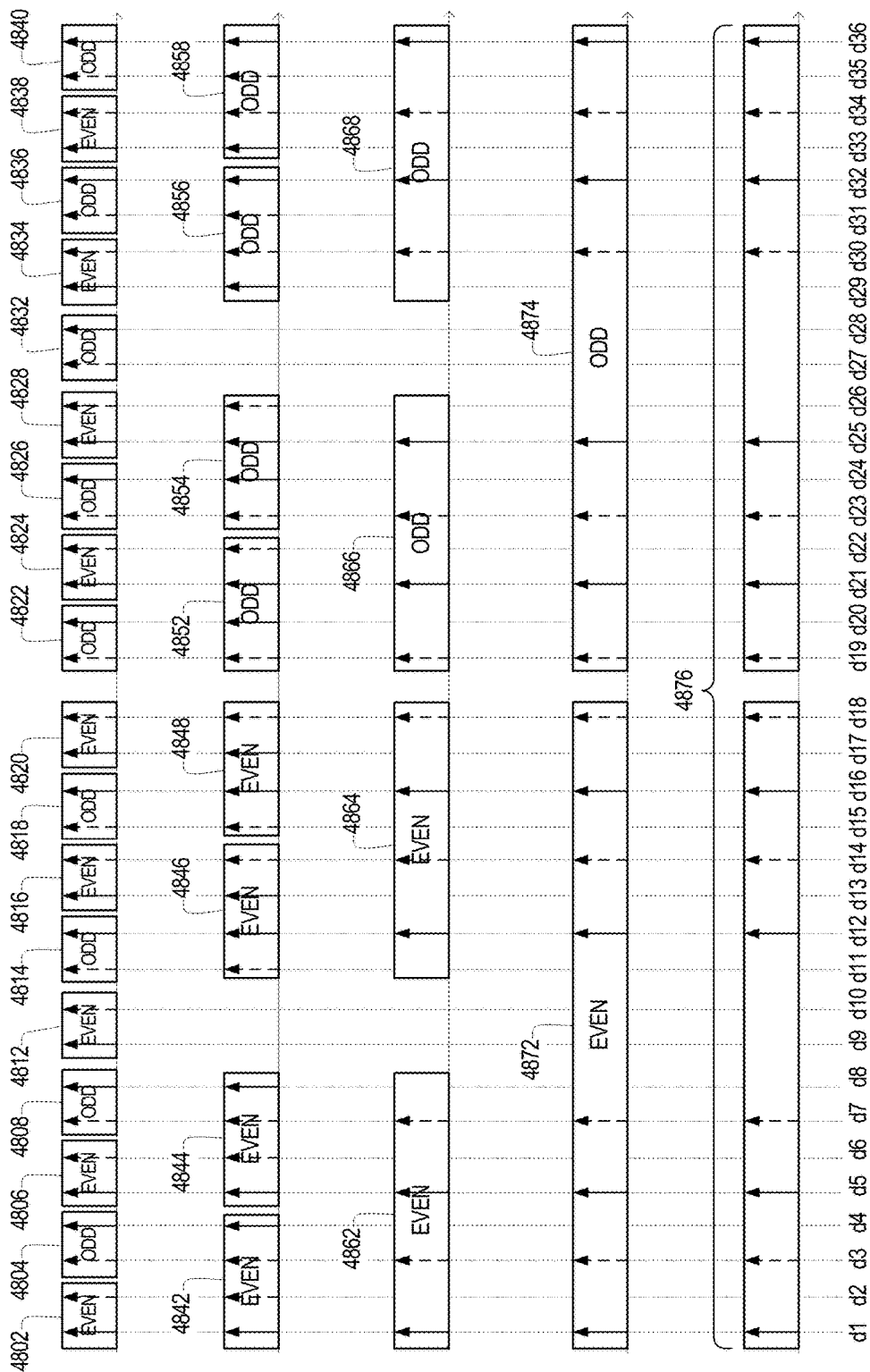
FIG. 48 illustrates pilot tone positions for RUs of the 40 MHz BW in of Case 1, according to an embodiment.

FIG. 48 illustrates a third option for pilot tone positions in Case 1 for a 40 MHz bandwidth. In an embodiment, the second option may use the first to thirty-sixth potential pilot tone positions d1 to d36 as shown in Table 9 of FIG. 33B, but embodiments are not limited thereto.

FIG. 48 shows first to eighteenth 26-subcarrier RUs 4802 to 4840 having pilot tone positions at the same potential pilot tone positions as the first to eighteenth 26-subcarrier RU 4602 to 4640 of FIG. 46A, respectively.

FIG. 48 shows first to eighth 52-subcarrier RUs 4842 to 4858 having pilot tone positions at the same potential pilot tone positions as the first to eighth 52-subcarrier RUs 4642 to 4658 of FIG. 46A, respectively.

FIG. 48 further shows a first 106-subcarrier RU 4862 having pilot tone positions at potential pilot tone positions d1, d3, d5, and d7, a second 106-subcarrier RU 4864 having pilot tone positions at potential pilot tone positions d12, d14, d16, and d18, a third 106-subcarrier RU 4866 having pilot tone positions at potential pilot tone positions d19, d21, d23, and d25, and a fourth 106-subcarrier RU 4868 having pilot tone positions at potential pilot tone positions d30, d32, d34, and d36.

FIG. 48 further shows a first 242-subcarrier RU 4872 having pilot tone positions at potential pilot tone positions d1, d3, d5, d7, d12, d14, d16, and d18, a second 242-subcarrier RU 4874 having pilot tone positions at potential pilot tone positions d19, d21, d23, d25, d30, d32, d34, and d36, and a 484-subcarrier RU 4876 having pilot tone positions at potential pilot tone positions d1, d3, d5, d7, d12, d14, d16, d18, d19, d21, d23, d25, d30, d32, d34, and d36.

Each of the 52-, 106-, 242-, and 484-subcarrier RUs in FIG. 48 has pilot tone positions selected from among the pilot tone positions used by the RUs having fewer subcarriers that occupy the same bandwidth. Furthermore, the pilot tone positions of FIG. 48 exhibit the mirror symmetry described above for FIG. 46A.

Figure 49:
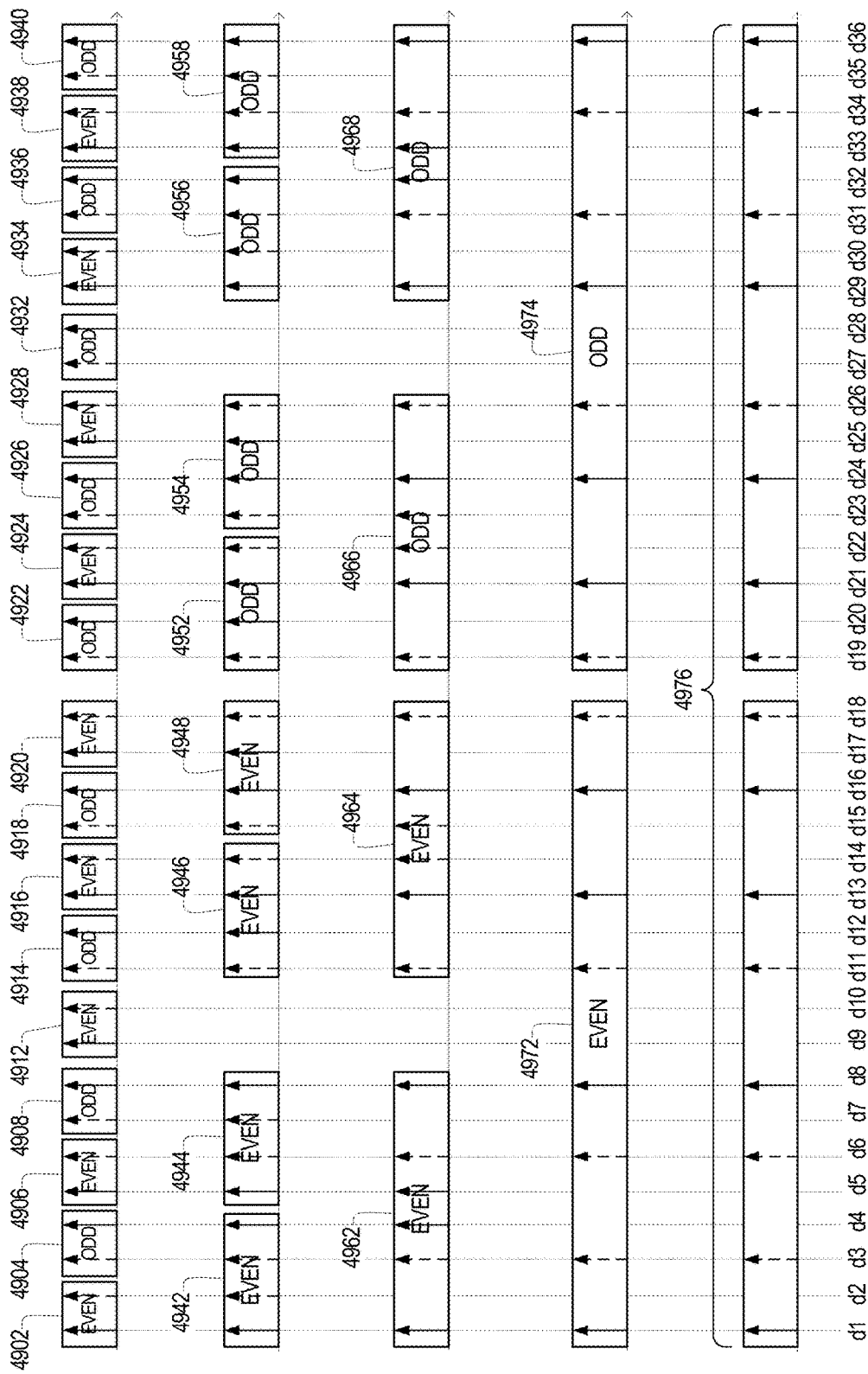
FIG. 49 illustrates pilot tone positions for RUs of the 40 MHz BW in of Case 1, according to an embodiment.

FIG. 49 illustrates a fourth option for pilot tone positions in Case 1 for a 40 MHz bandwidth. In an embodiment, the fourth option may use the first to thirty-sixth potential pilot tone positions d1 to d36 as shown in Table 9 of FIG. 33B, but embodiments are not limited thereto.

FIG. 49 shows first to eighteenth 26-subcarrier RUs 4902 to 4940 having pilot tone positions at the same potential pilot tone positions as the first to eighteenth 26-subcarrier RU 4602 to 4640 of FIG. 46A, respectively.

FIG. 49 shows first to eighth 52-subcarrier RUs 4942 to 4958 having pilot tone positions at the same potential pilot tone positions as the first to eighth 52-subcarrier RUs 4642 to 4658 of FIG. 46A, respectively.

FIG. 49 further shows a first 108-subcarrier RU 4962 having pilot tone positions at potential pilot tone positions d1, d3, d4, d5, d6, and d8, a second 108-subcarrier RU 4964 having pilot tone positions at potential pilot tone positions d11, d13, d14, d15, d16, and d18, a third 108-subcarrier RU 4966 having pilot tone positions at potential pilot tone positions d19, d21, d22, d23, d24, and d26, and a fourth 108-subcarrier RU 4968 having pilot tone positions at potential pilot tone positions d29, d31, d32, d33, d34, and d36.

FIG. 49 further shows a first 242-subcarrier RU 4972 having pilot tone positions at potential pilot tone positions d1, d3, d6, d8, d11, d13, d16, and d18, a second 242-subcarrier RU 4974 having pilot tone positions at potential pilot tone positions d19, d21, d24, d26, d29, d31, d34, and d36, and a 484-subcarrier RU 4976 having pilot tone positions at potential pilot tone positions d1, d3, d6, d8, d11, d13, d16, d18, d19, d21, d24, d26, d29, d31, d34, and d36.

Each of the 52-, 106-, 242-, and 484-subcarrier RUs in FIG. 49 has pilot tone positions selected from among the pilot tone positions used by the RUs having fewer subcarriers that occupy the same bandwidth. Furthermore, the pilot tone positions of FIG. 49 exhibit the mirror symmetry described above for FIG. 46A.

Figure 50:
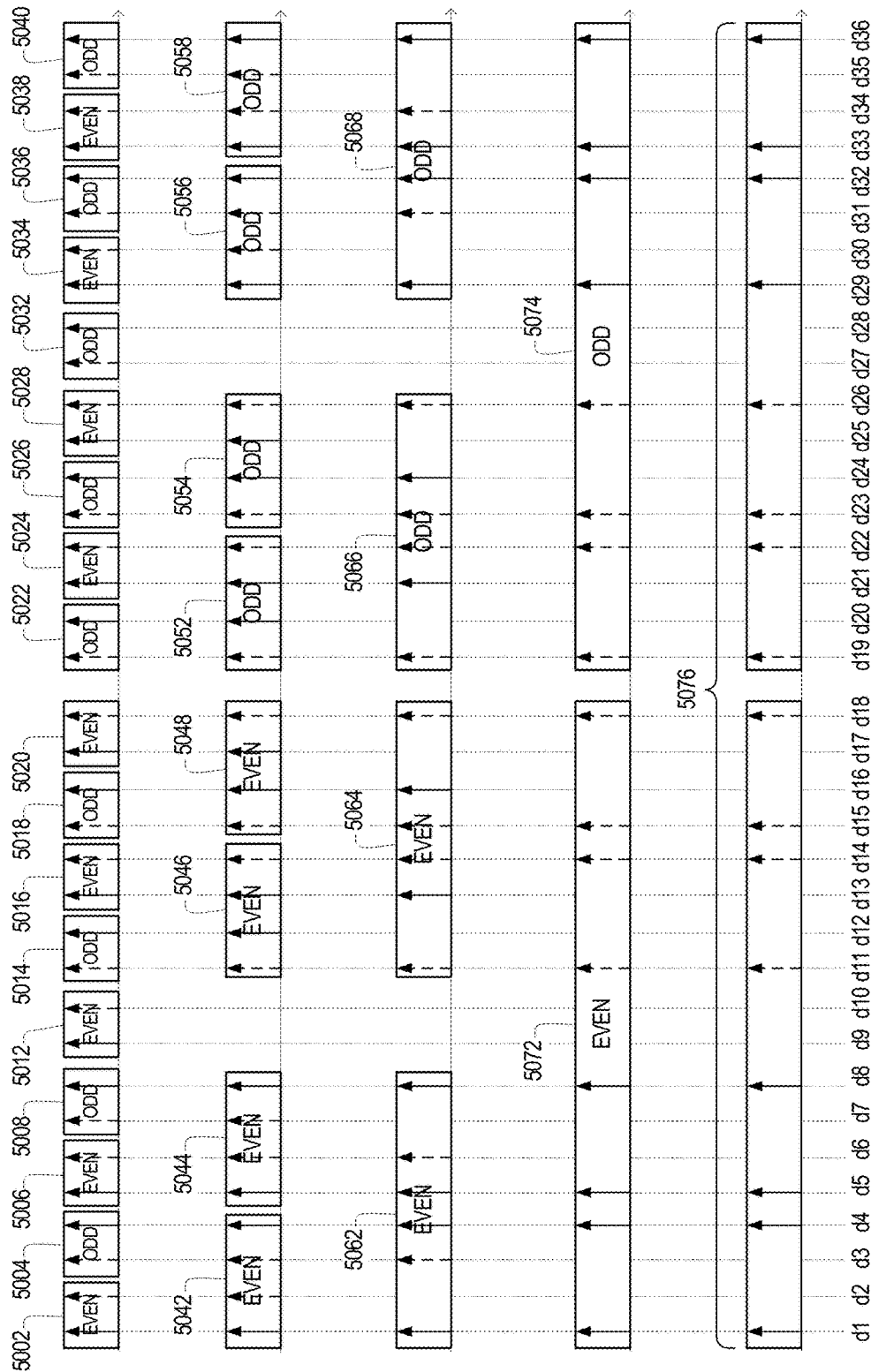
FIG. 50 illustrates pilot tone positions for RUs of the 40 MHz BW in of Case 1, according to an embodiment.

FIG. 50 illustrates a fifth option for pilot tone positions in Case 1 for a 40 MHz bandwidth. In an embodiment, the fifth option may use the first to thirty-sixth potential pilot tone positions d1 to d36 as shown in Table 9 of FIG. 33B, but embodiments are not limited thereto.

FIG. 50 shows first to eighteenth 26-subcarrier RUs 5002 to 5040 having pilot tone positions at the same potential pilot tone positions as the first to eighteenth 26-subcarrier RU 4602 to 4640 of FIG. 46A, respectively.

FIG. 50 shows first to eighth 52-subcarrier RUs 5042 to 5058 having pilot tone positions at the same potential pilot tone positions as the first to eighth 52-subcarrier RUs 4642 to 4658 of FIG. 46A, respectively.

FIG. 50 further shows a first 108-subcarrier RU 5062 having pilot tone positions at potential pilot tone positions d1, d3, d4, d5, d6, and d8, a second 108-subcarrier RU 5064 having pilot tone positions at potential pilot tone positions d11, d13, d14, d15, d16, and d18, a third 108-subcarrier RU 5066 having pilot tone positions at potential pilot tone positions d19, d21, d22, d23, d24, and d26, and a fourth 108-subcarrier RU 5068 having pilot tone positions at potential pilot tone positions d29, d31, d32, d33, d34, and d36.

FIG. 50 further shows a first 242-subcarrier RU 5072 having pilot tone positions at potential pilot tone positions d1, d4, d5, d8, d11, d14, d15, and d18, a second 242-subcarrier RU 5074 having pilot tone positions at potential pilot tone positions d19, d22, d23, d26, d29, d32, d33, and d36, and a 484-subcarrier RU 5076 having pilot tone positions at potential pilot tone positions d1, d4, d5, d8, d11, d14, d15, d18, d19, d22, d23, d26, d29, d32, d33, and d36.

Each of the 52-, 106-, 242-, and 484-subcarrier RUs in FIG. 50 has pilot tone positions selected from among the pilot tone positions used by the RUs having fewer subcarriers that occupy the same bandwidth. Furthermore, the pilot tone positions of FIG. 50 exhibit the mirror symmetry described above for FIG. 46A.

Figure 51:
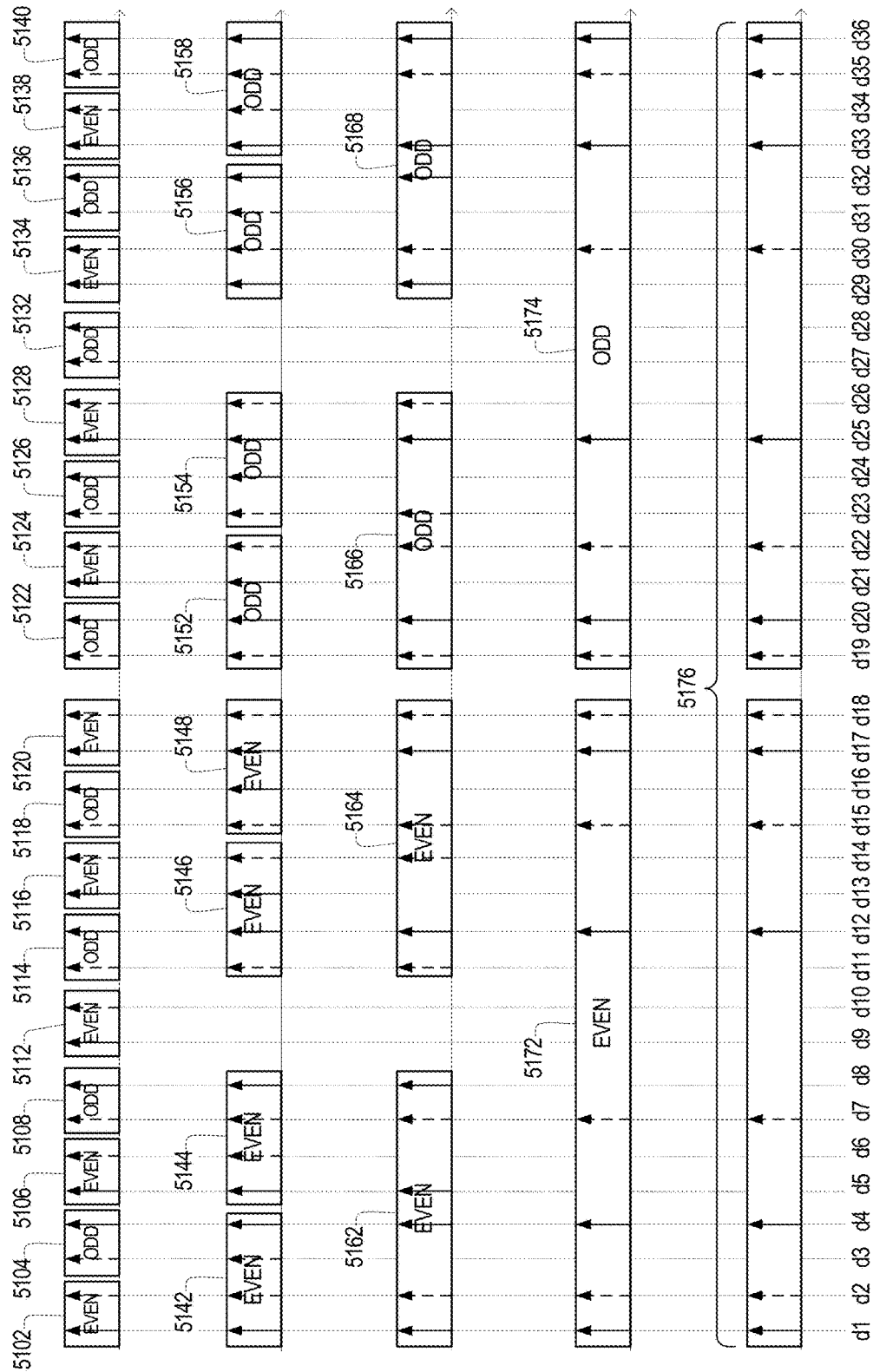
FIG. 51 illustrates pilot tone positions for RUs of the 40 MHz BW in of Case 1, according to an embodiment.

FIG. 51 illustrates a sixth option for pilot tone positions in Case 1 for a 40 MHz bandwidth. In an embodiment, the sixth option may use the first to thirty-sixth potential pilot tone positions d1 to d36 as shown in Table 9 of FIG. 33B, but embodiments are not limited thereto.

FIG. 51 shows first to eighteenth 26-subcarrier RUs 5102 to 5140 having pilot tone positions at the same potential pilot tone positions as the first to eighteenth 26-subcarrier RU 4602 to 4640 of FIG. 46A, respectively.

FIG. 51 shows first to eighth 52-subcarrier RUs 5142 to 5158 having pilot tone positions at the same potential pilot tone positions as the first to eighth 52-subcarrier RUs 4642 to 4658 of FIG. 46A, respectively.

FIG. 51 further shows a first 108-subcarrier RU 5162 having pilot tone positions at potential pilot tone positions d1, d2, d4, d5, d7, and d8, a second 108-subcarrier RU 5164 having pilot tone positions at potential pilot tone positions d11, d12, d14, d15, d17, and d18, a third 108-subcarrier RU 5166 having pilot tone positions at potential pilot tone positions d19, d20, d22, d23, d25, and d26, and a fourth 108-subcarrier RU 5168 having pilot tone positions at potential pilot tone positions d29, d30, d32, d33, d35, and d36.

FIG. 51 further shows a first 242-subcarrier RU 5172 having pilot tone positions at potential pilot tone positions d1, d3, d4, d7, d12, d15, d17, and d18, a second 242-subcarrier RU 5174 having pilot tone positions at potential pilot tone positions d19, d20, d22, d25, d30, d33, d35, and d36, and a 484-subcarrier RU 5176 having pilot tone positions at potential pilot tone positions d1, d3, d4, d7, d12, d15, d17, d18, d19, d20, d22, d25, d30, d33, d35, and d36.

Each of the 52-, 106-, 242-, and 484-subcarrier RUs in FIG. 51 has pilot tone positions selected from among the pilot tone positions used by the RUs having fewer subcarriers that occupy the same bandwidth. Furthermore, the pilot tone positions of FIG. 51 exhibit the mirror symmetry described above for FIG. 46A.

Figure 52:
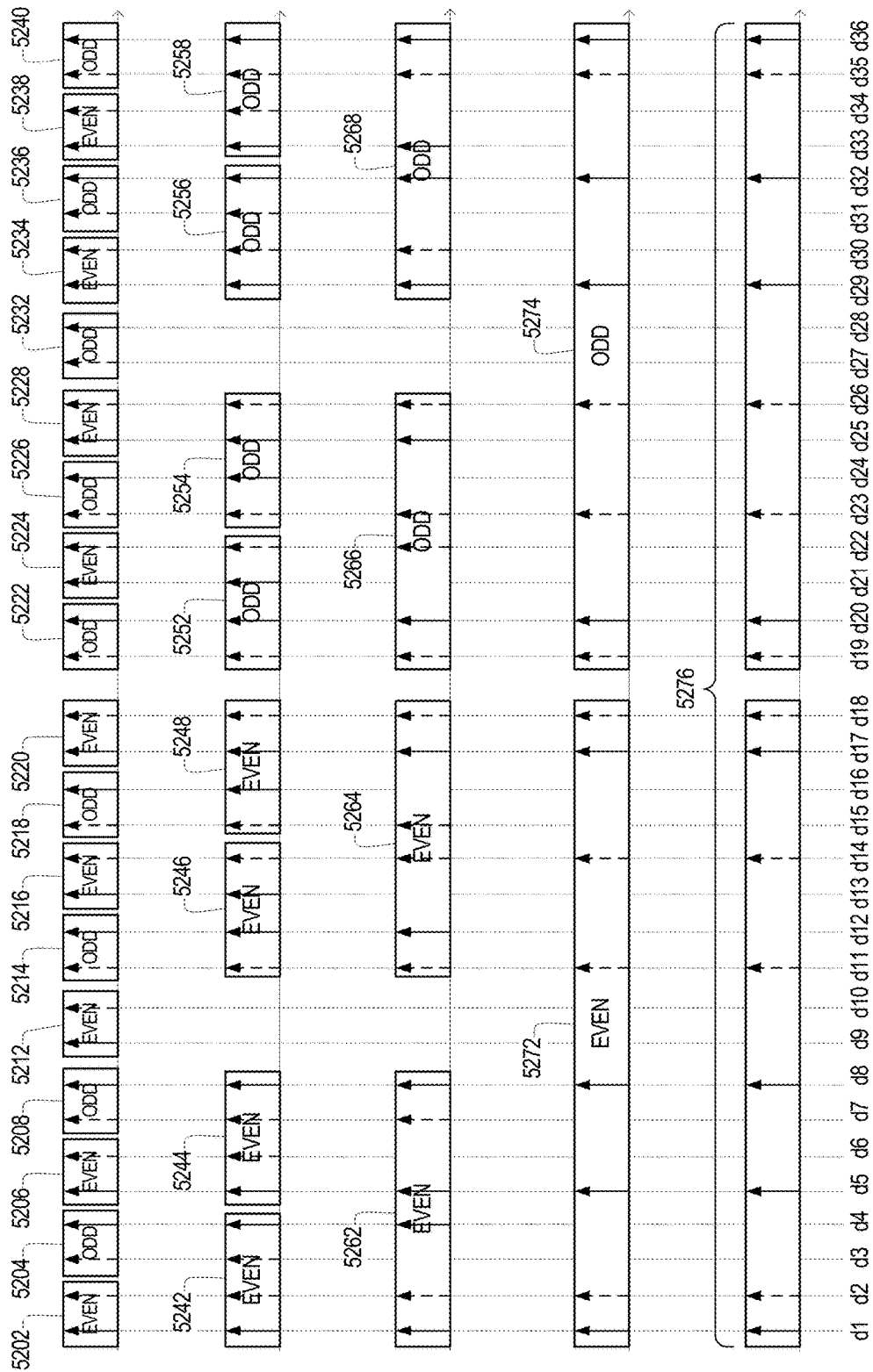
FIG. 52 illustrates pilot tone positions for RUs of the 40 MHz BW in of Case 1, according to an embodiment.

FIG. 52 illustrates a seventh option for pilot tone positions in Case 1 for a 40 MHz bandwidth. In an embodiment, the seventh option may use the first to thirty-sixth potential pilot tone positions d1 to d36 as shown in Table 9 of FIG. 33B, but embodiments are not limited thereto.

FIG. 52 shows first to eighteenth 26-subcarrier RUs 5202 to 5240 having pilot tone positions at the same potential pilot tone positions as the first to eighteenth 26-subcarrier RU 4602 to 4640 of FIG. 46A, respectively.

FIG. 52 shows first to eighth 52-subcarrier RUs 5242 to 5258 having pilot tone positions at the same potential pilot tone positions as the first to eighth 52-subcarrier RUs 4642 to 4658 of FIG. 46A, respectively.

FIG. 52 further shows a first 108-subcarrier RU 5262 having pilot tone positions at potential pilot tone positions d1, d2, d4, d5, d7, and d8, a second 108-subcarrier RU 5264 having pilot tone positions at potential pilot tone positions d11, d12, d14, d15, d17, and d18, a third 108-subcarrier RU 5266 having pilot tone positions at potential pilot tone positions d19, d20, d22, d23, d25, and d26, and a fourth 108-subcarrier RU 5268 having pilot tone positions at potential pilot tone positions d29, d30, d32, d33, d35, and d36.

FIG. 52 further shows a first 242-subcarrier RU 5272 having pilot tone positions at potential pilot tone positions d1, d2, d5, d8, d11, d14, d17, and d18, a second 242-subcarrier RU 5274 having pilot tone positions at potential pilot tone positions d19, d20, d23, d26, d29, d32, d35, and d36, and a 484-subcarrier RU 5276 having pilot tone positions at potential pilot tone positions d1, d2, d5, d8, d11, d14, d17, d18, d19, d20, d23, d26, d29, d32, d35, and d36.

Each of the 52-, 106-, 242-, and 484-subcarrier RUs in FIG. 52 has pilot tone positions selected from among the pilot tone positions used by the RUs having fewer subcarriers that occupy the same bandwidth. Furthermore, the pilot tone positions of FIG. 52 exhibit the mirror symmetry described above for FIG. 46A.

Figure 53:
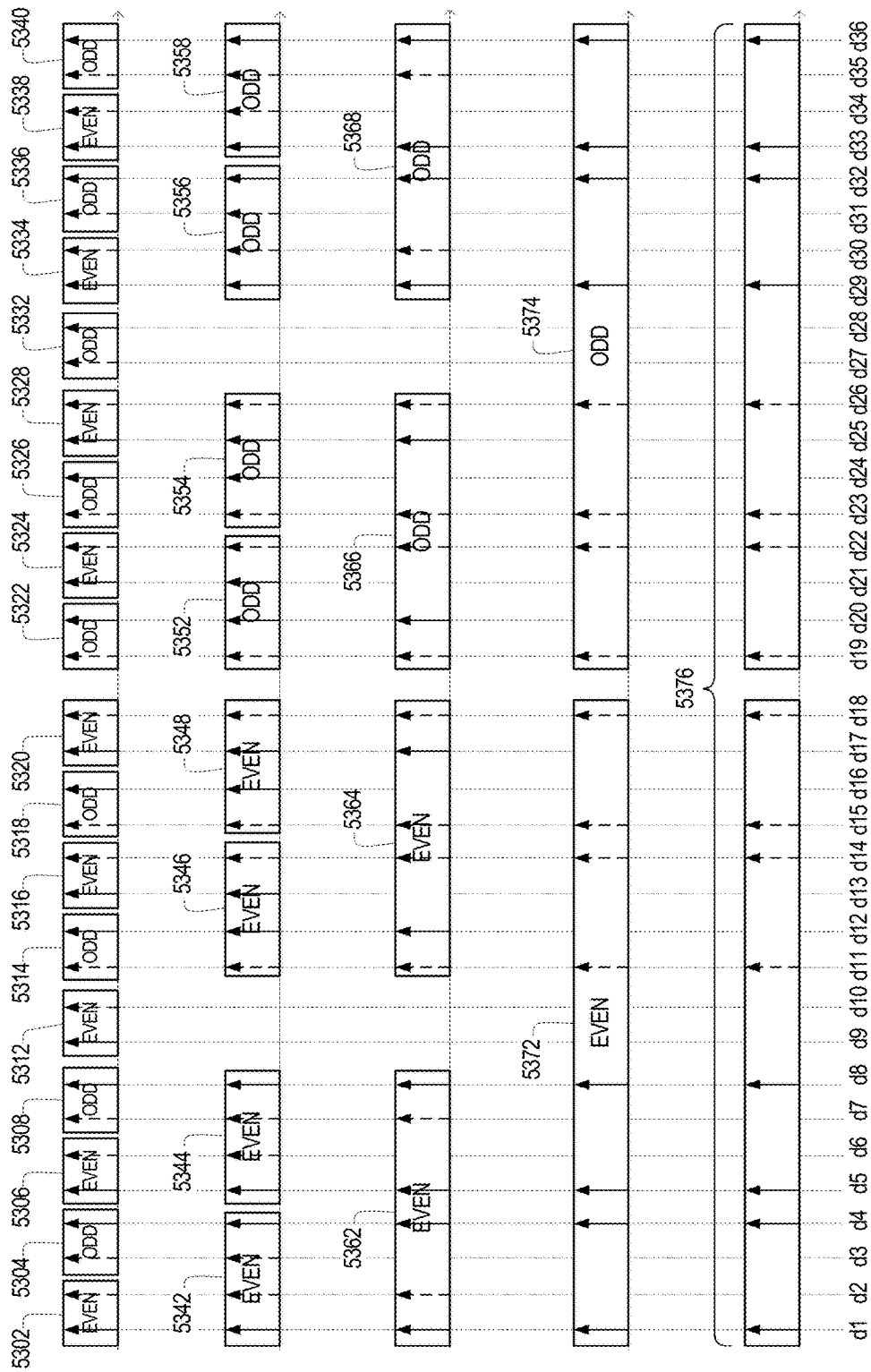
FIG. 53 illustrates pilot tone positions for RUs of the 40 MHz BW in of Case 1, according to an embodiment.

FIG. 53 illustrates an eighth option for pilot tone positions in Case 1 for a 40 MHz bandwidth. In an embodiment, the eighth option may use the first to thirty-sixth potential pilot tone positions d1 to d36 as shown in Table 9 of FIG. 33B, but embodiments are not limited thereto.

FIG. 53 shows first to eighteenth 26-subcarrier RUs 5302 to 5340 having pilot tone positions at the same potential pilot tone positions as the first to eighteenth 26-subcarrier RU 4602 to 4640 of FIG. 46A, respectively.

FIG. 53 shows first to eighth 52-subcarrier RUs 5342 to 5358 having pilot tone positions at the same potential pilot tone positions as the first to eighth 52-subcarrier RUs 4642 to 4658 of FIG. 46A, respectively.

FIG. 53 further shows a first 108-subcarrier RU 5362 having pilot tone positions at potential pilot tone positions d1, d2, d4, d5, d7, and d8, a second 108-subcarrier RU 5364 having pilot tone positions at potential pilot tone positions d11, d12, d14, d15, d17, and d18, a third 108-subcarrier RU 5366 having pilot tone positions at potential pilot tone positions d19, d20, d22, d23, d25, and d26, and a fourth 108-subcarrier RU 5368 having pilot tone positions at potential pilot tone positions d29, d30, d32, d33, d35, and d36.

FIG. 53 further shows a first 242-subcarrier RU 5372 having pilot tone positions at potential pilot tone positions d1, d4, d5, d8, d11, d14, d15, and d18, a second 242-subcarrier RU 5374 having pilot tone positions at potential pilot tone positions d19, d22, d23, d26, d29, d32, d33, and d36, and a 484-subcarrier RU 5376 having pilot tone positions at potential pilot tone positions d1, d4, d5, d8, d11, d14, d15, d18, d19, d22, d23, d26, d29, d32, d33, and d36.

Each of the 52-, 106-, 242-, and 484-subcarrier RUs in FIG. 53 has pilot tone positions selected from among the pilot tone positions used by the RUs having fewer subcarriers that occupy the same bandwidth. Furthermore, the pilot tone positions of FIG. 53 exhibit the mirror symmetry described above for FIG. 46A.

Case 2 embodies RU definition design with 26 subcarrier RUs, 52 subcarriers RUs, 106 or 108 subcarrier RUs, 242 subcarrier RUs, 484 subcarrier RUs, and 994 or 996 subcarrier RUs, wherein pairs of consecutive 26 subcarrier RUs line up (frequency wise) with 52 subcarrier RUs, except for the central 26 subcarrier RU within each 20 MHz bandwidth.

In FIGS. 54A to 58, potential pilot tone positions are indicated by dotted lines extending vertically through the figures. Actual pilot tone for each RU are indicated by upward pointing arrows. A solid upward pointing arrow indicates a pilot tone with a fixed position. A dashed upward pointing arrow indicates a pilot tone having one of two positions, includes a first position to the left of a reference subcarrier and a second position to the right of a reference subcarrier, according to a design choice. In an embodiment, the reference subcarriers are center subcarriers of 13-subcarrier halves of 26-subcarrier RUs.

Figures 54A, 54B:
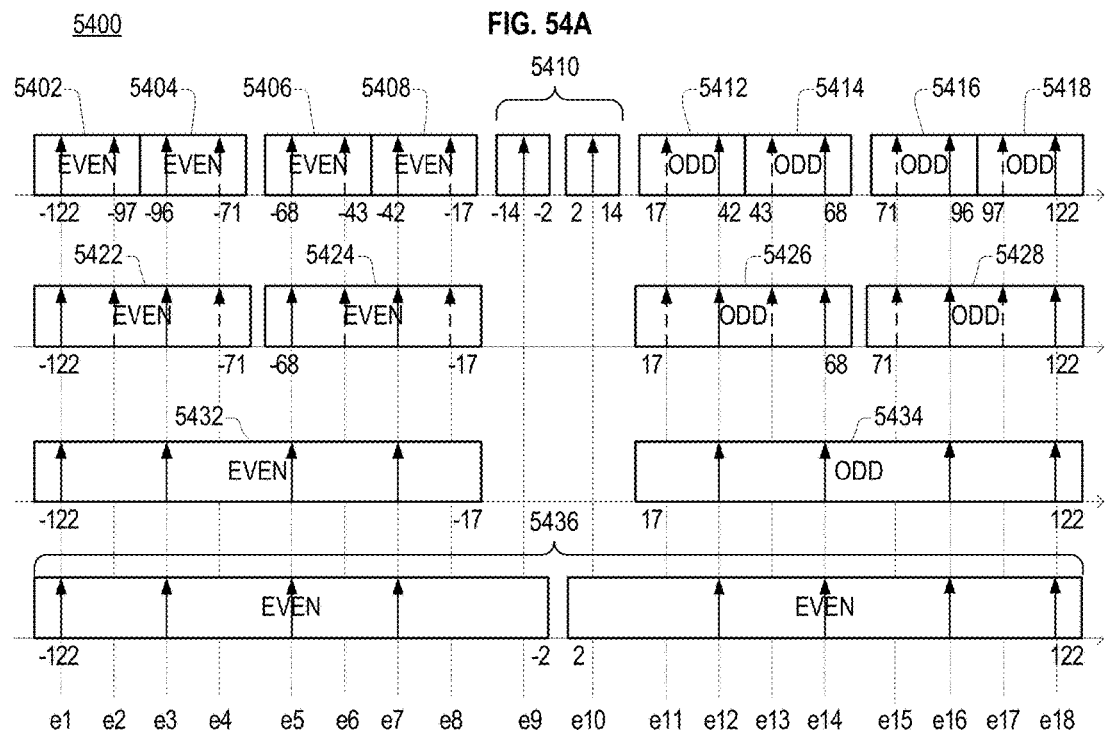
FIG. 54A illustrates pilot tone positions for RUs of a 20 MHz bandwidth (BW) of Case 2, according to an embodiment.
FIG. 54B includes a Table 11 showing pilot tone relative positions in the 20 MHz BW according to an embodiment.

FIG. 54A illustrates a first option for pilot tone positions for a 20 MHz channel 5400 in Case 2. Pilot tone positions for each RU are selected from first to eighteenth potential pilot tone positions e1 to e18. FIG. 54B shows Table 11, which lists the positions of each of the potential pilot tone positions e1 to e18 according to an embodiment.

FIG. 54A shows a first 26-subcarrier RU 5402 having pilot tone positions at potential pilot tone positions e1 and e2, a second 26-subcarrier RU 5404 having pilot tone positions at potential pilot tone positions e3 and e4, a third 26-subcarrier RU 5406 having pilot tone positions at potential pilot tone positions e5 and e6, a fourth 26-subcarrier RU 5408 having pilot tone positions at potential pilot tone positions e7 and e8, a fifth (center) 26-subcarrier RU 5410 having pilot tone positions at potential pilot tone positions e9 and e10, a sixth 26-subcarrier RU 5412 having pilot tone positions at potential pilot tone positions e11 and e12, a seventh 26-subcarrier RU 5414 having pilot tone positions at potential pilot tone positions e13 and e14, an eighth 26-subcarrier RU 5416 having pilot tone positions at potential pilot tone positions e15 and e16, and a ninth 26-subcarrier RU 5418 having pilot tone positions at potential pilot tone positions e17 and e18.

FIG. 54A further shows a first 52-subcarrier RU 5422 having pilot tone positions at potential pilot tone positions e1, e2, e3, and e4, a second 52-subcarrier RU 5424 having pilot tone positions at potential pilot tone positions e5, e6, e7, and e8, a third 52-subcarrier RU 5426 having pilot tone positions at potential pilot tone positions e11, e12, e13, and e14, and a fourth 52-subcarrier RU 5428 having pilot tone positions at potential pilot tone positions e15, e16, e17, and e18.

FIG. 54A further shows a first 106-subcarrier RU 5432 having pilot tone positions at potential pilot tone positions e1, e3, e5, and e7, a second 106-subcarrier RU 5434 having pilot tone positions at potential pilot tone positions e12, e14, e16, and e18, and a 242-subcarrier RU 5436 having pilot tone positions at potential pilot tone positions e1, e3, e5, e7, e12, e14, e16, and e18.

Each of the 52-, 106-, and 242-subcarrier RUs in FIG. 54A has pilot tone positions selected from among the pilot tone positions used by the RUs having fewer subcarriers that occupy the same bandwidth.

Furthermore, each RU in a lower 10 MHz of the 20 MHz channel 5400 has pilot tone positions that are mirror symmetric with a corresponding mirrored RU (that is, an RU with a same number of subcarriers and a same offset from the center of the 20 MHz channel 5400) of an upper 10 MHz of the 20 MHz channel 5400. For example, the pilot tone positions of the first 26-subcarrier RU 5402 are positioned to be mirror-symmetric to the pilot tone positions of the ninth 26-subcarrier RU 5418, the pilot tone positions of the second 52-subcarrier RU 5424 are positioned to be mirror-symmetric to the pilot tone positions of the third 52-subcarrier RU 5426, and so on.

Figure 55:
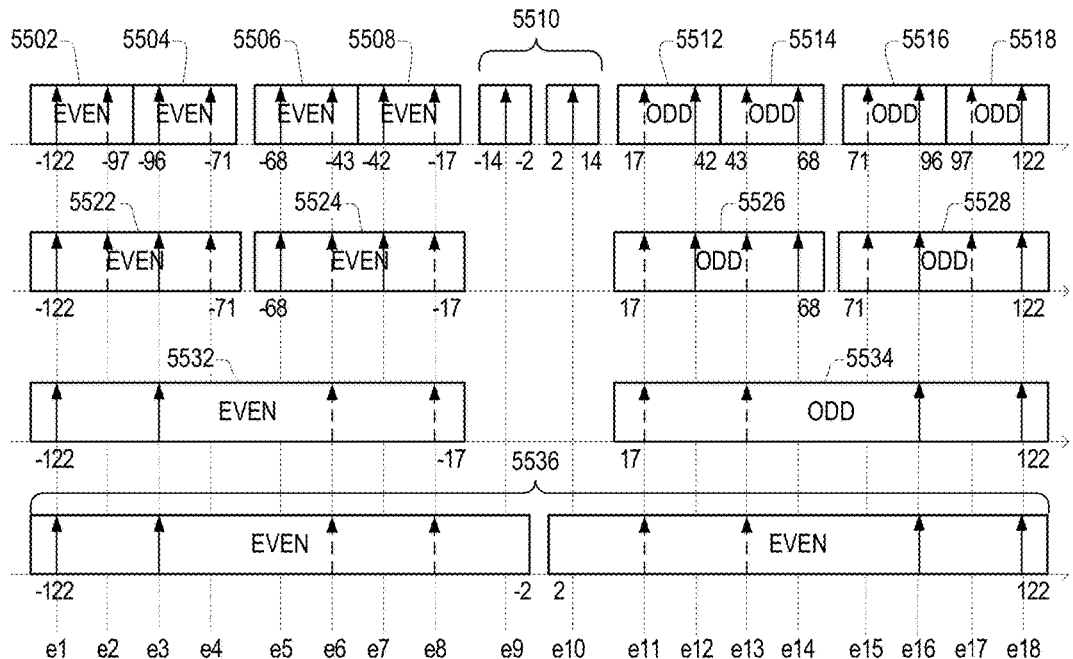
FIG. 55 illustrates pilot tone positions for RUs of the 20 MHz BW in of Case 2, according to an embodiment.

FIG. 55 illustrates a second option for pilot tone positions in Case 2. In an embodiment, the second option may use the first to eighteenth potential pilot tone positions e1 to e18 as shown in Table 11 of FIG. 54B, but embodiments are not limited thereto.

FIG. 55 shows a first, second, third, and fourth 26-subcarrier RU 5502, 5504, 5506, and 5508 having pilot tone positions at potential pilot tone positions e1 and e2, e3 and e4, e5 and e6, and e7 and e8, respectively, a fifth (center) 26-subcarrier RU 5510 having pilot tone positions at potential pilot tone positions e9 and e10, and sixth, seventh, eighth, and ninth 26-subcarrier RU 5512, 5514, 5516, and 5518 having pilot tone positions at potential pilot tone positions e11 and e12, e13 and e14, e15 and e16, and e17 and e18, respectively.

FIG. 55 further shows a first, second, third, and fourth 52-subcarrier RU 5522, 5524, 5526, and 5528 having pilot tone positions at potential pilot tone positions e1, e2, e3, and e4, potential pilot tone positions e5, e6, e7, and e8, potential pilot tone positions e11 , e12, e13, and e14, and potential pilot tone positions e15, e16, e17, and e18, respectively.

FIG. 55 further shows a first 106-subcarrier RU 5532 having pilot tone positions at potential pilot tone positions e1, e3, e6, and e8, a second 106-subcarrier RU 5534 having pilot tone positions at potential pilot tone positions e11, e13, e16, and e18, and a 242-subcarrier RU 5536 having pilot tone positions at potential pilot tone positions e1, e3, e6, e8, e11, e13, e16, and e18.

Each of the 52-, 106-, and 242-subcarrier RUs in FIG. 55 has pilot tone positions selected from among the pilot tone positions used by the RUs having fewer subcarriers that occupy the same bandwidth. Furthermore, the pilot tone positions of FIG. 55 exhibit the mirror symmetry described above for FIG. 54A.

Figure 56:
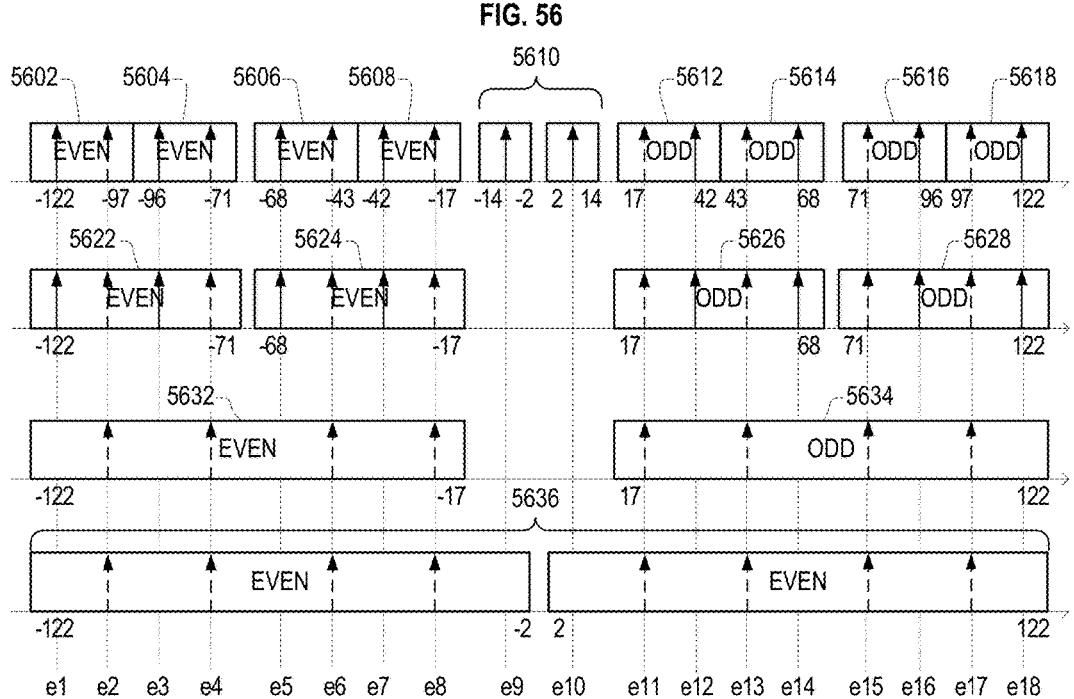
FIG. 56 illustrates pilot tone positions for RUs of the 20 MHz BW in of Case 2, according to an embodiment.

FIG. 56 illustrates a third option for pilot tone positions in Case 2. In an embodiment, the third option may use the first to eighteenth potential pilot tone positions e1 to e18 as shown in Table 11 of FIG. 54B, but embodiments are not limited thereto.

FIG. 56 shows a first, second, third, and fourth 26-subcarrier RU 5602, 5604, 5606, and 5608 having pilot tone positions at potential pilot tone positions e1 and e2, e3 and e4, e5 and e6, and e7 and e8, respectively, a fifth (center) 26-subcarrier RU 5610 having pilot tone positions at potential pilot tone positions e9 and e10, and sixth, seventh, eighth, and ninth 26-subcarrier RU 5612, 5614, 5616, and 5618 having pilot tone positions at potential pilot tone positions e11 and e12, e13 and e14, e15 and e16, and e17 and e18, respectively.

FIG. 56 further shows a first, second, third, and fourth 52-subcarrier RU 5622, 5624, 5626, and 5628 having pilot tone positions at potential pilot tone positions e1, e2, e3, and e4, potential pilot tone positions e5, e6, e7, and e8, potential pilot tone positions e11, e12, e13, and e14, and potential pilot tone positions e15, e16, e17, and e18, respectively.

FIG. 56 further shows a first 106-subcarrier RU 5632 having pilot tone positions at potential pilot tone positions e2, e4, e6, and e8, a second 106-subcarrier RU 5634 having pilot tone positions at potential pilot tone positions e11, e13, e15, and e17, and a 242-subcarrier RU 5636 having pilot tone positions at potential pilot tone positions e2, e4, e6, e8, e 11, e13, e15, and e17.

Each of the 52-, 106-, and 242-subcarrier RUs in FIG. 56 has pilot tone positions selected from among the pilot tone positions used by the RUs having fewer subcarriers that occupy the same bandwidth. Furthermore, the pilot tone positions of FIG. 56 exhibit the mirror symmetry described above for FIG. 54A.

Options 1, 2, and 3 for Case 2 as shown in FIGS. 54A, 55, and 56, respectively, represent pilot tone positions for a 20 MHz bandwidth and when a 106-subcarrier RU is used instead of a 108-subcarrier RU. The pilot tone positions within the 26-subcarrier RU can be the suggested pilot tone positions embodiments described in Design A section.

Resource Units (RUs) with larger sizes will have identical pilot frequency positions as the pilot tone positions for aggregated 26 subcarrier RUs.

The 106-subcarrier RUs respectively have 4 pilots within their RU allocations. However, there are potentially 8 pilot tone positions available for the 106 subcarrier RU. The options 1, 2, and 3 shown in FIGS. 54A, 55, and 56, respectively, are different alternatives to the pilot tone positions of the 106 subcarrier RUs and 242 subcarrier RU. The pilot tone positions for 106 subcarrier RU and 242 subcarrier RU are chosen from the set of potential positions stemming from the pilot tone positions of the 26 subcarrier RUs such that frequency diversity can be maximized (e.g. spacing between pilots are large). In case 2, the edge of the 106 subcarrier RU is lined up with 26 subcarrier and 52 subcarrier RUs.

Figure 57:
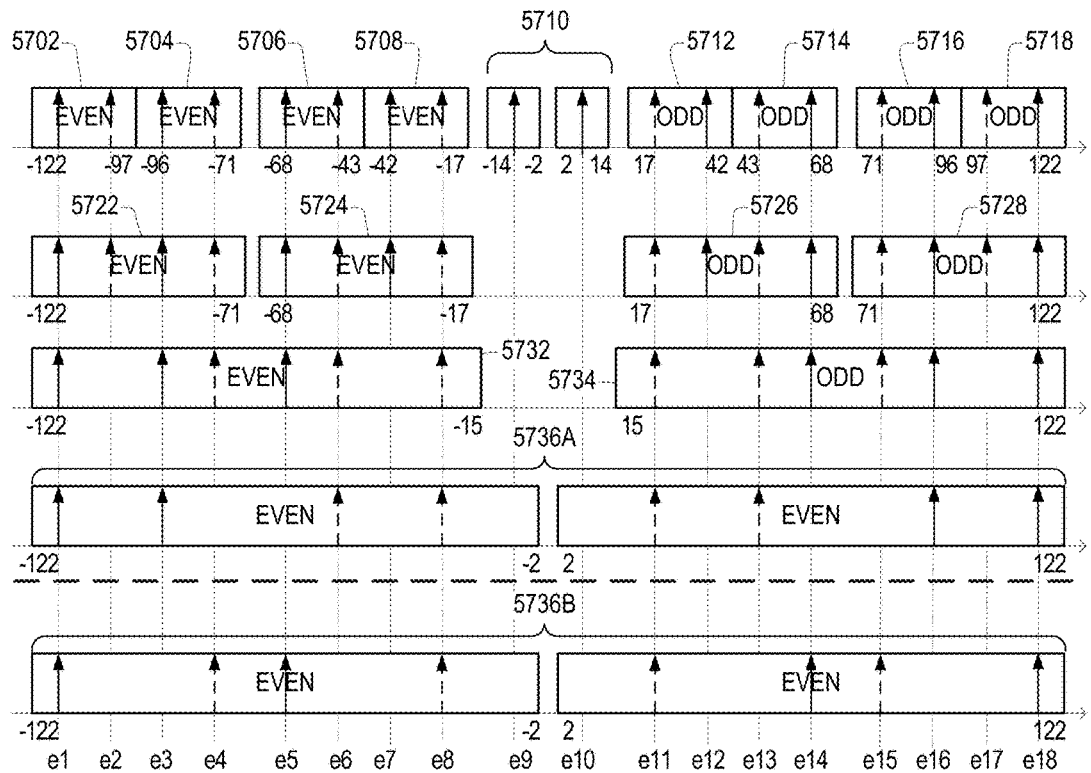
FIG. 57 illustrates pilot tone positions for RUs of the 20 MHz BW in of Case 2, according to an embodiment.

FIG. 57 illustrates a fourth and a fifth option for pilot tone positions in Case 2. In an embodiment, the fourth and fifth options may each use the first to eighteenth potential pilot tone positions e1 to e18 as shown in Table 11 of FIG. 54B, but embodiments are not limited thereto.

The fourth and fifth option respectively have identical pilot tone positions for 26-, 52-, and 108-subcarrier RUs. Pilot tone positions for an option-four 242-subcarrier RU 5736A of option four are different from pilot tone positions for an option-five 242-subcarrier RU 5736B of option five.

FIG. 57 shows a first, second, third, and fourth 26-subcarrier RU 5702, 5704, 5706, and 5708 having pilot tone positions at potential pilot tone positions e1 and e2, e3 and e4, e5 and e6, and e7 and e8, respectively, a fifth (center) 26-subcarrier RU 5710 having pilot tone positions at potential pilot tone positions e9 and e10, and sixth, seventh, eighth, and ninth 26-subcarrier RU 5712, 5714, 5716, and 5718 having pilot tone positions at potential pilot tone positions e11 and e12, e13 and e14, e15 and e16, and e17 and e18, respectively.

FIG. 57 further shows a first, second, third, and fourth 52-subcarrier RU 5722, 5724, 5726, and 5728 having pilot tone positions at potential pilot tone positions e1, e2, e3, and e4, potential pilot tone positions e5, e6, e7, and e8, potential pilot tone positions e11, e12, e 13, and e14, and potential pilot tone positions e15, e16, e17, and e18, respectively.

FIG. 57 further shows a first 108-subcarrier RU 5732 having pilot tone positions at potential pilot tone positions e1, e3, e4, e5, e6, and e8, and a second 108-subcarrier RU 5734 having pilot tone positions at potential pilot tone positions e11, e13, e14, e15, e16, and e18.

FIG. 57 further shows the option-four 242-subcarrier RU 5736A of option four having pilot tone positions at potential pilot tone positions e1, e3, e6, e8, e11, e13, e16, and e18, and the option-five 242-subcarrier RU 5736A of option five having pilot tone positions at potential pilot tone positions e1, e4, e5, e8, e11, e14, e15, and e18.

Each of the 52-, 108-, and 242-subcarrier RUs in FIG. 57 has pilot tone positions selected from among the pilot tone positions used by the RUs having fewer subcarriers that occupy the same bandwidth. Furthermore, the pilot tone positions of FIG. 57 exhibit the mirror symmetry described above for FIG. 54A.

Figure 58:
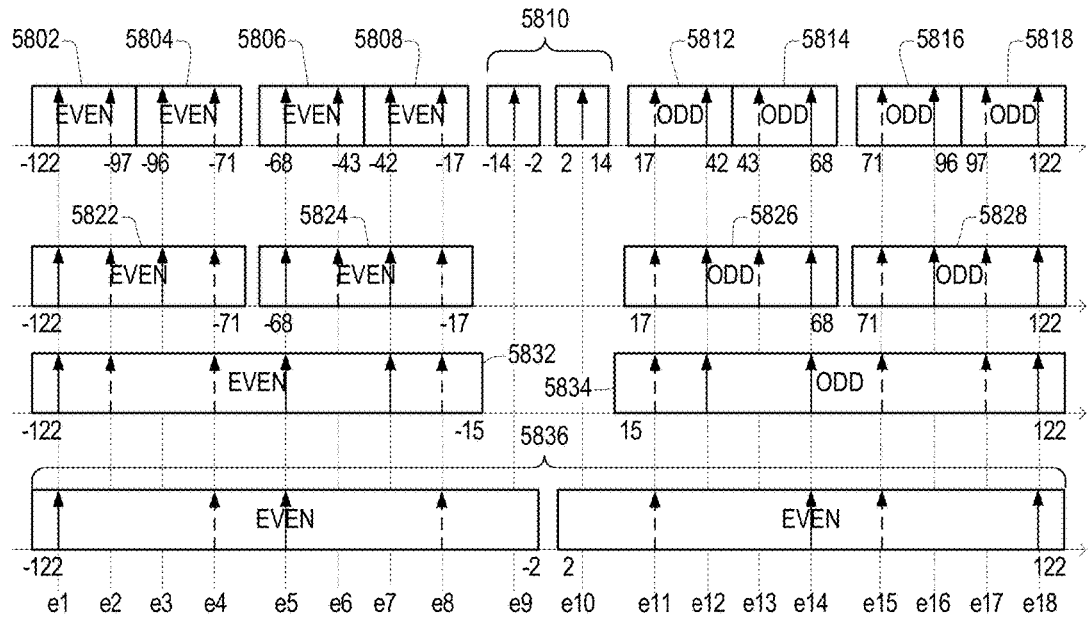
FIG. 58 illustrates pilot tone positions for RUs of the 20 MHz BW in of Case 2, according to an embodiment.

FIG. 58 illustrates a sixth option for pilot tone positions in Case 2. In an embodiment, the sixth option may use the first to eighteenth potential pilot tone positions e1 to e18 as shown in Table 11 of FIG. 54B, but embodiments are not limited thereto.

FIG. 58 shows a first, second, third, and fourth 26-subcarrier RU 5802, 5804, 5806, and 5808 having pilot tone positions at potential pilot tone positions e1 and e2, e3 and e4, e5 and e6, and e7 and e8, respectively, a fifth (center) 26-subcarrier RU 5810 having pilot tone positions at potential pilot tone positions e9 and e10, and sixth, seventh, eighth, and ninth 26-subcarrier RU 5812, 5814, 5816, and 5818 having pilot tone positions at potential pilot tone positions e11 and e12, e13 and e14, e15 and e16, and e17 and e18, respectively.

FIG. 58 further shows a first, second, third, and fourth 52-subcarrier RU 5822, 5824, 5826, and 5828 having pilot tone positions at potential pilot tone positions e1, e2, e3, and e4, potential pilot tone positions e5, e6, e7, and e8, potential pilot tone positions e11, e12, e13, and e14, and potential pilot tone positions e15, e16, e17, and e18, respectively.

FIG. 58 further shows a first 108-subcarrier RU 5832 having pilot tone positions at potential pilot tone positions e1, e2, e4, e5, e7, and e8, a second 108-subcarrier RU 5834 having pilot tone positions at potential pilot tone positions e11, e12, e14, e15, e17, and e18, and a 242-subcarrier RU 5836 having pilot tone positions at potential pilot tone positions e1, e4, e5, e8, e11, e14, e15, and e18.

Each of the 52-, 108-, and 242-subcarrier RUs in FIG. 58 has pilot tone positions selected from among the pilot tone positions used by the RUs having fewer subcarriers that occupy the same bandwidth. Furthermore, the pilot tone positions of FIG. 58 exhibit the mirror symmetry described above for FIG. 54A

Options 4, 5, and 6 of Case 2 shown in FIGS. 57, 57, and 58, respectively, represent pilot tone positions for a 20 MHz bandwidth and when a 108-subcarrier RU is used instead of a 106-subcarrier RU. The pilot tone positions within the 26-subcarrier RUs can be the suggested pilot tone positions embodiments described in Design A section.

Resource Units (RUs) with larger sizes will have identical pilot frequency positions as the pilot tone positions for aggregated 26 subcarrier RUs. 108-subcarrier RUs have 6 pilots within their respective RU allocation and the 242-subcarrier RU has 8 pilots within its RU allocation. However, there are potentially 8 potential pilot tone positions available for the 108-subcarrier RU and 18 potential pilot tone positions for the 242 subcarrier RU.

The options 4, 5, and 6 are different alternatives for the pilot tone positions of the 108-subcarrier RUs and 242-subcarrier RU. The pilot tone positions for 108 subcarrier RU and 242 subcarrier RU are chosen from the set of potential positions stemming from the pilot tone positions of the 26 subcarrier RUs such that frequency diversity can be maximized (e.g. spacing between pilots are large).

Pilot tone positions of 40, 80, and 160 MHz bandwidths for case 2 are defined using the concatenated (relative) pilot tone positions of the 20 MHz bandwidth pilot tone positions. As in Case 1, central 26-subcarrier RUs in left and right 20 MHz portions of a 40 MHz bandwidth are respectively replaced by an even or odd 26-subcarrier RU. An 80 MHz bandwidth will use two concatenated 40 MHz pilot tone positions with a single central 26-subcarrier RU in the middle. FIGS. 59 to 65 illustrate embodiments of pilot tone positions for a 40 MHz bandwidth for Case 2.

In FIGS. 59 to 65, potential pilot tone positions are indicated by dotted lines extending vertically through the figures. Actual pilot tone for each RU are indicated by upward pointing arrows. A solid upward pointing arrow indicates a pilot tone with a fixed position. A dashed upward pointing arrow indicates a pilot tone having one of two positions, includes a first position to the left of a reference subcarrier and a second position to the right of a reference subcarrier, according to a design choice. In an embodiment, the reference subcarriers are center subcarriers of 13-subcarrier halves of 26-subcarrier RUs.

Figure 59A:
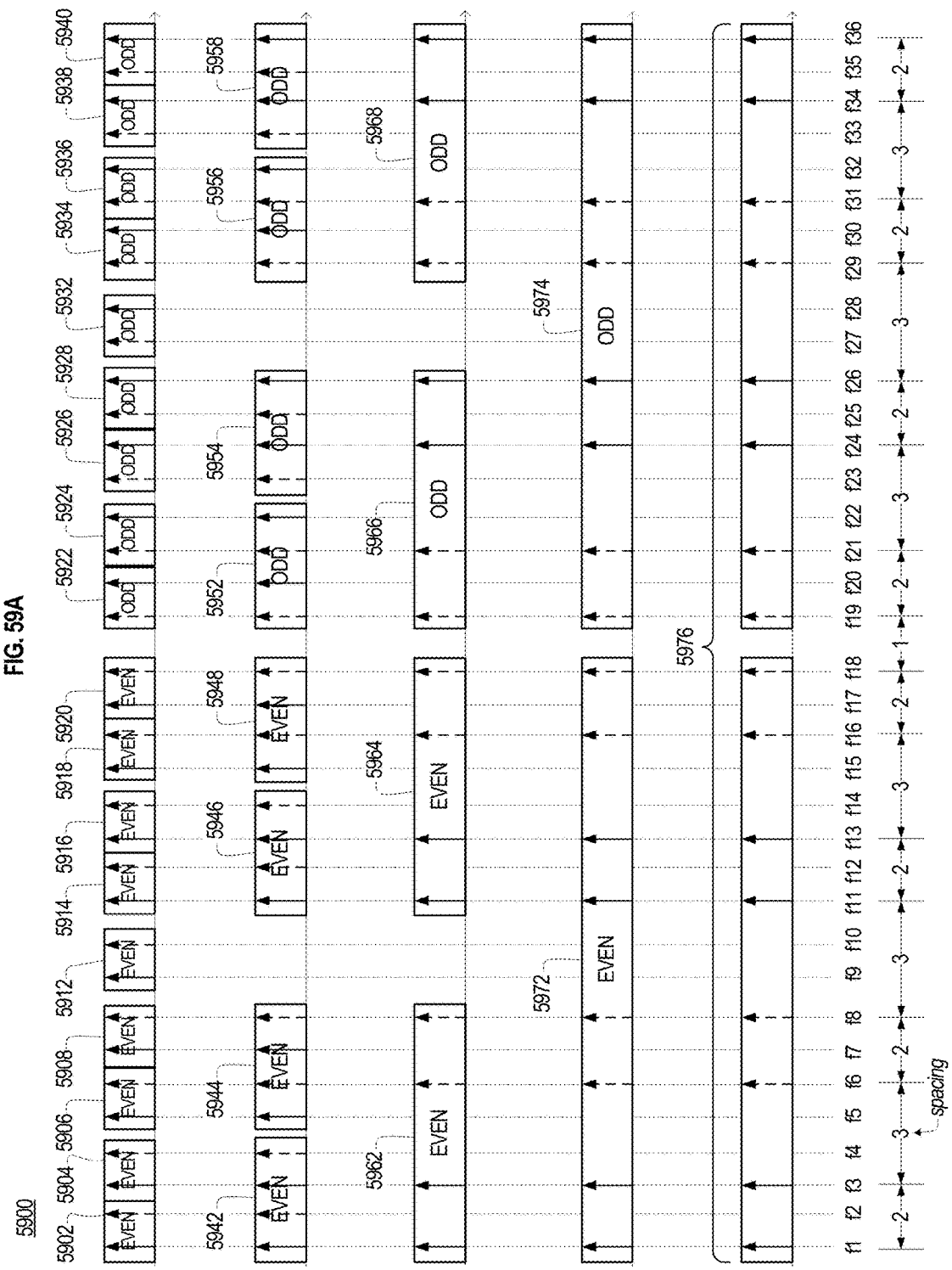
FIG. 59A illustrates pilot tone positions for RUs of a 40 MHz bandwidth (BW) in Case 2, according to an embodiment.

FIG. 59A illustrates a first option for pilot tone positions in Case 2 for a 40 MHz channel 5900. Pilot tone positions for each RU are selected from first to thirty-sixth potential pilot tone positions f1 to f36. FIG. 59B shows Table 12, which lists positions of each of the potential pilot tone positions f1 to f36 according to an embodiment, but embodiments are not limited thereto. The order of the potential pilot tone positions f1 to f36 in Table 10 goes down the left sub-table and up the right sub-table to better illustrate the mirror symmetry of the potential pilot tone positions f1 to f36. Therefore, the pilot tone positions f1 to f36 meets the following relationship: f1=−f36, f2=−f35, f3=−f34, f4=−f33, f5=−f32, f6=−f31, f7=−f30, f8=−f29, f9=−f28, f10=−f27, f11=−f26, f12=−f25, f13=−f24, f14=−f23, f15=−f22, f16=f21, f17=f20, and f18=f19 (f36>f35>f34>f33>f32>f31>f30>f29>f28>f27>f26>f25>f24>f23>f22>f21>f20>f19>f18>f17>f16>f15>f14>f13>f12>f11>f10>f9>f8>f7>f6>f5>f4>f3>f2>f1).

FIG. 59A shows, on the left side, a first 26-subcarrier RU 5902 having pilot tone positions at potential pilot tone positions f1 and f2, a second 26-subcarrier RU 5904 having pilot tone positions at potential pilot tone positions f3 and f4, a third 26-subcarrier RU 5906 having pilot tone positions at potential pilot tone positions f5 and f6, a fourth 26-subcarrier RU 5908 having pilot tone positions at potential pilot tone positions f7 and f8, a fifth 26-subcarrier RU 5912 having pilot tone positions at potential pilot tone positions f9 and f10, a sixth 26-subcarrier RU 5914 having pilot tone positions at potential pilot tone positions f11 and f12, a seventh 26-subcarrier RU 5916 having pilot tone positions at potential pilot tone positions f13 and f14, an eighth 26-subcarrier RU 5918 having pilot tone positions at potential pilot tone positions f15 and f16, and a ninth 26-subcarrier RU 5920 having pilot tone positions at potential pilot tone positions f17 and f18.

FIG. 59A shows, on the right side, a tenth 26-subcarrier RU 5922 having pilot tone positions at potential pilot tone positions f19 and f20, an eleventh 26-subcarrier RU 5924 having pilot tone positions at potential pilot tone positions f21 and f22, a twelfth 26-subcarrier RU 5926 having pilot tone positions at potential pilot tone positions f23 and f24, a thirteenth 26-subcarrier RU 5928 having pilot tone positions at potential pilot tone positions f25 and f26, a fourteenth 26-subcarrier RU 5932 having pilot tone positions at potential pilot tone positions f27 and f28, a fifteenth 26-subcarrier RU 5934 having pilot tone positions at potential pilot tone positions f29 and f30, a sixteenth 26-subcarrier RU 5936 having pilot tone positions at potential pilot tone positions f31 and f32, a seventeenth 26-subcarrier RU 5938 having pilot tone positions at potential pilot tone positions f33 and f34, and an eighteenth 26-subcarrier RU 5940 having pilot tone positions at potential pilot tone positions f35 and f36.

In each of the 26-subcarrier RUs 5902 to 5940, respective first and second pilot tone positions correspond to potential pilot tone positions covered by the respective 26 subcarriers.

FIG. 59A further shows, on the left side, a first 52-subcarrier RU 5942 having pilot tone positions at potential pilot tone positions f1, f2, f3, and f4, a second 52-subcarrier RU 5944 having pilot tone positions at potential pilot tone positions f5, f6, f7, and f8, a third 52-subcarrier RU 5959 having pilot tone positions at potential pilot tone positions f11, f 12, f13, and f14, and a fourth 52-subcarrier RU 5948 having pilot tone positions at potential pilot tone positions f15, f16, f17, and f18.

FIG. 59A further shows, on the right side, a fifth 52-subcarrier RU 5952 having pilot tone positions at potential pilot tone positions f19, f22, f21, and f22 a sixth 52-subcarrier RU 5954 having pilot tone positions at potential pilot tone positions f23, f24, f25, and f26, a seventh 52-subcarrier RU 5956 having pilot tone positions at potential pilot tone positions f29, f30, f31, and f32, and an eighth 52-subcarrier RU 5958 having pilot tone positions at potential pilot tone positions f33, f34, f35, and f36.

In each of the 52-subcarrier RUs 5942 to 5958, respective first, second, third, and fourth pilot tone positions correspond to potential pilot tone positions covered by the respective 52 subcarriers.

FIG. 59A further shows a first 106-subcarrier RU 5962 having pilot tone positions at potential pilot tone positions f1, f3, f6, and f8, a second 106-subcarrier RU 5964 having pilot tone positions at potential pilot tone positions f11, f13, f16, and f18, a third 106-subcarrier RU 5966 having pilot tone positions at potential pilot tone positions f19, f21, f24, and f26, and a fourth 106-subcarrier RU 5968 having pilot tone positions at potential pilot tone positions f29, f31, f34, and f36. In each of the 106-subcarrier RUs 5962 to 5968, a first pilot tone position has an index corresponding to a lowest index among potential pilot tone positions covered by the RU, a second pilot tone position is spaced two potential pilot tone positions away from the first pilot tone position, a third pilot tone position spaced three potential pilot tone positions away from the second pilot tone position, and a fourth pilot tone position spaced two potential pilot tone positions away from the third pilot tone position.

FIG. 59A further shows a first 242-subcarrier RU 5972 having pilot tone positions at potential pilot tone positions f1, f3, f6, f8, f11, f13, f16, and f18, and a second 242-subcarrier RU 5974 having pilot tone positions at potential pilot tone positions f19, f21, f24, f26, f29, f31, f34, and f36. In each of the first and second 242-subcarrier RUs 5972 and 5964, a first pilot tone position has a lowest index among potential pilot tone positions covered by the 242 subcarriers, a second pilot tone position is spaced two potential pilot tone positions away from the first pilot tone position, a third pilot tone position is spaced three potential pilot tone positions away from the second pilot tone position, a fourth pilot tone position is spaced two potential pilot tone positions away from the third pilot tone position, a fifth pilot tone position is spaced three potential pilot tone positions away from the fourth pilot tone position, a sixth pilot tone position is spaced two potential pilot tone positions away from the fifth pilot tone position, a seventh pilot tone position is spaced three potential pilot tone positions away from the sixth pilot tone position, and an eighth pilot tone position is spaced two potential pilot tone positions away from the seventh pilot tone position.

FIG. 59A further shows a 484-subcarrier RU 5976 having pilot tone positions at potential pilot tone positions f1, f3, f6, f8, f11, f13, f1, f18, f19, f21, f24, f26, f29 f31, f 34, and f36. The 484-subcarrier RU 5976 has a first pilot tone position having a lowest index among potential pilot tone positions covered by the 242 subcarriers, and second, third, fourth, fifth, sixth, seventh, eighth, ninth, tenth, eleventh, twelfth, thirteenth, fourteenth, fifteenth, and sixteenth pilot tone positions spaced 2, 3, 2, 3, 2, 3, 2, 1, 2, 3, 2, 3, 2, 3, 2 potential pilot tone positions away from the first, second, third, fourth, fifth, sixth, seventh, eighth, ninth, tenth, eleventh, twelfth, thirteenth, fourteenth, and fifteenth pilot tone position, respectively.

Each of the 52-, 106-, 242-, and 484-subcarrier RUs in FIG. 59A has pilot tone positions selected from among the pilot tone positions used by the RUs having fewer subcarriers that occupy the same bandwidth.

Furthermore, each RU in a lower 20 MHz of the 40 MHz channel 5900 has pilot tone positions that are mirror symmetric with a corresponding mirrored RU (that is, an RU with a same number of subcarriers and a same offset from the center of the 40 MHz channel 4900) of an upper 20 MHz of the 40 MHz channel 4900. For example, the pilot tone positions of the first 26-subcarrier RU 5902 are positioned to be mirror-symmetric to the pilot tone positions of the eighteenth 26-subcarrier RU 5940, the pilot tone positions of the second 52-subcarrier RU 5944 are positioned to be mirror-symmetric to the pilot tone positions of the seventh 52-subcarrier RU 5956, and so on.

Figure 60:
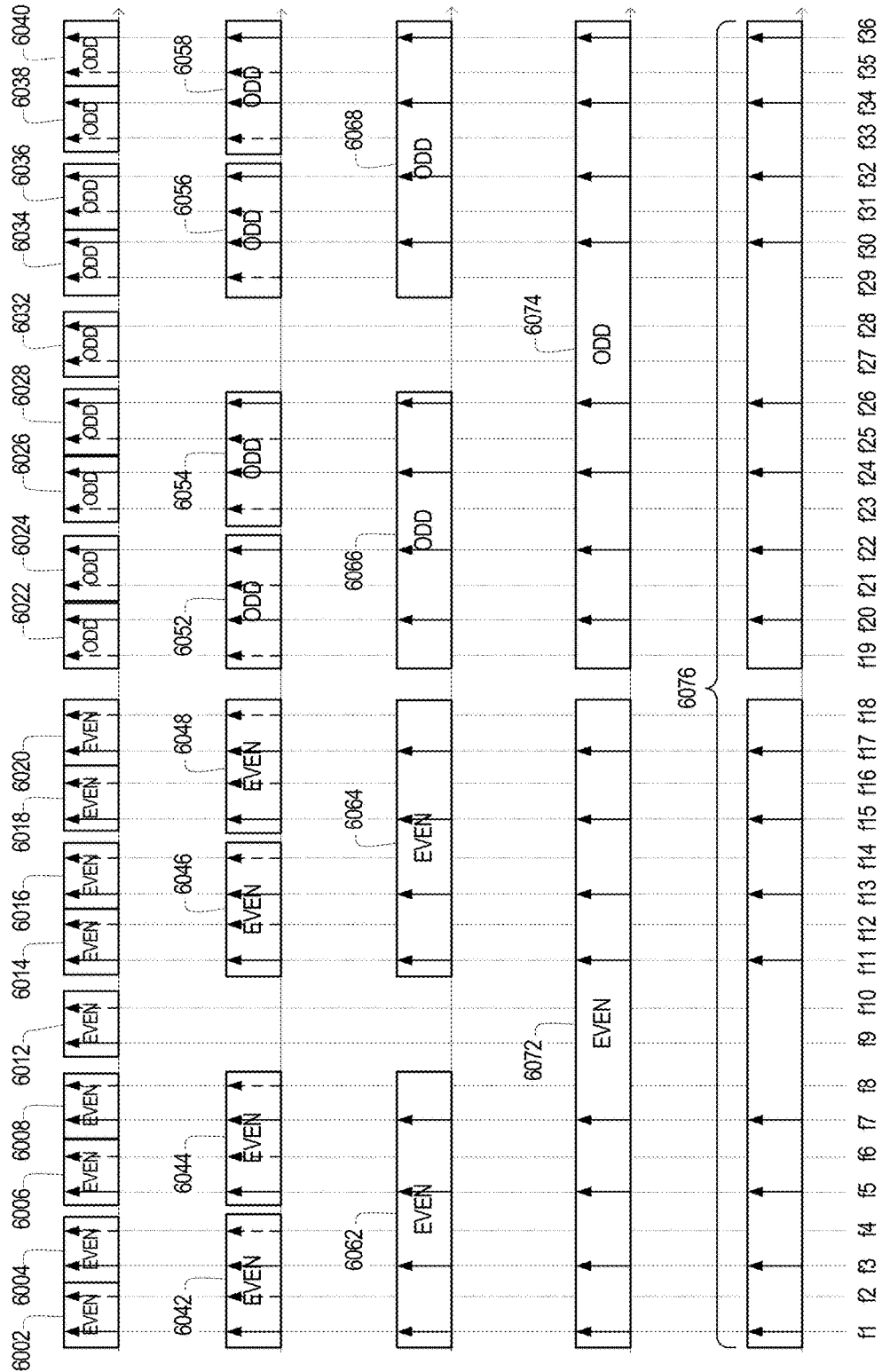
FIG. 60 illustrates pilot tone positions for RUs of the 40 MHz BW in of Case 2, according to an embodiment.

FIG. 60 illustrates a second option for pilot tone positions in Case 2 for a 40 MHz bandwidth. In an embodiment, the second option may use the first to thirty-sixth potential pilot tone positions f1 to f36 as shown in Table 9 of FIG. 33B, but embodiments are not limited thereto.

FIG. 60 shows first to eighteenth 26-subcarrier RUs 6002 to 6040 having pilot tone positions at the same potential pilot tone positions as the first to eighteenth 26-subcarrier RU 5902 to 5940 of FIG. 59A, respectively.

FIG. 60 shows first to eighth 52-subcarrier RUs 6042 to 6058 having pilot tone positions at the same potential pilot tone positions as the first to eighth 52-subcarrier RUs 5942 to 5958 of FIG. 59A, respectively.

FIG. 60 further shows a first 106-subcarrier RU 6062 having pilot tone positions at potential pilot tone positions f1, f3, f5, and f7, a second 106-subcarrier RU 6064 having pilot tone positions at potential pilot tone positions f11, f13, f15, and f17, a third 106-subcarrier RU 6066 having pilot tone positions at potential pilot tone positions f20, f22, f24, and f26, and a fourth 106-subcarrier RU 6068 having pilot tone positions at potential pilot tone positions f30, f32, f34, and f36.

FIG. 60 further shows a first 242-subcarrier RU 6072 having pilot tone positions at potential pilot tone positions f1, f3, f5, f7, f11, f13, f15, and f17, a second 242-subcarrier RU 6074 having pilot tone positions at potential pilot tone positions f20, f22, f24, f26, f30, f32, f34, and f36, and a 484-subcarrier RU 6076 having pilot tone positions at potential pilot tone positions f1, f3, f5, f7, f11, f13, f15, f17, f20, f22, f24, f26, f30, f32, f34, and f36.

Each of the 52-, 106-, 242-, and 484-subcarrier RUs in FIG. 60 has pilot tone positions selected from among the pilot tone positions used by the RUs having fewer subcarriers that occupy the same bandwidth. Furthermore, the pilot tone positions of FIG. 60 exhibit the mirror symmetry described above for FIG. 59A.

Figure 61:
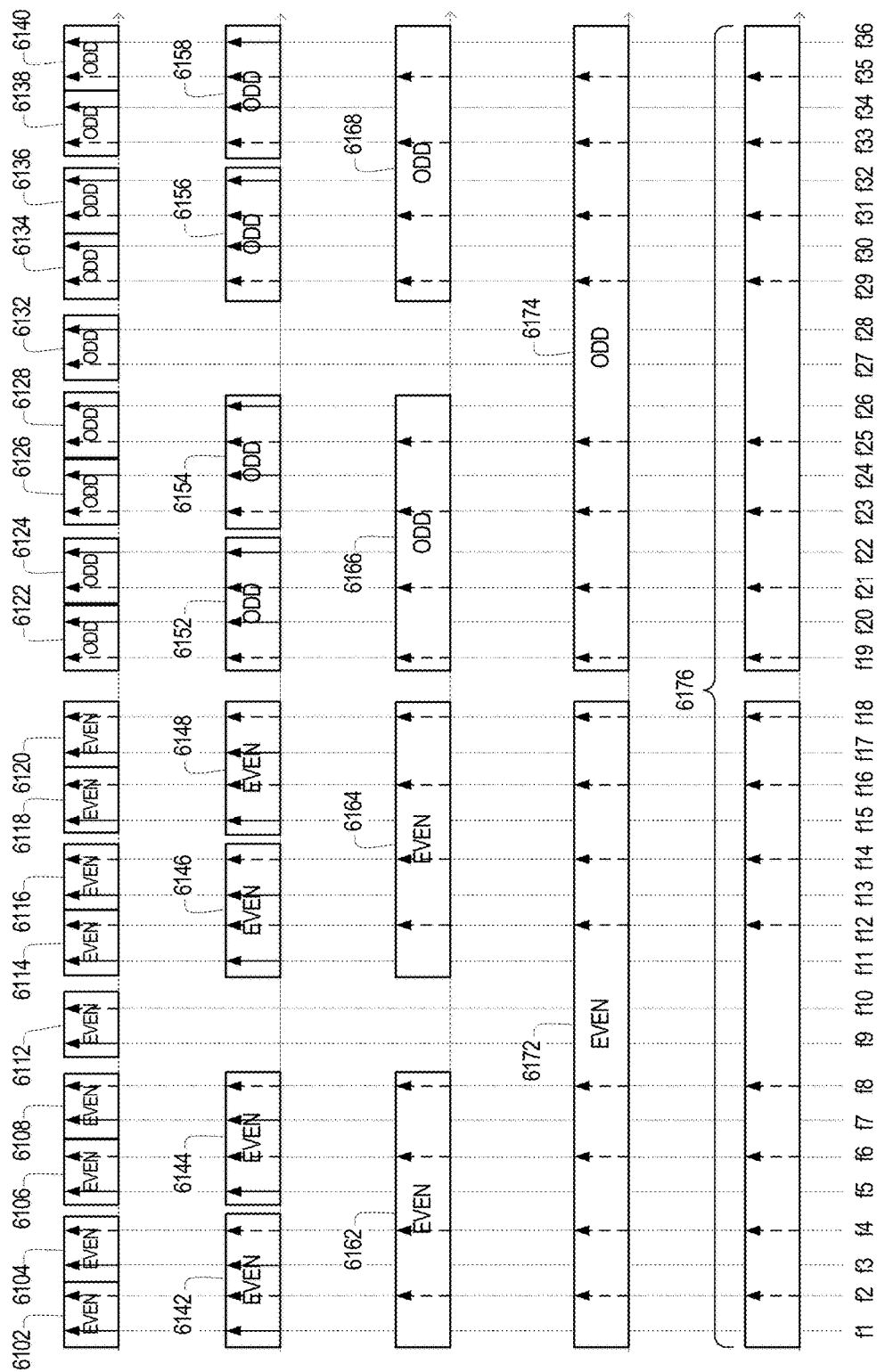
FIG. 61 illustrates pilot tone positions for RUs of the 40 MHz BW in of Case 2, according to an embodiment.

FIG. 61 illustrates a third option for pilot tone positions in Case 2 for a 40 MHz bandwidth. In an embodiment, the third option may use the first to thirty-sixth potential pilot tone positions f1 to f36 as shown in Table 9 of FIG. 33B, but embodiments are not limited thereto.

FIG. 61 shows first to eighteenth 26-subcarrier RUs 6102 to 6140 having pilot tone positions at the same potential pilot tone positions as the first to eighteenth 26-subcarrier RU 5902 to 5940 of FIG. 59A, respectively.

FIG. 61 shows first to eighth 52-subcarrier RUs 6142 to 6158 having pilot tone positions at the same potential pilot tone positions as the first to eighth 52-subcarrier RUs 5942 to 5958 of FIG. 59A, respectively.

FIG. 61 further shows a first 106-subcarrier RU 6162 having pilot tone positions at potential pilot tone positions f2, f4, f6, and f8, a second 106-subcarrier RU 6164 having pilot tone positions at potential pilot tone positions f12, f14, f16, and f18, a third 106-subcarrier RU 6166 having pilot tone positions at potential pilot tone positions f19, f21, f23, and f25, and a fourth 106-subcarrier RU 6168 having pilot tone positions at potential pilot tone positions f29, f31, f33, and f35.

FIG. 61 further shows a first 242-subcarrier RU 6172 having pilot tone positions at potential pilot tone positions f2, f4, f6, f8, f12, f14, f16, and f18, a second 242-subcarrier RU 6174 having pilot tone positions at potential pilot tone positions f19, f21, f23, f25, f29, f31, f33, and f35, and a 484-subcarrier RU 6176 having pilot tone positions at potential pilot tone positions f2, f4, f6, f8, f12, f14, f16, f18, f19, f21, f23, f25, f29, f31, f33, and f35.

Each of the 52-, 106-, 242-, and 484-subcarrier RUs in FIG. 61 has pilot tone positions selected from among the pilot tone positions used by the RUs having fewer subcarriers that occupy the same bandwidth. Furthermore, the pilot tone positions of FIG. 61 exhibit the mirror symmetry described above for FIG. 59A.

Figure 62:
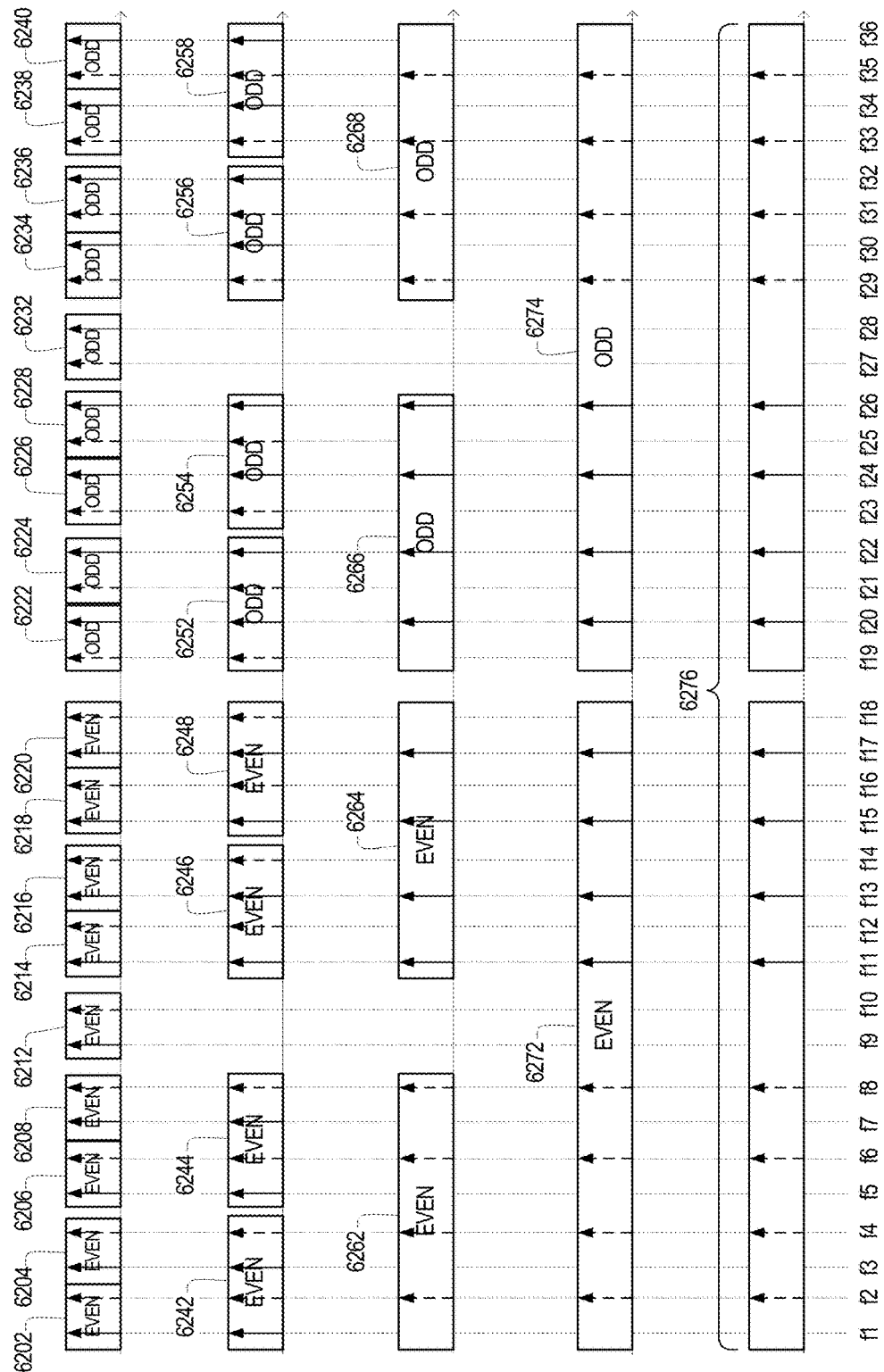
FIG. 62 illustrates pilot tone positions for RUs of the 40 MHz BW in of Case 2, according to an embodiment.

FIG. 62 illustrates a fourth option for pilot tone positions in Case 2 for a 40 MHz bandwidth. In an embodiment, the fourth option may use the first to thirty-sixth potential pilot tone positions f1 to f36 as shown in Table 9 of FIG. 33B, but embodiments are not limited thereto.

FIG. 62 shows first to eighteenth 26-subcarrier RUs 6202 to 6240 having pilot tone positions at the same potential pilot tone positions as the first to eighteenth 26-subcarrier RU 5902 to 5940 of FIG. 59A, respectively.

FIG. 62 shows first to eighth 52-subcarrier RUs 6242 to 6258 having pilot tone positions at the same potential pilot tone positions as the first to eighth 52-subcarrier RUs 5942 to 5958 of FIG. 59A, respectively.

FIG. 62 further shows a first 106-subcarrier RU 6262 having pilot tone positions at potential pilot tone positions f2, f4, f6, and f8, a second 106-subcarrier RU 6264 having pilot tone positions at potential pilot tone positions f11, f13, f15, and f17, a third 106-subcarrier RU 6266 having pilot tone positions at potential pilot tone positions f20, f22, f24, and f26, and a fourth 106-subcarrier RU 6268 having pilot tone positions at potential pilot tone positions f29, f31, f33, and f35.

FIG. 62 further shows a first 242-subcarrier RU 6272 having pilot tone positions at potential pilot tone positions f2, f4, f6, f8, f11, f13, f15, and f17, a second 242-subcarrier RU 6274 having pilot tone positions at potential pilot tone positions f20, f22, f24, f26, f29, f31, f33, and f35, and a 484-subcarrier RU 6276 having pilot tone positions at potential pilot tone positions f2, f4, f6, f8, f11, f13, f15, f17, f20, f22, f24, f26, f29, f31, f33, and f35.

Each of the 52-, 106-, 242-, and 484-subcarrier RUs in FIG. 62 has pilot tone positions selected from among the pilot tone positions used by the RUs having fewer subcarriers that occupy the same bandwidth. Furthermore, the pilot tone positions of FIG. 62 exhibit the mirror symmetry described above for FIG. 59A.

Figure 63:
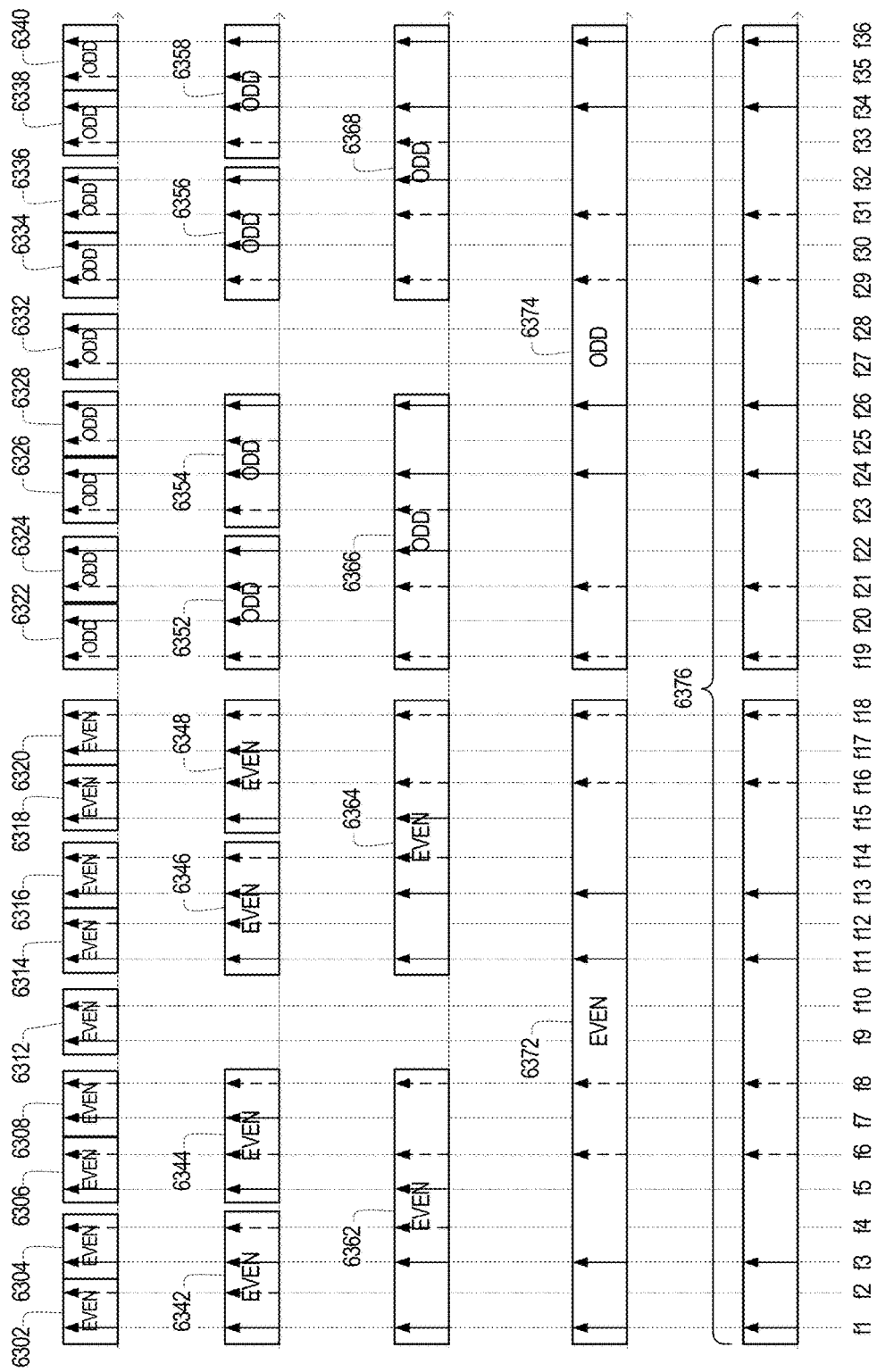
FIG. 63 illustrates pilot tone positions for RUs of the 40 MHz BW in of Case 2, according to an embodiment.

FIG. 63 illustrates a fifth option for pilot tone positions in Case 2 for a 40 MHz bandwidth. In an embodiment, the fifth option may use the first to thirty-sixth potential pilot tone positions f1 to f36 as shown in Table 9 of FIG. 33B, but embodiments are not limited thereto.

FIG. 63 shows first to eighteenth 26-subcarrier RUs 6302 to 6340 having pilot tone positions at the same potential pilot tone positions as the first to eighteenth 26-subcarrier RU 5902 to 5940 of FIG. 59A, respectively.

FIG. 63 shows first to eighth 52-subcarrier RUs 6342 to 6358 having pilot tone positions at the same potential pilot tone positions as the first to eighth 52-subcarrier RUs 5942 to 5958 of FIG. 59A, respectively.

FIG. 63 further shows a first 108-subcarrier RU 6362 having pilot tone positions at potential pilot tone positions f1, f3, f4, f5, f6, and f8, a second 108-subcarrier RU 6364 having pilot tone positions at potential pilot tone positions f11, f13, f14, f15, f16, and f18, a third 108-subcarrier RU 6366 having pilot tone positions at potential pilot tone positions f19, f 21, f22, f23, f24, and f26, and a fourth 108-subcarrier RU 6368 having pilot tone positions at potential pilot tone positions f29, f31, f32, f33, f34, and f36.

FIG. 63 further shows a first 242-subcarrier RU 6372 having pilot tone positions at potential pilot tone positions f1, f3, f6, f8, f11, f13, f16, and f18, a second 242-subcarrier RU 6374 having pilot tone positions at potential pilot tone positions f19, f21, f24, f26, f29, f31, f34, and f36, and a 484-subcarrier RU 6376 having pilot tone positions at potential pilot tone positions f1, f3, f6, f8, f11, f13, f16, f18, f19, f21, f24, f26, f29, f31, f34, and f36.

Each of the 52-, 106-, 242-, and 484-subcarrier RUs in FIG. 63 has pilot tone positions selected from among the pilot tone positions used by the RUs having fewer subcarriers that occupy the same bandwidth. Furthermore, the pilot tone positions of FIG. 63 exhibit the mirror symmetry described above for FIG. 59A.

Figure 64:
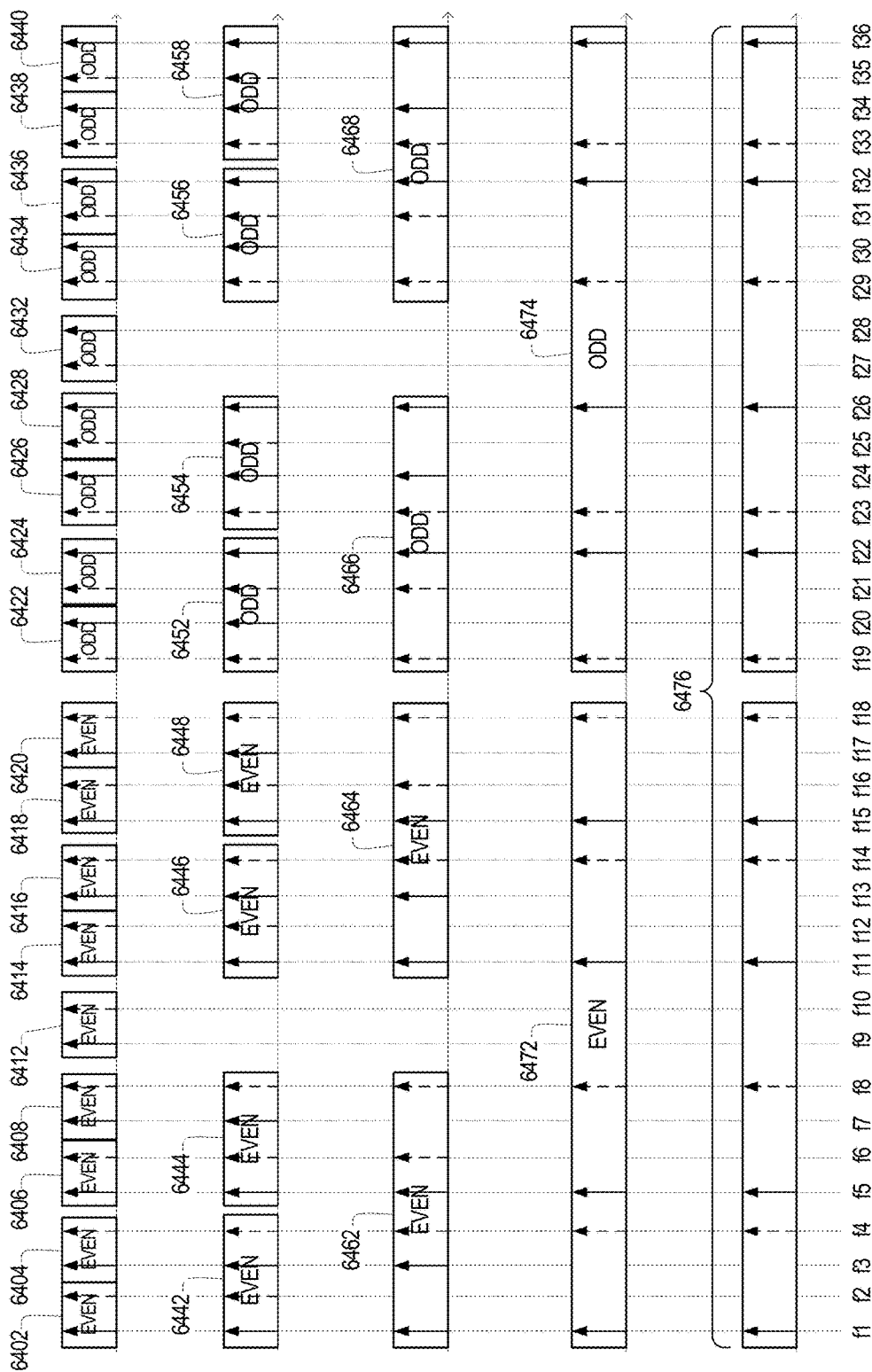
FIG. 64 illustrates pilot tone positions for RUs of the 40 MHz BW in of Case 2, according to an embodiment.

FIG. 64 illustrates a sixth option for pilot tone positions in Case 2 for a 40 MHz bandwidth. In an embodiment, the sixth option may use the first to thirty-sixth potential pilot tone positions f1 to f36 as shown in Table 9 of FIG. 33B, but embodiments are not limited thereto.

FIG. 64 shows first to eighteenth 26-subcarrier RUs 6402 to 6440 having pilot tone positions at the same potential pilot tone positions as the first to eighteenth 26-subcarrier RU 5902 to 5940 of FIG. 59A, respectively.

FIG. 64 shows first to eighth 52-subcarrier RUs 6442 to 6458 having pilot tone positions at the same potential pilot tone positions as the first to eighth 52-subcarrier RUs 5942 to 5958 of FIG. 59A, respectively.

FIG. 64 further shows a first 108-subcarrier RU 6462 having pilot tone positions at potential pilot tone positions f1, f3, f4, f5, f6, and f8, a second 108-subcarrier RU 6464 having pilot tone positions at potential pilot tone positions f11, f13, f14, f15, f16, and f18, a third 108-subcarrier RU 6466 having pilot tone positions at potential pilot tone positions f19, f 21, f22, f23, f24, and f26, and a fourth 108-subcarrier RU 6468 having pilot tone positions at potential pilot tone positions f29, f31, f32, f33, f34, and f36.

FIG. 64 further shows a first 242-subcarrier RU 6472 having pilot tone positions at potential pilot tone positions f1, f4, f5, f8, f11, f14, f15, and f18, a second 242-subcarrier RU 6474 having pilot tone positions at potential pilot tone positions f19, f22, f23, f26, f29, f32, f33, and f36, and a 484-subcarrier RU 6476 having pilot tone positions at potential pilot tone positions f1, f4, f5, f8, f11, f14, f15, f18, f19, f22, f23, f26, f29, f32, f33, and f36.

Each of the 52-, 106-, 242-, and 484-subcarrier RUs in FIG. 64 has pilot tone positions selected from among the pilot tone positions used by the RUs having fewer subcarriers that occupy the same bandwidth. Furthermore, the pilot tone positions of FIG. 64 exhibit the mirror symmetry described above for FIG. 59A.

Figure 65:
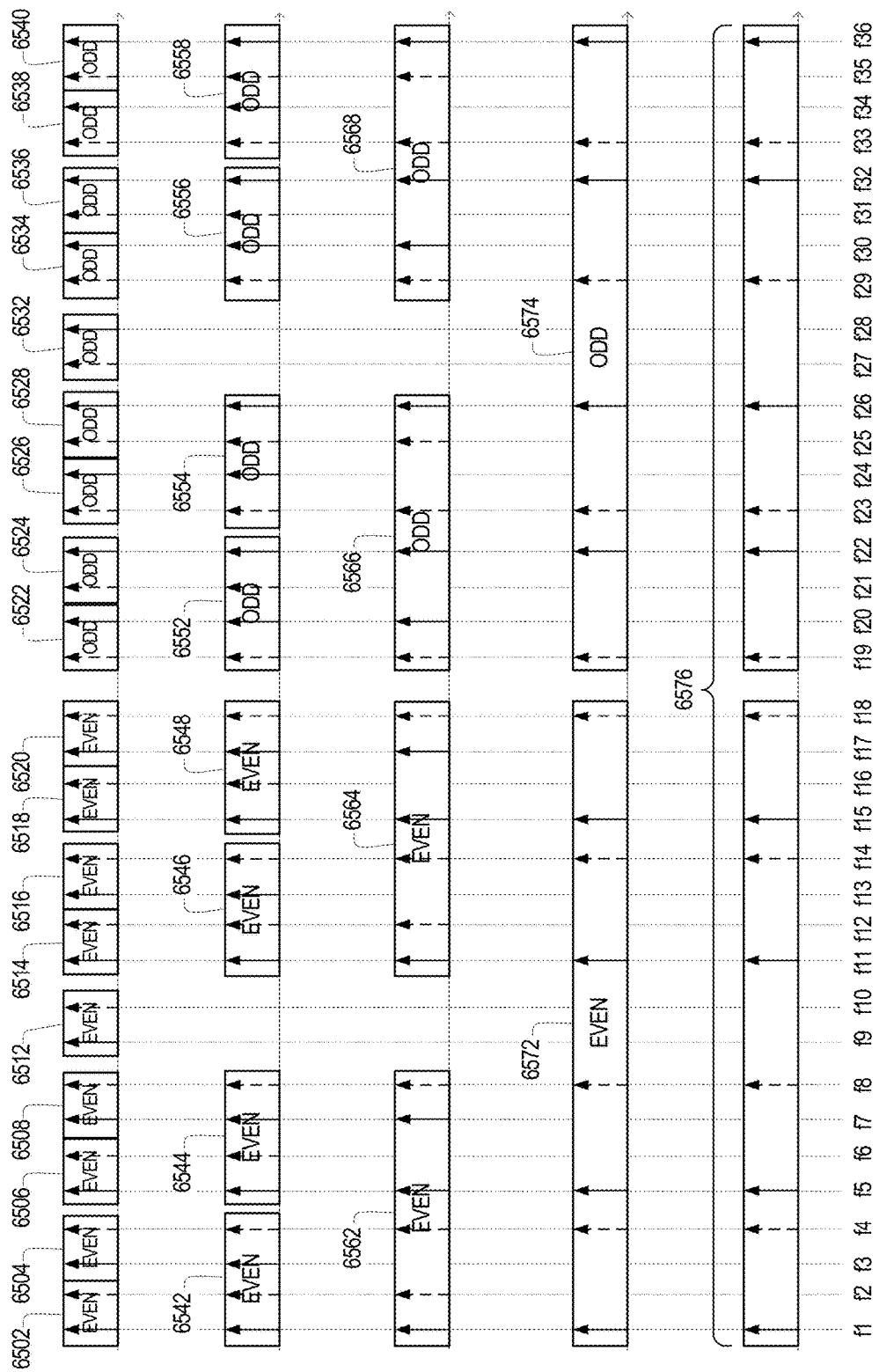
FIG. 65 illustrates pilot tone positions for RUs of the 40 MHz BW in of Case 2, according to an embodiment.

FIG. 65 illustrates a seventh option for pilot tone positions in Case 2 for a 40 MHz bandwidth. In an embodiment, the seventh option may use the first to thirty-sixth potential pilot tone positions f1 to f36 as shown in Table 9 of FIG. 33B, but embodiments are not limited thereto.

FIG. 65 shows first to eighteenth 26-subcarrier RUs 6502 to 6540 having pilot tone positions at the same potential pilot tone positions as the first to eighteenth 26-subcarrier RU 5902 to 5940 of FIG. 59A, respectively.

FIG. 65 shows first to eighth 52-subcarrier RUs 6542 to 6558 having pilot tone positions at the same potential pilot tone positions as the first to eighth 52-subcarrier RUs 5942 to 5958 of FIG. 59A, respectively.

FIG. 65 further shows a first 108-subcarrier RU 6562 having pilot tone positions at potential pilot tone positions f1, f2, f4, f5, f7, and f8, a second 108-subcarrier RU 6564 having pilot tone positions at potential pilot tone positions f11, f12, f14, f15, f17, and f18, a third 108-subcarrier RU 6566 having pilot tone positions at potential pilot tone positions f19, f20, f22, f23, f25, and f26, and a fourth 108-subcarrier RU 6568 having pilot tone positions at potential pilot tone positions f29, f30, f32, f33, f35, and f36.

FIG. 65 further shows a first 242-subcarrier RU 6572 having pilot tone positions at potential pilot tone positions f1, f4, f5, f8, f11, f14, f15, and f18, a second 242-subcarrier RU 6574 having pilot tone positions at potential pilot tone positions f19, f22, f23, f26, f29, f32, f33, and f36, and a 484-subcarrier RU 6576 having pilot tone positions at potential pilot tone positions f1, f4, f5, f8, f11, f14, f15, f18, f19, f22, f23, f26, f29, f32, f33, and f36.

Each of the 52-, 106-, 242-, and 484-subcarrier RUs in FIG. 65 has pilot tone positions selected from among the pilot tone positions used by the RUs having fewer subcarriers that occupy the same bandwidth. Furthermore, the pilot tone positions of FIG. 65 exhibit the mirror symmetry described above for FIG. 59A.

FIGS. 66 to 78 represent example embodiments of the relative pilot tone positions within the 52 subcarrier RU for different cases and options. The pilot tone position positions shown in FIGS. 66 to 78 can be used in both Design A and B, although it was drawn to represent an example of the nested pilot tone positions (i.e. design B) for the 52 subcarrier RUs.

In FIGS. 66 to 78, hash marks along the horizontal access correspond to subcarriers that respectively do not correspond to subcarriers having energy in a 2X HE-LTF. Upward pointing arrows along the horizontal access respectively correspond to subcarriers that correspond to the subcarriers having energy in the 2X HE-LTF.

FIG. 66 illustrates an option for pilot tone positions in Case 1, according to embodiments. FIG. 66 can be interpreted as illustrating two embodiments, according to whether a reference subcarrier index $f_0$ is even or odd.

FIG. 66 illustrates a first embodiment including a 52-subcarrier RU 6610 being an even RU and having pilot tone positions such as may be used with an even mapping of a HE-LTF sequence in a 2×LTF design, wherein a reference subcarrier index $f_0$ has a value equal to 2×N, where N is an integer. FIG. 66 also illustrates pilot tone positions of a first 26-subcarier RU 6600A and a second 26-subcarier RU 6600B that occupy a plurality of subcarriers occupied by the 52-subcarrier RU 6610 and that would be even and odd RUs, respectively, in the first embodiment.

FIG. 66 illustrates a second embodiment including a 52-subcarrier RU 6610 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 66 also illustrates pilot tone positions of a first 26-subcarier RU 6600A and a second 26-subcarier RU 6600B that occupy a plurality of subcarriers occupied by the 52-subcarrier RU 6610 and that would be odd and even RUs, respectively, in the second embodiment.

In FIG. 66, a lowest-indexed subcarrier of the 52-subcarrier RU 6610 is aligned with a lowest-indexed subcarrier of the first 26-subcarrier RU 6600A. A null or reserved subcarrier 6620 is disposed between the first and second 26-subcarrier RUs 6600A and 6600B.

The first 26-subcarrier RU 6600A includes first and second pilot tone positions 6602 and 6604. The first pilot tone position 6602 corresponds to a subcarrier spaced 6 subcarriers away from the lowest-indexed subcarrier of the first 26-subcarrier RU 6600A. The second pilot tone position 6604 corresponds to a subcarrier separated by 12 subcarriers from the first pilot tone position 6602 and spaced 6 subcarriers away from a highest-indexed subcarrier of the first 26-subcarrier RU 6600A.

The second 26-subcarrier RU 6600B includes third and fourth pilot tone positions 6606 and 6608. The third pilot tone position 6606 corresponds to a subcarrier spaced 6 subcarriers away from a lowest-indexed subcarrier of the second 26-subcarrier RU 6600B. The fourth pilot tone position 6608 corresponds to a subcarrier separated by 12 subcarriers from the first pilot tone position 6606 and spaced 6 subcarriers away from a highest-indexed subcarrier of the second 26-subcarrier RU 6600B.

The 52-subcarrier RU 6610 includes fifth, sixth, seventh, and eighth pilot tone positions 6612, 6614, 6616, and 6618. The fifth, sixth, seventh, and eighth pilot tone positions 6612, 6614, 6616, and 6618 of the 52-subcarrier RU 6610 respectively correspond to the first, second, third, and fourth pilot tone positions 6602, 6604, 6606, and 6608 of the first and second 26-subcarrier RUs 6600A and 6600B.

The fifth pilot tone position 6612 corresponds to a subcarrier spaced 6 subcarriers away from the lowest-indexed subcarrier of the 52-subcarrier RU 6610. The sixth pilot tone position 6614 corresponds to a subcarrier separated by 12 subcarriers from the fifth pilot tone position 6612. The seventh pilot tone position 6614 corresponds to a subcarrier separated by 13 subcarriers from the sixth pilot tone position 6612. The eighth pilot tone position 6618 corresponds to a subcarrier separated by 12 subcarriers from the seventh pilot tone position 6616 and spaced 5 subcarriers away from a highest-indexed subcarrier of the 52-subcarrier RU 6610.

FIG. 66 illustrates mirror symmetric pilot tone positions between the first 26-subcarrier RU 6600A (which may be odd or even) and the second 26-subcarrier RU 6600B (which may be even or odd, respectively). FIG. 66 also illustrates a nested design in which the 52-subcarrier RU 6610 uses the same pilot tone positions as the first and second RUs 6600A and 6600B, but embodiments are not limited thereto.

FIG. 67 illustrates another option for pilot tone positions in Case 1, according to embodiments. FIG. 67 can be interpreted as illustrating two embodiments, according to whether a reference subcarrier index $f_0$ is even or odd.

FIG. 67 illustrates a first embodiment including a 52-subcarrier RU 6710 being an even RU and having pilot tone positions such as may be used with an even mapping of a HE-LTF sequence in a 2×LTF design, wherein a reference subcarrier index $f_0$ has a value equal to 2×N, where N is an integer. FIG. 67 also illustrates pilot tone positions of a first 26-subcarrier RU 6700A and a second 26-subcarrier RU 6700B that occupy a plurality of subcarriers occupied by the 52-subcarrier RU 6710 and that would be odd and even RUs, respectively, in the first embodiment.

FIG. 67 illustrates a second embodiment including a 52-subcarrier RU 6710 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 67 also illustrates pilot tone positions of a first 26-subcarrier RU 6700A and a second 26-subcarrier RU 6700B that occupy a plurality of subcarriers occupied by the 52-subcarrier RU 6710 and that would be even and odd RUs, respectively, in the second embodiment.

In FIG. 67, a highest-indexed subcarrier of the 52-subcarrer RU 6710 is aligned with a highest-indexed subcarrier of the second 26-subcarrier RU 6700B. A null or reserved subcarrier 6720 is disposed between the first and second 26-subcarrier RUs 6700A and 6700B.

The first 26-subcarrier RU 6700A includes first and second pilot tone positions 6702 and 6704. The first pilot tone position 6702 corresponds to a subcarrier spaced 6 subcarriers away from a lowest-indexed subcarrier of the first 26-subcarrier RU 6700A. The second pilot tone position 6704 corresponds to a subcarrier separated by 12 subcarriers from the first pilot tone position 6702 and spaced 6 subcarriers away from a highest-indexed subcarrier of the first 26-subcarrier RU 6700A.

The second 26-subcarrier RU 6700B includes third and fourth pilot tone positions 6706 and 6708. The third pilot tone position 6706 corresponds to a subcarrier spaced 6 subcarriers away from a lowest-indexed subcarrier of the second 26-subcarrier RU 6700B. The fourth pilot tone position 6708 corresponds to a subcarrier separated by 12 subcarriers from the first pilot tone position 6706 and spaced 6 subcarriers away from the highest-indexed subcarrier of the second 26-subcarrier RU 6700B.

The 52-subcarrier RU 6710 includes fifth, sixth, seventh, and eighth pilot tone positions 6712, 6714, 6716, and 6718. The fifth, sixth, seventh, and eighth pilot tone positions 6712, 6714, 6716, and 6718 of the 52-subcarrier RU 6710 respectively correspond to the first, second, third, and fourth pilot tone positions 6702, 6704, 6706, and 6708 of the first and second 26-subcarrier RUs 6700A and 6700B.

The fifth pilot tone position 6712 corresponds to a subcarrier spaced 5 subcarriers away from a lowest-indexed subcarrier of the 52-subcarrier RU 6710. The sixth pilot tone position 6714 corresponds to a subcarrier separated by 12 subcarriers from the fifth pilot tone position 6712. The seventh pilot tone position 6714 corresponds to a subcarrier separated by 13 subcarriers from the sixth pilot tone position 6712. The eighth pilot tone position 6718 corresponds to a subcarrier separated by 12 subcarriers from the seventh pilot tone position 6716 and spaced 6 subcarriers away from the highest-indexed subcarrier of the 52-subcarrier RU 6710.

FIG. 67 illustrates mirror symmetric pilot tone positions between the first 26-subcarrier RU 6700A (which may be odd or even) and the second 26-subcarrier RU 6700B (which may be even or odd, respectively). FIG. 67 also illustrates a nested design in which the 52-subcarrier RU 6710 uses the same pilot tone positions as the first and second RUs 6700A and 6700B, but embodiments are not limited thereto.

FIG. 68 illustrates another option for pilot tone positions in Case 1, according to embodiments. FIG. 68 can be interpreted as illustrating two embodiments, according to whether a reference subcarrier index $f_0$ is even or odd.

FIG. 68 illustrates a first embodiment including a 52-subcarrier RU 6810 being an even RU and having pilot tone positions such as may be used with an odd mapping of a HE-LTF sequence in a 2×LTF design, wherein a reference subcarrier index $f_0$ has a value equal to 2×N, where N is an integer. FIG. 68 also illustrates pilot tone positions of a first 26-subcarier RU 6800A and a second 26-subcarier RU 6800B that occupy a plurality of subcarriers occupied by the 52-subcarrier RU 6810 and that would be even and odd RUs, respectively, in the first embodiment.

FIG. 68 may also be seen illustrating a second embodiment including a 52-subcarrier RU 6810 being an odd RU and having pilot tone positions such as may be used with an even mapping of a HE-LTF sequence in a 2×LTF design, wherein the reference subcarrier index $f_0$ has a value equal to 2×N+1, where N is an integer. FIG. 68 also illustrates pilot tone positions of a first 26-subcarier RU 6800A and a second 26-subcarier RU 6800B that occupy a plurality of subcarriers occupied by the 52-subcarrier RU 6810 and that would be odd and even RUs, respectively, in the second embodiment.

In FIG. 68, a lowest-indexed subcarrier of the 52-subcarrer RU 6810 is aligned with a lowest-indexed subcarrier of the first 26-subcarrier RU 6800A. A null or reserved subcarrier 6820 is disposed between the first and second 26-subcarrier RUs 6800A and 6800B.

The first 26-subcarrier RU 6800A includes first and second pilot tone positions 6802 and 6804. The first pilot tone position 6802 corresponds to a subcarrier spaced 6 subcarriers away from the lowest-indexed subcarrier of the first 26-subcarrier RU 6800A. The second pilot tone position 6804 corresponds to a subcarrier separated by 12 subcarriers from the first pilot tone position 6802 and spaced 6 subcarriers away from a highest-indexed subcarrier of the first 26-subcarrier RU 6800A.

The second 26-subcarrier RU 6800B includes third and fourth pilot tone positions 6806 and 6808. The third pilot tone position 6806 corresponds to a subcarrier spaced 6 subcarriers away from a lowest-indexed subcarrier of the second 26-subcarrier RU 6800B. The fourth pilot tone position 6808 corresponds to a subcarrier separated by 12 subcarriers from the first pilot tone position 6806 and spaced 6 subcarriers away from a highest-indexed subcarrier of the second 26-subcarrier RU 6800B.

The 52-subcarrier RU 6810 includes fifth, sixth, seventh, and eighth pilot tone positions 6812, 6814, 6816, and 6818. The fifth, sixth, seventh, and eighth pilot tone positions 6812, 6814, 6816, and 6818 of the 52-subcarrier RU 6810 respectively correspond to the first, second, third, and fourth pilot tone positions 6802, 6804, 6806, and 6808 of the first and second 26-subcarrier RUs 6800A and 6800B.

The fifth pilot tone position 6812 corresponds to a subcarrier spaced 6 subcarriers away from the lowest-indexed subcarrier of the 52-subcarrier RU 6810. The sixth pilot tone position 6814 corresponds to a subcarrier separated by 12 subcarriers from the fifth pilot tone position 6812. The seventh pilot tone position 6814 corresponds to a subcarrier separated by 13 subcarriers from the sixth pilot tone position 6812. The eighth pilot tone position 6818 corresponds to a subcarrier separated by 12 subcarriers from the seventh pilot tone position 6816 and spaced 5 subcarriers away from a highest-indexed subcarrier of the 52-subcarrier RU 6810.

FIG. 68 illustrates mirror symmetric pilot tone positions between the first 26-subcarrier RU 6800A (which may be odd or even) and the second 26-subcarrier RU 6800B (which may be even or odd, respectively). FIG. 68 also illustrates a nested design in which the 52-subcarrier RU 6810 uses the same pilot tone positions as the first and second RUs 6800A and 6800B, but embodiments are not limited thereto.

FIG. 69 illustrates another option for pilot tone positions in Case 1, according to embodiments. FIG. 69 can be interpreted as illustrating two embodiments, according to whether a reference subcarrier index $f_0$ is even or odd.

FIG. 69 illustrates a first embodiment including a 52-subcarrier RU 6910 being an even RU and having pilot tone positions such as may be used with an odd mapping of a HE-LTF sequence in a 2×LTF design, wherein a reference subcarrier index $f_0$ has a value equal to 2×N, where N is an integer. FIG. 69 also illustrates pilot tone positions of a first 26-subcarier RU 6900A and a second 26-subcarrier RU 6900B that occupy a plurality of subcarriers occupied by the 52-subcarrier RU 6910 and that would be odd and even RUs, respectively, in the first embodiment.

FIG. 69 illustrates a second embodiment including a 52-subcarrier RU 6910 being an odd RU and having pilot tone positions such as may be used with an even mapping of a HE-LTF sequence in a 2×LTF design, wherein the reference subcarrier index $f_0$ has a value equal to 2×N+1, where N is an integer. FIG. 69 also illustrates pilot tone positions of a first 26-subcarrier RU 6900A and a second 26-subcarrier RU 6900B that occupy a plurality of subcarriers occupied by the 52-subcarrier RU 6910 and that would be even and odd RUs, respectively, in the second embodiment.

In FIG. 69, a highest-indexed subcarrier of the 52-subcarrer RU 6910 is aligned with a highest-indexed subcarrier of the second 26-subcarrier RU 6900B. A null or reserved subcarrier 6920 is disposed between the first and second 26-subcarrier RUs 6900A and 6900B.

The first 26-subcarrier RU 6900A includes first and second pilot tone positions 6902 and 6904. The first pilot tone position 6902 corresponds to a subcarrier spaced 6 subcarriers away from a lowest-indexed subcarrier of the first 26-subcarrier RU 6900A. The second pilot tone position 6904 corresponds to a subcarrier separated by 12 subcarriers from the first pilot tone position 6902 and spaced 6 subcarriers away from a highest-indexed subcarrier of the first 26-subcarrier RU 6900A.

The second 26-subcarrier RU 6900B includes third and fourth pilot tone positions 6906 and 6908. The third pilot tone position 6906 corresponds to a subcarrier spaced 6 subcarriers away from a lowest-indexed subcarrier of the second 26-subcarrier RU 6900B. The fourth pilot tone position 6908 corresponds to a subcarrier separated by 12 subcarriers from the first pilot tone position 6906 and spaced 6 subcarriers away from the highest-indexed subcarrier of the second 26-subcarrier RU 6900B.

The 52-subcarrier RU 6910 includes fifth, sixth, seventh, and eighth pilot tone positions 6912, 6914, 6916, and 6918. The fifth, sixth, seventh, and eighth pilot tone positions 6912, 6914, 6916, and 6918 of the 52-subcarrier RU 6910 respectively correspond to the first, second, third, and fourth pilot tone positions 6902, 6904, 6906, and 6908 of the first and second 26-subcarrier RUs 6900A and 6900B.

The fifth pilot tone position 6912 corresponds to a subcarrier spaced 5 subcarriers away from a lowest-indexed subcarrier of the 52-subcarrier RU 6910. The sixth pilot tone position 6914 corresponds to a subcarrier separated by 12 subcarriers from the fifth pilot tone position 6912. The seventh pilot tone position 6914 corresponds to a subcarrier separated by 13 subcarriers from the sixth pilot tone position 6912. The eighth pilot tone position 6918 corresponds to a subcarrier separated by 12 subcarriers from the seventh pilot tone position 6916 and spaced 6 subcarriers away from the highest-indexed subcarrier of the 52-subcarrier RU 6910.

FIG. 69 illustrates mirror symmetric pilot tone positions between the first 26-subcarrier RU 6900A (which may be odd or even) and the second 26-subcarrier RU 6900B (which may be even or odd, respectively). FIG. 69 also illustrates a nested design in which the 52-subcarrier RU 6910 uses the same pilot tone positions as the first and second RUs 6900A and 6900B, but embodiments are not limited thereto.

FIG. 70 illustrates another option for pilot tone positions in Case 1, according to embodiments. FIG. 70 can be interpreted as illustrating two embodiments, according to whether a reference subcarrier index $f_0$ is even or odd.

FIG. 70 illustrates a first embodiment including a 52-subcarrier RU 7010 being an even RU and having pilot tone positions such as may be used with an even mapping of a HE-LTF sequence in a 2×LTF design, wherein a reference subcarrier index $f_0$ has a value equal to 2×N, where N is an integer. FIG. 70 also illustrates pilot tone positions of a first 26-subcarier RU 7000A and a second 26-subcarier RU 7000B that occupy a plurality of subcarriers occupied by the 52-subcarrier RU 7010 and that would be odd and even RUs, respectively, in the first embodiment.

FIG. 70 illustrates a second embodiment including a 52-subcarrier RU 7010 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 70 also illustrates pilot tone positions of a first 26-subcarrier RU 7000A and a second 26-subcarier RU 7000B that occupy a plurality of subcarriers occupied by the 52-subcarrier RU 7010 and that would be even and odd RUs, respectively, in the second embodiment.

In FIG. 70, a highest-indexed subcarrier of the 52-subcarrer RU 7010 is aligned with a highest-indexed subcarrier of the second 26-subcarrier RU 7000B. A null or reserved subcarrier 7020 is disposed between the first and second 26-subcarrier RUs 7000A and 7000B.

The first 26-subcarrier RU 7000A includes first and second pilot tone positions 7002 and 7004. The first pilot tone position 7002 corresponds to a subcarrier spaced 5 subcarriers away from a lowest-indexed subcarrier of the first 26-subcarrier RU 7000A. The second pilot tone position 7004 corresponds to a subcarrier separated by 13 subcarriers from the first pilot tone position 7002 and spaced 6 subcarriers away from a highest-indexed subcarrier of the first 26-subcarrier RU 7000A.

The second 26-subcarrier RU 7000B includes third and fourth pilot tone positions 7006 and 7008. The third pilot tone position 7006 corresponds to a subcarrier spaced 6 subcarriers away from a lowest-indexed subcarrier of the second 26-subcarrier RU 7000B. The fourth pilot tone position 7008 corresponds to a subcarrier separated by 13 subcarriers from the first pilot tone position 7006 and spaced 5 subcarriers away from the highest-indexed subcarrier of the second 26-subcarrier RU 7000B.

The 52-subcarrier RU 7010 includes fifth, sixth, seventh, and eighth pilot tone positions 7012, 7014, 7016, and 7018. The fifth, sixth, seventh, and eighth pilot tone positions 7012, 7014, 7016, and 7018 of the 52-subcarrier RU 7010 respectively correspond to the first, second, third, and fourth pilot tone positions 7002, 7004, 7006, and 7008 of the first and second 26-subcarrier RUs 7000A and 7000B.

The fifth pilot tone position 7012 corresponds to a subcarrier spaced 4 subcarriers away from the lowest-indexed subcarrier of the 52-subcarrier RU 7010. The sixth pilot tone position 7014 corresponds to a subcarrier separated by 13 subcarriers from the fifth pilot tone position 7012. The seventh pilot tone position 7014 corresponds to a subcarrier separated by 13 subcarriers from the sixth pilot tone position 7012. The eighth pilot tone position 7018 corresponds to a subcarrier separated by 13 subcarriers from the seventh pilot tone position 7016 and spaced 5 subcarriers away from a highest-indexed subcarrier of the 52-subcarrier RU 7010.

FIG. 70 illustrates mirror symmetric pilot tone positions between the first 26-subcarrier RU 7000A (which may be odd or even) and the second 26-subcarrier RU 7000B (which may be even or odd, respectively). FIG. 70 also illustrates a nested design in which the 52-subcarrier RU 7010 uses the same pilot tone positions as the first and second RUs 7000A and 7000B, but embodiments are not limited thereto.

FIG. 71 illustrates another option for pilot tone positions in Case 1, according to embodiments. FIG. 71 can be interpreted as illustrating two embodiments, according to whether a reference subcarrier index $f_0$ is even or odd.

FIG. 71 illustrates a first embodiment including a 52-subcarrier RU 7110 being an even RU and having pilot tone positions such as may be used with an even mapping of a HE-LTF sequence in a 2×LTF design, wherein a reference subcarrier index $f_0$ has a value equal to 2×N, where N is an integer. FIG. 71 also illustrates pilot tone positions of a first 26-subcarrier RU 7100A and a second 26-subcarrier RU 7100B that occupy a plurality of subcarriers occupied by the 52-subcarrier RU 7110 and that would be even and odd RUs, respectively, in the first embodiment.

FIG. 71 illustrates a second embodiment including a 52-subcarrier RU 7110 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 71 also illustrates pilot tone positions of a first 26-subcarier RU 7100A and a second 26-subcarier RU 7100B that occupy a plurality of subcarriers occupied by the 52-subcarrier RU 7110 and that would be odd and even RUs, respectively, in the second embodiment.

In FIG. 71, a lowest-indexed subcarrier of the 52-subcarrer RU 7110 is aligned with a lowest-indexed subcarrier of the first 26-subcarrier RU 7100A. A null or reserved subcarrier 7120 is disposed between the first and second 26-subcarrier RUs 7100A and 7100B.

The first 26-subcarrier RU 7100A includes first and second pilot tone positions 7102 and 7104. The first pilot tone position 7102 corresponds to a subcarrier spaced 6 subcarriers away from the lowest-indexed subcarrier of the first 26-subcarrier RU 7100A. The second pilot tone position 7104 corresponds to a subcarrier separated by 13 subcarriers from the first pilot tone position 7102 and spaced 5 subcarriers away from a highest-indexed subcarrier of the first 26-subcarrier RU 7100A.

The second 26-subcarrier RU 7100B includes third and fourth pilot tone positions 7106 and 7108. The third pilot tone position 7106 corresponds to a subcarrier spaced 5 subcarriers away from a lowest-indexed subcarrier of the second 26-subcarrier RU 7100B. The fourth pilot tone position 7108 corresponds to a subcarrier separated by 13 subcarriers from the first pilot tone position 7106 and spaced 6 subcarriers away from the highest-indexed subcarrier of the second 26-subcarrier RU 7100B.

The 52-subcarrier RU 7110 includes fifth, sixth, seventh, and eighth pilot tone positions 7112, 7114, 7116, and 7118. The fifth, sixth, seventh, and eighth pilot tone positions 7112, 7114, 7116, and 7118 of the 52-subcarrier RU 7110 respectively correspond to the first, second, third, and fourth pilot tone positions 7102, 7104, 7106, and 7108 of the first and second 26-subcarrier RUs 7100A and 7100B.

The fifth pilot tone position 7112 corresponds to a subcarrier spaced 6 subcarriers away from the lowest-indexed subcarrier of the 52-subcarrier RU 7110. The sixth pilot tone position 7114 corresponds to a subcarrier separated by 13 subcarriers from the fifth pilot tone position 7112. The seventh pilot tone position 7114 corresponds to a subcarrier separated by 11 subcarriers from the sixth pilot tone position 7112. The eighth pilot tone position 7118 corresponds to a subcarrier separated by 13 subcarriers from the seventh pilot tone position 7116 and spaced 5 subcarriers away from a highest-indexed subcarrier of the 52-subcarrier RU 7110.

FIG. 71 illustrates mirror symmetric pilot tone positions between the first 26-subcarrier RU 7100A (which may be odd or even) and the second 26-subcarrier RU 7100B (which may be even or odd, respectively). FIG. 71 also illustrates a nested design in which the 52-subcarrier RU 7110 uses the same pilot tone positions as the first and second RUs 7100A and 7100B, but embodiments are not limited thereto.

FIG. 72 illustrates another option for pilot tone positions in Case 1, according to embodiments. FIG. 72 can be interpreted as illustrating two embodiments, according to whether a reference subcarrier index $f_0$ is even or odd.

FIG. 72 illustrates a first embodiment including a 52-subcarrier RU 7210 being an even RU and having pilot tone positions such as may be used with an even mapping of a HE-LTF sequence in a 2×LTF design, wherein a reference subcarrier index $f_0$ has a value equal to 2×N, where N is an integer. FIG. 72 also illustrates pilot tone positions of a first 26-subcarier RU 7200A and a second 26-subcarier RU 7200B that occupy a plurality of subcarriers occupied by the 52-subcarrier RU 7210 and that would be odd and even RUs, respectively, in the first embodiment.

FIG. 72 illustrates a second embodiment including a 52-subcarrier RU 7210 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 72 also illustrates pilot tone positions of a first 26-subcarrier RU 7200A and a second 26-subcarier RU 7200B that occupy a plurality of subcarriers occupied by the 52-subcarrier RU 7210 and that would be even and odd RUs, respectively, in the second embodiment.

In FIG. 72, a highest-indexed subcarrier of the 52-subcarrer RU 7210 is aligned with a highest-indexed subcarrier of the second 26-subcarrier RU 7200B. A null or reserved subcarrier 7220 is disposed between the first and second 26-subcarrier RUs 7200A and 7200B.

The first 26-subcarrier RU 7200A includes first and second pilot tone positions 7202 and 7204. The first pilot tone position 7202 corresponds to a subcarrier spaced 7 subcarriers away from a lowest-indexed subcarrier of the first 26-subcarrier RU 7200A. The second pilot tone position 7204 corresponds to a subcarrier separated by 11 subcarriers from the first pilot tone position 7202 and spaced 6 subcarriers away from a highest-indexed subcarrier of the first 26-subcarrier RU 7200A.

The second 26-subcarrier RU 7200B includes third and fourth pilot tone positions 7206 and 7208. The third pilot tone position 7206 corresponds to a subcarrier spaced 6 subcarriers away from a lowest-indexed subcarrier of the second 26-subcarrier RU 7200B. The fourth pilot tone position 7208 corresponds to a subcarrier separated by 11 subcarriers from the first pilot tone position 7206 and spaced 7 subcarriers away from the highest-indexed subcarrier of the second 26-subcarrier RU 7200B.

The 52-subcarrier RU 7210 includes fifth, sixth, seventh, and eighth pilot tone positions 7212, 7214, 7216, and 7218. The fifth, sixth, seventh, and eighth pilot tone positions 7212, 7214, 7216, and 7218 of the 52-subcarrier RU 7210 respectively correspond to the first, second, third, and fourth pilot tone positions 7202, 7204, 7206, and 7208 of the first and second 26-subcarrier RUs 7200A and 7200B.

The fifth pilot tone position 7212 corresponds to a subcarrier spaced 6 subcarriers away from the lowest-indexed subcarrier of the 52-subcarrier RU 7210. The sixth pilot tone position 7214 corresponds to a subcarrier separated by 11 subcarriers from the fifth pilot tone position 7212. The seventh pilot tone position 7214 corresponds to a subcarrier separated by 13 subcarriers from the sixth pilot tone position 7212. The eighth pilot tone position 7218 corresponds to a subcarrier separated by 11 subcarriers from the seventh pilot tone position 7216 and spaced 7 subcarriers away from a highest-indexed subcarrier of the 52-subcarrier RU 7210.

FIG. 72 illustrates mirror symmetric pilot tone positions between the first 26-subcarrier RU 7200A (which may be odd or even) and the second 26-subcarrier RU 7200B (which may be even or odd, respectively). FIG. 72 also illustrates a nested design in which the 52-subcarrier RU 7210 uses the same pilot tone positions as the first and second RUs 7200A and 7200B, but embodiments are not limited thereto.

FIG. 73 illustrates another option for pilot tone positions in Case 2, according to embodiments. FIG. 73 can be interpreted as illustrating two embodiments, according to whether a reference subcarrier index $f_0$ is even or odd.

FIG. 73 illustrates a first embodiment including a 52-subcarrier RU 7310 being an even RU and having pilot tone positions such as may be used with an even mapping of a HE-LTF sequence in a 2×LTF design, wherein a reference subcarrier index $f_0$ has a value equal to 2×N, where N is an integer. FIG. 73 also illustrates pilot tone positions of a first 26-subcarier RU 7300A and a second 26-subcarrier RU 7300B that occupy a plurality of subcarriers occupied by the 52-subcarrier RU 7310 and that would be even RUs in the first embodiment.

FIG. 73 illustrates a second embodiment including a 52-subcarrier RU 7310 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 73 also illustrates pilot tone positions of a first 26-subcarrier RU 7300A and a second 26-subcarrier RU 7300B that occupy a plurality of subcarriers occupied by the 52-subcarrier RU 7310 and that would be odd RUs in the second embodiment.

In FIG. 73, a lowest-indexed subcarrier of the 52-subcarrer RU 7310 is aligned with a lowest-indexed subcarrier of the first 26-subcarrier RU 7300A and a highest-indexed subcarrier of the 52-subcarrer RU 7310 is aligned with a highest-indexed subcarrier of the second 26-subcarrier RU 7300B.

The first 26-subcarrier RU 7300A includes first and second pilot tone positions 7302 and 7304. The first pilot tone position 7302 corresponds to a subcarrier spaced 6 subcarriers away from a lowest-indexed subcarrier of the first 26-subcarrier RU 7300A. The second pilot tone position 7304 corresponds to a subcarrier separated by 12 subcarriers from the first pilot tone position 7302 and spaced 6 subcarriers away from a highest-indexed subcarrier of the first 26-subcarrier RU 7300A.

The second 26-subcarrier RU 7300B includes third and fourth pilot tone positions 7306 and 7308. The third pilot tone position 7306 corresponds to a subcarrier spaced 6 subcarriers away from a lowest-indexed subcarrier of the second 26-subcarrier RU 7300B. The fourth pilot tone position 7308 corresponds to a subcarrier separated by 12 subcarriers from the first pilot tone position 7306 and spaced 6 subcarriers away from the highest-indexed subcarrier of the second 26-subcarrier RU 7300B.

The 52-subcarrier RU 7310 includes fifth, sixth, seventh, and eighth pilot tone positions 7312, 7314, 7316, and 7318. The fifth, sixth, seventh, and eighth pilot tone positions 7312, 7314, 7316, and 7318 of the 52-subcarrier RU 7310 respectively correspond to the first, second, third, and fourth pilot tone positions 7302, 7304, 7306, and 7308 of the first and second 26-subcarrier RUs 7300A and 7300B.

The fifth pilot tone position 7312 corresponds to a subcarrier spaced 6 subcarriers away from the lowest-indexed subcarrier of the 52-subcarrier RU 7310. The sixth pilot tone position 7314 corresponds to a subcarrier separated by 12 subcarriers from the fifth pilot tone position 7312. The seventh pilot tone position 7314 corresponds to a subcarrier separated by 12 subcarriers from the sixth pilot tone position 7312. The eighth pilot tone position 7318 corresponds to a subcarrier separated by 12 subcarriers from the seventh pilot tone position 7316 and spaced 6 subcarriers away from a highest-indexed subcarrier of the 52-subcarrier RU 7310.

FIG. 73 illustrates a nested design in which the 52-subcarrier RU 7310 uses the same pilot tone positions as the first and second RUs 7300A and 7300B, but embodiments are not limited thereto.

Figure 74:
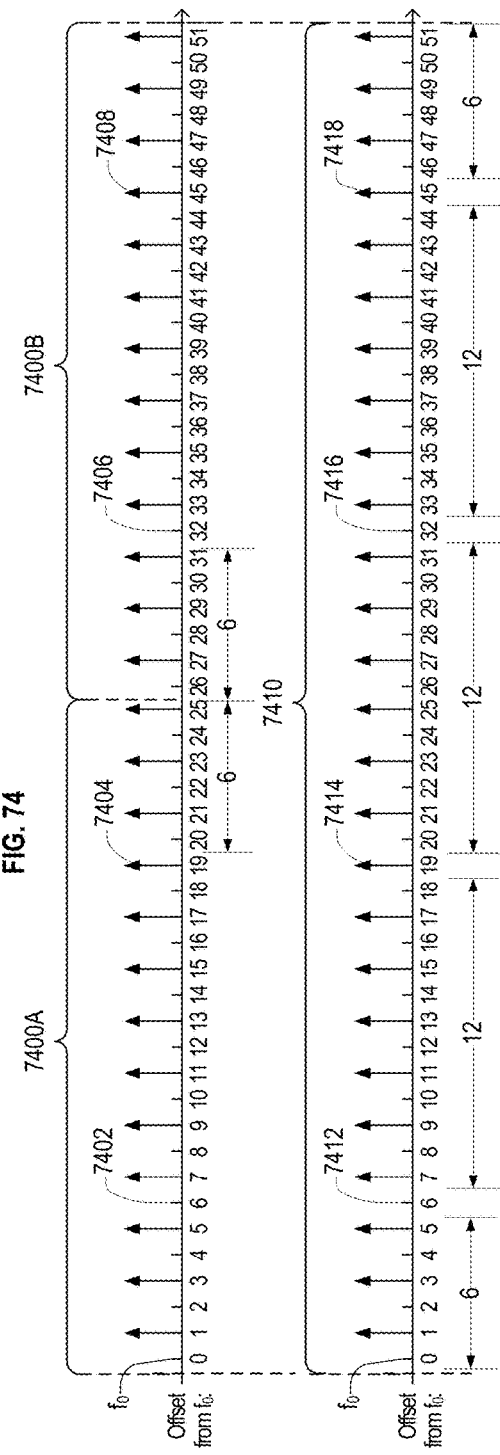
FIG. 74 illustrates another option for pilot tone positions in Case 2, according to embodiments.

FIG. 74 illustrates another option for pilot tone positions in Case 2, according to embodiments. FIG. 74 can be interpreted as illustrating two embodiments, according to whether a reference subcarrier index $f_0$ is even or odd.

FIG. 74 illustrates a first embodiment including a 52-subcarrier RU 7410 being an even RU and having pilot tone positions such as may be used with an odd mapping of a HE-LTF sequence in a 2×LTF design, wherein a reference subcarrier index $f_0$ has a value equal to 2×N, where N is an integer. FIG. 74 also illustrates pilot tone positions of a first 26-subcarier RU 7400A and a second 26-subcarier RU 7400B that occupy a plurality of subcarriers occupied by the 52-subcarrier RU 7410 and that would be even RUs in the first embodiment.

FIG. 74 illustrates a second embodiment including a 52-subcarrier RU 7410 being an odd RU and having pilot tone positions such as may be used with an even mapping of a HE-LTF sequence in a 2×LTF design, wherein the reference subcarrier index $f_0$ has a value equal to 2×N+1, where N is an integer. FIG. 74 also illustrates pilot tone positions of a first 26-subcarier RU 7400A and a second 26-subcarier RU 7400B that occupy a plurality of subcarriers occupied by the 52-subcarrier RU 7410 and that would be odd RUs in the second embodiment.

In FIG. 74, a lowest-indexed subcarrier of the 52-subcarrer RU 7410 is aligned with a lowest-indexed subcarrier of the first 26-subcarrier RU 7400A and a highest-indexed subcarrier of the 52-subcarrer RU 7410 is aligned with a highest-indexed subcarrier of the second 26-subcarrier RU 7400B.

The first 26-subcarrier RU 7400A includes first and second pilot tone positions 7402 and 7404. The first pilot tone position 7402 corresponds to a subcarrier spaced 6 subcarriers away from a lowest-indexed subcarrier of the first 26-subcarrier RU 7400A. The second pilot tone position 7404 corresponds to a subcarrier separated by 12 subcarriers from the first pilot tone position 7402 and spaced 6 subcarriers away from a highest-indexed subcarrier of the first 26-subcarrier RU 7400A.

The second 26-subcarrier RU 7400B includes third and fourth pilot tone positions 7406 and 7408. The third pilot tone position 7406 corresponds to a subcarrier spaced 6 subcarriers away from a lowest-indexed subcarrier of the second 26-subcarrier RU 7400B. The fourth pilot tone position 7408 corresponds to a subcarrier separated by 12 subcarriers from the first pilot tone position 7406 and spaced 6 subcarriers away from the highest-indexed subcarrier of the second 26-subcarrier RU 7400B.

The 52-subcarrier RU 7410 includes fifth, sixth, seventh, and eighth pilot tone positions 7412, 7414, 7416, and 7418. The fifth, sixth, seventh, and eighth pilot tone positions 7412, 7414, 7416, and 7418 of the 52-subcarrier RU 7410 respectively correspond to the first, second, third, and fourth pilot tone positions 7402, 7404, 7406, and 7408 of the first and second 26-subcarrier RUs 7400A and 7400B.

The fifth pilot tone position 7412 corresponds to a subcarrier spaced 6 subcarriers away from the lowest-indexed subcarrier of the 52-subcarrier RU 7410. The sixth pilot tone position 7414 corresponds to a subcarrier separated by 12 subcarriers from the fifth pilot tone position 7412. The seventh pilot tone position 7414 corresponds to a subcarrier separated by 12 subcarriers from the sixth pilot tone position 7412. The eighth pilot tone position 7418 corresponds to a subcarrier separated by 12 subcarriers from the seventh pilot tone position 7416 and spaced 6 subcarriers away from a highest-indexed subcarrier of the 52-subcarrier RU 7410.

FIG. 74 illustrates a nested design in which the 52-subcarrier RU 7410 uses the same pilot tone positions as the first and second RUs 7400A and 7400B, but embodiments are not limited thereto.

Figure 75:
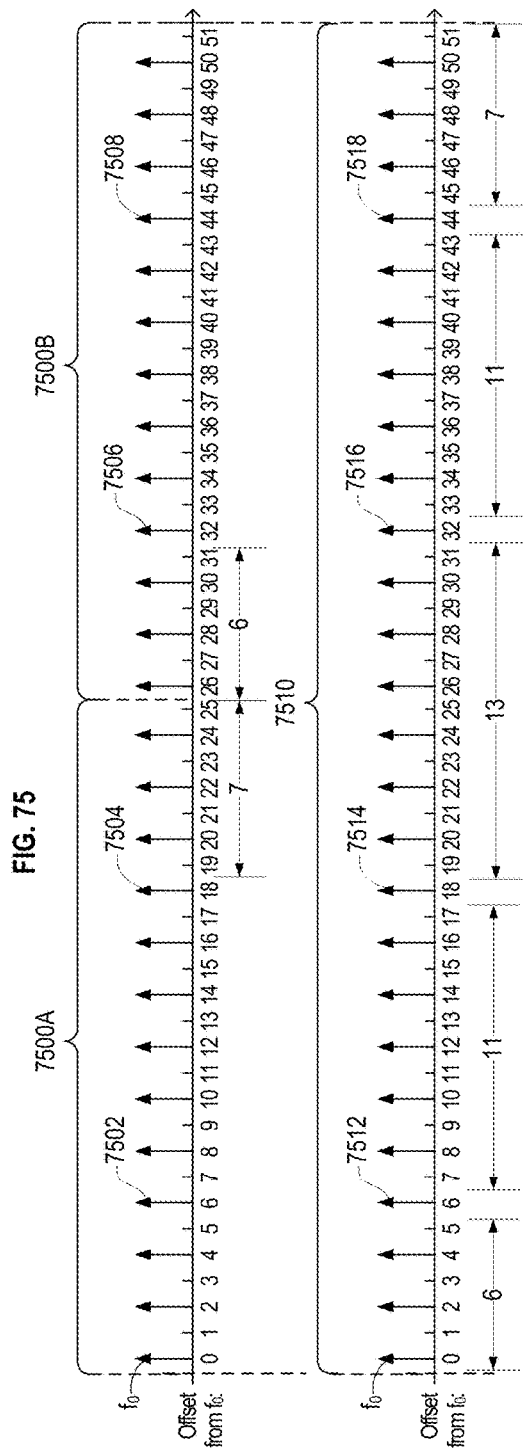
FIG. 75 illustrates another option for pilot tone positions in Case 2, according to embodiments.

FIG. 75 illustrates another option for pilot tone positions in Case 2, according to embodiments. FIG. 75 can be interpreted as illustrating two embodiments, according to whether a reference subcarrier index $f_0$ is even or odd.

FIG. 75 illustrates a first embodiment including a 52-subcarrier RU 7510 being an even RU and having pilot tone positions such as may be used with an even mapping of a HE-LTF sequence in a 2×LTF design, wherein a reference subcarrier index $f_0$ has a value equal to 2×N, where N is an integer. FIG. 75 also illustrates pilot tone positions of a first 26-subcarier RU 7500A and a second 26-subcarier RU 7500B that occupy a plurality of subcarriers occupied by the 52-subcarrier RU 7510 and that would be even RUs in the first embodiment.

FIG. 75 illustrates a second embodiment including a 52-subcarrier RU 7510 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 75 also illustrates pilot tone positions of a first 26-subcarrier RU 7500A and a second 26-subcarier RU 7500B that occupy a plurality of subcarriers occupied by the 52-subcarrier RU 7510 and that would be odd RUs in the second embodiment.

In FIG. 75, a lowest-indexed subcarrier of the 52-subcarrer RU 7510 is aligned with a lowest-indexed subcarrier of the first 26-subcarrier RU 7500A and a highest-indexed subcarrier of the 52-subcarrer RU 7510 is aligned with a highest-indexed subcarrier of the second 26-subcarrier RU 7500B.

The first 26-subcarrier RU 7500A includes first and second pilot tone positions 7502 and 7504. The first pilot tone position 7502 corresponds to a subcarrier spaced 6 subcarriers away from a lowest-indexed subcarrier of the first 26-subcarrier RU 7500A. The second pilot tone position 7504 corresponds to a subcarrier separated by 11 subcarriers from the first pilot tone position 7502 and spaced 7 subcarriers away from a highest-indexed subcarrier of the first 26-subcarrier RU 7500A.

The second 26-subcarrier RU 7500B includes third and fourth pilot tone positions 7506 and 7508. The third pilot tone position 7506 corresponds to a subcarrier spaced 6 subcarriers away from a lowest-indexed subcarrier of the second 26-subcarrier RU 7500B. The fourth pilot tone position 7508 corresponds to a subcarrier separated by 11 subcarriers from the first pilot tone position 7506 and spaced 7 subcarriers away from the highest-indexed subcarrier of the second 26-subcarrier RU 7500B.

The 52-subcarrier RU 7510 includes fifth, sixth, seventh, and eighth pilot tone positions 7512, 7514, 7516, and 7518. The fifth, sixth, seventh, and eighth pilot tone positions 7512, 7514, 7516, and 7518 of the 52-subcarrier RU 7510 respectively correspond to the first, second, third, and fourth pilot tone positions 7502, 7504, 7506, and 7508 of the first and second 26-subcarrier RUs 7500A and 7500B.

The fifth pilot tone position 7512 corresponds to a subcarrier spaced 6 subcarriers away from the lowest-indexed subcarrier of the 52-subcarrier RU 7510. The sixth pilot tone position 7514 corresponds to a subcarrier separated by 11 subcarriers from the fifth pilot tone position 7512. The seventh pilot tone position 7514 corresponds to a subcarrier separated by 13 subcarriers from the sixth pilot tone position 7512. The eighth pilot tone position 7518 corresponds to a subcarrier separated by 11 subcarriers from the seventh pilot tone position 7516 and spaced 7 subcarriers away from a highest-indexed subcarrier of the 52-subcarrier RU 7510.

FIG. 75 illustrates a nested design in which the 52-subcarrier RU 7510 uses the same pilot tone positions as the first and second RUs 7500A and 7500B, but embodiments are not limited thereto.

FIG. 76 illustrates another option for pilot tone positions in Case 2, according to embodiments. FIG. 76 can be interpreted as illustrating two embodiments, according to whether a reference subcarrier index $f_0$ is even or odd.

FIG. 76 illustrates a first embodiment including a 52-subcarrier RU 7610 being an even RU and having pilot tone positions such as may be used with an odd mapping of a HE-LTF sequence in a 2×LTF design, wherein a reference subcarrier index $f_0$ has a value equal to 2×N, where N is an integer. FIG. 76 also illustrates pilot tone positions of a first 26-subcarrier RU 7600A and a second 26-subcarrier RU 7600B that occupy a plurality of subcarriers occupied by the 52-subcarrier RU 7610 and that would be even RUs in the first embodiment.

FIG. 76 illustrates a second embodiment including a 52-subcarrier RU 7610 being an odd RU and having pilot tone positions such as may be used with an even mapping of a HE-LTF sequence in a 2×LTF design, wherein the reference subcarrier index $f_0$ has a value equal to 2×N+1, where N is an integer. FIG. 76 also illustrates pilot tone positions of a first 26-subcarier RU 7600A and a second 26-subcarrier RU 7600B that occupy a plurality of subcarriers occupied by the 52-subcarrier RU 7610 and that would be odd RUs in the second embodiment.

In FIG. 76, a lowest-indexed subcarrier of the 52-subcarrer RU 7610 is aligned with a lowest-indexed subcarrier of the first 26-subcarrier RU 7600A and a highest-indexed subcarrier of the 52-subcarrer RU 7610 is aligned with a highest-indexed subcarrier of the second 26-subcarrier RU 7600B.

The first 26-subcarrier RU 7600A includes first and second pilot tone positions 7602 and 7604. The first pilot tone position 7602 corresponds to a subcarrier spaced 7 subcarriers away from a lowest-indexed subcarrier of the first 26-subcarrier RU 7600A. The second pilot tone position 7604 corresponds to a subcarrier separated by 11 subcarriers from the first pilot tone position 7602 and spaced 6 subcarriers away from a highest-indexed subcarrier of the first 26-subcarrier RU 7600A.

The second 26-subcarrier RU 7600B includes third and fourth pilot tone positions 7606 and 7608. The third pilot tone position 7606 corresponds to a subcarrier spaced 7 subcarriers away from a lowest-indexed subcarrier of the second 26-subcarrier RU 7600B. The fourth pilot tone position 7608 corresponds to a subcarrier separated by 11 subcarriers from the first pilot tone position 7606 and spaced 6 subcarriers away from the highest-indexed subcarrier of the second 26-subcarrier RU 7600B.

The 52-subcarrier RU 7610 includes fifth, sixth, seventh, and eighth pilot tone positions 7612, 7614, 7616, and 7618. The fifth, sixth, seventh, and eighth pilot tone positions 7612, 7614, 7616, and 7618 of the 52-subcarrier RU 7610 respectively correspond to the first, second, third, and fourth pilot tone positions 7602, 7604, 7606, and 7608 of the first and second 26-subcarrier RUs 7600A and 7600B.

The fifth pilot tone position 7612 corresponds to a subcarrier spaced 7 subcarriers away from the lowest-indexed subcarrier of the 52-subcarrier RU 7610. The sixth pilot tone position 7614 corresponds to a subcarrier separated by 11 subcarriers from the fifth pilot tone position 7612. The seventh pilot tone position 7614 corresponds to a subcarrier separated by 13 subcarriers from the sixth pilot tone position 7612. The eighth pilot tone position 7618 corresponds to a subcarrier separated by 11 subcarriers from the seventh pilot tone position 7616 and spaced 6 subcarriers away from a highest-indexed subcarrier of the 52-subcarrier RU 7610.

FIG. 76 illustrates a nested design in which the 52-subcarrier RU 7610 uses the same pilot tone positions as the first and second RUs 7600A and 7600B, but embodiments are not limited thereto.

FIG. 77 illustrates another option for pilot tone positions in Case 2, according to embodiments. FIG. 77 can be interpreted as illustrating two embodiments, according to whether a reference subcarrier index $f_0$ is even or odd.

FIG. 77 illustrates a first embodiment including a 52-subcarrier RU 7710 being an even RU and having pilot tone positions such as may be used with an even mapping of a HE-LTF sequence in a 2×LTF design, wherein a reference subcarrier index $f_0$ has a value equal to 2×N, where N is an integer. FIG. 77 also illustrates pilot tone positions of a first 26-subcarier RU 7700A and a second 26-subcarier RU 7700B that occupy a plurality of subcarriers occupied by the 52-subcarrier RU 7710 and that would be even RUs in the first embodiment.

FIG. 77 illustrates a second embodiment including a 52-subcarrier RU 7710 being an odd RU and having pilot tone positions such as may be used with an odd mapping of a HE-LTF sequence in a 2×LTF design, wherein the reference subcarrier index $f_0$ has a value equal to 2×N+1, where N is an integer. FIG. 77 also illustrates pilot tone positions of a first 26-subcarier RU 7700A and a second 26-subcarier RU 7700B that occupy a plurality of subcarriers occupied by the 52-subcarrier RU 7710 and that would be odd RUs in the second embodiment.

In FIG. 77, a lowest-indexed subcarrier of the 52-subcarrer RU 7710 is aligned with a lowest-indexed subcarrier of the first 26-subcarrier RU 7700A and a highest-indexed subcarrier of the 52-subcarrer RU 7710 is aligned with a highest-indexed subcarrier of the second 26-subcarrier RU 7700B.

The first 26-subcarrier RU 7700A includes first and second pilot tone positions 7702 and 7704. The first pilot tone position 7702 corresponds to a subcarrier spaced 6 subcarriers away from a lowest-indexed subcarrier of the first 26-subcarrier RU 7700A. The second pilot tone position 7704 corresponds to a subcarrier separated by 13 subcarriers from the first pilot tone position 7702 and spaced 5 subcarriers away from a highest-indexed subcarrier of the first 26-subcarrier RU 7700A.

The second 26-subcarrier RU 7700B includes third and fourth pilot tone positions 7706 and 7708. The third pilot tone position 7706 corresponds to a subcarrier spaced 6 subcarriers away from a lowest-indexed subcarrier of the second 26-subcarrier RU 7700B. The fourth pilot tone position 7708 corresponds to a subcarrier separated by 13 subcarriers from the first pilot tone position 7706 and spaced 5 subcarriers away from the highest-indexed subcarrier of the second 26-subcarrier RU 7700B.

The 52-subcarrier RU 7710 includes fifth, sixth, seventh, and eighth pilot tone positions 7712, 7714, 7716, and 7718. The fifth, sixth, seventh, and eighth pilot tone positions 7712, 7714, 7716, and 7718 of the 52-subcarrier RU 7710 respectively correspond to the first, second, third, and fourth pilot tone positions 7702, 7704, 7706, and 7708 of the first and second 26-subcarrier RUs 7700A and 7700B.

The fifth pilot tone position 7712 corresponds to a subcarrier spaced 6 subcarriers away from the lowest-indexed subcarrier of the 52-subcarrier RU 7710. The sixth pilot tone position 7714 corresponds to a subcarrier separated by 13 subcarriers from the fifth pilot tone position 7712. The seventh pilot tone position 7714 corresponds to a subcarrier separated by 11 subcarriers from the sixth pilot tone position 7712. The eighth pilot tone position 7718 corresponds to a subcarrier separated by 13 subcarriers from the seventh pilot tone position 7716 and spaced 5 subcarriers away from a highest-indexed subcarrier of the 52-subcarrier RU 7710.

FIG. 77 illustrates a nested design in which the 52-subcarrier RU 7710 uses the same pilot tone positions as the first and second RUs 7700A and 7700B, but embodiments are not limited thereto.

FIG. 78 illustrates another option for pilot tone positions in Case 2, according to embodiments. FIG. 78 can be interpreted as illustrating two embodiments, according to whether a reference subcarrier index $f_0$ is even or odd.

FIG. 78 illustrates a first embodiment including a 52-subcarrier RU 7810 being an even RU and having pilot tone positions such as may be used with an odd mapping of a HE-LTF sequence in a 2×LTF design, wherein a reference subcarrier index $f_0$ has a value equal to 2×N, where N is an integer. FIG. 78 also illustrates pilot tone positions of a first 26-subcarier RU 7800A and a second 26-subcarier RU 7800B that occupy a plurality of subcarriers occupied by the 52-subcarrier RU 7810 and that would be even RUs in the first embodiment.

FIG. 78 illustrates a second embodiment including a 52-subcarrier RU 7810 being an odd RU and having pilot tone positions such as may be used with an even mapping of a HE-LTF sequence in a 2×LTF design, wherein the reference subcarrier index $f_0$ has a value equal to 2×N+1, where N is an integer. FIG. 78 also illustrates pilot tone positions of a first 26-subcarier RU 7800A and a second 26-subcarier RU 7800B that occupy a plurality of subcarriers occupied by the 52-subcarrier RU 7810 and that would be odd RUs in the second embodiment.

In FIG. 78, a lowest-indexed subcarrier of the 52-subcarrer RU 7810 is aligned with a lowest-indexed subcarrier of the first 26-subcarrier RU 7800A and a highest-indexed subcarrier of the 52-subcarrer RU 7810 is aligned with a highest-indexed subcarrier of the second 26-subcarrier RU 7800B.

The first 26-subcarrier RU 7800A includes first and second pilot tone positions 7802 and 7804. The first pilot tone position 7802 corresponds to a subcarrier spaced 5 subcarriers away from a lowest-indexed subcarrier of the first 26-subcarrier RU 7800A. The second pilot tone position 7804 corresponds to a subcarrier separated by 13 subcarriers from the first pilot tone position 7802 and spaced 6 subcarriers away from a highest-indexed subcarrier of the first 26-subcarrier RU 7800A.

The second 26-subcarrier RU 7800B includes third and fourth pilot tone positions 7806 and 7808. The third pilot tone position 7806 corresponds to a subcarrier spaced 5 subcarriers away from a lowest-indexed subcarrier of the second 26-subcarrier RU 7800B. The fourth pilot tone position 7808 corresponds to a subcarrier separated by 13 subcarriers from the first pilot tone position 7806 and spaced 6 subcarriers away from the highest-indexed subcarrier of the second 26-subcarrier RU 7800B.

The 52-subcarrier RU 7810 includes fifth, sixth, seventh, and eighth pilot tone positions 7812, 7814, 7816, and 7818. The fifth, sixth, seventh, and eighth pilot tone positions 7812, 7814, 7816, and 7818 of the 52-subcarrier RU 7810 respectively correspond to the first, second, third, and fourth pilot tone positions 7802, 7804, 7806, and 7808 of the first and second 26-subcarrier RUs 7800A and 7800B.

The fifth pilot tone position 7812 corresponds to a subcarrier spaced 5 subcarriers away from the lowest-indexed subcarrier of the 52-subcarrier RU 7810. The sixth pilot tone position 7814 corresponds to a subcarrier separated by 13 subcarriers from the fifth pilot tone position 7812. The seventh pilot tone position 7814 corresponds to a subcarrier separated by 11 subcarriers from the sixth pilot tone position 7812. The eighth pilot tone position 7818 corresponds to a subcarrier separated by 13 subcarriers from the seventh pilot tone position 7816 and spaced 6 subcarriers away from a highest-indexed subcarrier of the 52-subcarrier RU 7810.

FIG. 78 illustrates a nested design in which the 52-subcarrier RU 7810 uses the same pilot tone positions as the first and second RUs 7800A and 7800B, but embodiments are not limited thereto.

Embodiments include processes for transmitting and receiving frames including pilot signals within allocated resources of an OFDMA transmission wherein locations of the pilots are chosen that maximize frequency diversity gain and improve carrier frequency offset tracking performance.

Figure 79:
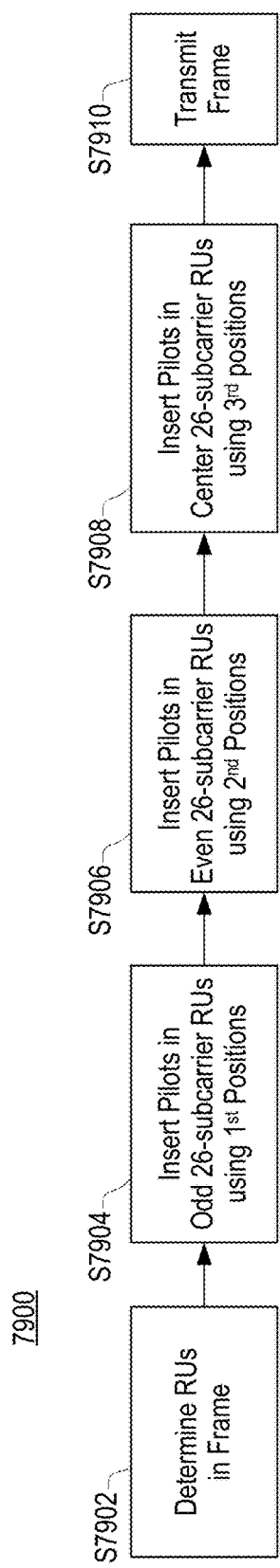
FIG. 79 illustrates a process for transmitting a frame in a wireless network, according to an embodiment.

FIG. 79 illustrates a process 7900 for transmitting a frame in a wireless network, according to an embodiment. The process 7900 may be performed by a wireless device configured to transmit frames.

At S7902, Resource Units (RU) of the frame are determined. In an embodiment, the RUs are RUs of a payload portion of an Orthogonal Frequency Division Multiple Access (OFDMA) frame.

At S7904, pilots are included into one or more odd 26-subcarrier RUs of the frame at a first set of positions relative to respective lowest subcarriers of the odd 26-subcarrier RUs. An odd RU is an RU wherein the lowest subcarrier has an odd index.

At S7906, pilots are included into one or more even 26-subcarrier RUs of the frame at a second set of positions relative to respective lowest subcarriers of the even 26-subcarrier RUs. An even RU is an RU wherein the lowest subcarrier has an even index.

In an embodiment, the first set of positions is different than the second set of positions. In an embodiment, the first set of positions is a mirror image of the second set of positions.

At S7908, pilots are included into a center 26-subcarrier RU of the frame at a third set of positions relative to respective lowest subcarriers of the center 26-subcarrier RUs. A center RU is an RU including at least one centermost non-DC subcarrier of the subchannel including the RU.

In an embodiment, the first set of positions is different than the third set of positions and the second set of positions is different than the third set of positions.

At S7910, the wireless device transmits the frame.

Figure 80:
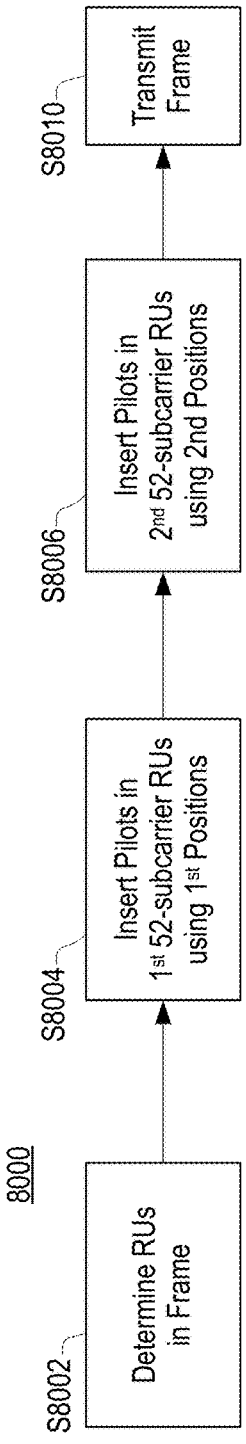
FIG. 80 illustrates another process for transmitting a frame in a wireless network, according to an embodiment.

FIG. 80 illustrates another process 8000 for transmitting a frame in a wireless network, according to an embodiment. The process 8000 may be performed by a wireless device configured to transmit frames.

At S8002, Resource Units (RU) of the frame are determined. In an embodiment, the RUs are RUs of a payload portion of an Orthogonal Frequency Division Multiple Access (OFDMA) frame.

At S8004, pilots are included into one or more 52-subcarrier RUs of a first plurality of RUs of the frame at a first set of positions relative to respective lowest subcarriers of the 52-subcarrier RUs. In an embodiment, the first plurality of RUs are even RUs.

At S8006, pilots are included into one or more 52-subcarrier RUs of a second plurality of RUs of the frame at a second set of positions relative to respective lowest subcarriers of the 52-subcarrier RUs. In an embodiment, the first plurality of RUs are odd RUs.

In an embodiment, the first set of positions is different than the second set of positions. In an embodiment, the first set of positions is a mirror image of the second set of positions.

At S8010, the wireless device transmits the frame.

FIG. 81 illustrates a process 8100 for transmitting a frame in a wireless network, according to an embodiment. The process 8100 may be performed by a wireless device configured to transmit frames.

At S8102, the process 8100 inserts a first plurality of pilots into a Resource Unit (RU) for a High Efficiency Long Training Field (HE-LTF) symbol. The process 8100 determines respective positions of the first plurality of pilots based on i) a size of the RU, ii) whether a lowest subcarrier of the RU has an odd-numbered index or an even numbered index, and iii) whether the RU is a center RU.

At S8104, the process 8100 inserts a second plurality of pilots into a Resource Unit (RU) for a data symbol. The process 8100 determines respective positions of the second plurality of pilots based on i) a size of the RU, ii) whether a lowest subcarrier of the RU has an odd-numbered index or an even numbered index, and iii) whether the RU is a center RU.

At S8106, the process 8100 transmits a frame. The frame includes the HE-LTF symbol and the data symbol.

FIG. 82 illustrates a sub-process 8200 for inserting pilots, according to an embodiment. The sub-process 8200 may be included in S8102, S8104, or both of process 8100 of FIG. 81.

At S8202, the sub-process 8200 determines whether an RU includes 26 or 52 subcarriers. When the RU includes 52 subcarriers, at S8202 the sub-process 8200 proceeds to S8204. Otherwise, when the RU includes 26 subcarriers, at S8202 the sub-process 8200 proceeds to S8210.

At S8204, the sub-process 8200 determines whether a lowest subcarrier of the RU has an odd index (i.e. the RU is an odd RU) or an even index (i.e. the RU is an even RU). When the RU is the odd RU, at S8204 the sub-process 8200 proceeds to S8206. Otherwise, when the RU is the even RU, at S8204 the sub-process 8200 proceeds to S8208.

At S8206, sub-process 8200 inserts a plurality of pilots into a symbol at a first set of predetermined positions, respectively.

At S8208, sub-process 8200 inserts a plurality of pilots into a symbol at a second set of predetermined positions, respectively.

At S8210, the sub-process 8200 determines whether the RU has a center RU. When the RU is the center RU, at S8210 the sub-process 8200 proceeds to S8214. Otherwise, at S8210 the sub-process 8200 proceeds to S8212.

At S8212, the sub-process 8200 determines whether a lowest subcarrier of the RU has an odd index (i.e. the RU is an odd RU) or an even index (i.e. the RU is an even RU). When the RU is the odd RU, at S8212 the sub-process 8200 proceeds to S8216. Otherwise, when the RU is the even RU, at S8212 the sub-process 8200 proceeds to S8218

At S8214, sub-process 8200 inserts a plurality of pilots into a symbol at a third set of predetermined positions, respectively.

At S8216, sub-process 8200 inserts a plurality of pilots into a symbol at a fourth set of predetermined positions, respectively.

At S8218, sub-process 8200 inserts a plurality of pilots into a symbol at a fifth set of predetermined positions, respectively.

In an embodiment, each of the first, second, third, fourth, and fifth sets of predetermined positions is different from every other of the first, second, third, fourth, and fifth sets of predetermined positions.

Figure 83:
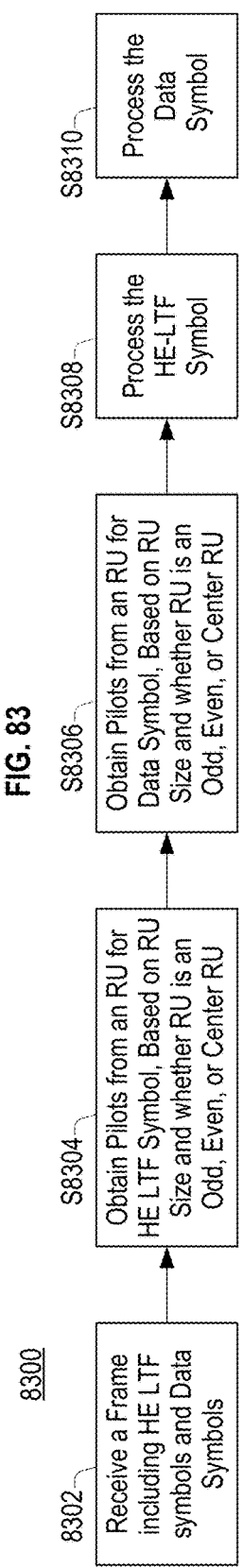
FIG. 83 illustrates a process for receiving a frame, according to an embodiment.

FIG. 83 illustrates a process 8300 for receiving a frame in a wireless network, according to an embodiment. The process 8300 may be performed by a wireless device configured to receive frames.

At S8302, the process 8300 receives a frame. The frame includes High Efficiency Long Training Field (HE-LTF) symbols and data symbols.

At S8304, the process 8300 obtains a first plurality of pilots from a Resource Unit (RU) for a HE-LTF symbol of the frame. The process 8300 determines respective positions of the first plurality of pilots based on i) a size of the RU, ii) whether a lowest subcarrier of the RU has an odd-numbered index or an even numbered index, and iii) whether the RU is a center RU.

At S8306, the process 8300 obtains a second plurality of pilots from a Resource Unit (RU) for a data symbol of the frame. The process 8300 determines respective positions of the second plurality of pilots based on i) a size of the RU, ii) whether a lowest subcarrier of the RU has an odd-numbered index or an even numbered index, and iii) whether the RU is a center RU.

At S8308, the process 8400 processes the HE-LTF symbol.

At S8310, the process 8400 processes the data symbol.

Figure 84:
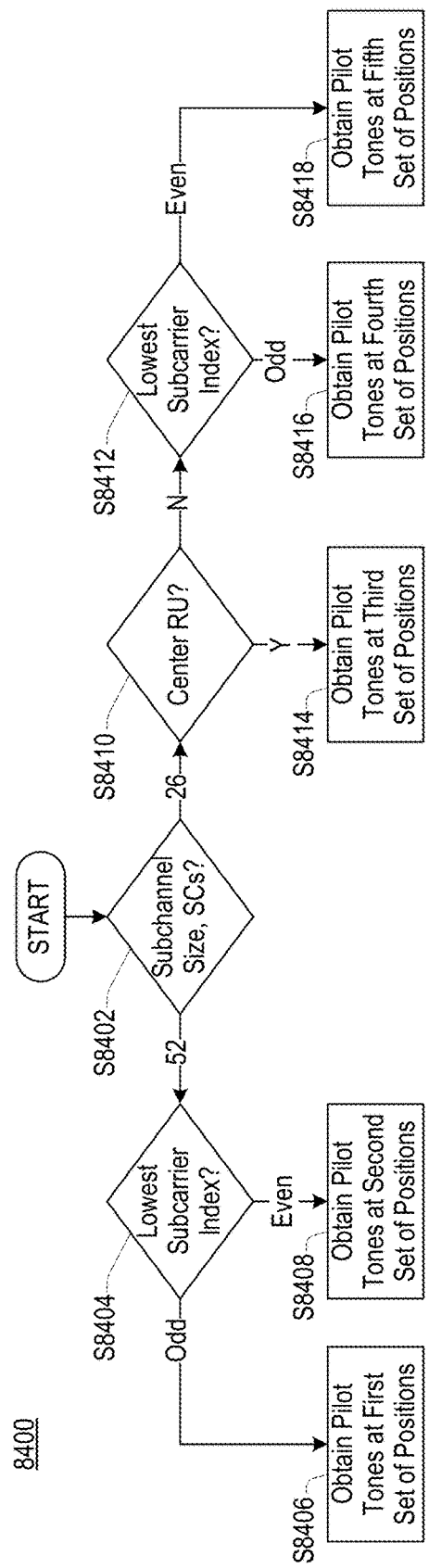
FIG. 84 illustrates a sub-process for obtaining pilots, according to an embodiment.

FIG. 84 illustrates a sub-process 8400 for obtaining pilots, according to an embodiment. The sub-process 8400 may be included in S8304, S8306, or both of process 8300 of FIG. 83.

At S8402, the sub-process 8400 determines whether an RU includes 26 or 52 subcarriers. When the RU includes 52 subcarriers, at S8402 the sub-process 8400 proceeds to S8404. Otherwise, when the RU includes 26 subcarriers, at S8402 the sub-process 8400 proceeds to S8410.

At S8404, the sub-process 8400 determines whether a lowest subcarrier of the RU has an odd index (i.e. the RU is an odd RU) or an even index (i.e. the RU is an even RU). When the RU is the odd RU, at S8404 the sub-process 8400 proceeds to S8406. Otherwise, when the RU is the even RU, at S8404 the sub-process 8400 proceeds to S8408.

At S8406, sub-process 8400 obtains a plurality of pilots from a first set of predetermined positions within a symbol of the RU, respectively.

At S8408, sub-process 8400 obtains a plurality of pilots from a second set of predetermined positions within the symbol, respectively.

At S8410, the sub-process 8400 determines whether the RU has a center RU. When the RU is the center RU, at S8410 the sub-process 8400 proceeds to S8414. Otherwise, at S8410 the sub-process 8400 proceeds to S8412.

At S8412, the sub-process 8400 determines whether a lowest subcarrier of the RU has an odd index (i.e. the RU is an odd RU) or an even index (i.e. the RU is an even RU). When the RU is the odd RU, at S8412 the sub-process 8400 proceeds to S8416. Otherwise, when the RU is the even RU, at S8412 the sub-process 8400 proceeds to S8418

At S8414, sub-process 8400 obtains a plurality of pilots from a third set of predetermined positions within the symbol, respectively.

At S8416, sub-process 8400 obtains a plurality of pilots from a fourth set of predetermined positions within the symbol, respectively.

At S8418, sub-process 8400 obtains a plurality of pilots from a fifth set of predetermined positions within the symbol, respectively.

In an embodiment, each of the first, second, third, fourth, and fifth sets of predetermined positions is different from every other of the first, second, third, fourth, and fifth sets of predetermined positions.

The above explanation and figures are applied to an HE receiver, an HE frame, an HE PPDU, an HE-SIG field and the like of the IEEE 802.11ax amendment, but they can also applied to a receiver, a frame, PPDU, a SIG field, and the like of the next amendment of IEEE 802.11.

Further aspects of the present disclosure relate to one or more of the following clauses.

In an embodiment, a method of a wireless device for transmitting a frame comprises providing pilots in a resource unit at a plurality of pilot tone positions, and transmitting a frame including the resource unit. The frame has a plurality of potential pilot tone positions. The plurality of pilot tone positions are a subset of the plurality of potential pilot tone positions. Half of the potential pilot tone positions are mirror-symmetrical with an other half of the potential pilot tone positions about a DC tone of the frame.

In an embodiment, when the resource unit has 106 subcarriers, the plurality of pilot tone positions include 1) a first pilot tone position having a lowest index among potential pilot tone positions covered by the 106 subcarriers, 2) a second pilot tone position spaced two potential pilot tone positions away from the first pilot tone position, 3) a third pilot tone position spaced three potential pilot tone positions away from the second pilot tone position, and 4) a fourth pilot tone position spaced two potential pilot tone positions away from the third pilot tone position.

In an embodiment, when the resource unit has 242 subcarriers, the plurality of pilot tone positions include: 1) a first pilot tone position having a lowest index among potential pilot tone positions covered by the 242 subcarriers, 2) a second pilot tone position spaced two potential pilot tone positions away from the first pilot tone position, 3) a third pilot tone position spaced three potential pilot tone positions away from the second pilot tone position, 4) a fourth pilot tone position spaced two potential pilot tone positions away from the third pilot tone position, 5) a fifth pilot tone position spaced three potential pilot tone positions away from the fourth pilot tone position, 6) a sixth pilot tone position spaced two potential pilot tone positions away from the fifth pilot tone position, 7) a seventh pilot tone position spaced three potential pilot tone positions away from the sixth pilot tone position, and 8) an eighth pilot tone position spaced two potential pilot tone positions away from the seventh pilot tone position.

In an embodiment, when the resource unit has 52 subcarriers, the plurality of pilot tone positions include a first pilot tone position, a second pilot tone position, a third pilot tone position, and a fourth pilot tone position which correspond to potential pilot tone positions covered by the 52 subcarriers.

In an embodiment, when a lowest-indexed subcarrier of the 52-subcarrier resource unit has an even index, the first pilot tone position is spaced six subcarriers away from the lowest-indexed subcarrier of the resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced five subcarriers away from the highest-indexed subcarrier of the resource unit. When the lowest-indexed subcarrier of the 52-subcarrier resource unit has an odd index, the first pilot tone position is spaced five subcarriers away from the lowest-indexed subcarrier of the resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced six subcarriers away from the highest-indexed subcarrier of the resource unit.

In an embodiment, when the RU has 26 subcarriers, the plurality of pilot tone positions include a first pilot tone position and a second pilot tone position which correspond to potential pilot tone positions covered by the 26 subcarriers.

In an embodiment, when a lowest-indexed subcarrier of the 26-subcarrier resource unit has an even index, the first pilot tone position is spaced six subcarriers away from the lowest-indexed subcarrier of the resource unit, and the second pilot tone position is separated by thirteen subcarriers from the first pilot tone position and spaced five subcarriers away from the highest-indexed subcarrier of the resource unit. When a lowest-indexed subcarrier of the 26-subcarrier resource unit has an odd index, the first pilot tone position is spaced five subcarriers away from the lowest-indexed subcarrier of the resource unit, and the second pilot tone position is separated by thirteen subcarriers from the first pilot tone position and spaced six subcarriers away from the highest-indexed subcarrier of the resource unit.

In an embodiment, when the 26-subcarrier resource unit is a center resource unit that is split into 13 positive-indexed subcarriers and 13 negative-indexed subcarriers by DC tones, the first pilot tone position is spaced six subcarriers away from a lowest-indexed subcarrier of the 26-subcarrier resource unit and spaced six subcarriers away from a highest-indexed subcarrier of the 13 negative-indexed subcarriers, and the second pilot tone position is spaced six subcarriers away from a lowest-indexed subcarrier of 13 positive-indexed subcarriers and spaced six subcarriers away from a highest-indexed subcarrier of the 26-subcarrier resource unit. When the 26-subcarrier resource unit is not the center resource unit and a lowest-indexed subcarrier of the 26-subcarrier resource unit has an even index, the first pilot tone position is spaced six subcarriers away from the lowest-indexed subcarrier of the 26-subcarrier resource unit, and the second pilot tone position is separated by thirteen subcarriers from the first pilot tone position and spaced five subcarriers away from the highest-indexed subcarrier of the 26-subcarrier resource unit. When the 26-subcarrier resource unit is not the center resource unit and a lowest-indexed subcarrier of the 26-subcarrier resource unit has an odd index, the first pilot tone position is spaced five subcarriers away from the lowest-indexed subcarrier of the 26-subcarrier resource unit, and the second pilot tone position is separated by thirteen subcarriers from the first pilot tone position and spaced six subcarriers away from the highest-indexed subcarrier of the 26-subcarrier resource unit.

In an embodiment, the frame is transmitted on a 20 MHz channel, and a total number of the potential pilot tone positions is 18.

In an embodiment, the frame is transmitted on a 40 MHz channel, and a total number of the potential pilot tone positions is 36.

In an embodiment, a method of a wireless device for receiving a frame comprises receiving a frame including a resource unit including pilots which are included at a plurality of pilot tone positions, and processing the pilots. The frame has a plurality of potential pilot tone positions. A half of the potential pilot tone positions is mirror-symmetrical with an other half of the potential pilot tone positions.

In an embodiment, when the resource unit has 106 subcarriers, the plurality of pilot tone positions include a 1) first pilot tone position having a lowest index among potential pilot tone positions covered by the 106 subcarriers, 2) a second pilot tone position spaced two potential pilot tone positions away from the first pilot tone position, 3) a third pilot tone position spaced three potential pilot tone positions away from the second pilot tone position, and 4) a fourth pilot tone position spaced two potential pilot tone positions away from the third pilot tone position.

In an embodiment, when the resource unit has 242 subcarriers, the plurality of pilot tone positions include: 1) a first pilot tone position having a lowest index among potential pilot tone positions covered by the 242 subcarriers, 2) a second pilot tone position spaced two potential pilot tone positions away from the first pilot tone position, 3) a third pilot tone position spaced three potential pilot tone positions away from the second pilot tone position, 4) a fourth pilot tone position spaced two potential pilot tone positions away from the third pilot tone position, 5) a fifth pilot tone position spaced three potential pilot tone positions away from the fourth pilot tone position, 6) a sixth pilot tone position spaced two potential pilot tone positions away from the fifth pilot tone position, 7) a seventh pilot tone position spaced three potential pilot tone positions away from the sixth pilot tone position, and 8) an eighth pilot tone position spaced two potential pilot tone positions away from the seventh pilot tone position.

In an embodiment, when the resource unit has 52 subcarriers, the plurality of pilot tone positions include a first pilot tone position, a second pilot tone position, a third pilot tone position, and a fourth pilot tone position which correspond to potential pilot tone positions covered by the 52 subcarriers.

In an embodiment, when a lowest-indexed subcarrier of the 52-subcarrier resource unit has an even index, the first pilot tone position is spaced six subcarriers away from the lowest-indexed subcarrier of the 52-subcarrier resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced five subcarriers away from the highest-indexed subcarrier of the 52-subcarrier resource unit. When a lowest-indexed subcarrier of the 52-subcarrier resource unit has an odd index, the first pilot tone position is spaced five subcarriers away from the lowest-indexed subcarrier of the 52-subcarrier resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced six subcarriers away from the highest-indexed subcarrier of the 52-subcarrier resource unit.

In an embodiment, when the resource unit has 26 subcarriers, the plurality of pilot tone positions include a first pilot tone position and a second pilot tone position which correspond to potential pilot tone positions covered by the 26 subcarriers.

In an embodiment, when a lowest-indexed subcarrier of the 26-subcarrier resource unit has an even index, the first pilot tone position is spaced six subcarriers away from the lowest-indexed subcarrier of the 26-subcarrier resource unit, and the second pilot tone position is separated by thirteen subcarriers from the first pilot tone position and spaced five subcarriers away from the highest-indexed subcarrier of the 26-subcarrier resource unit. When a lowest-indexed subcarrier of the 26-subcarrier resource unit has an odd index, the first pilot tone position is spaced five subcarriers away from the lowest-indexed subcarrier of the 26-subcarrier resource unit, and the second pilot tone position is separated by thirteen subcarriers from the first pilot tone position and spaced six subcarriers away from the highest-indexed subcarrier of the 26-subcarrier resource unit.

In an embodiment, when the 26-subcarrier resource unit is a center resource unit that is split into 13 positive-indexed subcarriers and 13 negative-indexed subcarriers by DC tones, the first pilot tone position is spaced six subcarriers away from a lowest-indexed subcarrier of the 26-subcarrier resource unit and spaced six subcarriers away from a highest-indexed subcarrier of the 13 negative-indexed subcarriers, and the second pilot tone position is spaced six subcarriers away from a lowest-indexed subcarrier of 13 positive-indexed subcarriers and spaced six subcarriers away from a highest-indexed subcarrier of the 26-subcarrier resource unit. When the 26-subcarrier resource unit is not the center resource unit and a lowest-indexed subcarrier of the 26-subcarrier resource unit has an even index, the first pilot tone position is spaced six subcarriers away from the lowest-indexed subcarrier of the 26-subcarrier resource unit, and the second pilot tone position is separated by thirteen subcarriers from the first pilot tone position and spaced five subcarriers away from the highest-indexed subcarrier of the 26-subcarrier resource unit. When the resource unit is not the center resource unit and a lowest-indexed subcarrier of the 26-subcarrier resource unit has an odd index, the first pilot tone position is spaced five subcarriers away from the lowest-indexed subcarrier of the 26-subcarrier resource unit, and the second pilot tone position is separated by thirteen subcarriers from the first pilot tone position and spaced six subcarriers away from the highest-indexed subcarrier of the 26-subcarrier resource unit.

In an embodiment, the frame is transmitted on a 20 MHz channel, and a total number of the potential pilot tone positions is 18.

In an embodiment, the frame is transmitted on a 40 MHz channel, and a total number of the potential pilot tone positions is 36.

In an embodiment, potential pilot tone positions are aggregation of pilot tone positions used for each 26 subcarrier RU on a given bandwidth.

Embodiments include frames transmitted on a 20 MHz channel and having a nested pilot structure.

In an embodiment, a method of a wireless device for transmitting a frame comprises providing pilots in a resource unit (RU), and transmitting a frame including the RU on a 20 MHz channel. The frame has 18 potential pilot tone positions $c1$ to $c18$ corresponding to subcarrier indices. For the respective subcarrier indices, $c18>c17>c16>c15>c14>c13>c12>c11>c10>c9>c8>c7>c6>c5>c4>c3>c2>c1$.

In an embodiment, for the respective subcarrier indices, $c1=-c18$, $c2=-c17$, $c3=-c16$, $c4=-c15$, $c5=-c14$, $c6=-c13$, $c7=-c12$, $c8=-c11$, and $c9=-c10$.

In an embodiment, when the RU has a first set of 52 positive-indexed subcarriers, pilots are included at potential pilot tone positions $c11$, $c12$, $c13$ and $c14$. When the RU has a second set of 52 positive-indexed subcarriers, pilots are included at potential pilot tone positions $c15$, $c16$, $c17$ and $c18$.

In an embodiment, when a RU has 106 positive-indexed subcarriers including the first set of 52 positive-indexed subcarriers and the second set of 52 positive-indexed subcarriers, pilots are included at potential pilot tone positions $c11$, $c13$, $c16$ and $c18$.

In an embodiment, when the RU has a first set of 26 positive-indexed subcarriers, pilots are included at potential pilot tone positions c11 and c12. When the RU has a second set of 26 positive-indexed subcarriers, pilots are included at potential pilot tone positions c13 and c14. When the RU has a third set of 26 positive-indexed subcarriers, pilots are included at potential pilot tone positions c15 and c16. When the RU has a fourth set of 26 positive-indexed subcarriers, pilots are included at potential pilot tone positions c17 and c18.

In an embodiment, when the RU has a first set of 52 negative-indexed subcarriers, pilots are included at potential pilot tone positions c1, c2, c3 and c4. When the RU has a second set of 52 negative-indexed subcarriers, pilots are included at potential pilot tone positions c5, c6, c7 and c8.

In an embodiment, when the RU has 106 negative-indexed subcarriers including the first set of 52 negative-indexed subcarriers and the second set of 52 negative-indexed subcarriers, pilots are included at potential pilot tone positions c1, c3, c6 and c8.

In an embodiment, when the RU has a first set of 26 negative-indexed subcarriers, pilots are included at potential pilot tone positions c1 and c2. When the RU has a second set of 26 negative-indexed subcarriers, pilots are included at potential pilot tone positions c3 and c4. When the RU has a third set of 26 negative-indexed subcarriers, pilots are included at potential pilot tone positions c5 and c6. When the RU has a fourth set of 26 negative-indexed subcarriers, pilots are included at potential pilot tone positions c7 and c8.

In an embodiment, when the RU has 26 subcarriers that are split into 13 positive-indexed subcarriers and 13 negative-indexed subcarriers by DC tones, pilots are included at potential pilot tone positions c9 and c10.

In an embodiment, when the RU has a set of 242 subcarriers that are split into 121 positive-indexed subcarriers and 121 negative-indexed subcarriers by DC tones, pilots are included at potential pilot tone positions c1, c3, c6, c8, c11, c13, c16 and c18.

In an embodiment, a method of a wireless device for receiving a frame comprises receiving, on a 20 MHz channel, a frame including a resource unit including pilots, and processing the pilots in the resource unit. The frame has 18 potential pilot tone positions c1 to c18 corresponding to subcarrier indices. For the respective subcarrier indices, c18>c17>c16>c15>c14>c13>c12>c11>c10>c9>c8>c7>c6>c5>c4>c3>c2>c1.

In an embodiment, for the respective subcarrier indices, c1=−c18, c2=−c17, c3=−c16, c4=−c15, c5=−c14, c6=−c13, c7=−c12, c8=−c11, and c9=−c10.

In an embodiment, when the RU has a first set of 52 positive-indexed subcarriers, pilots are included at potential pilot tone positions c11, c12, c13 and c14. When the RU has a second set of 52 positive-indexed subcarriers, pilots are included at potential pilot tone positions c15, c16, c17 and c18.

In an embodiment, when a RU has 106 positive-indexed subcarriers, pilots are included at potential pilot tone positions c11, c13, c16 and c18.

In an embodiment, when the RU has a first set of 26 positive-indexed subcarriers, pilots are included at potential pilot tone positions c11 and c12. When the RU has a second set of 26 positive-indexed subcarriers, pilots are included at potential pilot tone positions c13 and c14. When the RU has a third set of 26 positive-indexed subcarriers, pilots are included at potential pilot tone positions c15 and c16. When the RU has a fourth set of 26 positive-indexed subcarriers, pilots are included at potential pilot tone positions c17 and c18.

In an embodiment, when the RU has a first set of 52 negative-indexed subcarriers, pilots are included at potential pilot tone positions c1, c2, c3 and c4. When the RU has a second set of 52 negative-indexed subcarriers, pilots are included at potential pilot tone positions c5, c6, c7 and c8.

In an embodiment, when the RU has 106 negative-indexed subcarriers, pilots are included at potential pilot tone positions c1, c3, c6 and c8.

In an embodiment, when the RU has a first set of 26 negative-indexed subcarriers, pilots are included at potential pilot tone positions c1 and c2. When the RU has a second set of 26 negative-indexed subcarriers, pilots are included at potential pilot tone positions c3 and c4. When the RU has a third set of 26 negative-indexed subcarriers, pilots are included at potential pilot tone positions c5 and c6. When the RU has a fourth set of 26 negative-indexed subcarriers, pilots are included at potential pilot tone positions c7 and c8.

In an embodiment, when the RU has 26 subcarriers that are split into 13 positive-indexed subcarriers and 13 negative-indexed subcarriers by DC tones, pilots are included at potential pilot tone positions c9 and c10.

In an embodiment, when the RU has a set of 242 subcarriers that are split into 121 positive-indexed subcarriers and 121 negative-indexed subcarriers by DC tones, pilots are included at potential pilot tone positions c1, c3, c6, c8, c11, c13, c16 and c18.

Embodiments include frames transmitted on a 40 MHz channel and having a nested pilot structure.

In an embodiment, a method of a wireless device for transmitting a frame comprises providing pilots in the resource unit, and transmitting a frame including a resource unit (RU) on a 40 MHz channel. The frame has 36 potential pilot tone positions f1 to f36 corresponding to subcarrier indices. For the respective indices, f36>f35>f34>f33>f32>f31>f30>f29>f28>f27>f26>f25>f24>f23>f22>f21>f20>f19>f18>f17>f16>f15>f14>f13>f12>f11>f10>f9>f8>f7>f6>f5>f4>f3>f2>f1.

In an embodiment, for the respective indices, f1=−f36, f2=−f35, f3=−f34, f4=−f33, f5=−f32, f6=−f31, f7=−f30, f8=−f29, f9=−f28, f10=−f27, f11=−f26, f12=−f25, f13=−f24, f14=−f23, f15=−f22, f16=−f21, f17=−f20, and f18=−f19.

In an embodiment, when the RU has a first set of 52 positive-indexed subcarriers, pilots are included at potential pilot tone positions f19, f20, f21 and f22. When the RU has a second set of 52 positive-indexed subcarriers, pilots are included at potential pilot tone positions f23, f24, f25 and f26. When the RU has a third set of 52 positive-indexed subcarriers, pilots are included at potential pilot tone positions f29, f30, f31 and f32. When the RU has a fourth set of 52 positive-indexed subcarriers, pilots are included at potential pilot tone positions f33, f34, f35 and f36.

In an embodiment, when the RU has a first set of 106 positive-indexed subcarriers, pilots are included at potential pilot tone positions f19, c21, c24 and c26. When the RU has a second set of 106 positive-indexed subcarriers, pilots are included at potential pilot tone positions c29, c31, c34 and c36.

In an embodiment, when the RU has a first set of 26 positive-indexed subcarriers, pilots are included at potential pilot tone positions f19 and f20. When the RU has a second set of 26 positive-indexed subcarriers, pilots are included at potential pilot tone positions f21 and f22. When the RU has a third set of 26 positive-indexed subcarriers, pilots are included at potential pilot tone positions f23 and f24. When the RU has a fourth set of 26 positive-indexed subcarriers, pilots are included at potential pilot tone positions f25 and f26. When the RU has a fifth set of 26 positive-indexed subcarriers, pilots are included at potential pilot tone positions f27 and f28. When the RU has a sixth set of 26 positive-indexed subcarriers, pilots are included at potential pilot tone positions f29 and f30. When the RU has a seventh set of 26 positive-indexed subcarriers, pilots are included at potential pilot tone positions f31 and f32. When the RU has an eighth set of 26 positive-indexed subcarriers, pilots are included at potential pilot tone positions f33 and f34. When the RU has a ninth set of 26 positive-indexed subcarriers, pilots are included at potential pilot tone positions f35 and f36.

In an embodiment, when the RU has a first set of 106 negative-indexed subcarriers, pilots are included at potential pilot tone positions f1, f3, f 6 and f8. When the RU has a second set of 106 negative-indexed subcarriers, pilots are included at potential pilot tone positions f11, f13, f16 and f18.

In an embodiment, when the RU has a first set of 52 negative-indexed subcarriers, pilots are included at potential pilot tone positions f1, f2, f3 and f4. When the RU has a second set of 52 negative-indexed subcarriers, pilots are included at potential pilot tone positions f5, f6, f7 and f8. When the RU has a third set of 52 negative-indexed subcarriers, pilots are included at potential pilot tone positions f11, f12, f13 and f14. When the RU has a fourth set of 52 negative-indexed subcarriers, pilots are included at potential pilot tone positions f15, f16, f17 and f18.

In an embodiment, when the RU has a first set of 26 negative-indexed subcarriers, pilots are included at potential pilot tone positions f1 and f2. When the RU has a second set of 26 negative-indexed subcarriers, pilots are included at potential pilot tone positions f3 and f4. When the RU has a third set of 26 negative-indexed subcarriers, pilots are included at potential pilot tone positions f5 and f6. When the RU has a fourth set of 26 negative-indexed subcarriers, pilots are included at potential pilot tone positions f7 and f8. When the RU has a fifth set of 26 negative-indexed subcarriers, pilots are included at potential pilot tone positions f9 and f10. When the RU has a sixth set of 26 negative-indexed subcarriers, pilots are included at potential pilot tone positions f11 and f12. When the RU has a seventh set of 26 negative-indexed subcarriers, pilots are included at potential pilot tone positions f13 and f14. When the RU has an eighth set of 26 negative-indexed subcarriers, pilots are included at potential pilot tone positions f15 and f16. When the RU has a ninth set of 26 negative-indexed subcarriers, pilots are included at potential pilot tone positions f17 and f18.

In an embodiment, when the RU has 242 positive-indexed subcarriers, pilots are included at potential pilot tone positions f19, f21, f24, f26, f29, f31, f34 and f36. When the RU has 242 negative-indexed subcarriers, pilots are included at potential pilot tone positions f1, f3, f6, f8, f11, f13, f16, and f18.

In an embodiment, when the RU has 484 subcarriers that are split into 242 positive-indexed subcarriers and 242 negative-indexed subcarriers by DC tones, pilots are included at potential pilot tone positions f1, f3, f6, f8, f11, f13, f16, f18, f19, f21, f24, f26, f29, f31, f34 and f36.

In an embodiment, a method of a wireless device for receiving a frame comprises receiving, on 40 MHz channel, a frame including a resource unit including pilots, and processing pilots in the resource unit. The frame has 36 potential pilot tone positions f1 to f36 corresponding to subcarrier indices. For the respective subcarrier indices, f36>f35>f34>f33>f32>f31>f30>f29>f28>f27>f26>f25>f24>f23>f22>f21>f20>f19>f18>f17>f16>f15>f14>f13>f12>f11>f10>f9>f8>f7>f6>f5>f4>f3>f2>f1.

In an embodiment, for the respective subcarrier indices, f1=−f36, f2=−f35, f3=−f34, f4=−f33, f5=−f32, f6=431, f7=430, f8=−f29, f9=−f28, f10=−f27, f11=−f26, f12=−f25, f13=−f24, f14=−f23, f15=−f22, f16=−f21, f17=−f20, and f18=−f19.

In an embodiment, when the RU has a first set of 52 positive-indexed subcarriers, pilots are included at potential pilot tone positions f19, f20, f21 and f22. When the RU has a second set of 52 positive-indexed subcarriers, pilots are included at potential pilot tone positions f23, f24, f25 and f26. When the RU has a third set of 52 positive-indexed subcarriers, pilots are included at potential pilot tone positions f29, f30, f31 and f32. When the RU has a fourth set of 52 positive-indexed subcarriers, pilots are included at potential pilot tone positions f33, f34, f35 and f36.

In an embodiment, when the RU has a first set of 106 positive-indexed subcarriers, pilots are included at potential pilot tone positions f19, c21, c24 and c26. When the RU has a second set of 106 positive-indexed subcarriers, pilots are included at potential pilot tone positions c29, c31, c34 and c36.

In an embodiment, when the RU has a first set of 26 positive-indexed subcarriers, pilots are included at potential pilot tone positions f19 and f20. When the RU has a second set of 26 positive-indexed subcarriers, pilots are included at potential pilot tone positions f21 and f22. When the RU has a third set of 26 positive-indexed subcarriers, pilots are included at potential pilot tone positions f23 and f24. When the RU has a fourth set of 26 positive-indexed subcarriers, pilots are included at potential pilot tone positions f25 and f26. When the RU has a fifth set of 26 positive-indexed subcarriers, pilots are included at potential pilot tone positions f27 and f28. When the RU has a sixth set of 26 positive-indexed subcarriers, pilots are included at potential pilot tone positions f29 and f30. When the RU has a seventh set of 26 positive-indexed subcarriers, pilots are included at potential pilot tone positions f31 and f32. When the RU has an eighth set of 26 positive-indexed subcarriers, pilots are included at potential pilot tone positions f33 and f34. When the RU has a ninth set of 26 positive-indexed subcarriers, pilots are included at potential pilot tone positions f35 and f36.

In an embodiment, when the RU has a first set of 106 negative-indexed subcarriers, pilots are included at potential pilot tone positions f1, f3, f6 and f8. When the RU has a second set of 106 negative-indexed subcarriers, pilots are included at potential pilot tone positions f11, f13, f16 and f18.

In an embodiment, when the RU has a first set of 52 negative-indexed subcarriers, pilots are included at potential pilot tone positions f1, f2, f3 and f4. When the RU has a second set of 52 negative-indexed subcarriers, pilots are included at potential pilot tone positions f5, f6, f7 and f8. When the RU has a third set of 52 negative-indexed subcarriers, pilots are included at potential pilot tone positions f11, f12, f13 and f14. When the RU has a fourth set of 52 negative-indexed subcarriers, pilots are included at potential pilot tone positions f15, f16, f17 and f18.

In an embodiment, when the RU has a first set of 26 negative-indexed subcarriers, pilots are included at potential pilot tone positions f1 and f2. When the RU has a second set of 26 negative-indexed subcarriers, pilots are included at potential pilot tone positions f3 and f4. When the RU has a third set of 26 negative-indexed subcarriers, pilots are included at potential pilot tone positions f5 and f6. When the RU has a fourth set of 26 negative-indexed subcarriers, pilots are included at potential pilot tone positions f7 and f8. When the RU has a fifth set of 26 negative-indexed subcarriers, pilots are included at potential pilot tone positions f9 and f10. When the RU has a sixth set of 26 negative-indexed subcarriers, pilots are included at potential pilot tone positions f11 and f12. When the RU has a seventh set of 26 negative-indexed subcarriers, pilots are included at potential pilot tone positions f13 and f14. When the RU has an eighth set of 26 negative-indexed subcarriers, pilots are included at potential pilot tone positions f15 and f16. When the RU has a ninth set of 26 negative-indexed subcarriers, pilots are included at potential pilot tone positions f17 and f18.

In an embodiment, when a RU has 242 positive-indexed subcarriers, pilots are included at potential pilot tone positions f19, f21, f24, f26, f29, f31, f34 and f36. When the RU has 242 negative-indexed subcarriers, pilots are included at potential pilot tone positions f1, f3, f6, f8, f11, f13, f16, and f18.

In an embodiment, when the RU has 484 subcarriers that are split into 242 positive-indexed subcarriers and 242 negative-indexed subcarriers by DC tones, pilots are included at potential pilot tone positions f1, f3, f6, f8, f11, f13, f16, f18, f19, f21, f24, f26, f29, f31, f34 and f36.

Embodiments further include frames having a nested pilot structure between 26-subchannel resource units and 52-subchannel resource units.

In an embodiment, a method of a wireless device for transmitting a frame comprises providing pilots in a resource unit, and transmitting a frame including the resource unit. When the resource unit has 52 subcarriers whose lowest index number is f0, pilots are included at a first pilot tone position, a second pilot tone position, a third pilot tone position, and a fourth pilot tone position, respectively. When the resource unit has 26 subcarriers whose lowest index number is equal to f0, pilots are included at a fifth pilot tone position, and a sixth pilot tone position, respectively. The fifth pilot tone position is the same as the first pilot tone position, and the sixth pilot tone position is the same as the second pilot tone position.

In an embodiment, when the resource unit has 26 subcarriers whose lowest index number is equal to (f0+26), pilots are included at a seventh pilot tone position, and an eighth pilot tone position, respectively. The seventh pilot tone position is the same as the third pilot tone position, and the eighth pilot tone position is the same as the fourth pilot tone position.

In an embodiment, when the resource unit has 52 subcarriers whose lowest index number is equal to f0 and is an even number, the first pilot tone position is spaced six subcarriers away from the lowest-indexed subcarrier of the resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced five subcarriers away from the highest-indexed subcarrier of the resource unit.

In an embodiment, when the resource unit has 52 subcarriers whose lowest index number is equal to f0 and is an odd number, the first pilot tone position is spaced five subcarriers away from the lowest-indexed subcarrier of the resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced six subcarriers away from the highest-indexed subcarrier of the resource unit.

In an embodiment, when the resource unit has 26 subcarriers whose lowest index number is equal to f0 and is an even number, the fifth pilot tone position is spaced six subcarriers away from the lowest-indexed subcarrier of the resource unit and the sixth pilot tone position is separated by thirteen subcarriers from the fifth pilot tone position and spaced five subcarriers away from the highest-indexed subcarrier of the resource unit.

In an embodiment, when the resource unit has 26 subcarriers whose lowest index number is equal to f0 and is an odd number, the fifth pilot tone position is spaced five subcarriers away from the lowest-indexed subcarrier of the resource unit and the sixth pilot tone position is separated by thirteen subcarriers from the fifth pilot tone position and spaced six subcarriers away from the highest-indexed subcarrier of the resource unit.

In an embodiment, when the resource unit has 26 subcarriers whose lowest index number is equal to (f0+26) and is an even number, the seventh pilot tone position is spaced six subcarriers away from the lowest-indexed subcarrier of the resource unit and the eighth pilot tone position is separated by thirteen subcarriers from the seventh pilot tone position and spaced five subcarriers away from the highest-indexed subcarrier of the resource unit.

In an embodiment, when the resource unit has 26 subcarriers whose lowest index number is equal to (f0+26) and is an odd number, the seventh pilot tone position is spaced five subcarriers away from the lowest-indexed subcarrier of the resource unit and the eighth pilot tone position is separated by thirteen subcarriers from the seventh pilot tone position and spaced six subcarriers away from the highest-indexed subcarrier of the resource unit.

In an embodiment, a method of a wireless device for receiving a frame comprises receiving a frame including a resource unit including pilots and processing pilots in the resource unit. When the resource unit has 52 subcarriers whose lowest index number is f0, pilots are included at a first pilot tone position, a second pilot tone position, a third pilot tone position, and a fourth pilot tone position, respectively. When the resource unit has 26 subcarriers whose lowest index number is f0, pilots are included at a fifth pilot tone position, and a sixth pilot tone position, respectively. The fifth pilot tone position is the same as the first pilot tone position. The sixth pilot tone position is the same as the second pilot tone position.

In an embodiment, when the resource unit has 26 subcarriers whose lowest index number is equal to (f0+26), pilots are included at a seventh pilot tone position, and an eighth pilot tone position, respectively. The seventh pilot tone position is the same as the third pilot tone position. The eighth pilot tone position is the same as the fourth pilot tone position.

In an embodiment, when the resource unit has 52 subcarriers whose lowest index number is equal to f0 and is an even number, the first pilot tone position is spaced six subcarriers away from the lowest-indexed subcarrier of the resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced five subcarriers away from the highest-indexed subcarrier of the resource unit.

In an embodiment, when the resource unit has 52 subcarriers whose lowest index number is equal to f0 and is an odd number, the first pilot tone position is spaced five subcarriers away from the lowest-indexed subcarrier of the resource unit, the second pilot tone position is separated by thirteen subcarriers from the first pilot tone position, the third pilot tone position is separated by eleven subcarriers from the second pilot tone position, and the fourth pilot tone position is separated by thirteen subcarriers from the third pilot tone position and spaced six subcarriers away from the highest-indexed subcarrier of the resource unit.

In an embodiment, when the resource unit has 26 subcarriers whose lowest index number is equal to f0 and is an even number, the fifth pilot tone position is spaced six subcarriers away from the lowest-indexed subcarrier of the resource unit, and the sixth pilot tone position is separated by thirteen subcarriers from the fifth pilot tone position and spaced five subcarriers away from the highest-indexed subcarrier of the resource unit.

In an embodiment, when the resource unit has 26 subcarriers whose lowest index number is equal to f0 and is an odd number, the fifth pilot tone position is spaced five subcarriers away from the lowest-indexed subcarrier of the resource unit, and the sixth pilot tone position is separated by thirteen subcarriers from the fifth pilot tone position and spaced six subcarriers away from the highest-indexed subcarrier of the resource unit.

In an embodiment, when the resource unit has 26 subcarriers whose lowest index number is equal to (f0+26) and is an even number, the seventh pilot tone position is spaced six subcarriers away from the lowest-indexed subcarrier of the resource unit, and the eighth pilot tone position is separated by thirteen subcarriers from the seventh pilot tone position and spaced five subcarriers away from the highest-indexed subcarrier of the resource unit.

In an embodiment, when the resource unit has 26 subcarriers whose lowest index number is equal to (f0+26) and is an odd number, the seventh pilot tone position is spaced five subcarriers away from the lowest-indexed subcarrier of the resource unit, and the eighth pilot tone position is separated by thirteen subcarriers from the seventh pilot tone position and spaced six subcarriers away from the highest-indexed subcarrier of the resource unit.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method of a wireless device for transmitting a frame, the method comprising:
determining, by the wireless device, a plurality of Resource Units (RUs) of the frame;
providing, by the wireless device, a first plurality of pilots in a first RU of the frame at a first set of positions, respectively;
providing, by the wireless device, a second plurality of pilots in a second RU of the frame at a second set of positions, respectively; and
transmitting, by the wireless device, the frame,
wherein the first set of positions is different from the second set of positions,
wherein the frame is an Orthogonal Frequency Division Multiple Access (OFDMA) frame and the plurality of RUs include respective pluralities of subcarriers,
wherein the first RU includes a lowest subcarrier having an odd-numbered index,
wherein the second RU includes a lowest subcarrier having an even-numbered index,
wherein the first RU is a 52-subcarrier RU and the second RU is a 52-subcarrier RU,
wherein the first set of positions include a first pilot tone position spaced five subcarriers away from a lowest-indexed subcarrier of the first RU, a second pilot tone position separated by thirteen subcarriers from the first pilot tone position, a third pilot tone position separated by eleven subcarriers from the second pilot tone position, and a fourth pilot tone position separated by thirteen subcarriers from the third pilot tone position and spaced six subcarriers away from a highest-indexed subcarrier of the first RU, and
wherein the second set of positions include a fifth pilot tone position spaced six subcarriers away from a lowest-indexed subcarrier of the first RU, a sixth pilot tone position separated by thirteen subcarriers from the fifth pilot tone position, a seventh pilot tone position separated by eleven subcarriers from the sixth pilot tone position, and an eighth pilot tone position separated by thirteen subcarriers from the seventh pilot tone position and spaced five subcarriers away from a highest-indexed subcarrier of the second RU.

2. A method of a wireless device for transmitting a frame, the method comprising:
determining, by the wireless device, a plurality of Resource Units (RUs) of the frame;
providing, by the wireless device, a first plurality of pilots in a first RU of the frame at a first set of positions, respectively;
providing, by the wireless device, a second plurality of pilots in a second RU of the frame at a second set of positions, respectively; and
transmitting, by the wireless device, the frame,
wherein the first set of positions is different from the second set of positions, wherein the frame is an Orthogonal Frequency Division Multiple Access (OFDMA) frame and the plurality of RUs include respective pluralities of subcarriers, wherein the first RU includes a lowest subcarrier having an odd-numbered index, wherein the second RU includes a lowest subcarrier having an even-numbered index, wherein the first RU is a 26-subcarrier RU, wherein the second RU is a 26-subcarrier RU, wherein the first set of positions include a first pilot tone position spaced five subcarriers away from a lowest-indexed subcarrier of the first RU and a second pilot tone position separated by thirteen subcarriers from the first pilot tone position and spaced six subcarriers away from a highest-indexed subcarrier of the first RU, and wherein the second set of positions includes a third pilot tone position spaced six subcarriers away from a lowest-indexed subcarrier of the second RU and a fourth pilot tone position separated by thirteen subcarriers from the third pilot tone position and spaced five subcarriers away from a highest-indexed subcarrier of the second RU.

3. The method of claim 2, the method further comprising:

providing a third plurality of pilots in a third RU of the frame at a third set of positions, respectively, wherein the second set of positions is different from the third set of positions, wherein the third RU is a 26-subcarrier RU, and wherein the third RU is a center RU that is split into 13 positive-indexed subcarriers and 13 negative-indexed subcarriers by DC tones.

4. The method of claim 3, wherein the third set of positions includes a fifth pilot tone position spaced six subcarriers away from a lowest-indexed subcarrier of the third RU and a sixth pilot tone position spaced six subcarriers away from a highest-indexed subcarrier of the third RU.

5. The method of claim 2, wherein the first set of positions is a mirror image of the second set of positions.

6. The method of claim 2, wherein the frame includes a 2X High Efficiency (HE) Long Training Field (HE-LTF), and wherein the first set of positions respectively correspond to locations of non-null subcarriers of symbols of the 2X HE-LTF, and wherein the second set of positions respectively correspond to the locations of the non-null subcarriers of the symbols of the 2X HE-LTF.

7. The method of claim 2, wherein pilot tone positions for all RUs in a lower half of a 20 MHz channel are mirror symmetric to pilot one positions for corresponding mirrored RUs in an upper half of the 20 MHz channel.

8. The method of claim 2, wherein pilot tone positions for all RUs in a lower half of a 40 MHz channel are mirror symmetric to pilot tone positions for corresponding mirrored RUs in an upper half of the 40 MHz channel.

9. A method of a wireless device for transmitting a frame, the method comprising:

providing, by the wireless device, pilots in a resource unit and transmitting, by the wireless device, the frame, the frame including the resource unit, wherein when a lowest subcarrier of the resource unit has an odd index, a plurality of pilots are included at a first set of positions in the resource unit, respectively, wherein when a lowest subcarrier of the resource unit has an even index, a plurality of pilots are included at a second set of positions in the resource unit, respectively, wherein the second set of positions is different from the first set of positions, wherein the resource unit is a 52-subcarrier resource unit, wherein the first set of positions include a first pilot tone position spaced five subcarriers away from a lowest-indexed subcarrier of the resource unit, a second pilot tone position separated by thirteen subcarriers from the first pilot tone position, a third pilot tone position separated by eleven subcarriers from the second pilot tone position, and a fourth pilot tone position separated by thirteen subcarriers from the third pilot tone position and spaced six subcarriers away from a highest-indexed subcarrier of the resource unit, and wherein the second set of positions include a fifth pilot tone position spaced six subcarriers away from a lowest-indexed subcarrier of the resource unit, a sixth pilot tone position tone separated by thirteen subcarriers from the fifth pilot tone position, a seventh pilot tone position separated by eleven subcarriers from the sixth pilot tone position, and an eighth pilot tone position separated by thirteen subcarriers from the seventh pilot tone position and spaced five subcarriers away from a highest-indexed subcarrier of the resource unit.

10. A method of a wireless device for transmitting a frame, the method comprising:

providing, by the wireless device, pilots in a resource unit and transmitting, by the wireless device, the frame, the frame including the resource unit, wherein when a lowest subcarrier of the resource unit has an odd index, a plurality of pilots are included at a first set of positions in the resource unit, respectively, wherein when a lowest subcarrier of the resource unit has an even index, a plurality of pilots are included at a second set of positions in the resource unit, respectively, wherein the second set of positions is different from the first set of positions, wherein the resource unit is a 26-subcarrier resource unit, wherein the first set of positions include a first pilot tone position spaced five subcarriers away from a lowest-indexed subcarrier of the resource unit and a second pilot tone position separated by thirteen subcarriers from the first pilot tone position and spaced six subcarriers away from a highest-indexed subcarrier of the resource unit, and wherein the second set of positions include includes a third pilot tone position spaced six subcarriers away from a lowest-indexed subcarrier of the resource unit and a fourth pilot tone position separated by thirteen subcarriers from the third pilot tone position and spaced five subcarriers away from a highest-indexed subcarrier of the resource unit.

11. The method of claim 10, wherein when the resource unit is a center resource unit that is split into 13 negative-indexed subcarriers and 13 positive-indexed subcarriers by DC tones, a plurality of pilots are included at a third set of positions in the resource unit, respectively, wherein the third set of positions is different from the second set of positions.

12. The method of claim 11, wherein the first set of positions include a first pilot tone position spaced five subcarriers away from a lowest-indexed subcarrier of the resource unit and a second pilot tone position separated by thirteen subcarriers from the first pilot tone position and spaced six subcarriers away from a highest-indexed subcarrier of the resource unit,
wherein the second set of positions include a third pilot tone position spaced six subcarriers away from a lowest-indexed subcarrier of the resource unit and a fourth pilot tone position separated by thirteen subcarriers from the third pilot tone position and spaced five subcarriers away from a highest-indexed subcarrier of the resource unit, and
wherein the third set of positions include a fifth pilot tone position spaced six subcarriers away from a lowest-indexed subcarrier of the resource unit and a sixth pilot tone position spaced six subcarriers away from a highest-indexed subcarrier of the resource unit.

13. A method of a wireless device for receiving a frame, the method comprising:
receiving, by the wireless device, the frame, the frame including a resource unit including pilots; and
processing, by the wireless device, the pilots,
wherein when a lowest subcarrier of the resource unit has an odd index, a plurality of pilots are included at a first set of positions in the resource unit, respectively,
wherein when a lowest subcarrier of the resource unit has even index, a plurality of pilots are included at a second set of positions in the resource unit, respectively, and
wherein the second set of positions is different from the first set of positions,
wherein the resource unit is a 52-subcarrier resource unit,
wherein the first set of positions include a first pilot tone position spaced five subcarriers away from a lowest-indexed subcarrier of the resource unit, a second pilot tone position separated by thirteen subcarriers from the first pilot tone position, a third pilot tone position separated by eleven subcarriers from the second pilot tone position, and a fourth pilot tone position separated by thirteen subcarriers from the third pilot tone position and spaced six subcarriers away from a highest-indexed subcarrier of the resource unit, and
wherein the second set of positions include a fifth pilot tone position spaced six subcarriers away from a lowest-indexed subcarrier of the resource unit, a sixth pilot tone position separated by thirteen subcarriers from the fifth pilot tone position, a seventh pilot tone position separated by eleven subcarriers from the sixth pilot tone position, and an eighth pilot tone position separated by thirteen subcarriers from the seventh pilot tone position and spaced five subcarriers away from a highest-indexed subcarrier of the resource unit.

14. A method of a wireless device for receiving a frame, the method comprising:
receiving, by the wireless device, the frame, the frame including a resource unit including pilots; and
processing, by the wireless device, the pilots,
wherein when a lowest subcarrier of the resource unit has an odd index, a plurality of pilots are included at a first set of positions in the resource unit, respectively,
wherein when a lowest subcarrier of the resource unit has even index, a plurality of pilots are included at a second set of positions in the resource unit, respectively, and
wherein the second set of positions is different from the first set of positions,
wherein the resource unit is a 26-subcarrier resource unit,
wherein the first set of positions include a first pilot tone position spaced five subcarriers away from a lowest-indexed subcarrier of the resource unit and a second pilot tone position separated by thirteen subcarriers from the first pilot tone position and spaced six subcarriers away from a highest-indexed subcarrier of the resource unit, and
wherein the second set of positions include a third pilot tone position spaced six subcarriers away from a lowest-indexed subcarrier of the resource unit and a fourth pilot tone position separated by thirteen subcarriers from the third pilot tone position and spaced five subcarriers away from a highest-indexed subcarrier of the resource unit.

15. The method of claim 14,
wherein when the resource unit is a center resource unit that is split into 13 negative-indexed subcarriers and 13 positive-indexed subcarriers by DC tones, a plurality of pilot are included at a third set of positions in the resource unit, respectively, and
wherein the third set of positions is different from the second set of positions.

16. The method of claim 15, wherein the first set of positions include a first pilot tone position spaced five subcarriers away from a lowest-indexed subcarrier of the resource unit and a second pilot tone position separated by thirteen subcarriers from the first pilot tone position and spaced six subcarriers away from a highest-indexed subcarrier of the resource unit,
wherein the second set of positions include a third pilot tone position spaced six subcarriers away from a lowest-indexed subcarrier of the resource unit and a fourth pilot tone position separated by thirteen subcarriers from the third pilot tone position and spaced five subcarriers away from a highest-indexed subcarrier of the resource unit, and
wherein the third set of positions include a fifth pilot tone position spaced six subcarriers away from a lowest-indexed subcarrier of the resource unit and a sixth pilot tone position spaced six subcarriers away from a highest-indexed subcarrier of the resource unit.

17. The method of claim 1, wherein the first set of positions is a mirror image of the second set of positions.

18. The method of claim 1, wherein the frame includes a 2X High Efficiency (HE) Long Training Field (HE-LTF), and
wherein the first set of positions respectively correspond to locations of non-null subcarriers of symbols of the 2X HE-LTF, and
wherein the second set of positions respectively correspond to the locations of the non-null subcarriers of the symbols of the 2X HE-LTF.

19. The method of claim 1, wherein pilot tone positions for all RUs in a lower half of a 20 MHz channel are mirror symmetric to pilot one positions for corresponding mirrored RUs in an upper half of the 20 MHz channel.

20. The method of claim 5, wherein pilot tone positions for all RUs in a lower half of a 40 MHz channel are mirror symmetric to pilot tone positions for corresponding mirrored RUs in an upper half of the 40 MHz channel.

* * * * *